(12) United States Patent
Ashrafi et al.

(10) Patent No.: US 10,530,435 B2
(45) Date of Patent: *Jan. 7, 2020

(54) SYSTEM AND METHOD FOR COMBINING MIMO AND MODE-DIVISION MULTIPLEXING

(71) Applicants: NXGEN PARTNERS IP, LLC, Dallas, TX (US); Nita Sue Linquist

(72) Inventors: Solyman Ashrafi, Plano, TX (US); Roger Linquist, Dallas, TX (US)

(73) Assignee: NXGEN PARTNERS IP, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,904

(22) Filed: Apr. 24, 2018

(65) Prior Publication Data

US 2018/0262243 A1 Sep. 13, 2018

Related U.S. Application Data

(63) Continuation of application No. 15/216,474, filed on Jul. 21, 2016, now Pat. No. 9,998,187, and a
(Continued)

(51) Int. Cl.
*H04B 7/0456* (2017.01)
*H04L 27/34* (2006.01)
(Continued)

(52) U.S. Cl.
CPC ......... *H04B 7/0456* (2013.01); *H04B 7/0469* (2013.01); *H04B 7/10* (2013.01);
(Continued)

(58) Field of Classification Search
CPC .............................. H04B 10/516; H04J 14/00
See application file for complete search history.

(56) References Cited

U.S. PATENT DOCUMENTS 3,459,466 A 8/1969 Giordmaine
3,614,722 A 10/1971 Jones
(Continued)

OTHER PUBLICATIONS

Wang, Jian, et al.; Terabit free-space data transmission employing orbital angular momentum multiplexing. Nature 3hotonics; 6, 488-96 (2012). (Year: 2012).*

(Continued)

*Primary Examiner* — Ross Varndell

(57) ABSTRACT

A communications system comprises first signal processing circuitry for receiving a plurality of input data streams and applying a different orthogonal function to each of the plurality of input data streams. Second signal processing circuitry processes each of the plurality of input data streams having the different orthogonal function applied thereto to multiplex a first group of the plurality of input data streams having a first group of orthogonal functions applied thereto onto a carrier signal and to multiplex a second group of the plurality of input data streams having a second group of orthogonal functions applied thereto onto the carrier signal. A MIMO transmitter transmits the carrier signal including the first group of the plurality of input data streams having the first group of orthogonal functions applied thereto and the second group of the plurality of input data streams having the second group of orthogonal functions applied thereto over a plurality of separate communications links. Each of the plurality of separate communications links go from one transmitting antenna of a plurality of transmitting antennas to each of a plurality of receiving antennas at a MIMO receiver.

30 Claims, 114 Drawing Sheets

US 10,530,435 B2
Page 2

Related U.S. Application Data continuation-in-part of application No. 14/882,085, filed on Oct. 13, 2015.

(60) Provisional application No. 62/196,075, filed on Jul. 23, 2015, provisional application No. 62/063,028, filed on Oct. 13, 2014.

(51) Int. Cl.
    *H04B 7/10*    (2017.01)
    *H04L 5/00*    (2006.01)
    *H04L 27/26*   (2006.01)
    *H04L 9/08*    (2006.01)

(52) U.S. Cl.
     CPC .......... *H04L 5/0014* (2013.01); *H04L 9/0852* (2013.01); *H04L 27/2639* (2013.01); *H04L 27/34* (2013.01); *H04L 5/0007* (2013.01)

(56) References Cited

U.S. PATENT DOCUMENTS

| | | | |
|---|---|---|---|
| 4,379,409 | A | 4/1983 | Primbsch et al. |
| 4,503,336 | A | 3/1985 | Hutchin et al. |
| 4,736,463 | A | 4/1988 | Chavez |
| 4,862,115 | A | 8/1989 | Lee et al. |
| 5,051,754 | A | 9/1991 | Newberg |
| 5,220,163 | A | 6/1993 | Toughlian et al. |
| 5,222,071 | A | 6/1993 | Pezeshki et al. |
| 5,272,484 | A | 12/1993 | Labaar |
| 5,543,805 | A | 8/1996 | Thaniyavarn |
| 5,555,530 | A | 9/1996 | Meehan |
| 6,337,659 | B1 | 1/2002 | Kim |
| 6,992,829 | B1 | 1/2006 | Jennings et al. |
| 7,577,165 | B1* | 8/2009 | Barrett .................. H04L 5/0001 370/205 |
| 7,729,572 | B1 | 6/2010 | Pepper et al. |
| 7,792,431 | B2 | 9/2010 | Jennings et al. |
| 8,184,972 | B2 | 5/2012 | Parker |
| 8,432,884 | B1 | 4/2013 | Ashrafi |
| 8,503,546 | B1 | 8/2013 | Ashrafi |
| 8,559,823 | B2 | 10/2013 | Izadpanah et al. |
| 8,811,366 | B2 | 8/2014 | Ashrafi |
| 9,077,577 | B1 | 7/2015 | Ashrafi |
| 9,998,187 | B2* | 6/2018 | Ashrafi ................ H04B 7/0456 |
| 2005/0254826 | A1 | 11/2005 | Jennings et al. |
| 2005/0259914 | A1 | 11/2005 | Padgett et al. |
| 2010/0013696 | A1 | 1/2010 | Schmitt et al. |
| 2012/0020423 | A1 | 1/2012 | Reuven et al. |
| 2012/0044917 | A1 | 2/2012 | O'Keeffe |
| 2012/0207470 | A1 | 8/2012 | Djordevic et al. |
| 2013/0027774 | A1 | 1/2013 | Bovino et al. |
| 2013/0235744 | A1 | 9/2013 | Chen |
| 2014/0016786 | A1 | 1/2014 | Sen |
| 2014/0140189 | A1* | 5/2014 | Shattil .................... H04B 7/026 370/208 |
| 2014/0355624 | A1* | 12/2014 | Li .......................... H04L 27/00 370/468 |
| 2015/0098697 | A1 | 4/2015 | Marom et al. |
| 2016/0127073 | A1 | 5/2016 | Ashrafi et al. |
| 2016/0204896 | A1 | 7/2016 | Yu |

OTHER PUBLICATIONS

Solyman Ashrafi, Channeling Radiation of Electrons in Crystal Lattices, Essays on Classical and Quantum Dynamics, Gordon and Breach Science Publishers, 1991.

Solyman Ashrafi, Solar Flux Forecasting Using Mutual Information with an Optimal Delay, Advances in the Astronautical Sciences, American Astronautical Society, vol. 84 Part II, 1993.

Solyman Ashrafi, PCS system design issues in the presence of microwave OFS, Electromagnetic Wave Interactions, Series on Stability, Vibration and Control of Systems, World Scientific, Jan. 1996.

Solyman Ashrafi, Performance Metrics and Design Parameters for an FSO Communications Link Based on Multiplexing of Multiple Orbital-Angular-Momentum Beams, IEEE Globecom 2014, paper 1570005079, Austin, TX, Dec. 2014(IEEE, Piscataway, NJ, 2014).

Solyman Ashrafi, Optical Communications Using Orbital Angular Momentum Beams, Adv. Opt. Photon. 7, 66-106, Advances in Optics and Photonic, 2015.

Solyman Ashrafi, Performance Enhancement of an Orbital-Angular-Momentum based Free-space Optical Communications Link Through Beam Divergence Controlling, IEEE/OSA Conference on Optical Fiber Communications (OFC) and National Fiber Optics Engineers Conference (NFOEC),paper M2F.6, Los Angeles, CA, Mar. 2015 (Optical Society of America, Washington, D.C., 2015).

Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.

Solyman Ashrafi, Link Analysis of Using Hermite-Gaussian Modes for Transmitting Multiple Channels in a Free-Space Optical Communication System, The Optical Society, vol. 2, No. 4, Apr. 2015.

Solyman Ashrafi, Performance Metrics and Design Considerations for a Free-Space Optical Orbital-Angular-Vlomentum Multiplexed Communication Link, The Optical Society, vol. 2, No. 4, Apr. 2015.

Solyman Ashrafi, Demonstration of Distance Emulation for an Orbital-Angular-Momentum Beam. OSA Technical Digest (online), paper STh1F.6. The Optical Society, 2015.

Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.

Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.

Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.

Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.

Solyman Ashrafi, Experimental Demonstration of Using Multi-Layer-Overlay Technique for Increasing Spectral Efficiency to 1.18 bitsls/Hz in a 3 Gbit/s Signal over 4-km Multimode Fiber. OSA Technical Digest (online), paper UTh2A.63. The Optical Society, 2015.

Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International communication Conference(ICC) 2015, paper1570038347, London, UK, Jun. 2015(IEEE, Piscataway, NJ, 2015).

Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.

Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC),paper M2F.1, Los Angeles, CA, Mar. 2015 (Optical Society of America, Washington, D.C., 2015).

Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.

Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.

(56) References Cited

OTHER PUBLICATIONS

Solyman Ashrafi, An Information Theoretic Framework to Increase Spectral Efficiency, IEEE Transactions on Information Theory, vol. XX, No. Y, Oct. 2014, Dallas, Texas.

Solyman Ashrafi, Acoustically induced stresses in elastic cylinders and their visualization, The Journal of the Acoustical Society of America 82(4):1378-1385, Sep. 1987.

Solyman Ashrafi, Splitting of channeling-radiation peaks in strained-layer superlattices, Journal of the Optical Society of America B 8(12), Nov. 1991.

Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.

Solyman Ashrafi, Orbital-Angular-Momentum-Multiplexed Free-Space Optical Communication Link Using Transmitter Lenses, Applied Optics, vol. 55, No. 8, pp. 2098-2103, 2016.

Solyman Ashrafi, 32 Gbit/s 60 GHz Millimeter-Wave Wireless Communications using Orbital-Angular-Momentum and Polarization Mulitplexing, IEEE International Communication Conference (ICC) 2016, paper 1570226040, Kuala Lumpur, Malaysia, May 2016 (IEEE, Piscataway, NJ, 2016).

Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).

Solyman Ashrafi, A Dual-Channel 60 GHz Communications Link Using Patch Antenna Arrays to Generate Data-Carrying Orbital-Angular-Momentum Beams, IEEE International Communication Conference (ICC) 2016, paper 1570224643, Kuala Lumpur, Malaysia, May 2016 (IEEE, Piscataway, NJ, 2016).

Solyman Ashrafi, Demonstration of OAM-based MIMO FSO link using spatial diversity and MIMO equalization for turbulence mitigation, IEEE/OSA Conference on Optical Fiber Communications (OFC), paper Th1H.2, Anaheim, CA, Mar. 2016 (Optical Society of America, Washington, D.C., 2016).

Solyman Ashrafi, Dividing and Multiplying the Mode Order for Orbital-Angular-Momentum Beams, European Conference on Optical Communications (Ecoc), paper Th.4.5.1, Valencia, Spain, Sep. 2015.

Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.

Solyman Ashrafi, Experimental Demonstration of a 400-Gbit/s Free Space Optical Link using Multiple Orbital-Angular-Momentum Beams with Higher Order Radial Indices, APS/IEEE/OSA Conference on Lasers and Electro-optics (CLEO), paper SW4M.5, San Jose, CA, May 2015 (OSA, Wash., D.C., 2015).

Solyman Ashrafi, Spurious Resonances and Modelling of Composite Resonators, 37th Annual Symposium on Frequency Control, 1983.

Solyman Ashrafi, Splitting and contrary motion of coherent bremsstrahlung peaks in strained-layer superlattices, Journal of Applied Physics 70:4190-4193, Dec. 1990.

Solyman Ashrafi, Nonlinear Techniques for Forecasting Solar Activity Directly From its Time Series, Proceedings of Flight Mechanics/Estimation Theory Symposium, National Aeronautics and Space Administration, May 1992.

Solyman Ashrafi, Demonstration of using Passive Integrated Phase Masks to Generate Orbital-Angular-Momentum Beams in a Communications Link, APS/IEEE/OSA Conference on Lasers and Electro-Optics (CLEO), paper 2480002, San Jose, CA, Jun. 2016 (OSA, Wash., D.C., 2016).

Solyman Ashrafi, Combining Schatten's Solar Activity Prediction Model with a Chaotic Prediction Model, National Aeronautics and Space Administration, Nov. 1991.

Solyman Ashrafi, Detecting and Disentangling Nonlinear Structure from Solar Flux Time Series, 43rd Congress of the International Astronautical Federation, Aug. 1992.

Solyman Ashrafi, Physical Phaseplate for the Generation of a Millimeter-Wave Hermite-Gaussian Beam, IEEE Antennas and Wireless Propagation Letters, RWS 2016; pp. 234-237.

Solyman Ashrafi, Future Mission Studies: Forecasting Solar Flux Directly From Its Chaotic Time Series, Computer Sciences Corp., Dec. 1991.

Solyman Ashrafi, CMA Equalization for a 2 Gb/s Orbital Angular Momentum Multiplexed Optical Underwater Link through Thermally Induced Refractive Index Inhomogeneity, APS/IEEE/OSA Conference on Lasers and Electro-optics (CLEO), paper 2479987, San Jose, CA, Jun. 2016 (OSA, Wash., D.C., 2016).

Solyman Ashrafi, 4 Gbit/s Underwater Transmission Using OAM Multiplexing and Directly Modulated Green Laser, APS/IEEE/OSA Conference on Lasers and Electro-Optics (CLEO), paper 2477374, San Jose, CA, Jun. 2016 (OSA, Wash., D.C., 2016).

Solyman Ashrafi, Evidence of Chaotic Pattern in Solar Flux Through a Reproducible Sequence of Period-Doubling-Type Bifurcations; Computer Sciences Corporation (CSC); Flight Mechanics/Estimation Theory Symposium; NASA Goddard Space Flight Center; Greenbelt, Maryland; May 21-23, 1991.

Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.

H. Yao et al.; Patch Antenna Array for the Generation of Millimeter-wave Hermite-Gaussian Beams, IEEE Antennas and Wireless Propagation Letters; 2016.

Yongxiong Ren et al.; Experimental Investigation of Data Transmission Over a Graded-index Multimode Fiber Using the Basis of Orbital Angular Momentum Modes.

Ren, Y. et al.; Experimental Demonstration of 16 Gbit/s millimeter-wave Communications using MIMO Processing of 2 OAM Modes on Each of Two Transmitter/Receiver Antenna Apertures. In Proc. IEEE GLobal TElecom. Conf. 3821-3826 (2014).

Li, X. et al.; Investigation of interference in multiple-input multiple-output wireless transmission at W band for an optical wireless integration system. Optics Letters 38, 742-744 (2013).

Padgett, Miles J. et al., Divergence of an orbital-angular-momentum-carrying beam upon propagation. New Journal of Physics 17, 023011 (2015).

Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).

Vasnetsov, M. V., Pasko, V.A. & Soskin, M.S.; Analysis of orbital angular momentum of a misaligned optical beam; New Journal of Physics 7, 46 (2005).

Byun, S.H., Haji, G.A. & Young, L.E.; Development and application of GPS signal multipath simulator; Radio Science, vol. 37, No. 6, 1098 (2002).

Tamburini, Fabrizio; Encoding many channels on the same frequency through radio vorticity: first experimental test; New Journal of Physics 14, 033001 (2012).

Gibson, G. et al., Free-space information transfer using light beans carrying orbital angular momentum; Optical Express 12, 5448-5456 (2004).

Yan, Y. et al.; High-capacity millimetre-wave communications with orbital angular momentum multiplexing; Nature Communications; 5, 4876 (2014).

Hur, Sooyoung et at.; Millimeter Wave Beamforming for Wireless Backhaul and Access in Small Cell Networks. IEEE Transactions on Communications, vol. 61, 4391-4402 (2013).

Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).

Anderson, Jorgen Bach; Rappaport, Theodore S.; Yoshida, Susumu; Propagation Measurements and Models for Wireless Communications Channels; 33 42-49 (1995).

(56) References Cited

OTHER PUBLICATIONS

Iskander, Magdy F.; Propagation Prediction Models for Wireless Communication Systems; IEEE Transactions on Microwave Theory and Techniques, vol. 50., No. 3, 662-673 (2002).
Wang, Jian, et al.; Terabit free-space data transmission employing orbital angular momentum multiplexing. Nature Photonics; 6, 488-496 (2012).
Katayama, Y., et al.; Wireless Data Center Networking with Steered-Beam mmWave Links; IEEE Wireless Communication Network Conference; 2011, 2179-2184 (2011).
Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).
Rapport, T.S.; Millimeter Wave Mobile Communications for 5G Cellular: It Will Work!; IEEE Access, 1, 335-349 (2013).
Huang, Hao et. al.; Crosstalk mitigation in a free-space orbital angular momentum multiplexed communication link using 4×4 Mimo equalization; Optics Letters, vol. 39, No. 15; 4360-4363; (2014).

* cited by examiner $$\Delta h = \frac{\ell \lambda}{n-1}$$

$\Delta h$

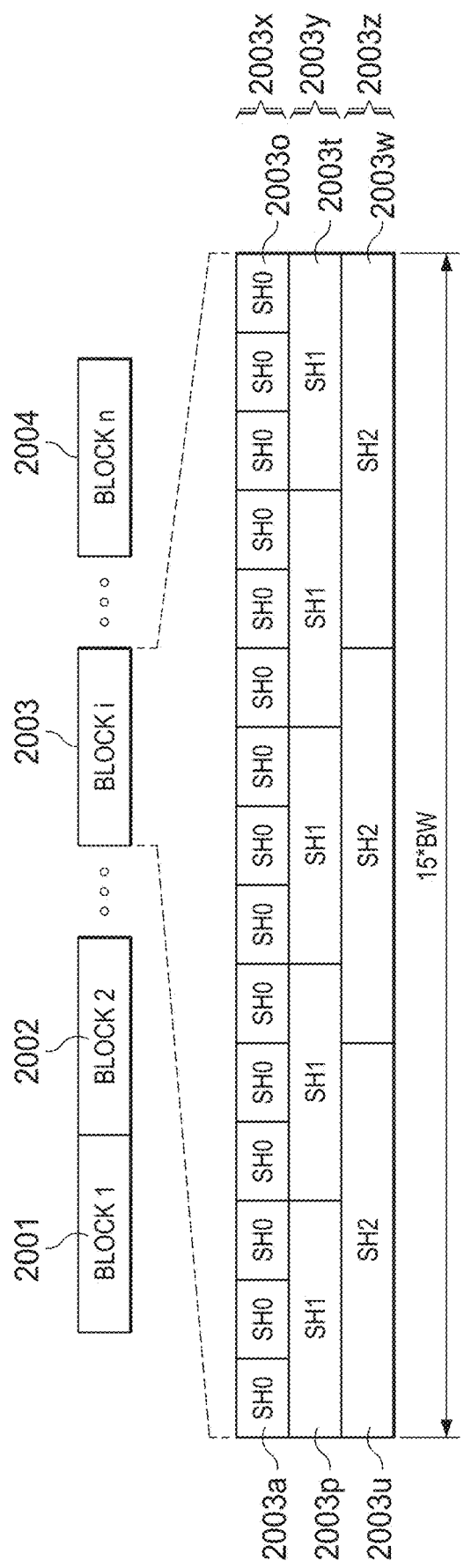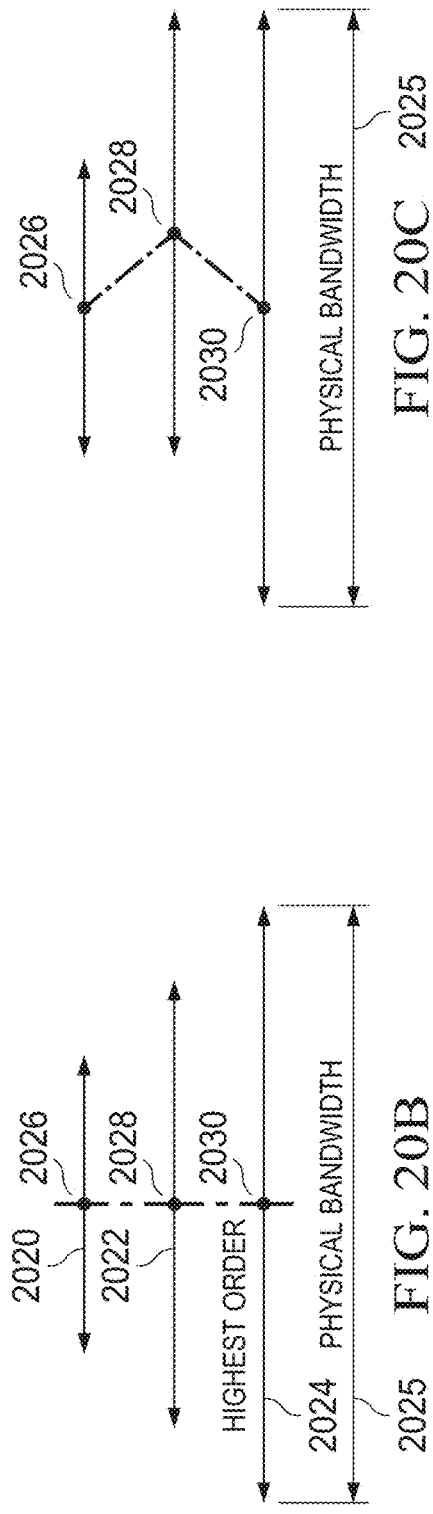
FIG. 20A
FIG. 20B
FIG. 20C $$\begin{bmatrix} y_1 \\ y_2 \\ y_3 \end{bmatrix} = \begin{bmatrix} h_{1,1} & h_{1,2} & h_{1,3} & h_{1,4} & h_{1,5} & h_{1,6} & h_{1,7} & h_{1,8} & h_{1,9} & h_{1,10} & h_{1,11} & h_{1,12} & h_{1,13} & h_{1,14} & h_{1,15} \\ h_{2,1} & h_{2,2} & h_{2,3} & h_{2,4} & h_{2,5} & h_{2,6} & h_{2,7} & h_{2,8} & h_{2,9} & h_{2,10} & h_{2,11} & h_{2,12} & h_{2,13} & h_{2,14} & h_{2,15} \\ h_{3,1} & h_{3,2} & h_{3,3} & h_{3,4} & h_{3,5} & h_{3,6} & h_{3,7} & h_{3,8} & h_{3,9} & h_{3,10} & h_{3,11} & h_{3,12} & h_{3,13} & h_{3,14} & h_{3,15} \end{bmatrix} \begin{bmatrix} x_{-2,1} \\ x_{-1,1} \\ x_{0,1} \\ x_{1,1} \\ x_{2,1} \\ x_{-2,2} \\ x_{-1,2} \\ x_{0,2} \\ x_{1,2} \\ x_{2,2} \\ x_{-2,3} \\ x_{-1,3} \\ x_{0,3} \\ x_{1,3} \\ x_{2,3} \end{bmatrix}$$

FIG. 25

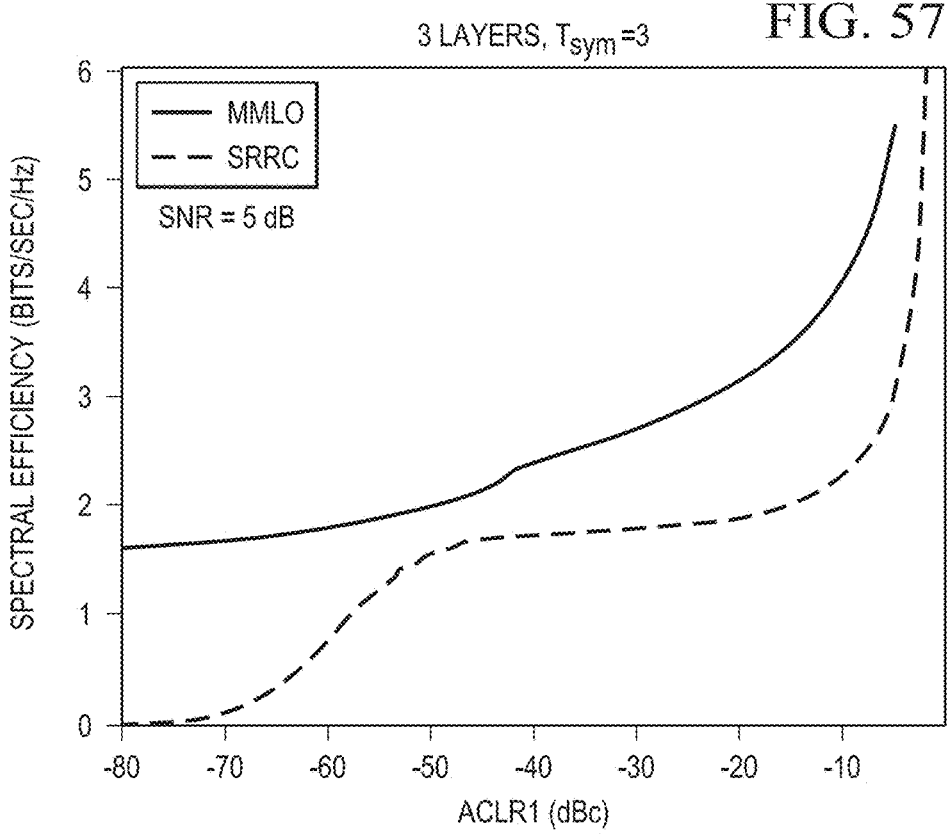
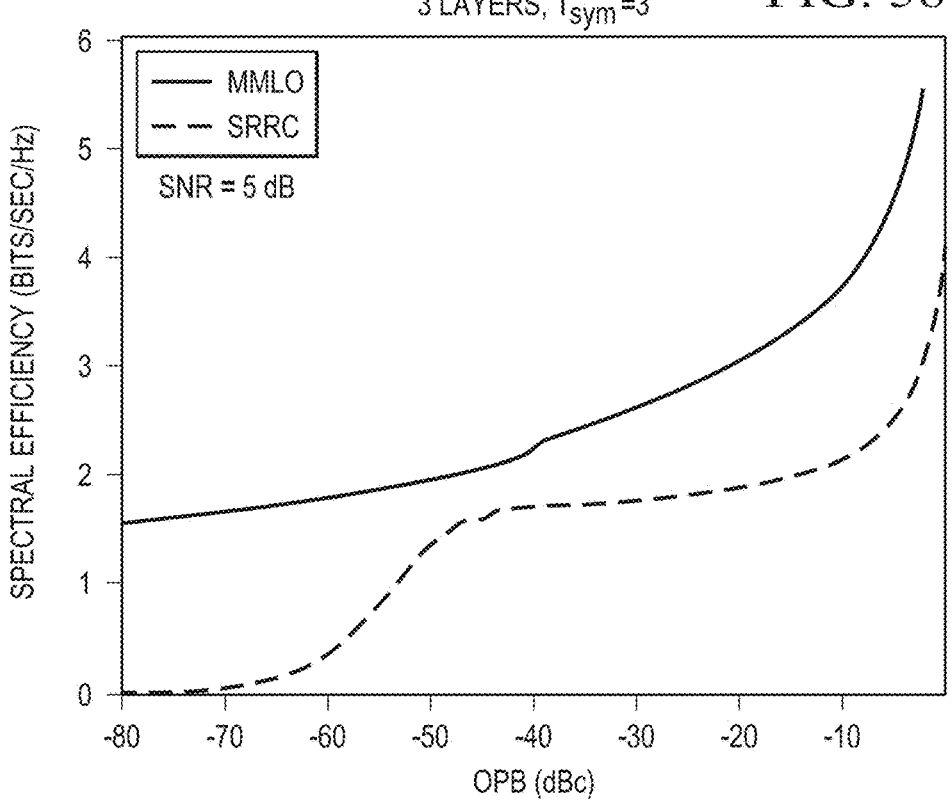

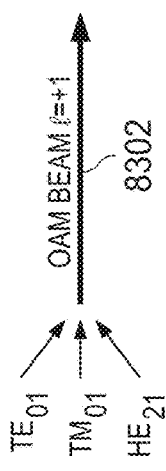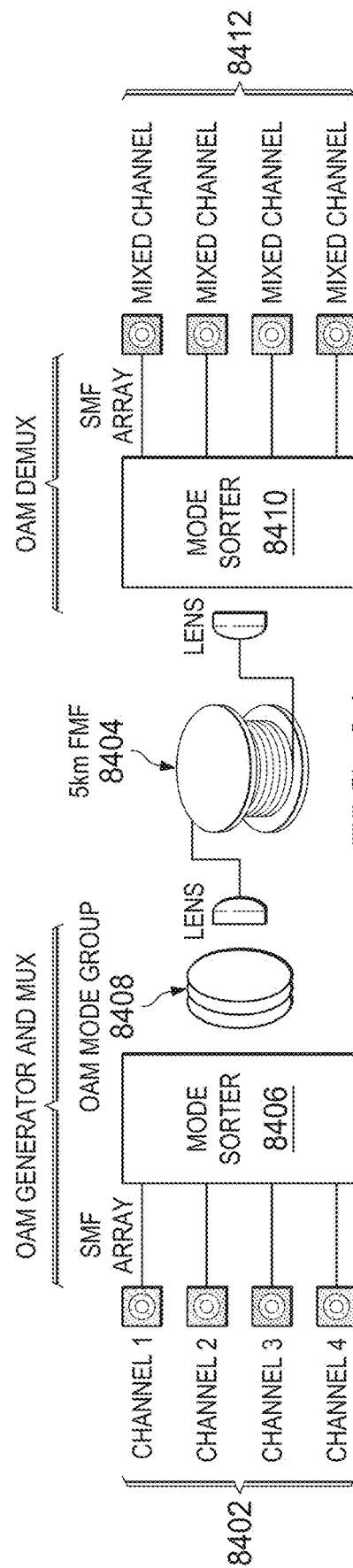

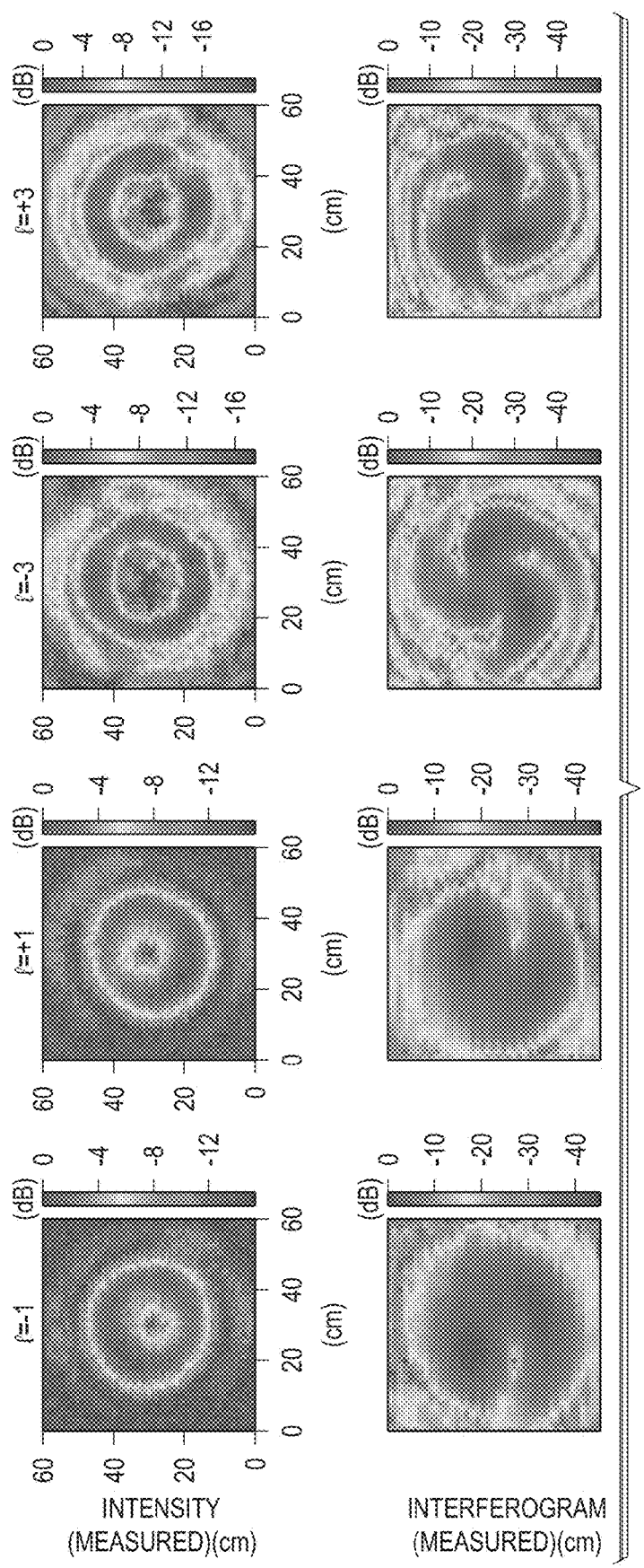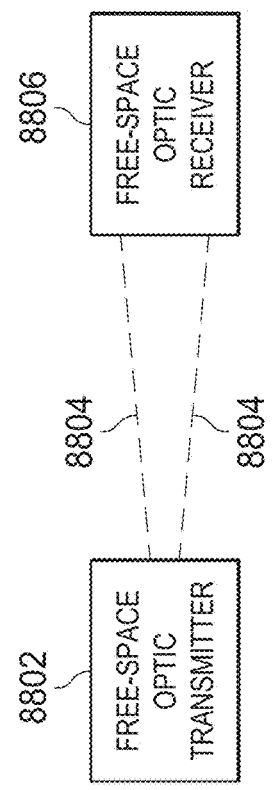
FIG. 87
FIG. 88

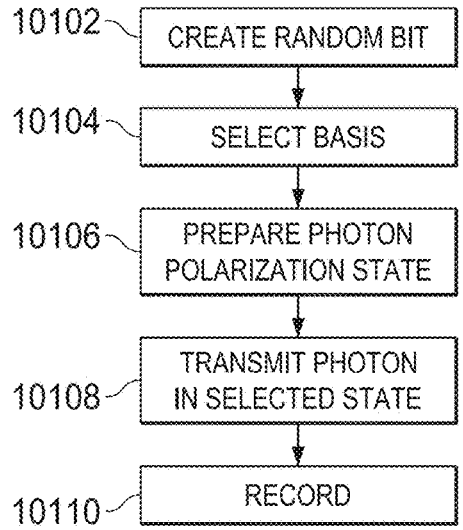
FIG. 101
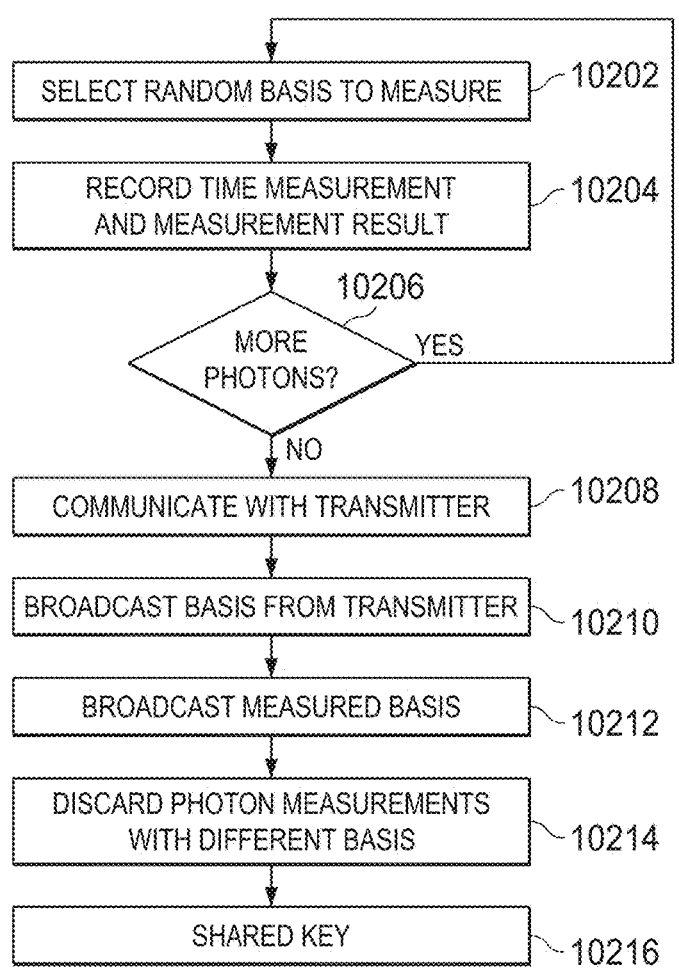
FIG. 102
| | | | | | | | | | |
|---|---|---|---|---|---|---|---|---|---|
| TRANSMITTER RANDOM BIT | 0 | 1 | 1 | 0 | 1 | 0 | 0 | 1 | |
| TRANSMITTER RANDOM SENDING BASIS | + | + | × | + | × | × | × | + | |
| PHOTON POLARIZATION TRANSMITTER SENDS | ↑ | → | ↘ | ↑ | ↘ | ↗ | ↗ | → | } 10302 |
| RECEIVER RANDOM MEASUREMENT BASIS | + | × | × | × | + | × | + | + | } 10304 |
| PHOTON POLARIZATION RECEIVER MEASURES | ↑ | ↗ | ↘ | ↗ | → | ↗ | → | → | } 10306 |
| PUBLIC DISCUSSION OF BASIS | | | | | | | | | } 10308 |
| SHARED SECRET KEY | 0 | | 1 | | 0 | | | 1 | } 10310 |
FIG. 103

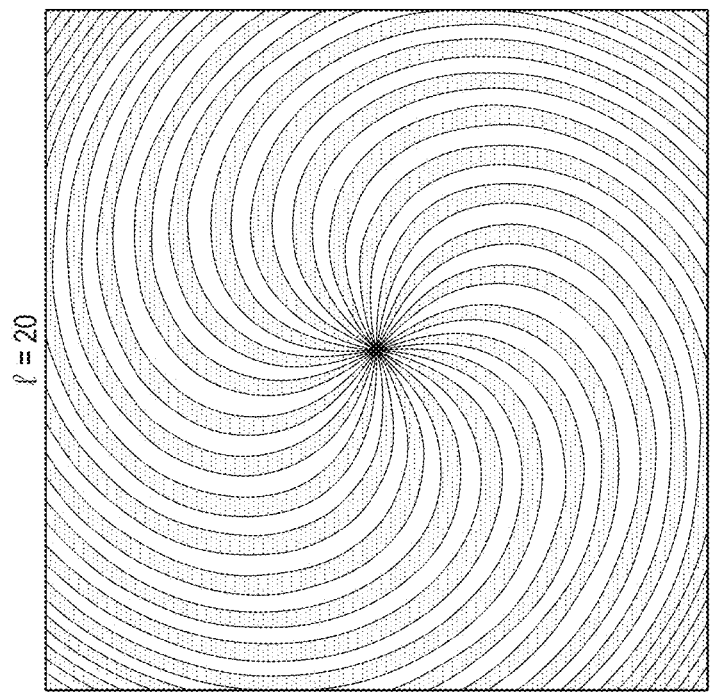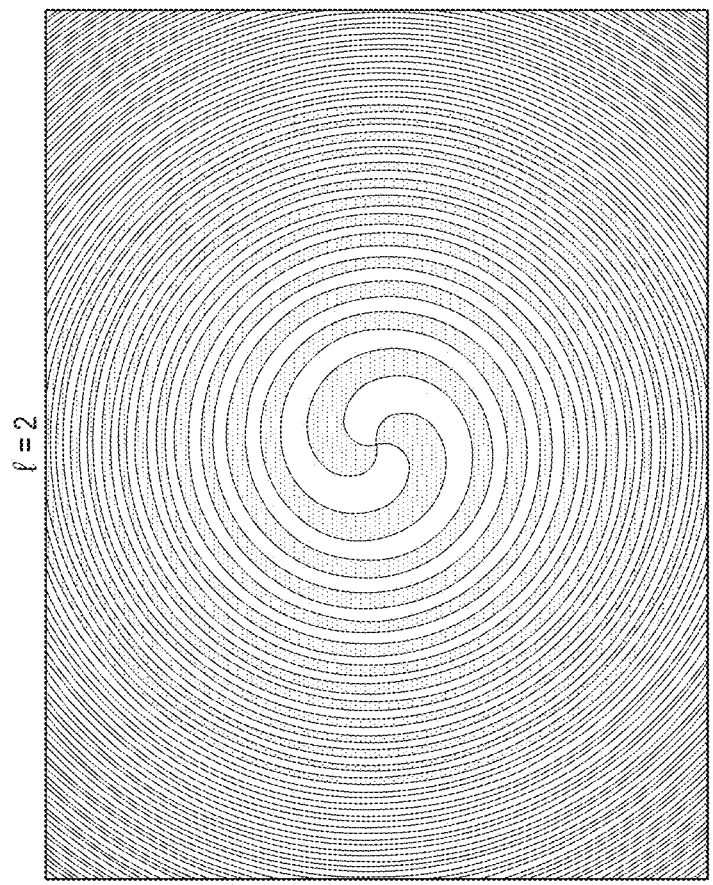
FIG. 138

SYSTEM AND METHOD FOR COMBINING MIMO AND MODE-DIVISION MULTIPLEXING

CROSS-REFERENCE TO RELATED APPLICATIONS

This application is a Continuation of U.S. patent application Ser. No. 15/216,474, filed on Jul. 21, 2016, entitled SYSTEM AND METHOD FOR COMBINING MIMO AND MODE-DIVISION MULTIPLEXING, which U.S. application Ser. No. 15/216,474 claims benefit of U.S. Provisional Application No. 62/196,075, filed on Jul. 23, 2015, entitled SYSTEM AND METHOD FOR COMBINING MIMO AND MODE-DIVISION MULTIPLEXING. U.S. application Ser. No. 15/216,474 is also a Continuation-In-Part of U.S. application Ser. No. 14/882,085, filed on Oct. 13, 2015, entitled APPLICATION OF ORBITAL ANGULAR MOMENTUM TO FIBER, FSO AND RF, which U.S. application Ser. No. 14/882,085 claims benefit of U.S. Provisional Application No. 62/063,028, filed Oct. 13, 2014, entitled APPLICATION OF ORBITAL ANGULAR MOMENTUM TO FIBER, FSO AND RF. U.S. patent application Ser. Nos. 15/216,474, 62/196,075, 14/882,085 and 62/063,028 are incorporated by reference herein in their entireties.

TECHNICAL FIELD

The following disclosure relates to systems and methods for increasing communication bandwidth, and more particularly to increasing communications bandwidth using a combination of mode division multiplexing (MDM) and multiple input, multiple output transmission systems.

BACKGROUND

The use of voice and data networks has greatly increased as the number of personal computing and communication devices, such as laptop computers, mobile telephones, Smartphones, tablets, et cetera, has grown. The astronomically increasing number of personal mobile communication devices has concurrently increased the amount of data being transmitted over the networks providing infrastructure for these mobile communication devices. As these mobile communication devices become more ubiquitous in business and personal lifestyles, the abilities of these networks to support all of the new users and user devices has been strained. Thus, a major concern of network infrastructure providers is the ability to increase their bandwidth in order to support the greater load of voice and data communications and particularly video that are occurring. Traditional manners for increasing the bandwidth in such systems have involved increasing the number of channels so that a greater number of communications may be transmitted, or increasing the speed at which information is transmitted over existing channels in order to provide greater throughput levels over the existing channel resources.

However, while each of these techniques have improved system bandwidths, existing technologies have taken the speed of communications to a level such that drastic additional speed increases are not possible, even though bandwidth requirements due to increased usage are continuing to grow exponentially. Additionally, the number of channels assigned for voice and data communications, while increasing somewhat, have not increased to a level to completely support the increasing demands of a voice and data intensive use society. Thus, there is a great need for some manner for increasing the bandwidth throughput within existing voice and data communication that increases the bandwidth on existing voice and data channels.

SUMMARY

The present invention, as disclosed and described herein, in at least one aspect thereof, comprises a communications system having first signal processing circuitry for receiving a plurality of input data streams and applying a different orthogonal function to each of the plurality of input data streams. Second signal processing circuitry processes each of the plurality of input data streams having the different orthogonal function applied thereto to multiplex a first group of the plurality of input data streams having a first group of orthogonal functions applied thereto onto a carrier signal and to multiplex a second group of the plurality of input data streams having a second group of orthogonal functions applied thereto onto the carrier signal. A MIMO transmitter transmits the carrier signal including the first group of the plurality of input data streams having the first group of orthogonal functions applied thereto and the second group of the plurality of input data streams having the second group of orthogonal functions applied thereto over a plurality of separate communications links. Each of the plurality of separate communications links go from one transmitting antenna of a plurality of transmitting antennas to each of a plurality of receiving antennas at a MIMO receiver.

BRIEF DESCRIPTION OF THE DRAWINGS

For a more complete understanding, reference is now made to the following description taken in conjunction with the accompanying Drawings in which:

FIG. 20A illustrates a spectral alignment of multiple level overlay signals for differing bandwidths of signals;

FIG. 20B-20C illustrate frequency domain envelopes located in separate layers within a same physical bandwidth;

FIG. 25 illustrates a fixed channel matrix;

FIG. 57 illustrates a spectral efficiency comparison based on ACLR1 between modified multiple layer overlay and square root raised cosine;

FIG. 58 illustrates a spectral efficiency comparison between modified multiple layer overlay and square root raised cosine based on OBP;

FIG. 83 illustrates a few mode fiber providing a linearly polarized OAM beam;

FIG. 84 illustrates the transmission of four OAM beams over a fiber;

FIG. 87 illustrates intensity profiles and interferograms of OAM beams;

FIG. 88 illustrates a free-space communication system;

FIG. 96 illustrates the OAM and ANG modes providing complementary 7 dimensional bases for information encoding;

FIG. 97 illustrates a block diagram of an OAM processing system utilizing quantum key distribution;

FIG. 98 illustrates a basic quantum key distribution system;

FIG. 99 illustrates the manner in which two separate states are combined into a single conjugate pair within quantum key distribution;

FIG. 100 illustrates one manner in which 0 and 1 bits may be transmitted using different basis within a quantum key distribution system;

FIG. 101 is a flow diagram illustrating the process for a transmitter transmitting a quantum key;

FIG. 102 illustrates the manner in which the receiver may receive and determine a shared quantum key;

Figure 104:
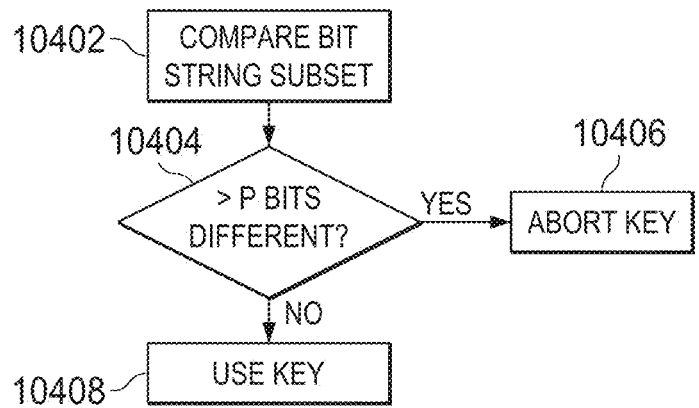
Figure 105:
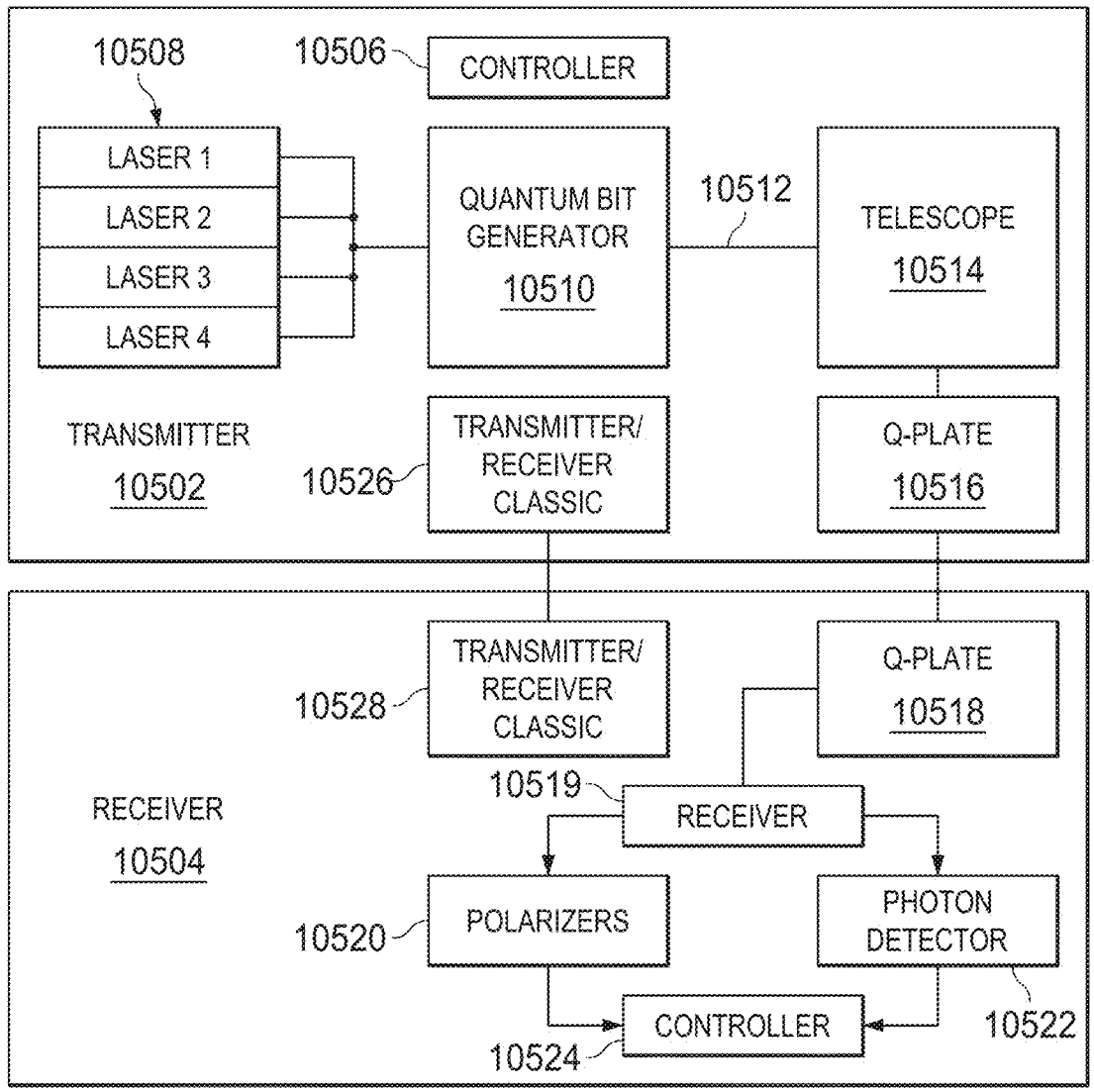
Figure 106:
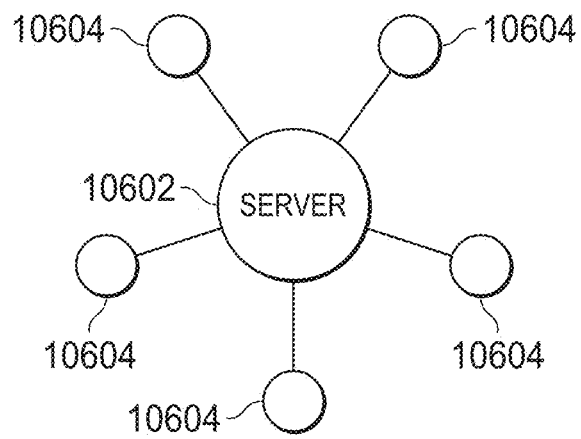
Figure 107:
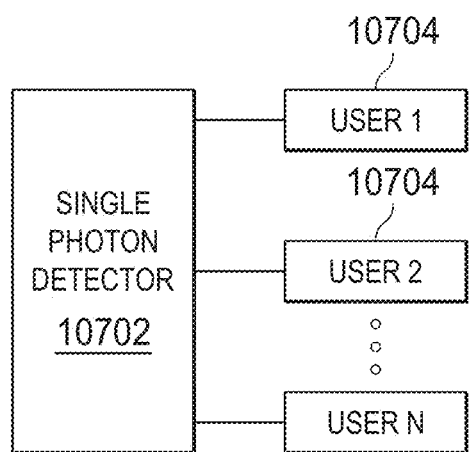
Figure 108:
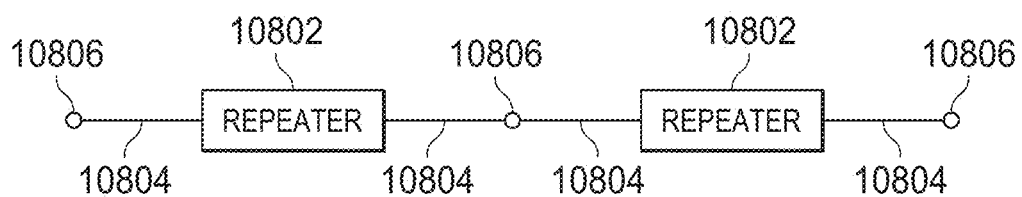

FIG. 103 more particularly illustrates the manner in which a transmitter and receiver may determine a shared quantum key;

FIG. 104 is a flow diagram illustrating the process for determining whether to keep or abort a determined key;

FIG. 105 illustrates a functional block diagram of a transmitter and receiver utilizing a free-space quantum key distribution system;

FIG. 106 illustrates a network cloud-based quantum key distribution system;

FIG. 107 illustrates a high-speed single photon detector in communication with a plurality of users; and FIG. 108 illustrates a nodal quantum key distribution network.

Figure 109:
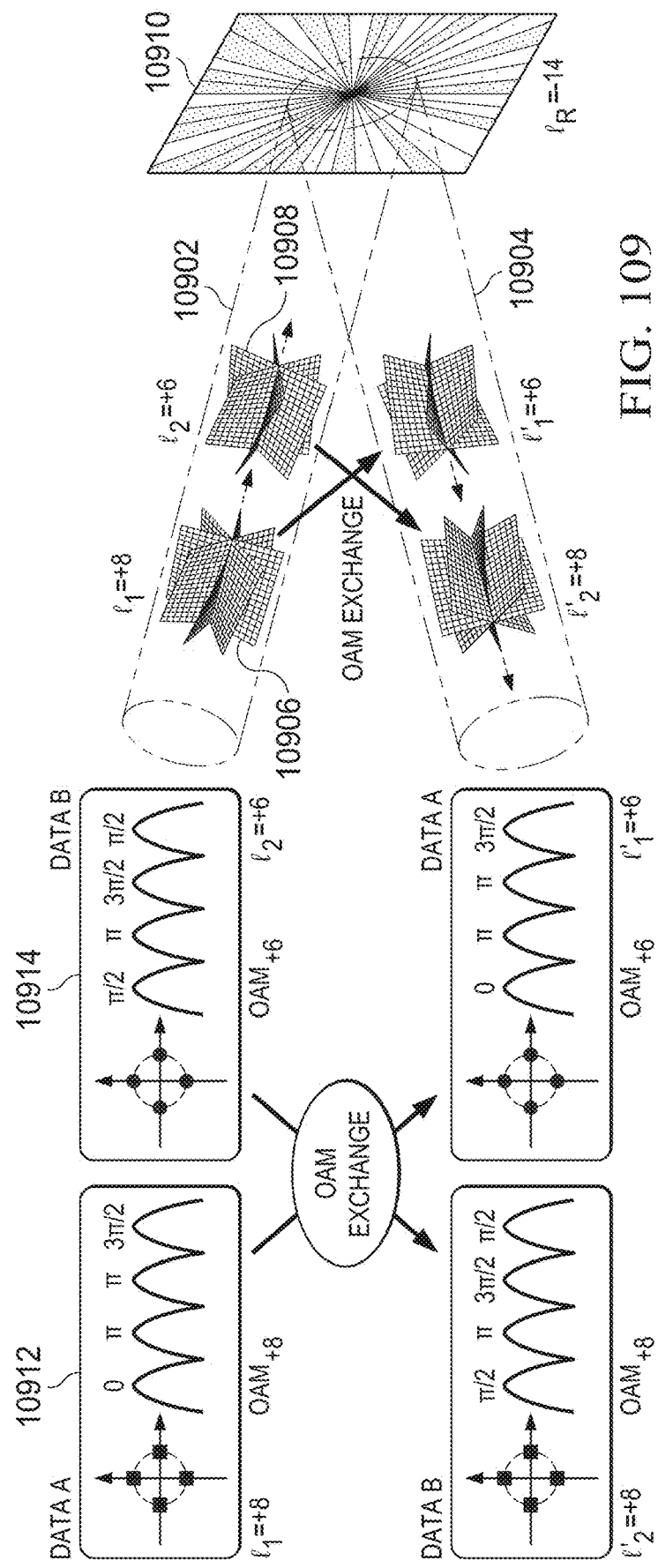
Figure 110:
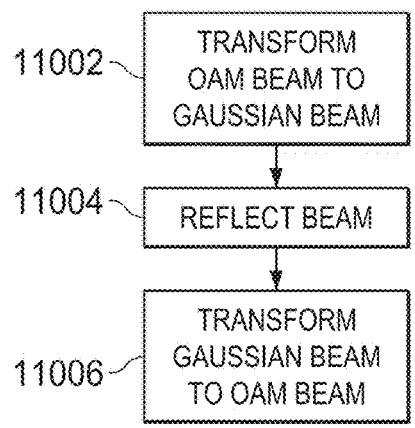
Figure 112:
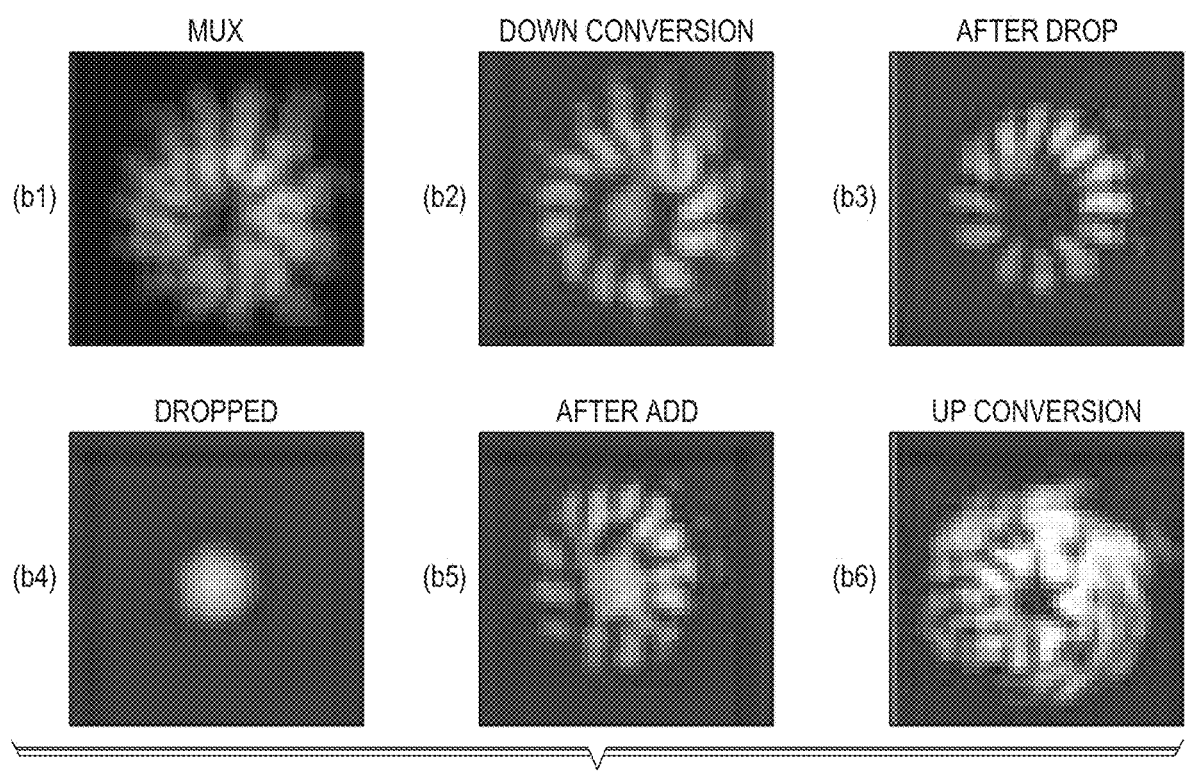
Figure 111:
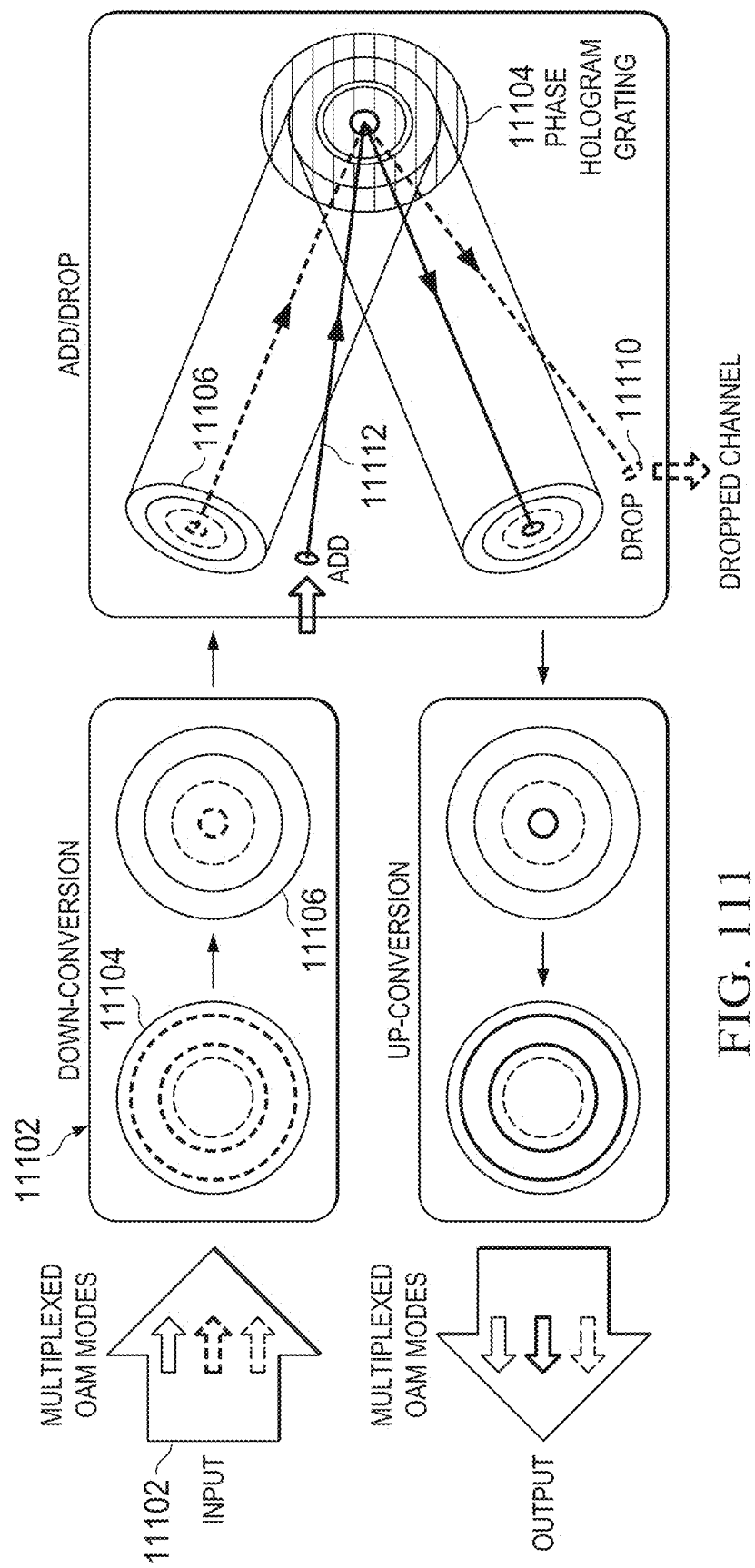
Figure 113:
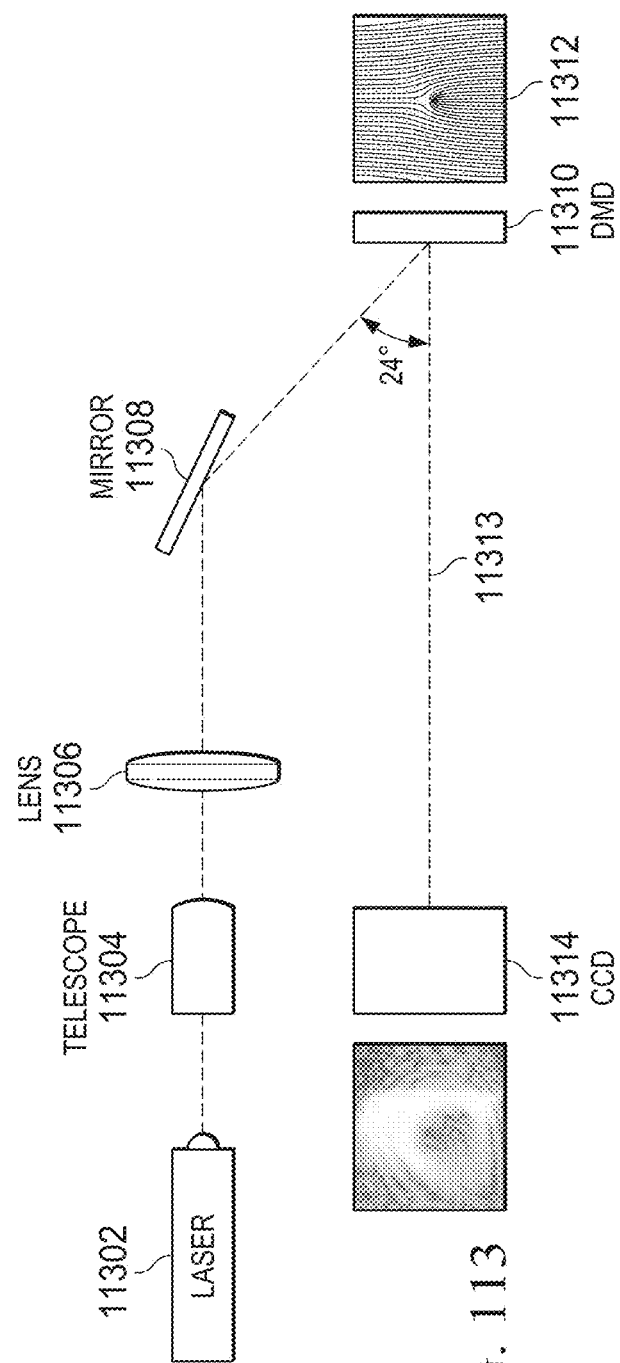
Figure 114:
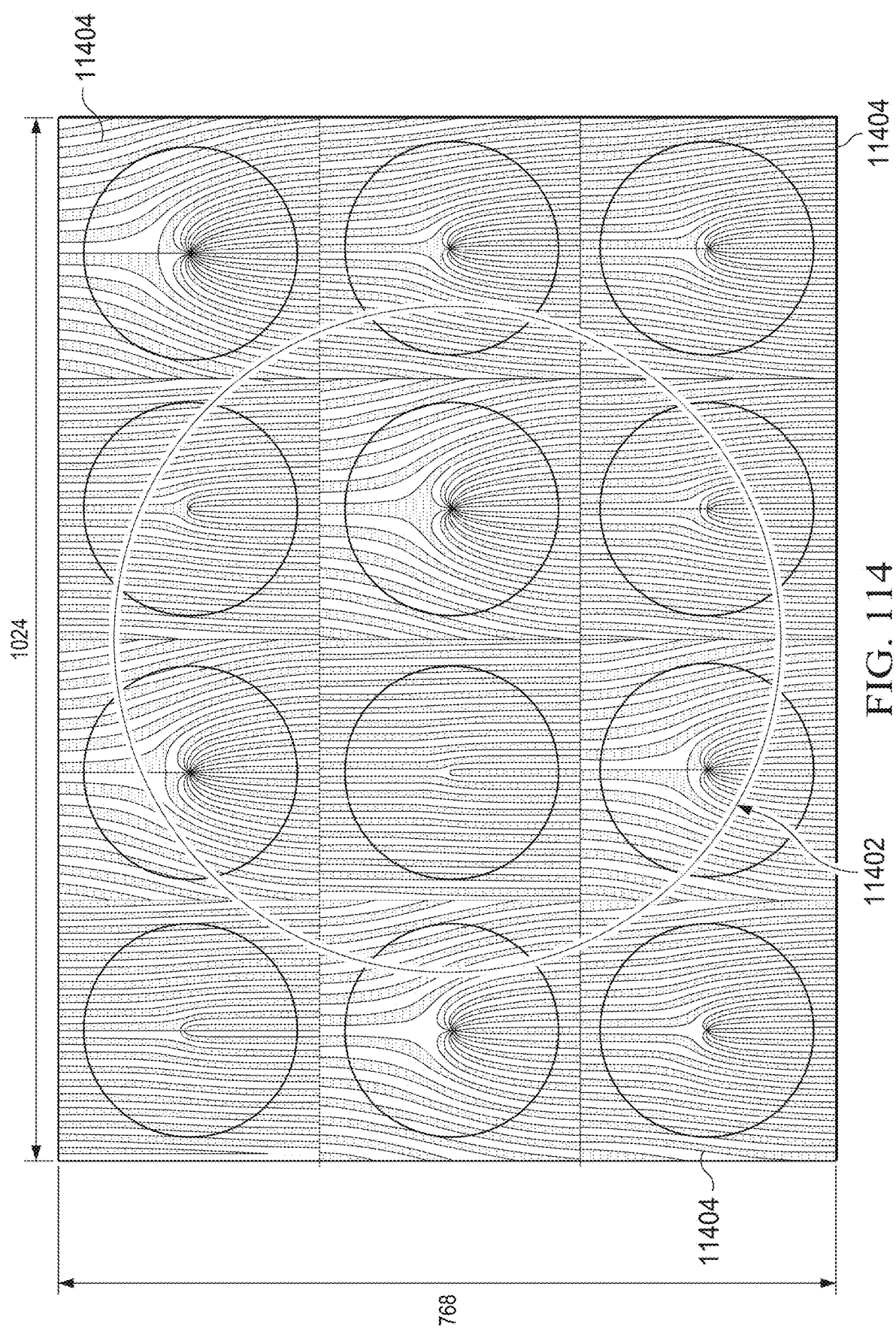
Figure 115:
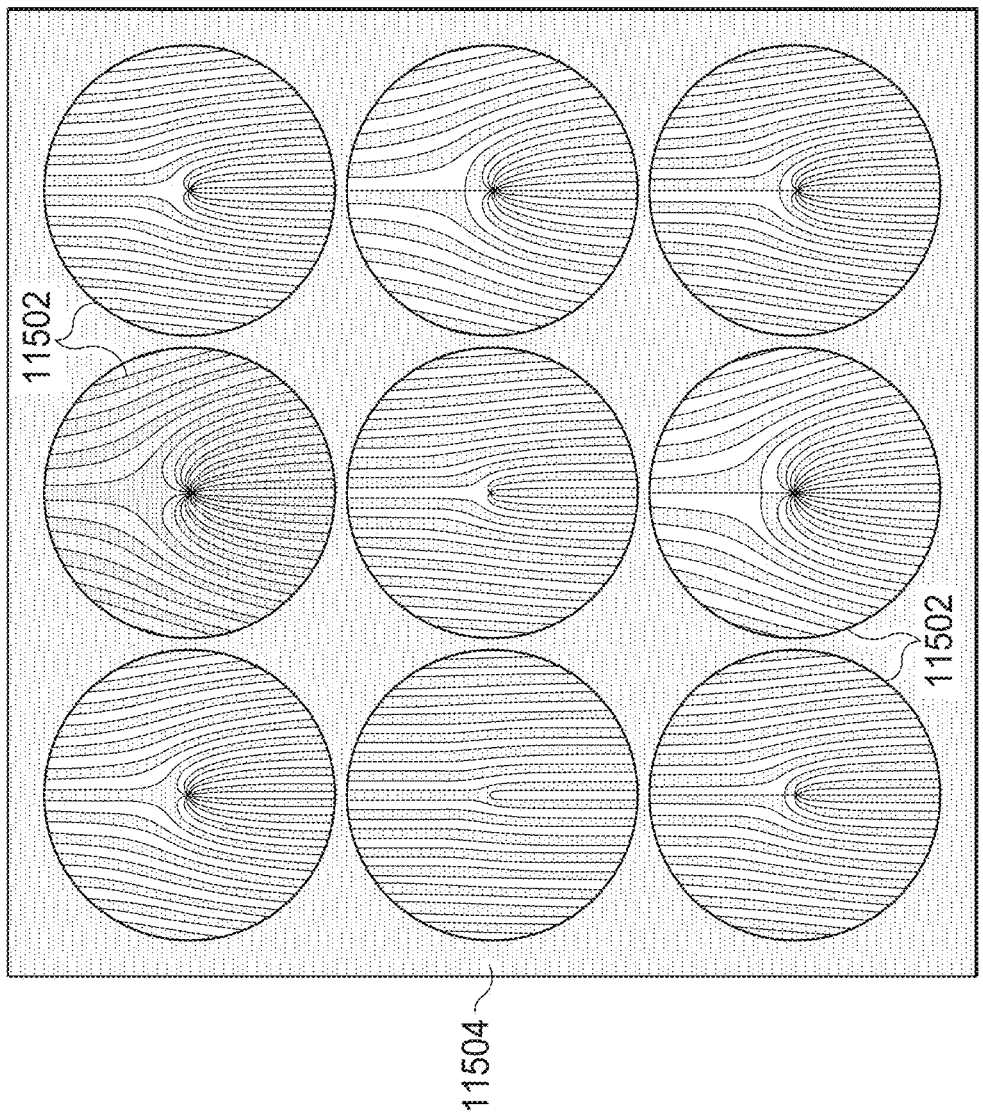
Figure 116:
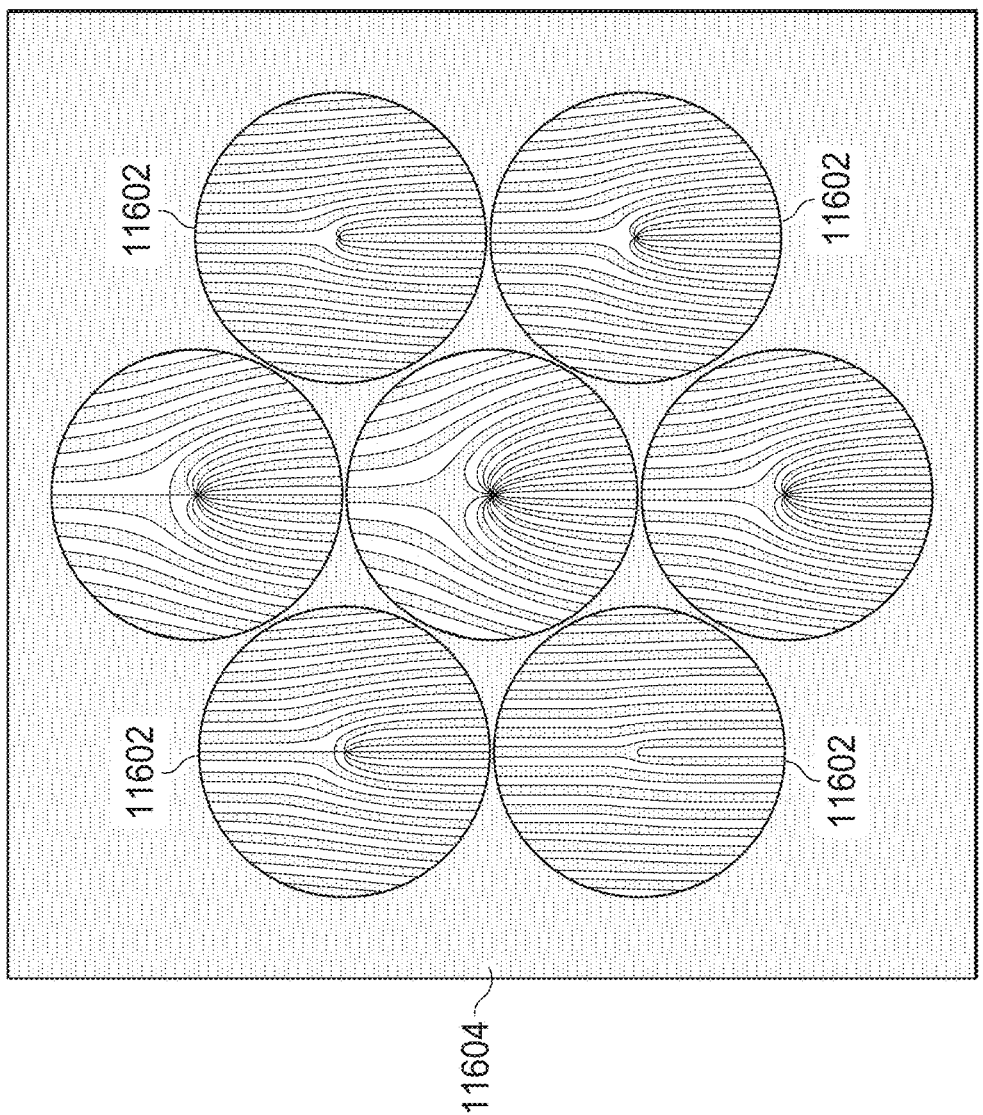
Figure 117:
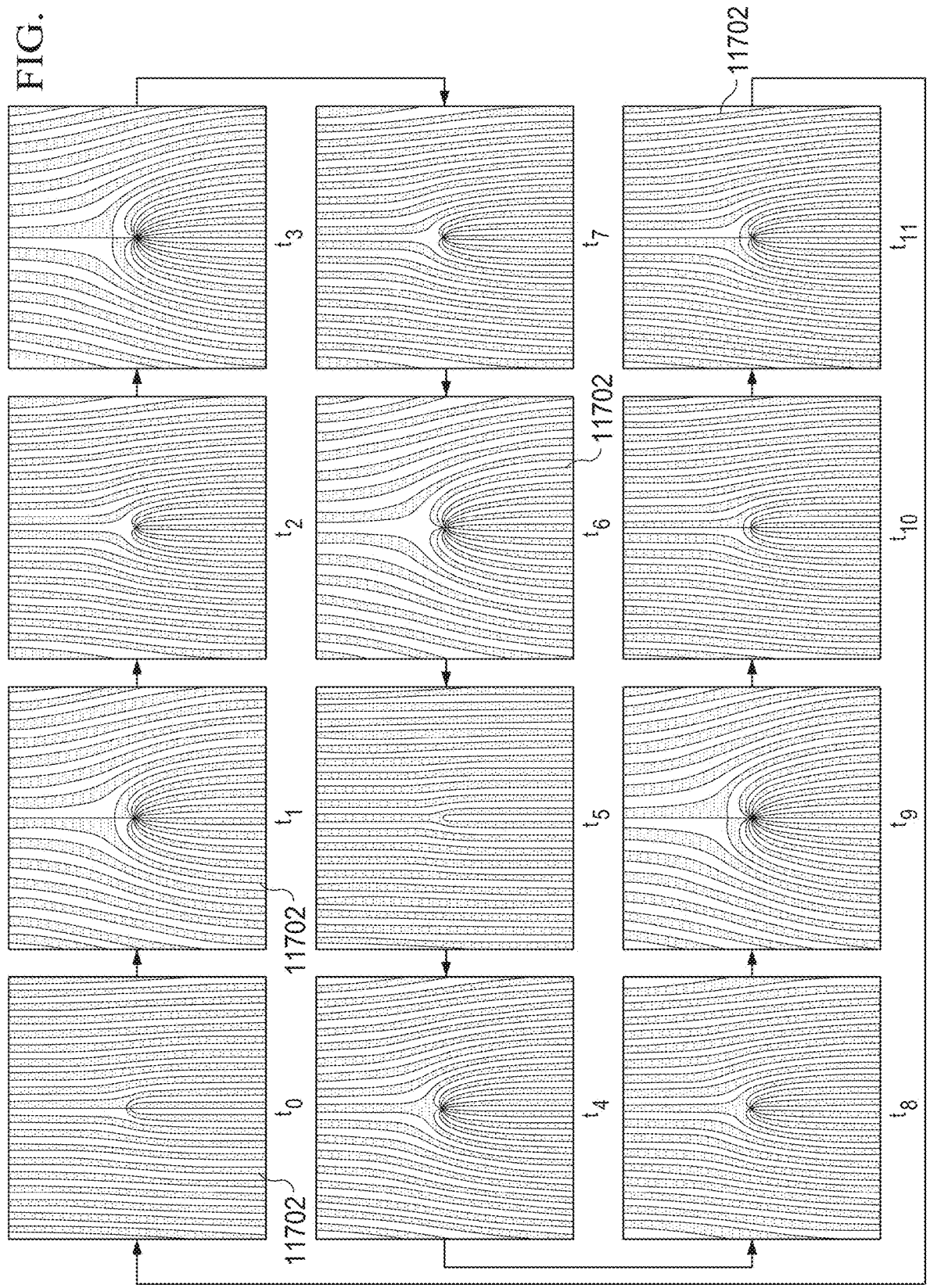
Figure 118:
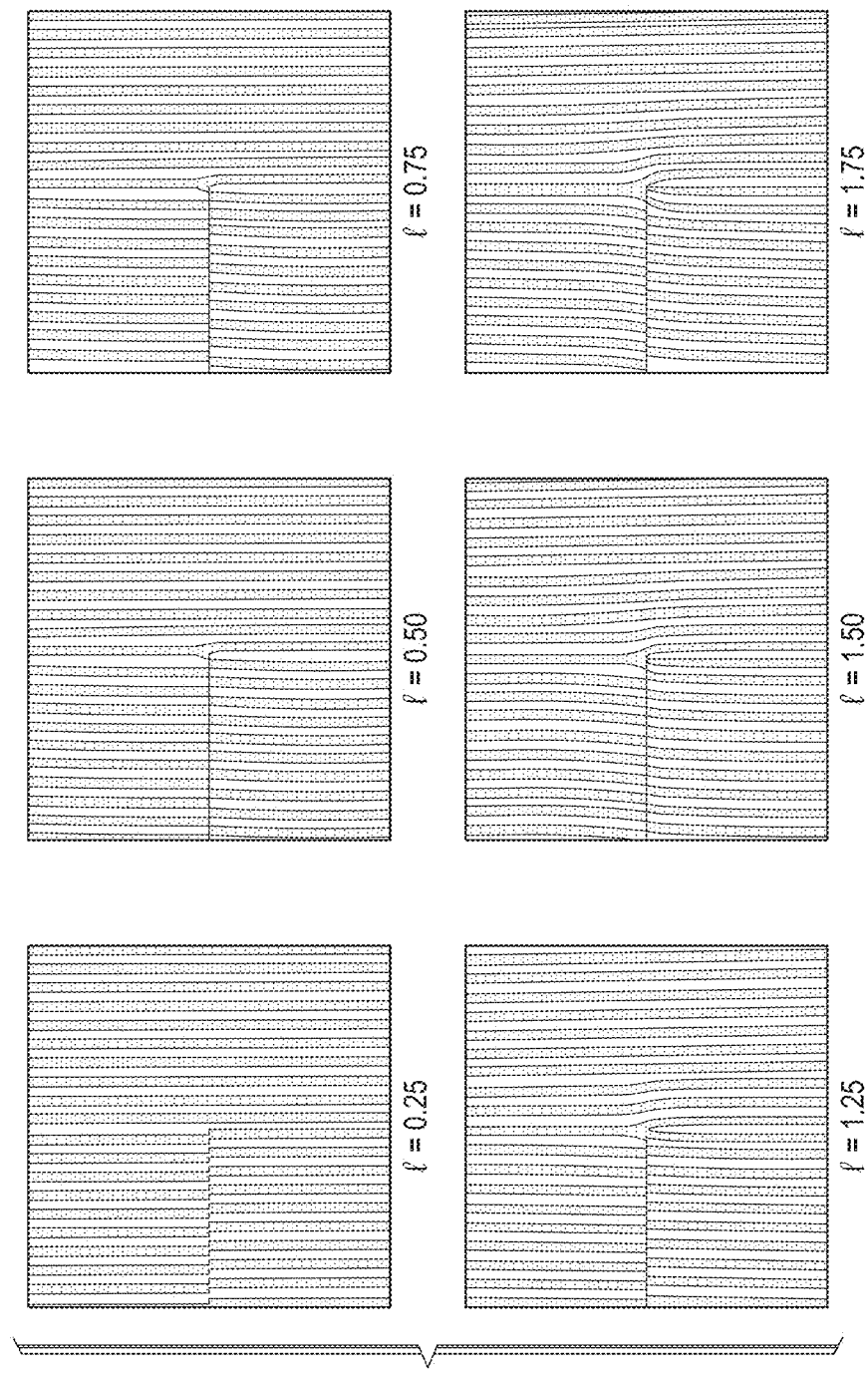
Figure 119:
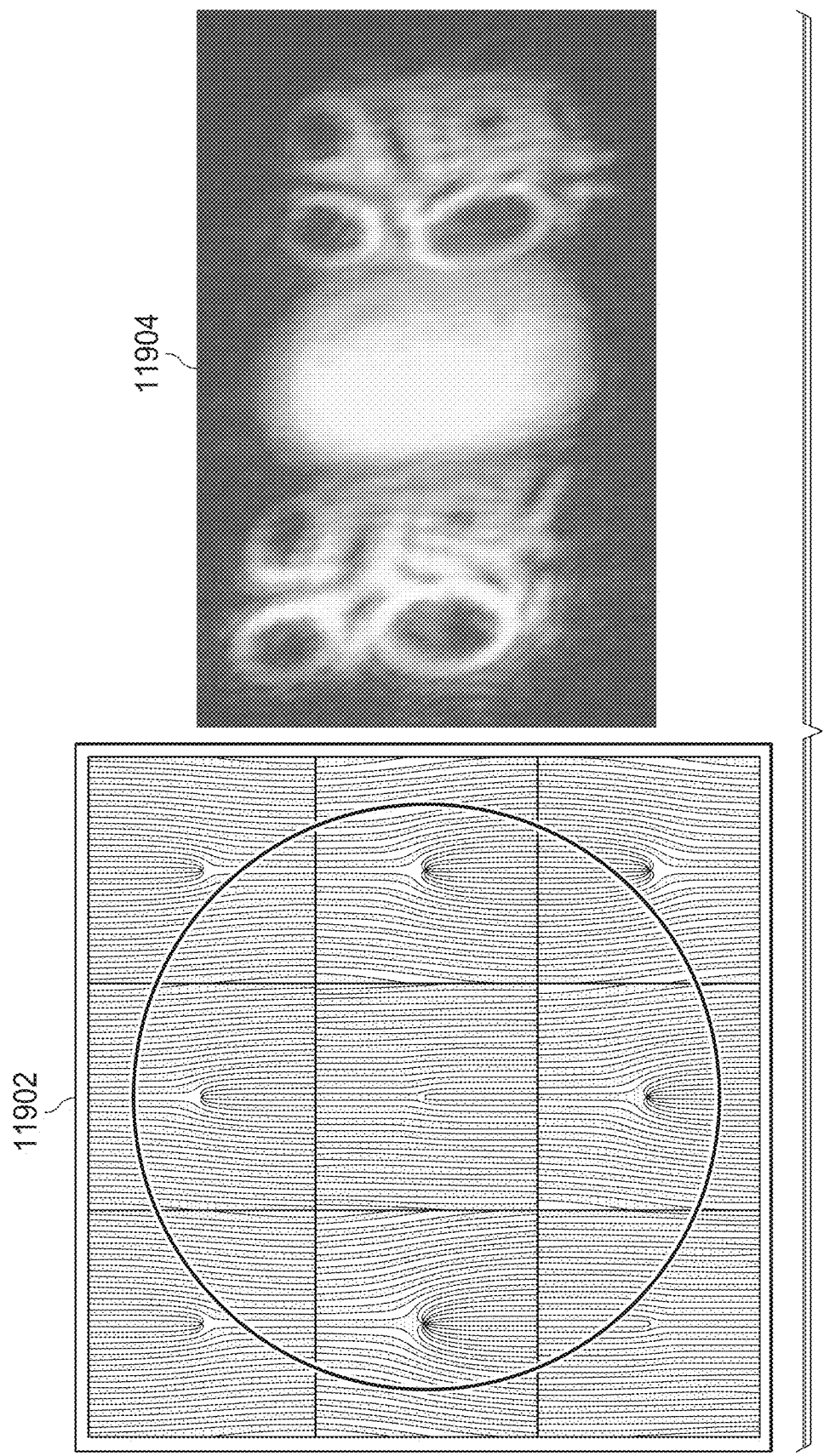
Figure 120:
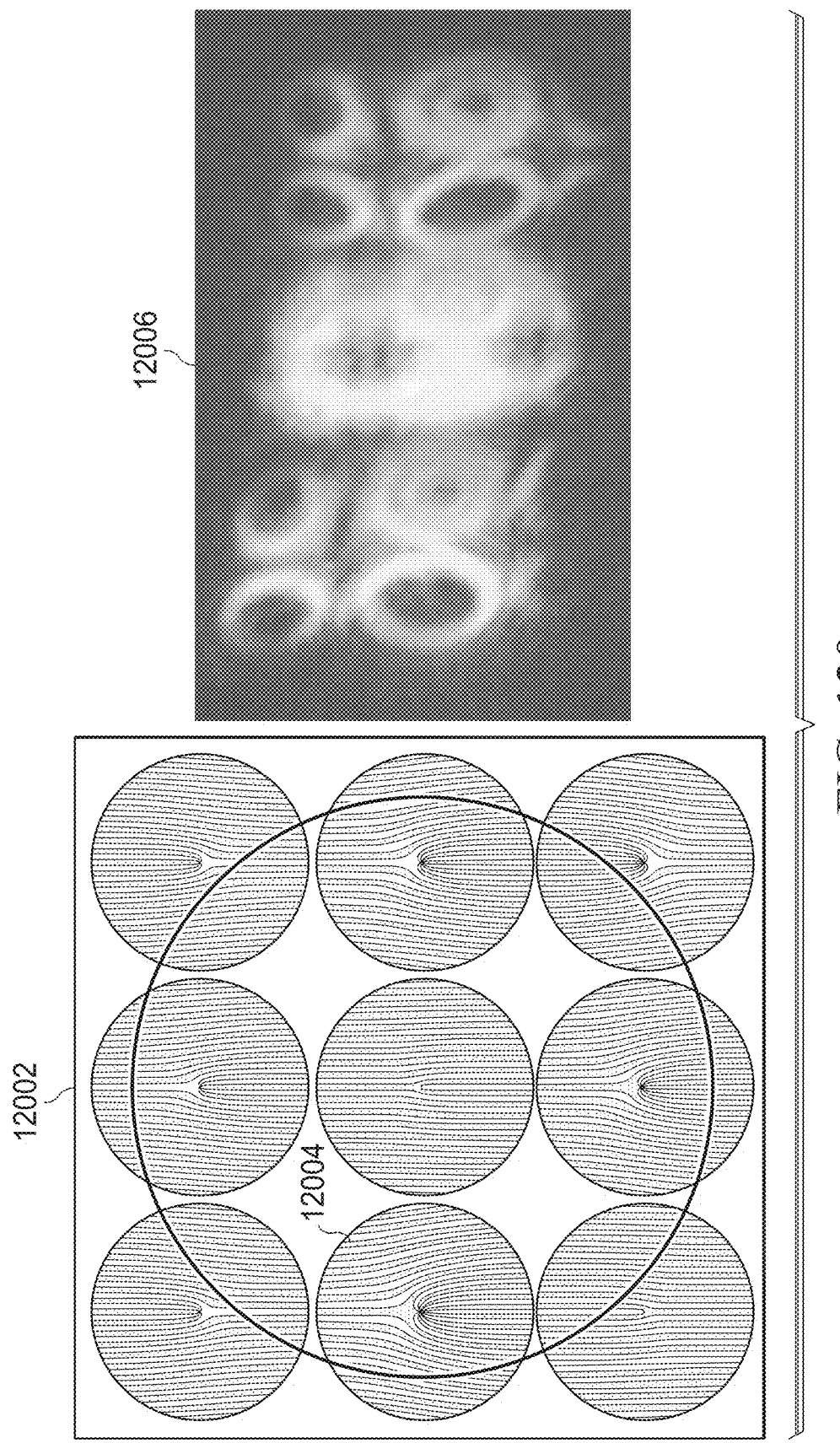
Figure 121:
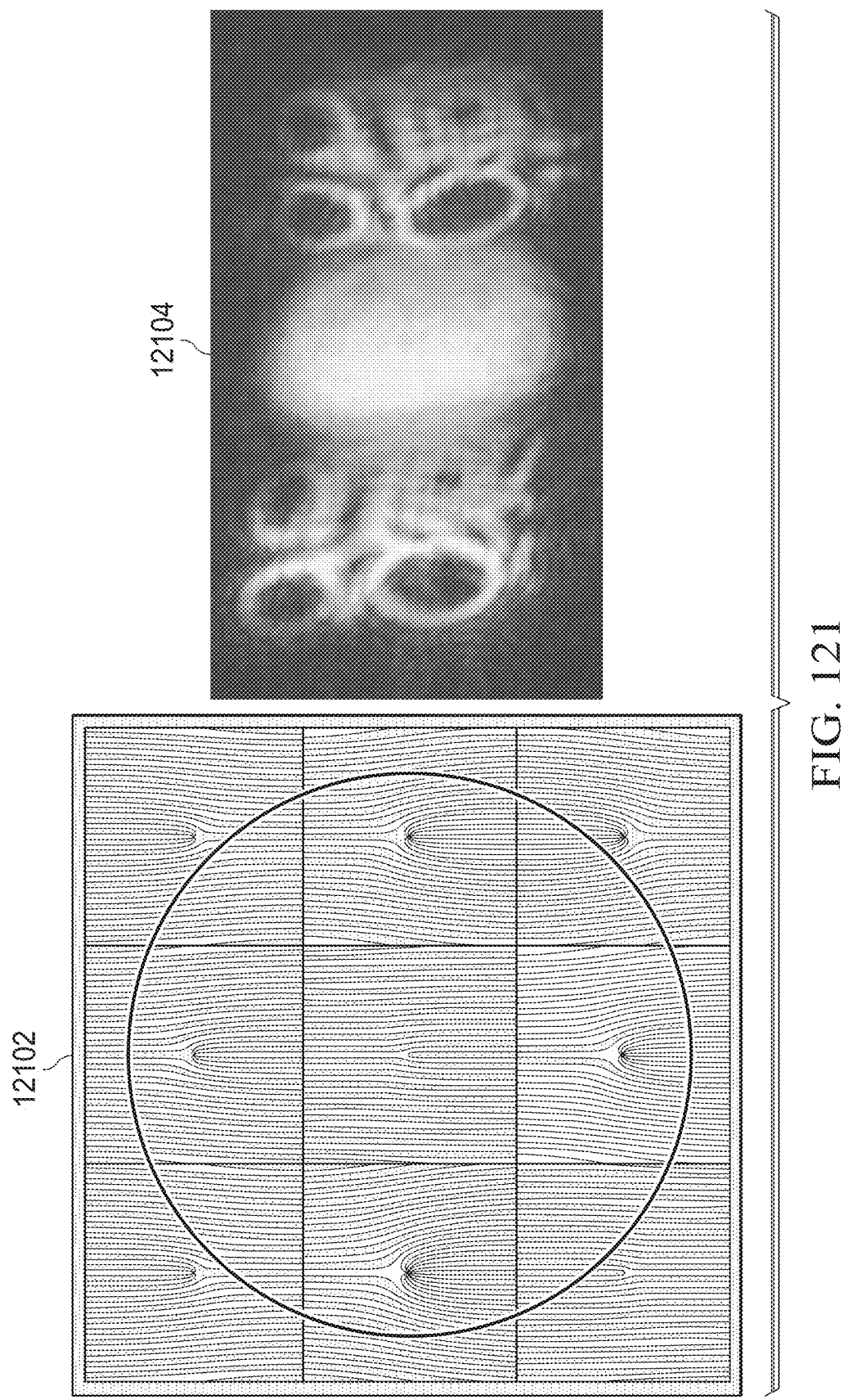
Figure 122:
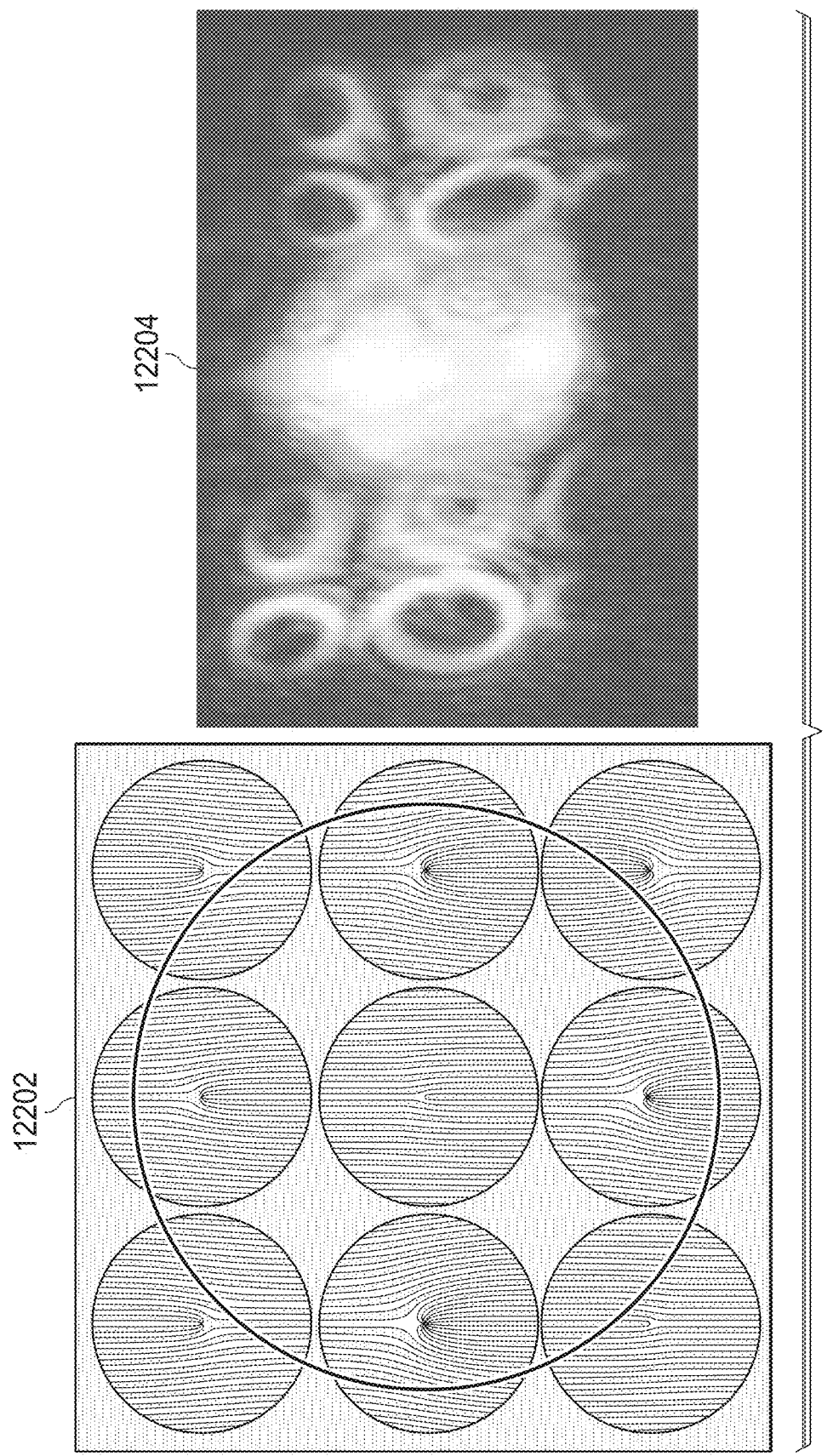
Figure 123:
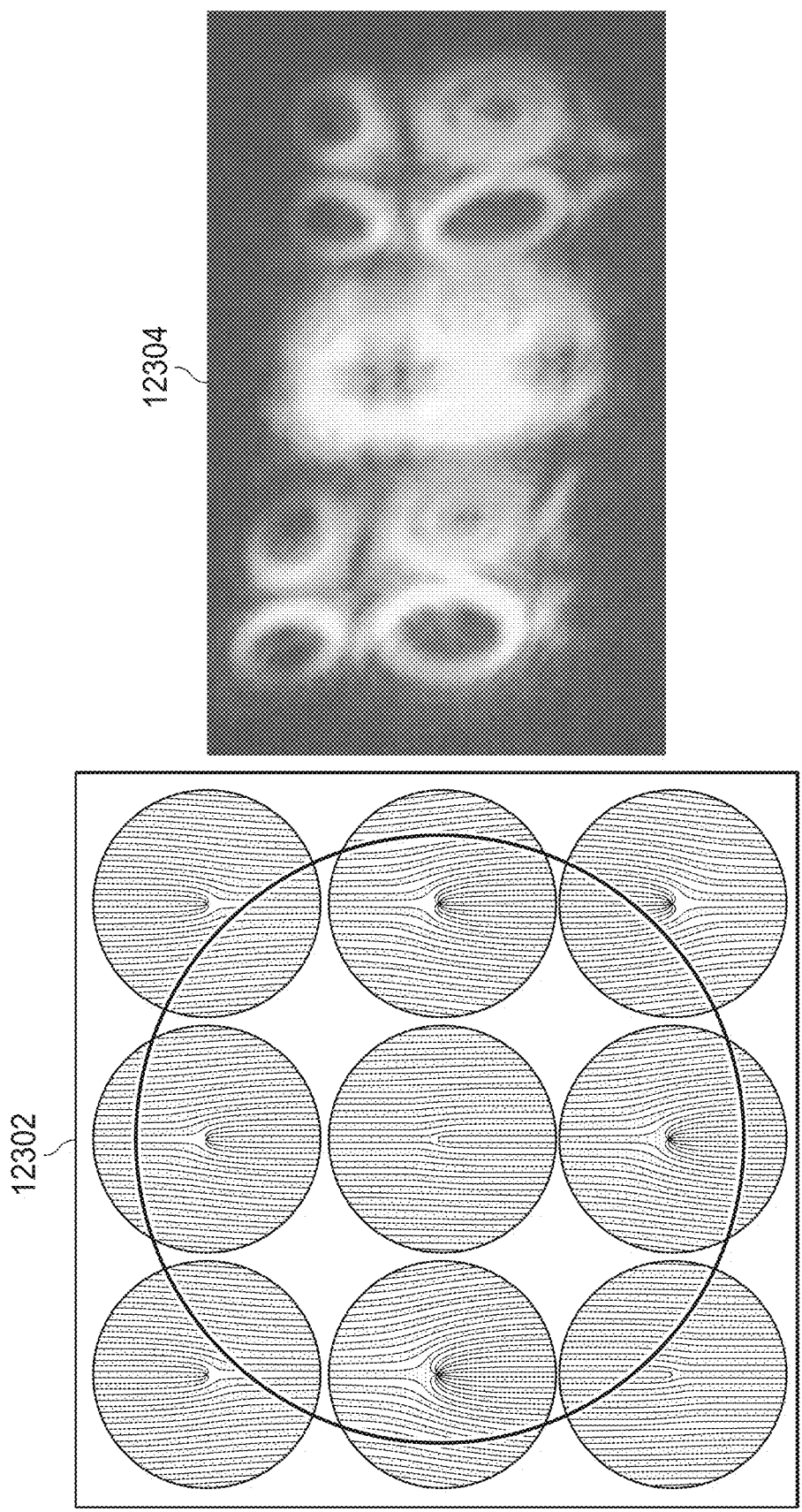
Figure 124:
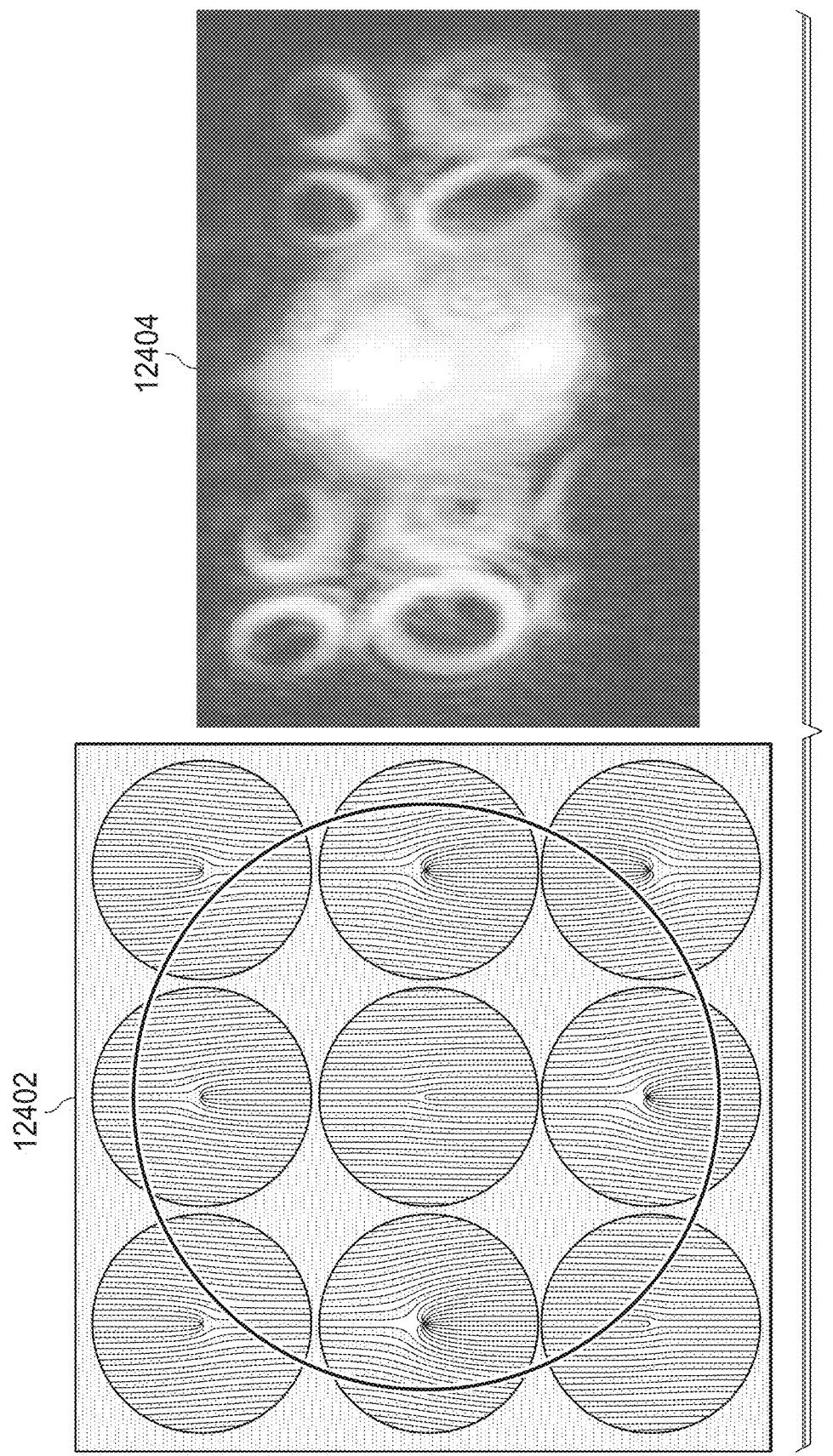
Figure 125:
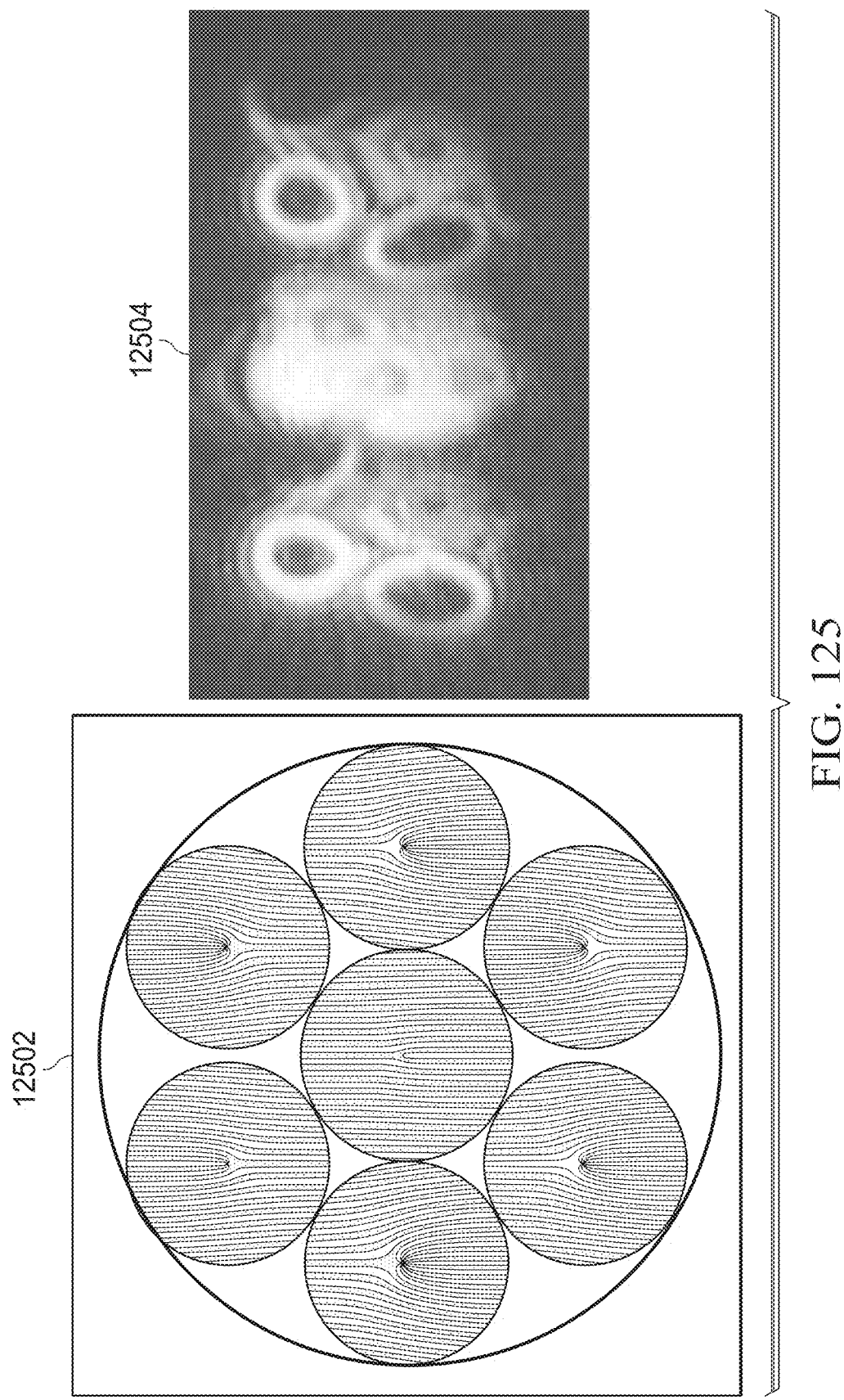
Figure 126:
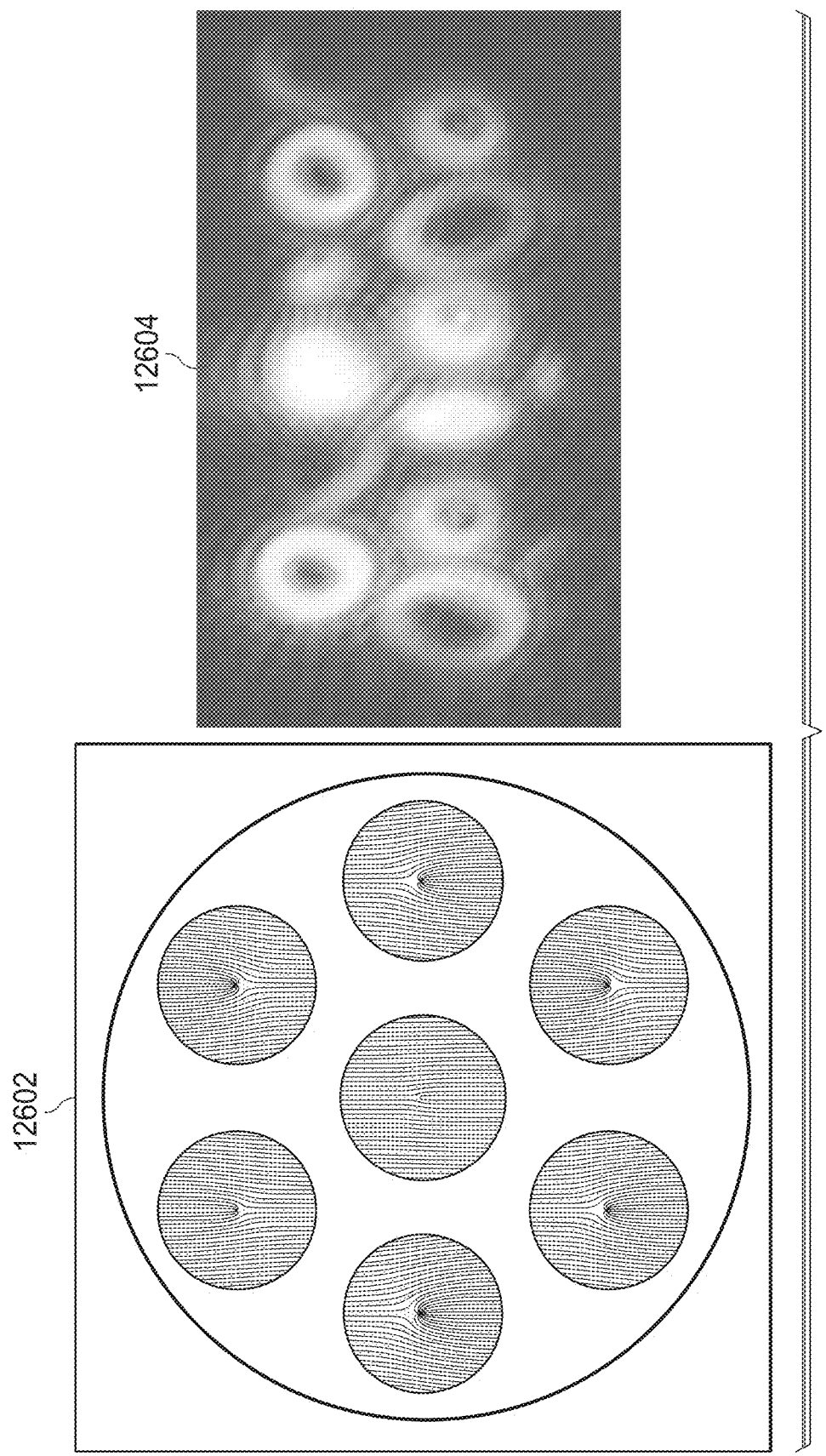
Figure 127:
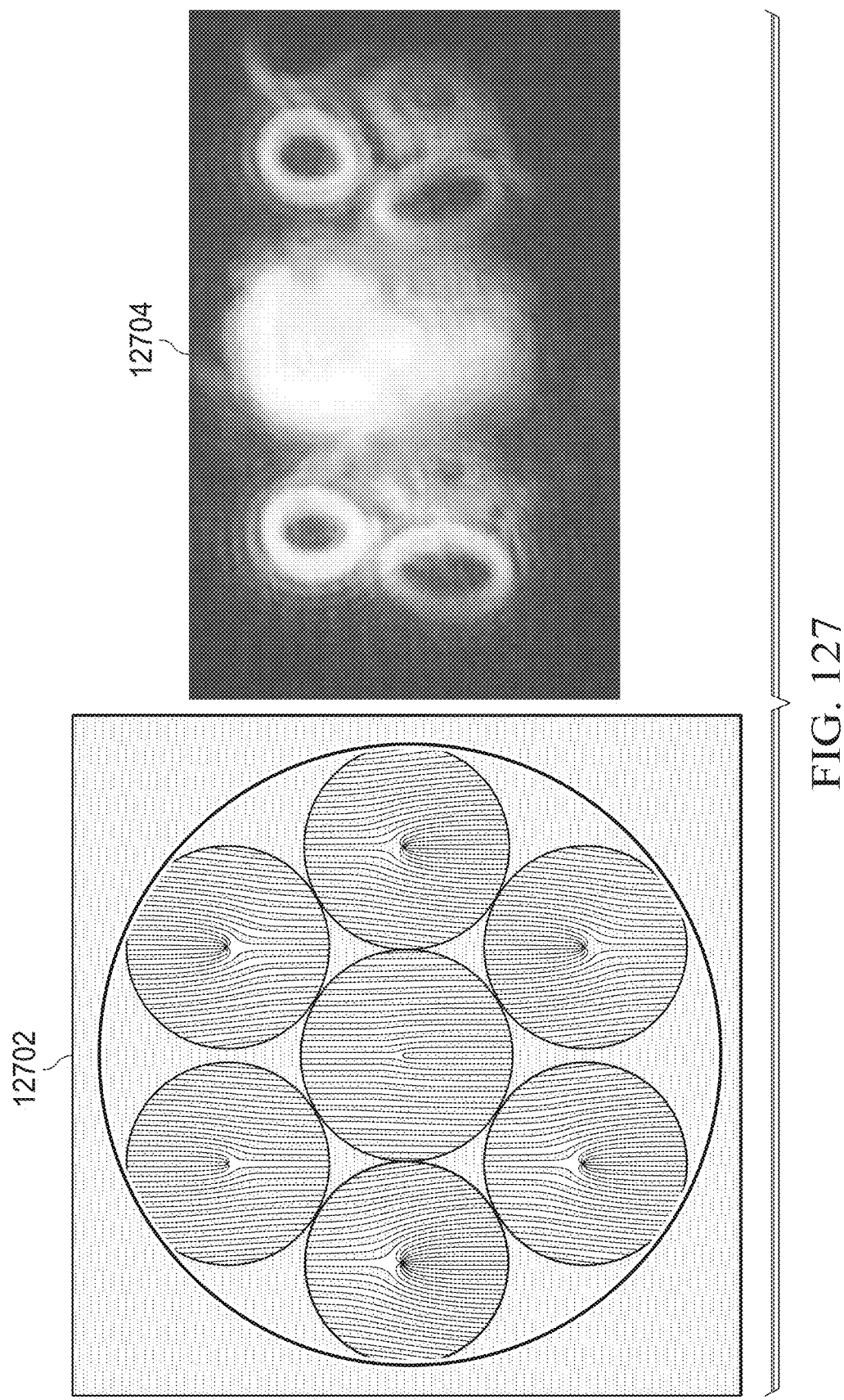
Figure 128:
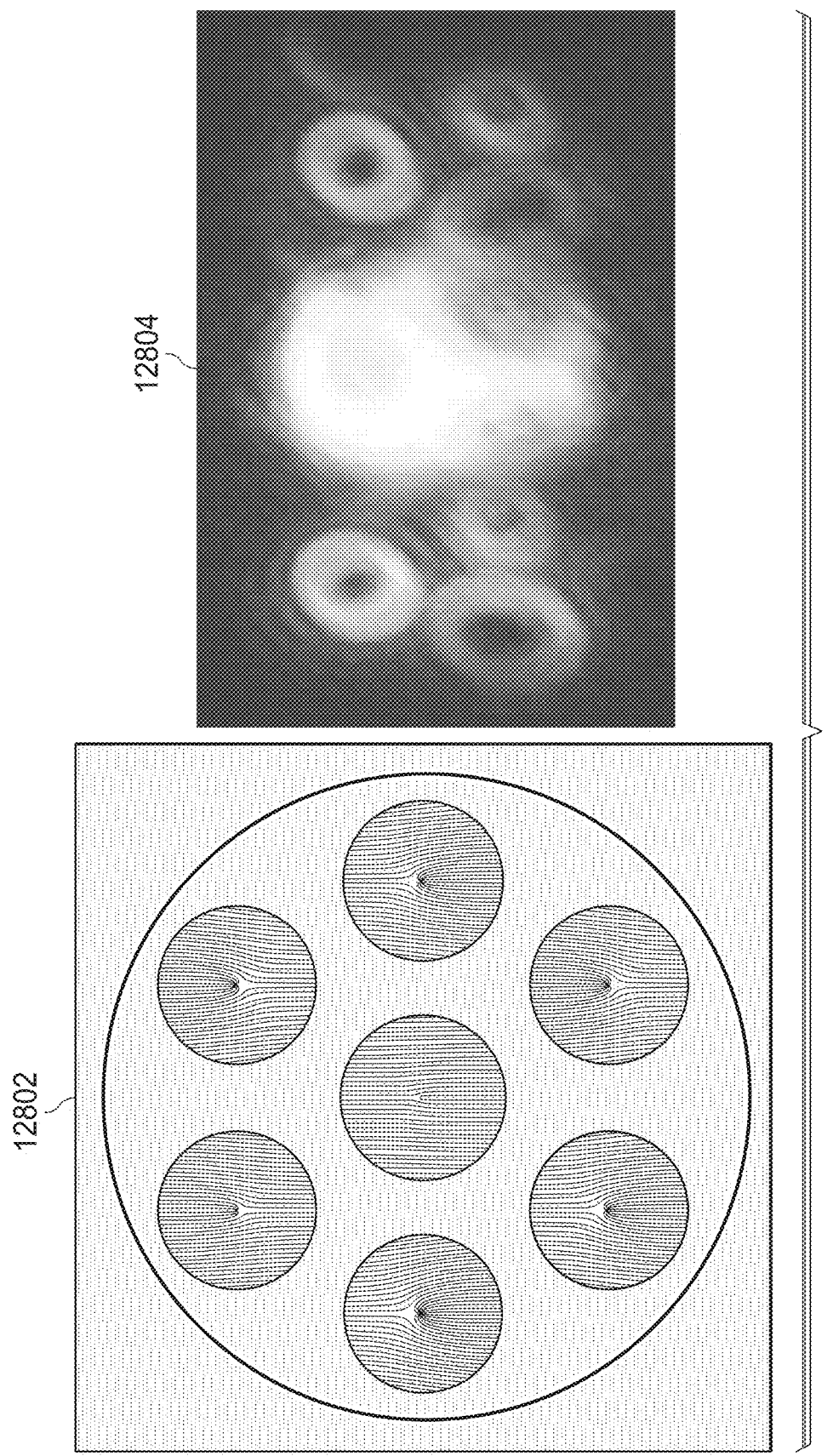
Figure 129:
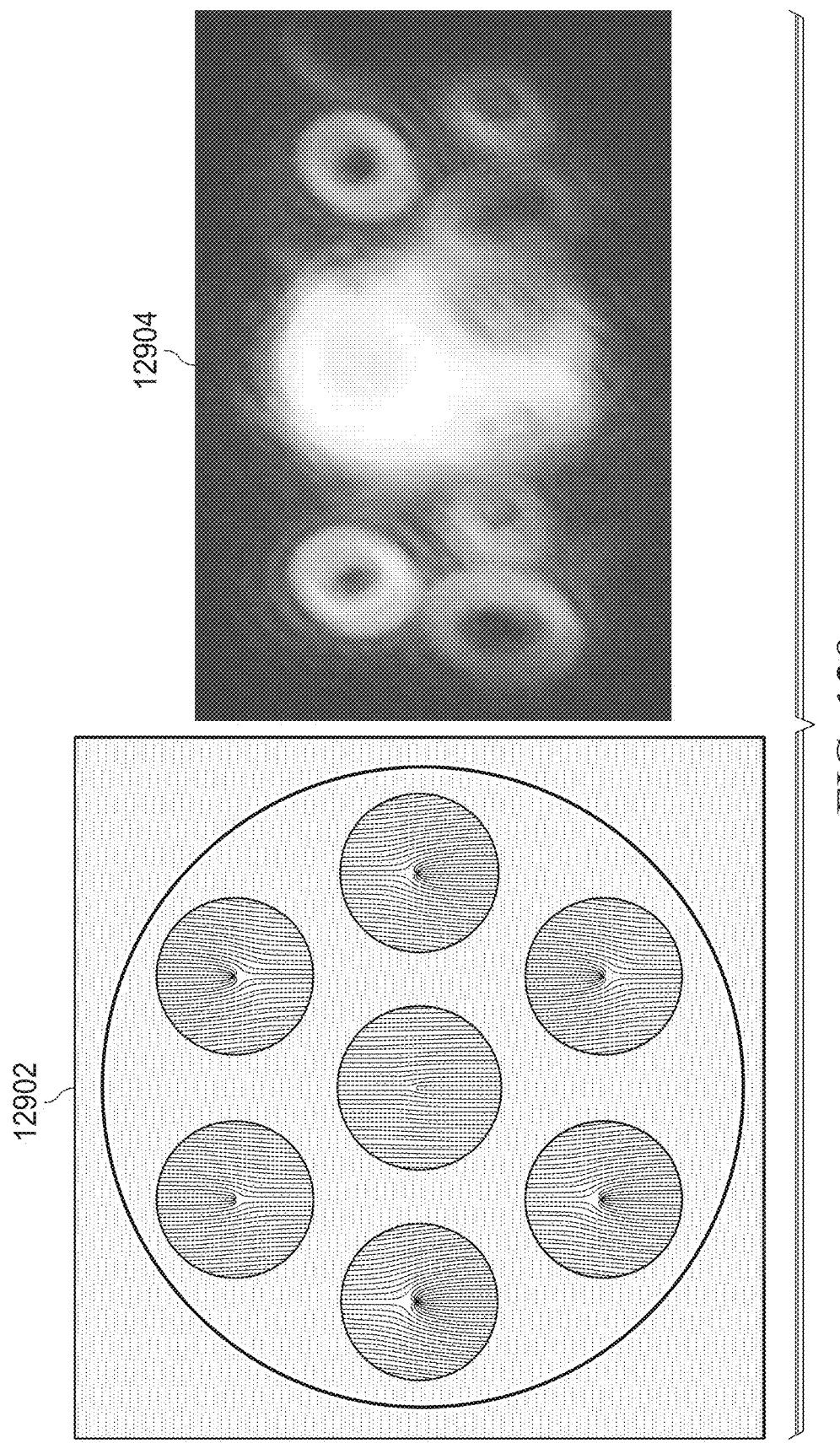
Figure 130:
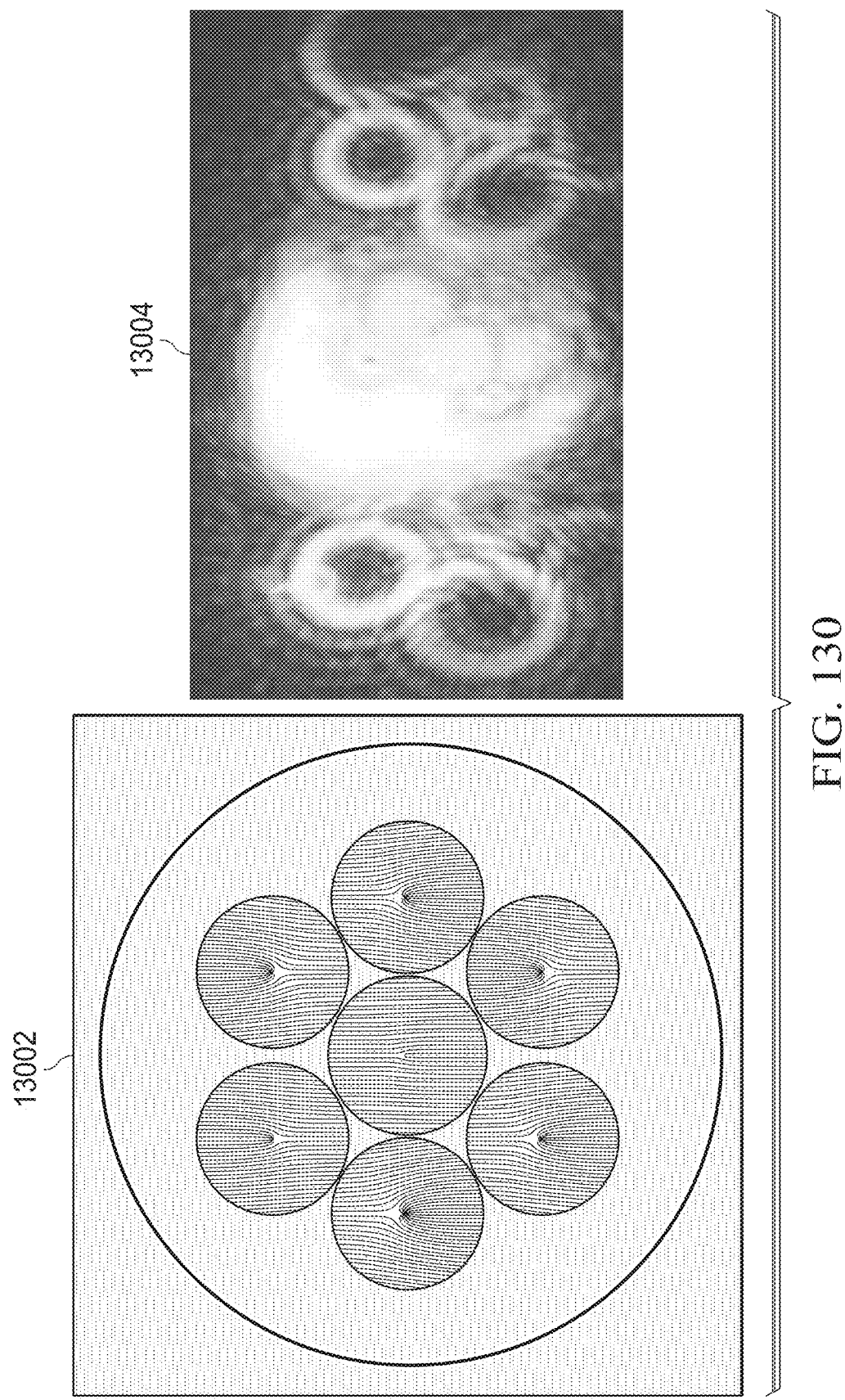
Figure 131:
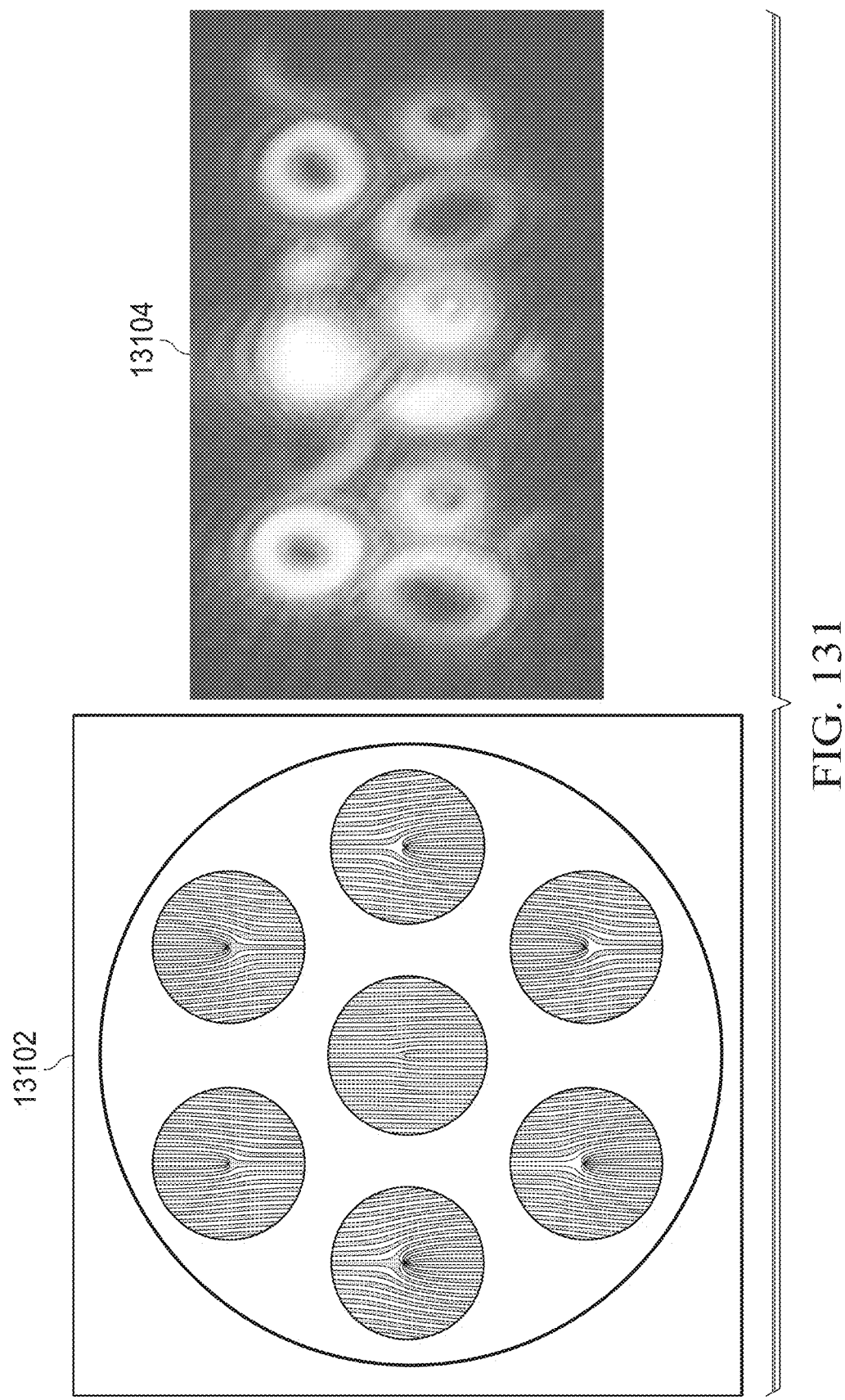
Figure 132:
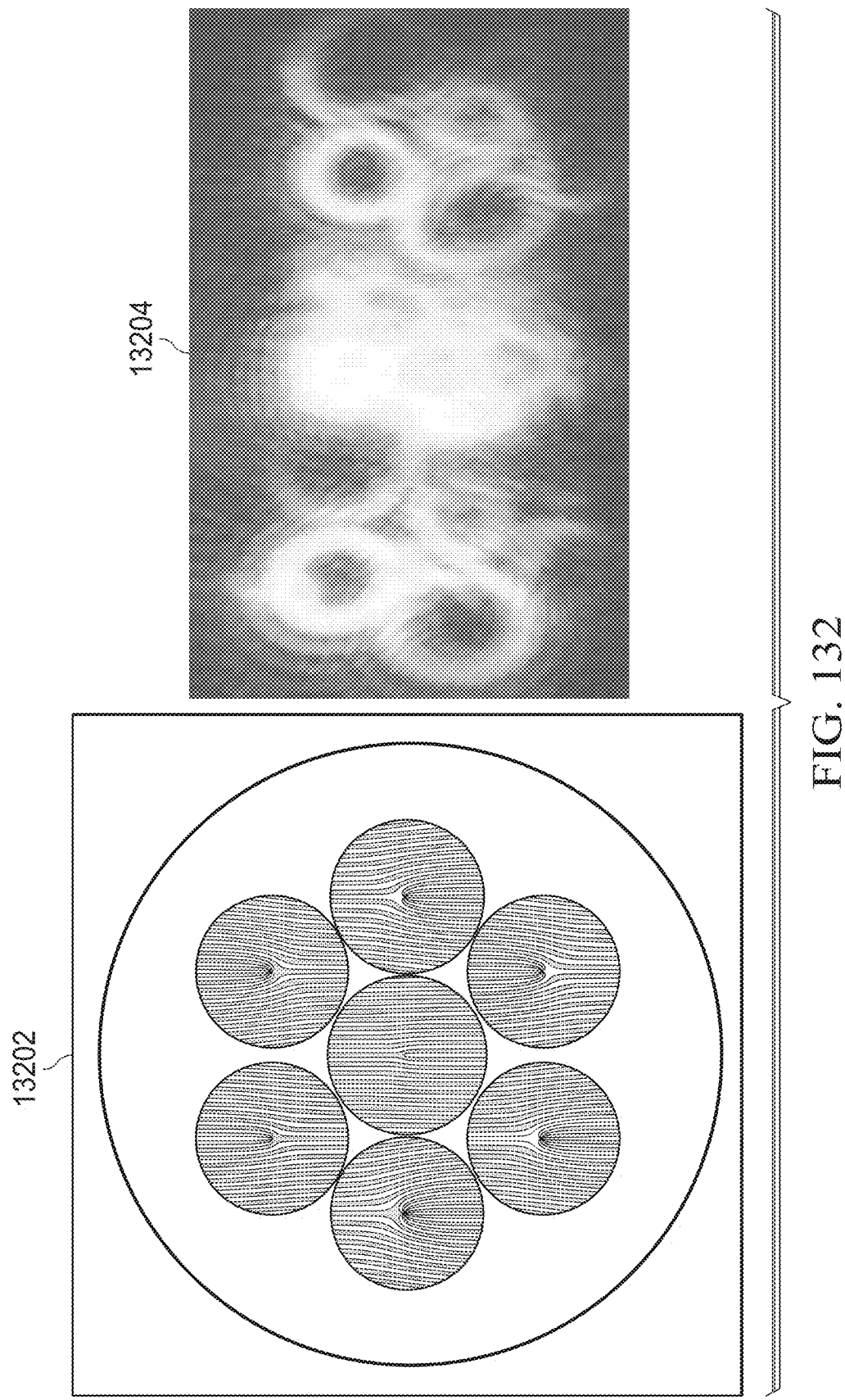
Figure 133:
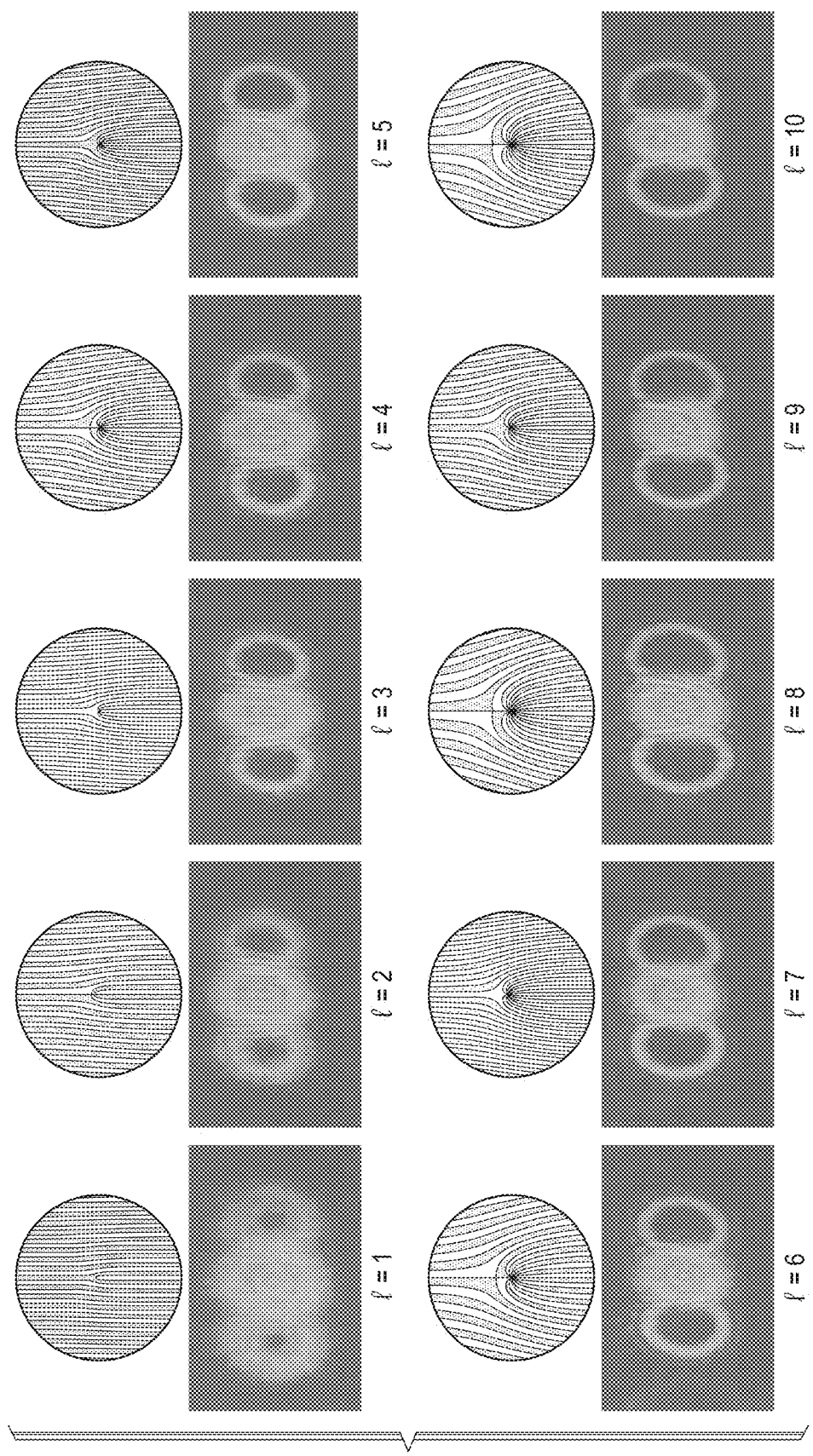
Figure 134:
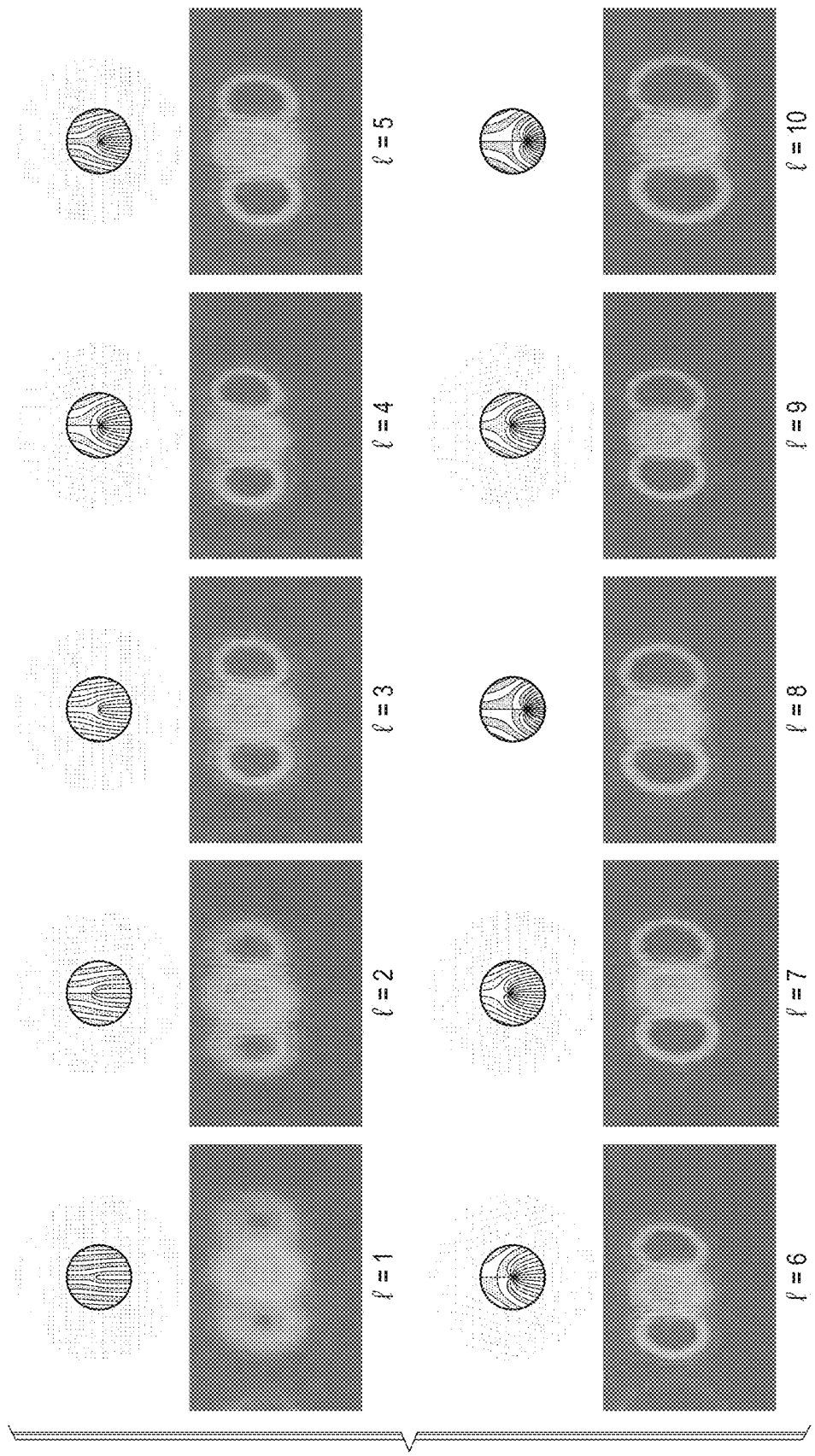
Figure 135:
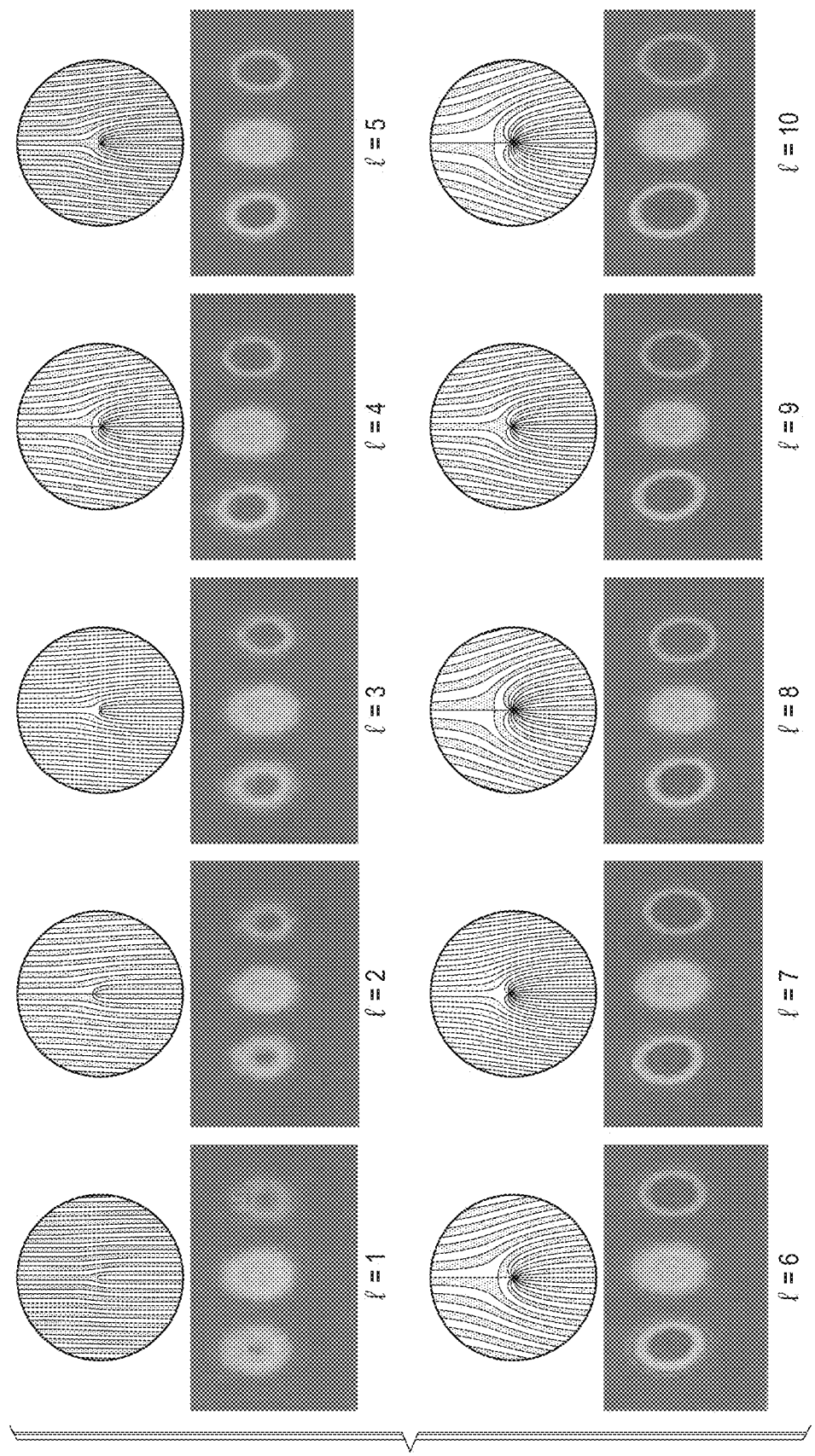
Figure 136:
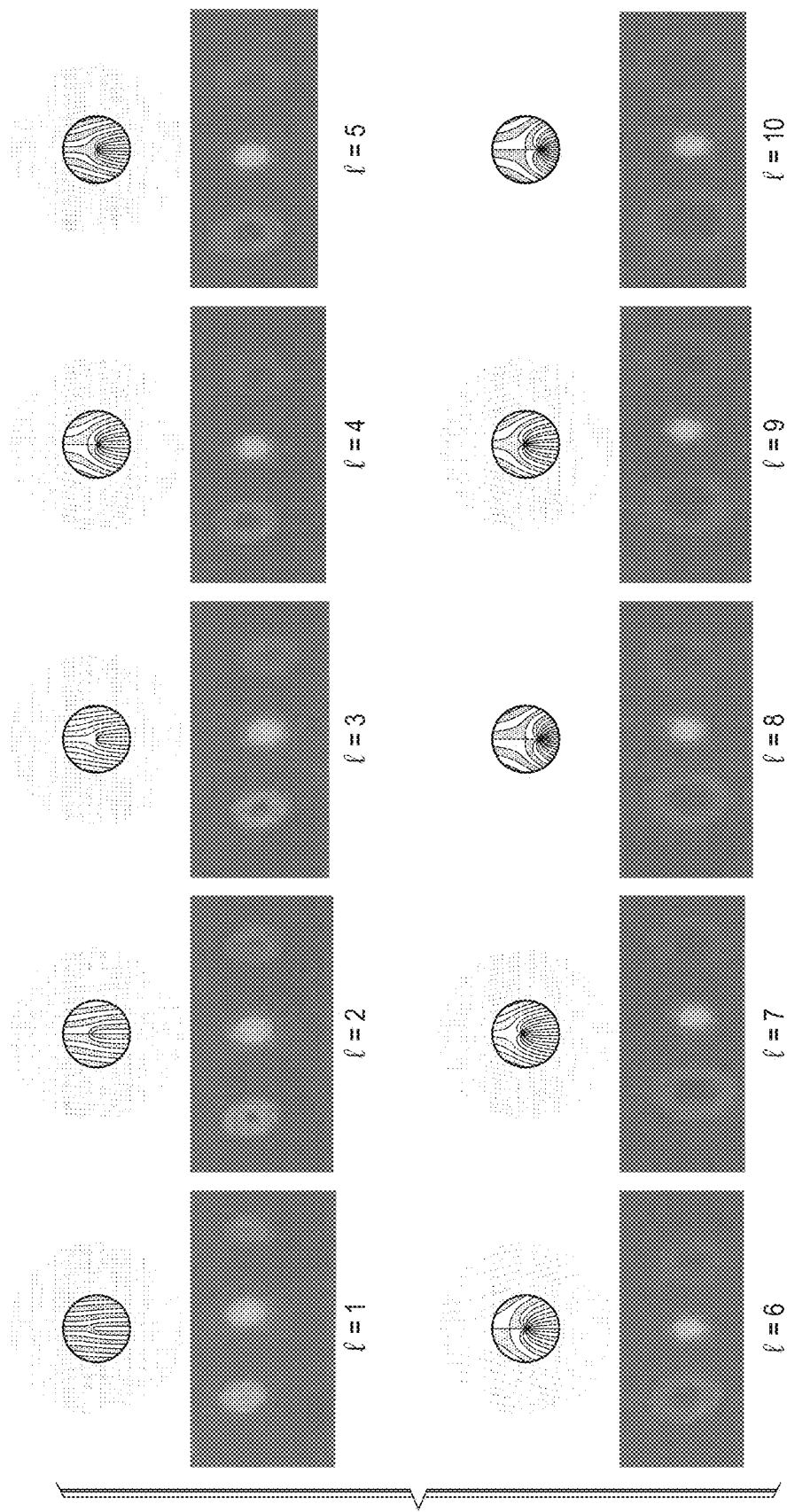
Figure 137:
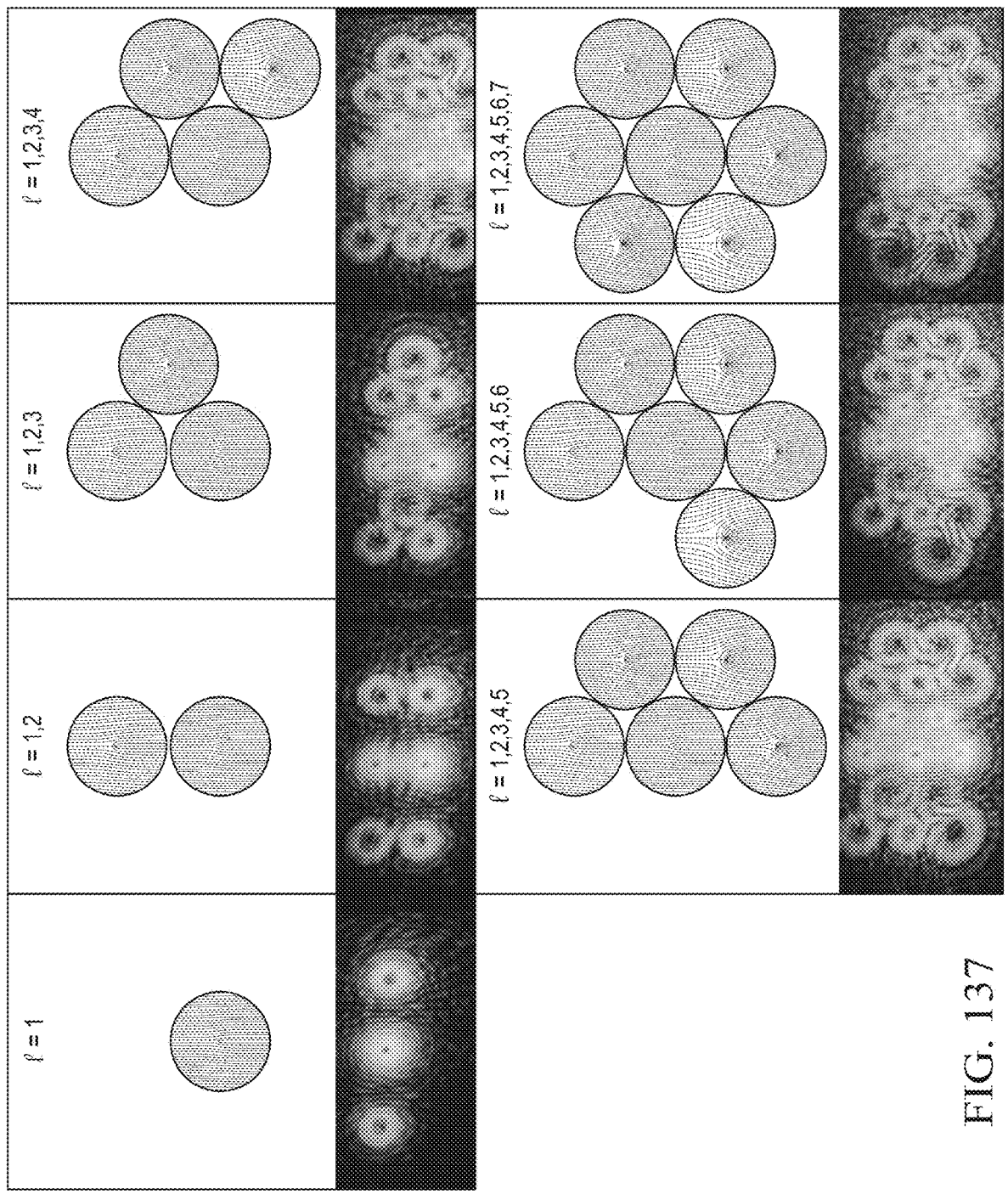
Figure 139:
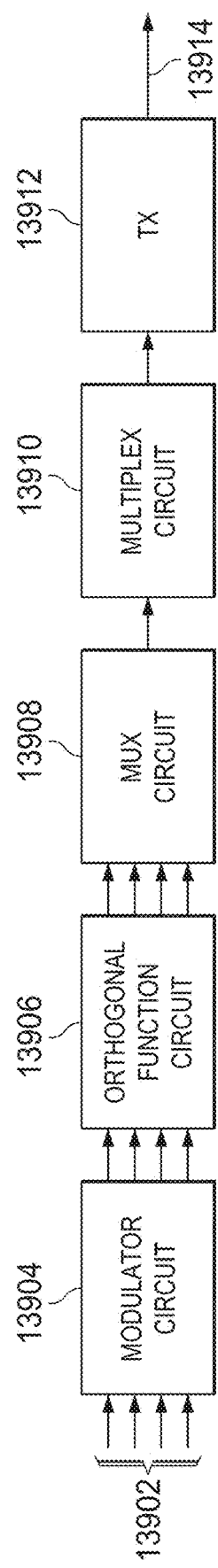
Figure 141:
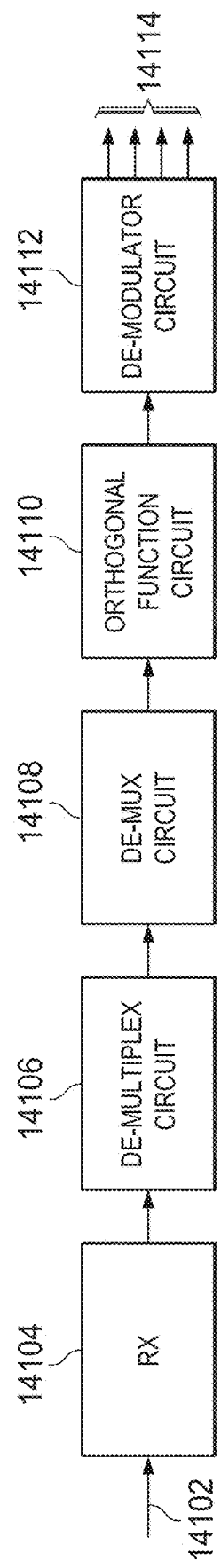
Figure 140:
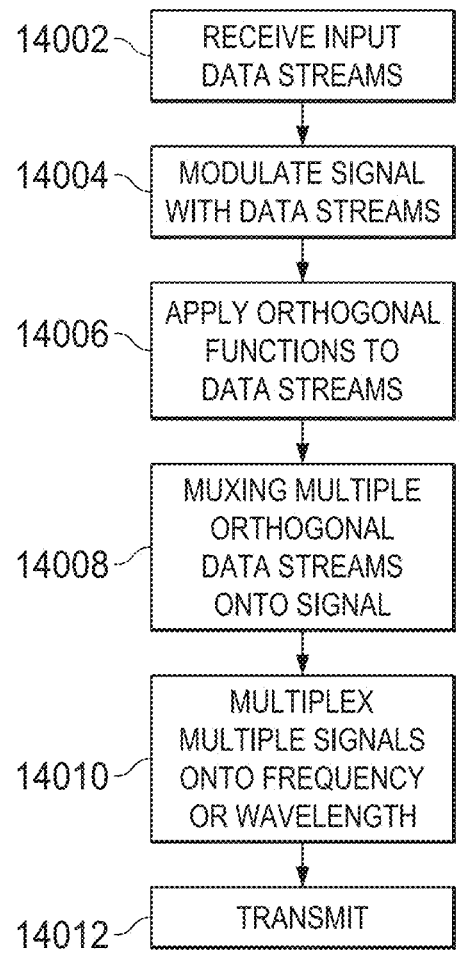
Figure 142:
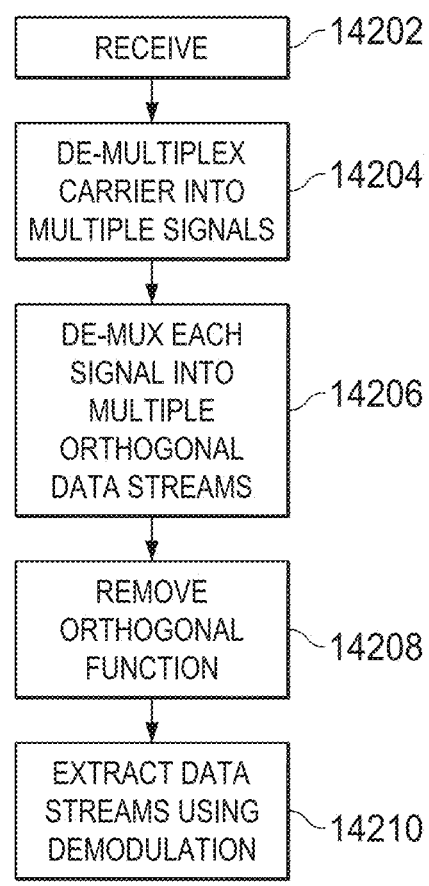
Figure 143:
Figure 144:
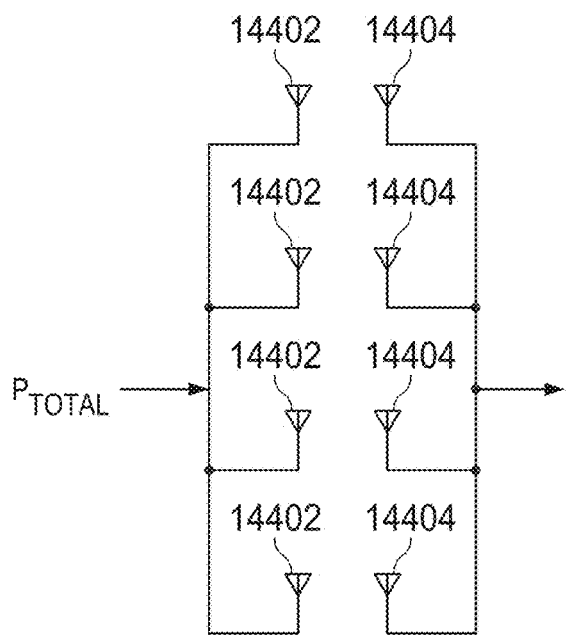
Figure 145:
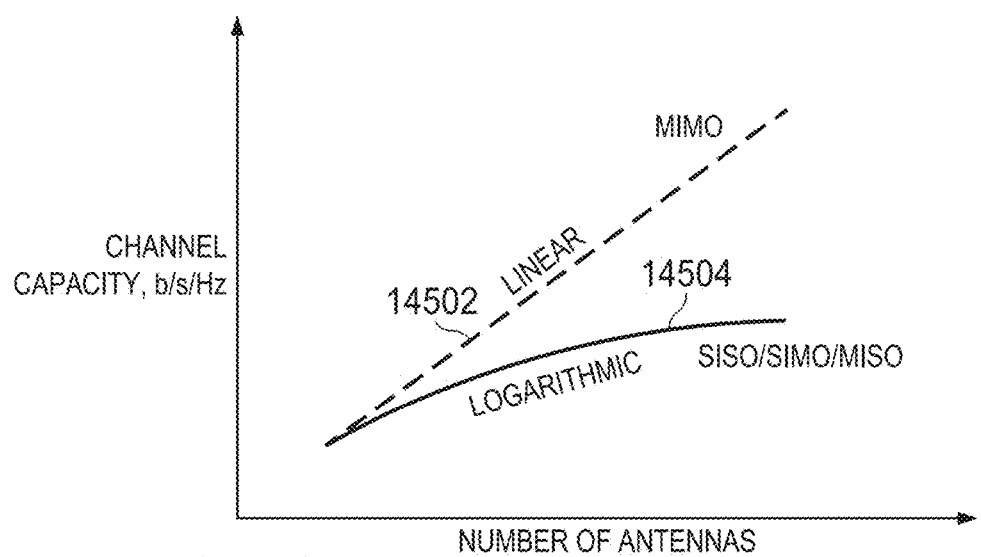
Figure 146:
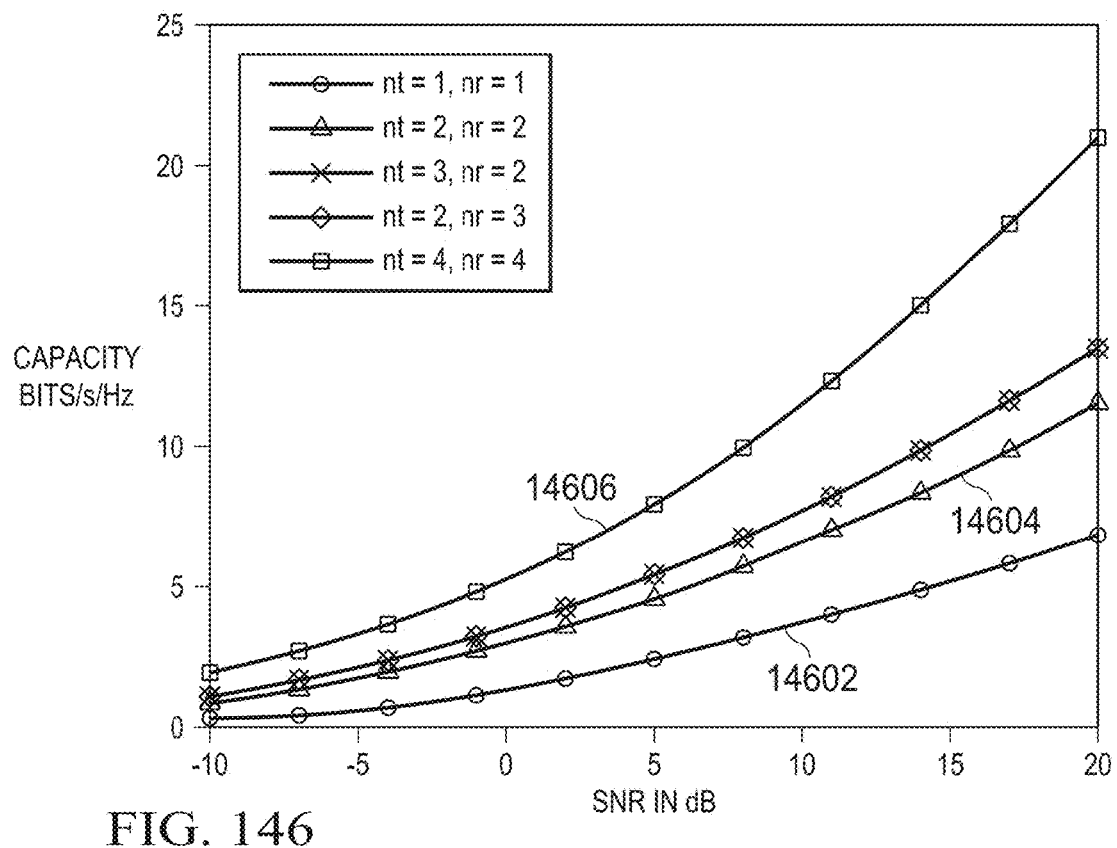
Figure 147:
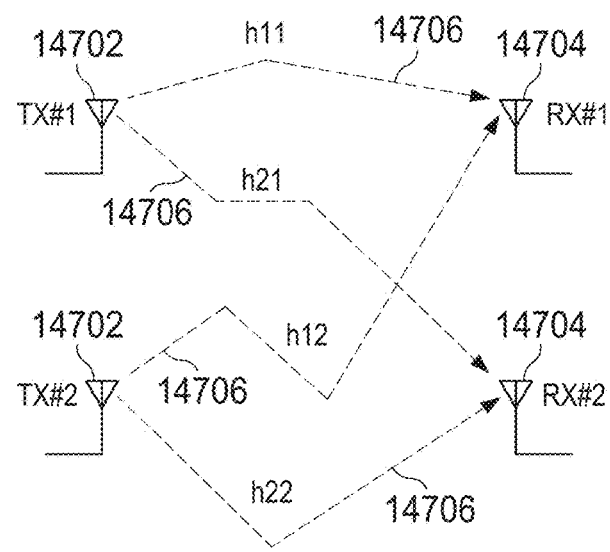
Figure 148:
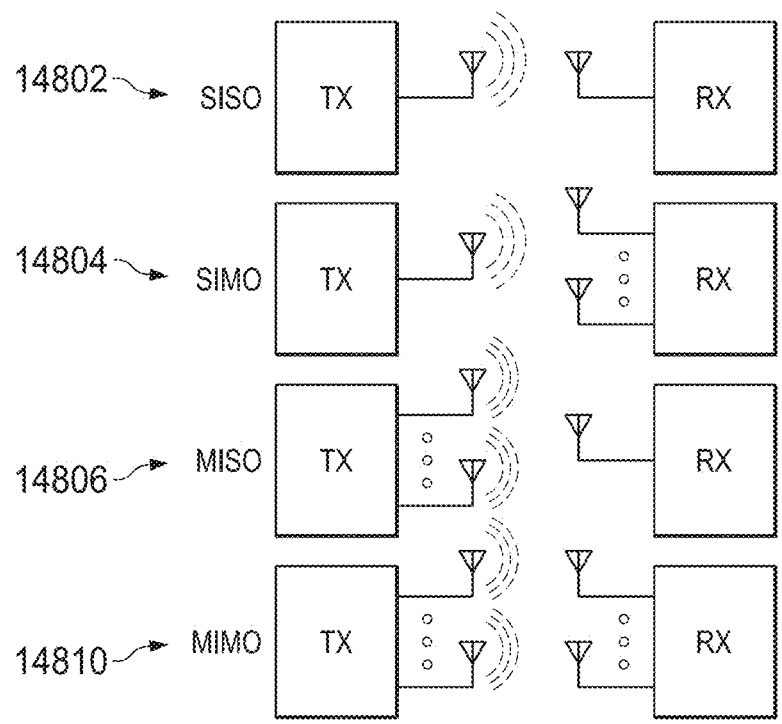
Figure 149:
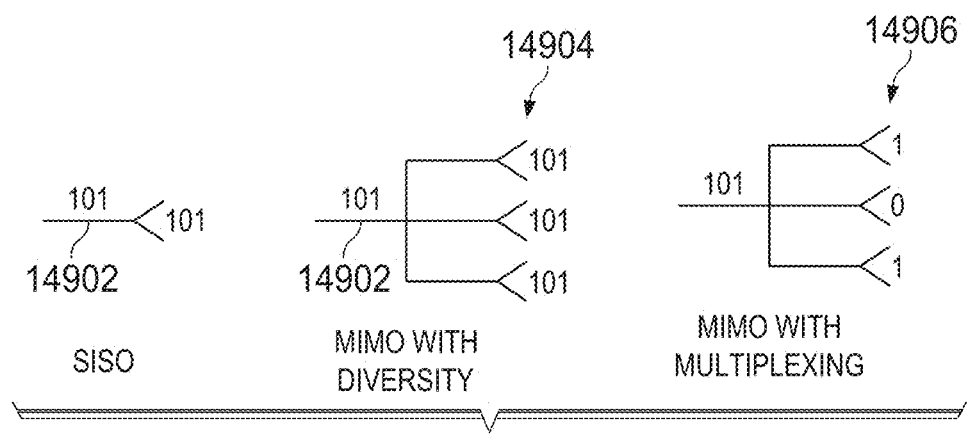
Figure 150:
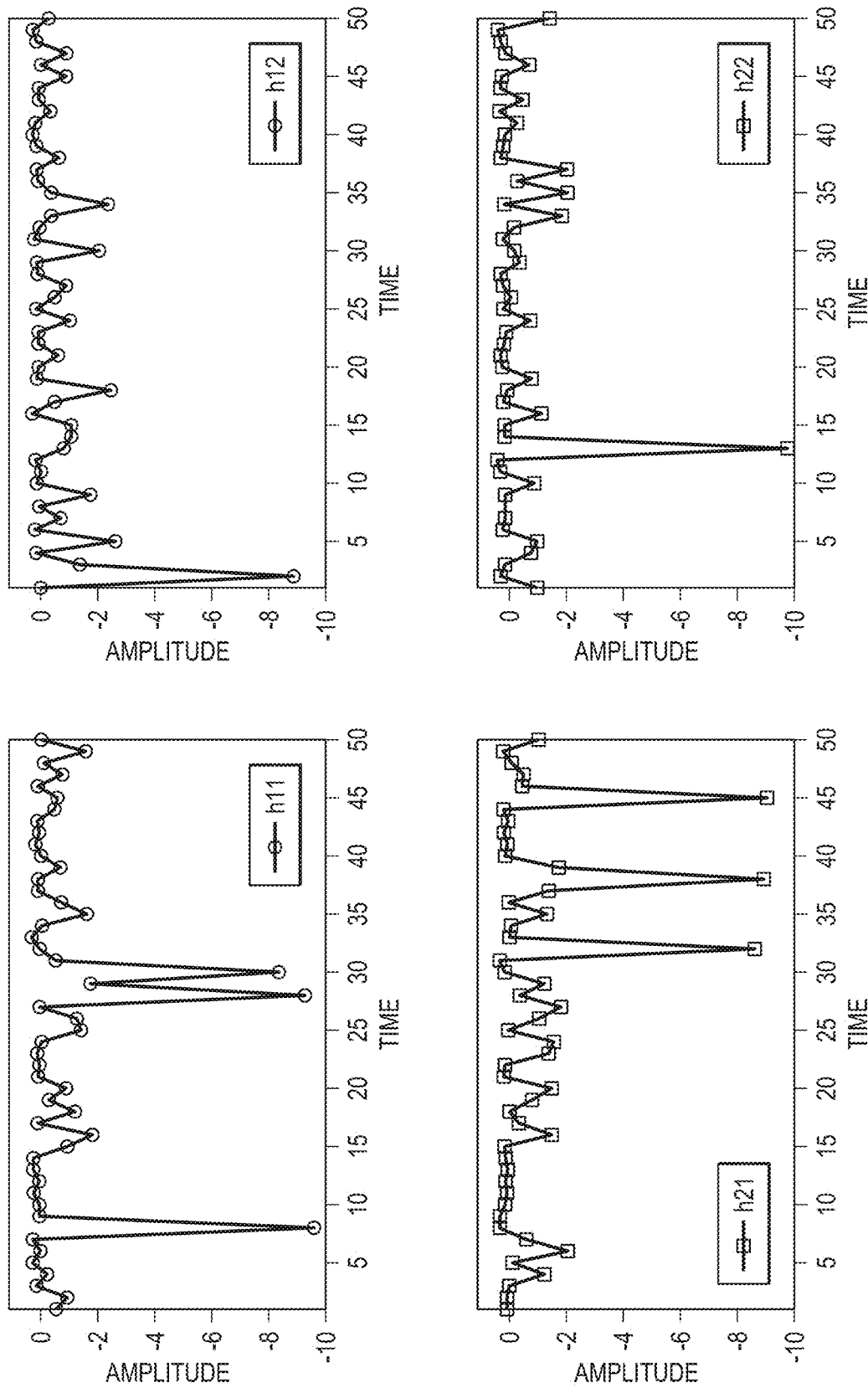
Figure 151:
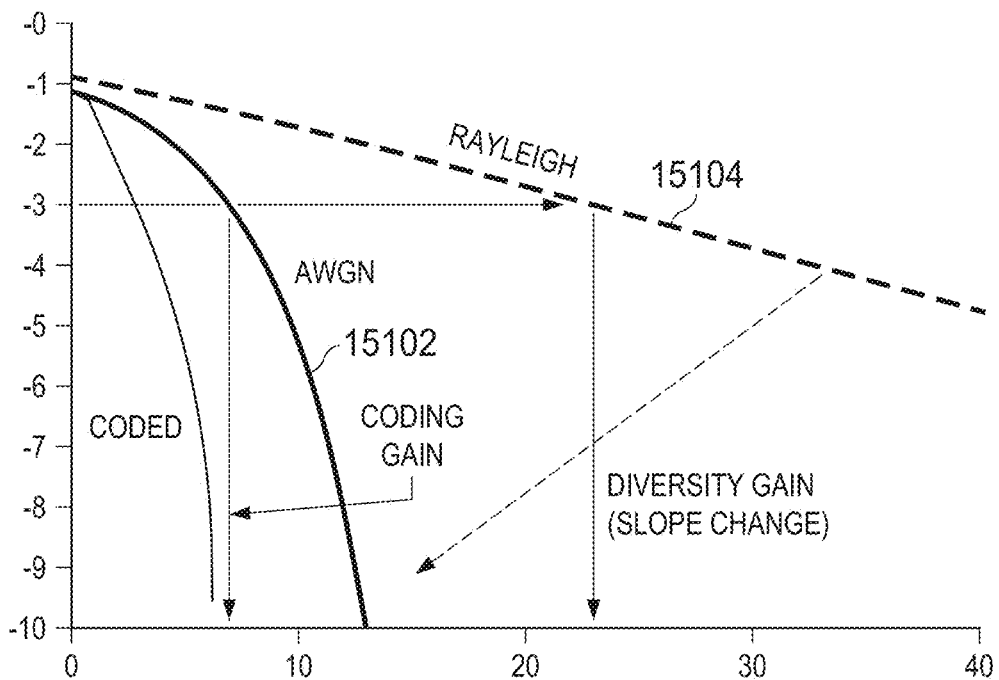
Figure 152:
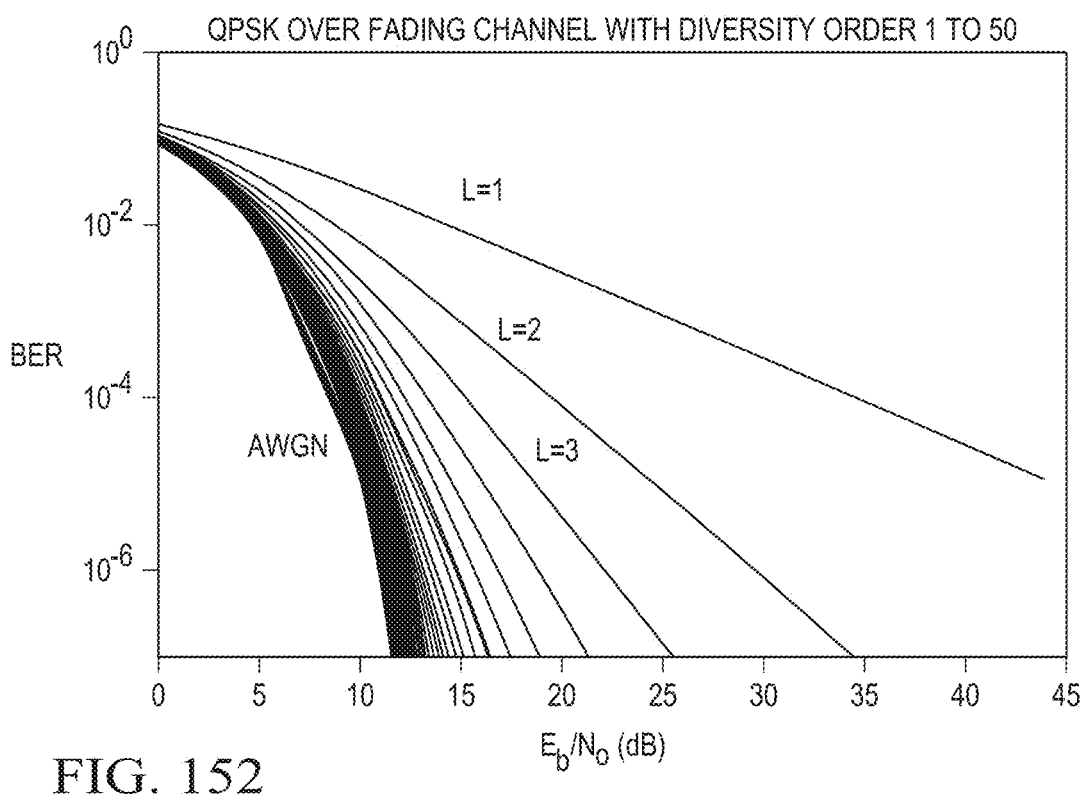
Figure 153:
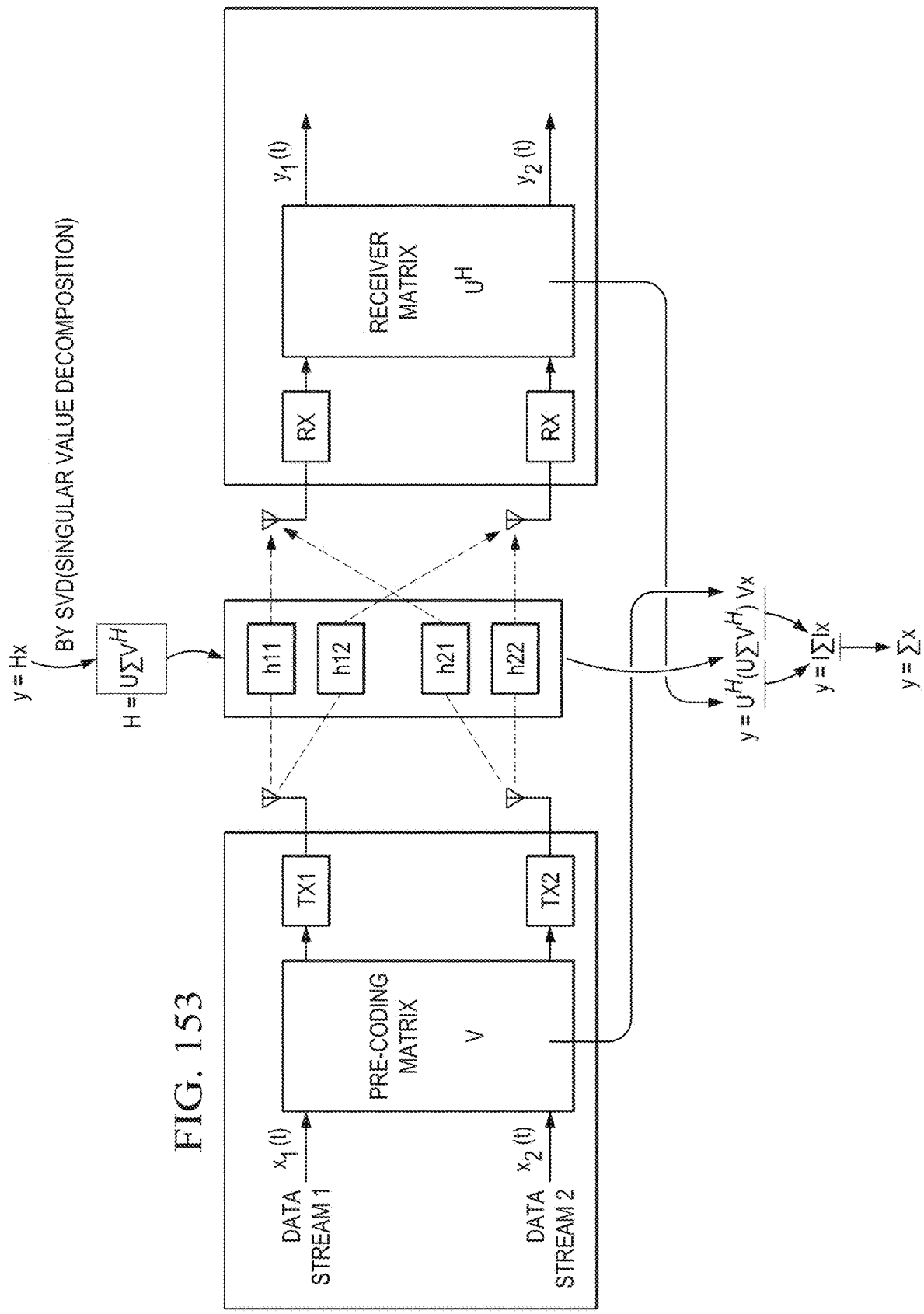
Figure 154:
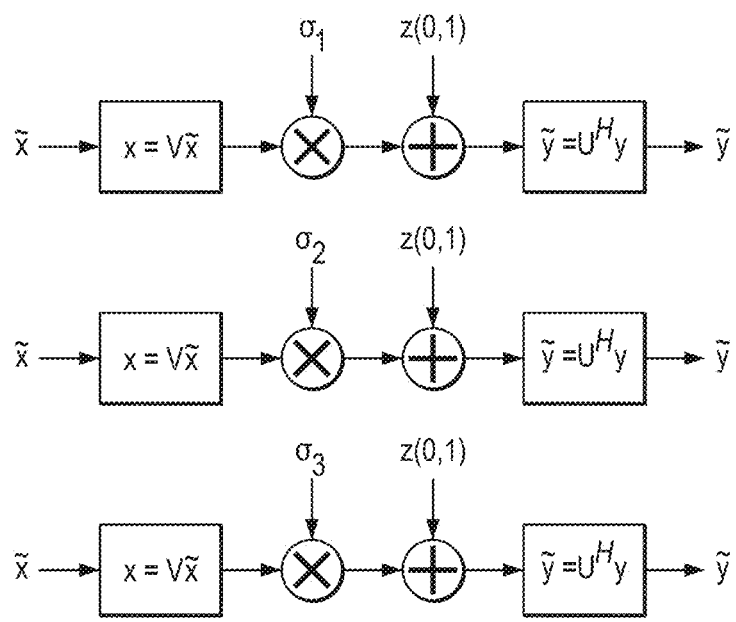
Figure 155:
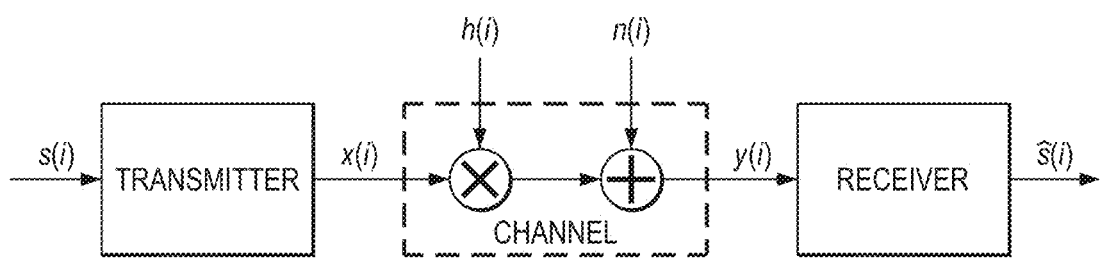
Figure 156:
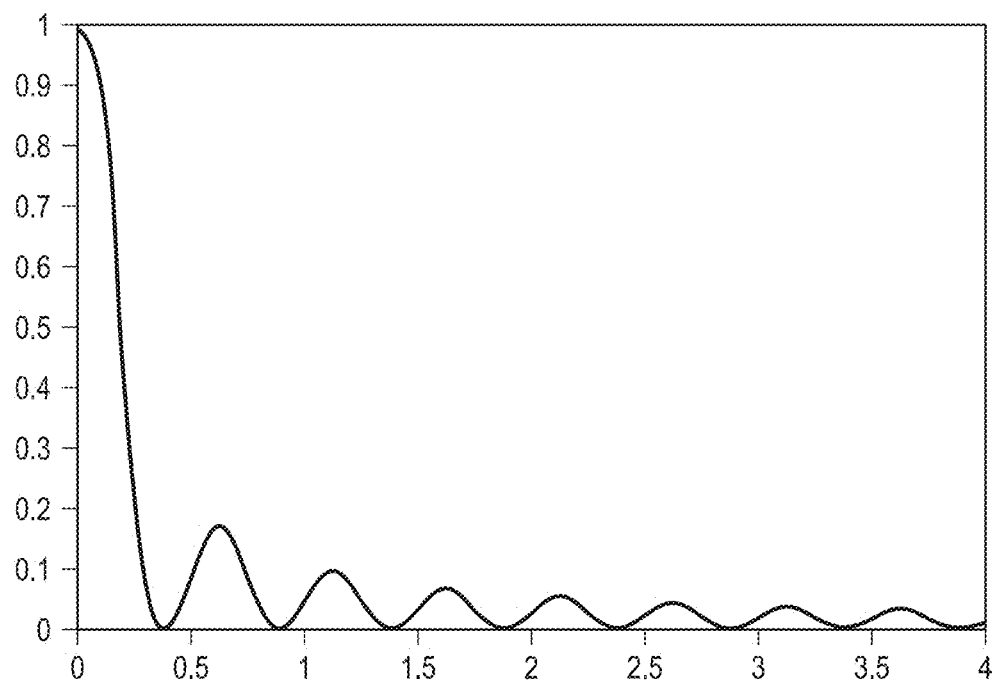
Figure 157:
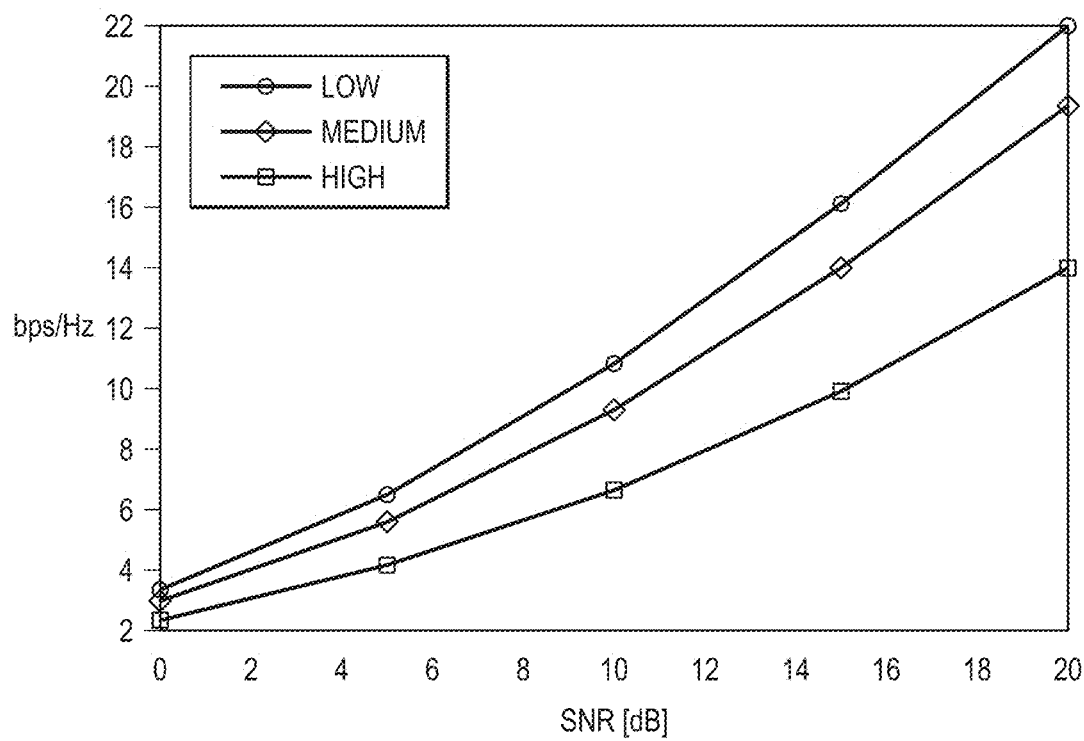
Figure 158:
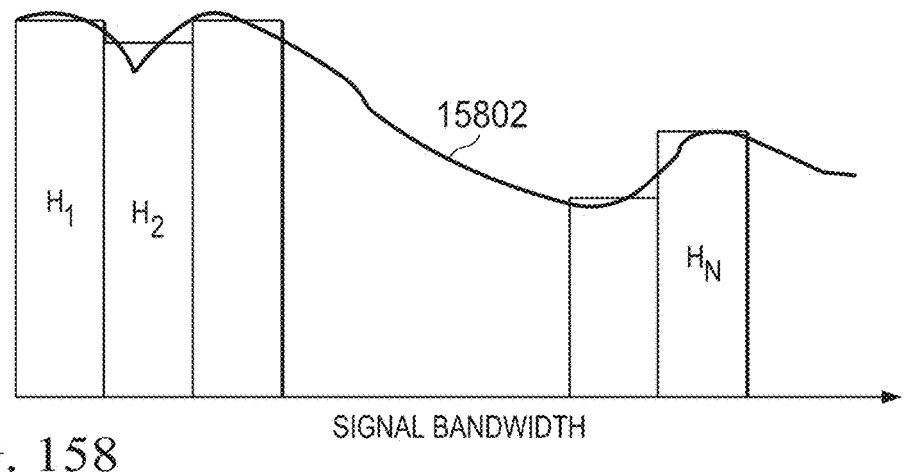
Figure 159:
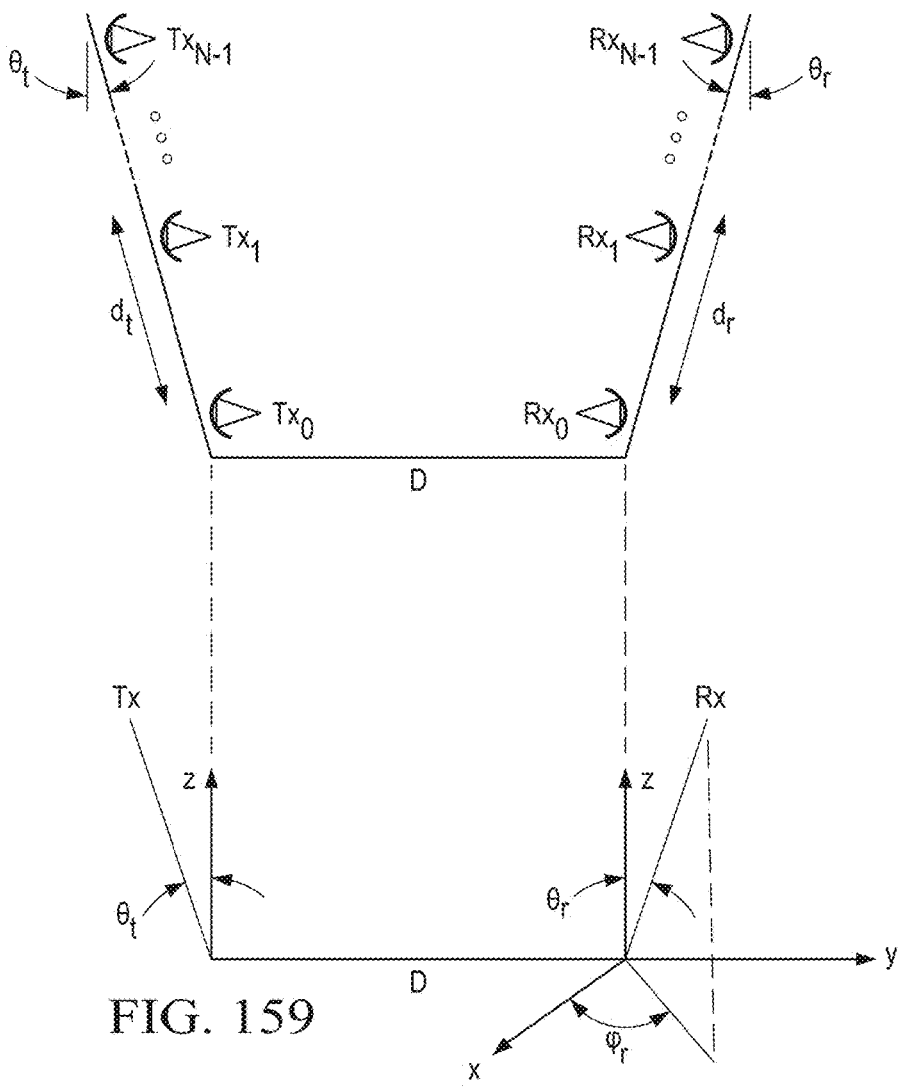
Figure 160:
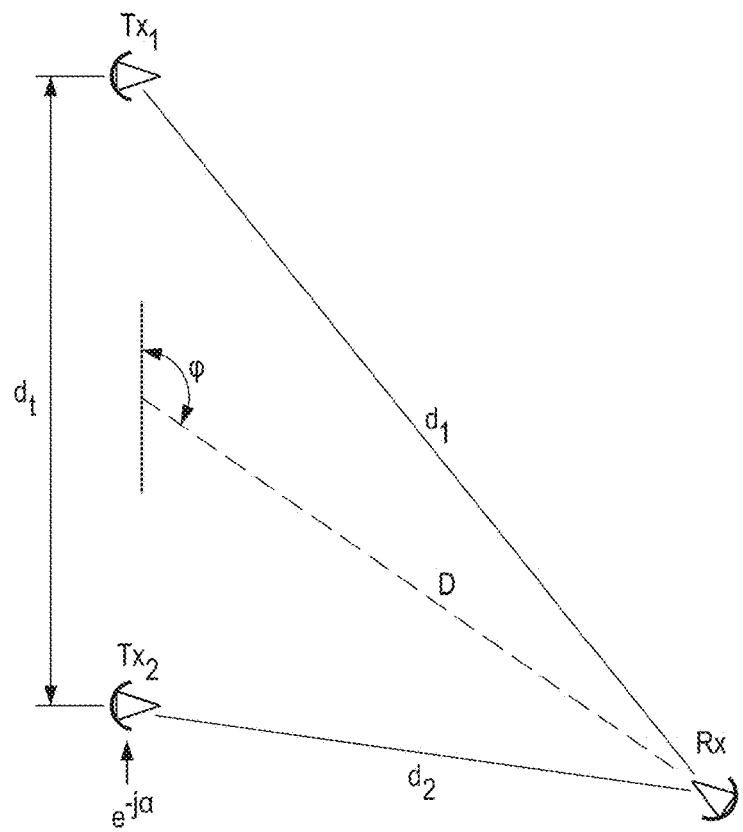
Figure 161:
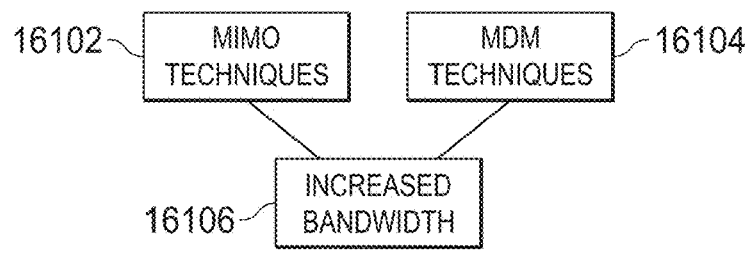
Figure 162:
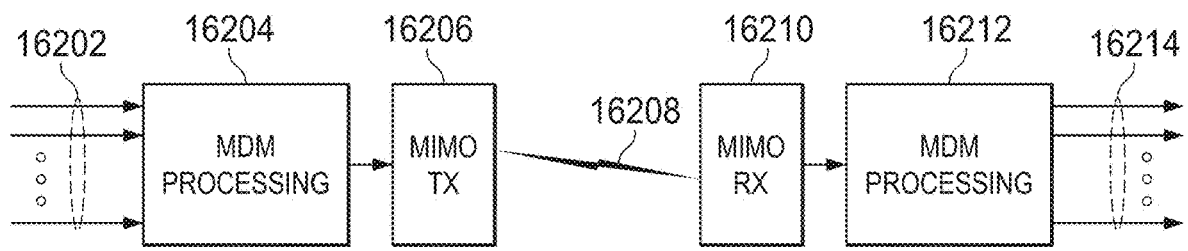
Figure 163:
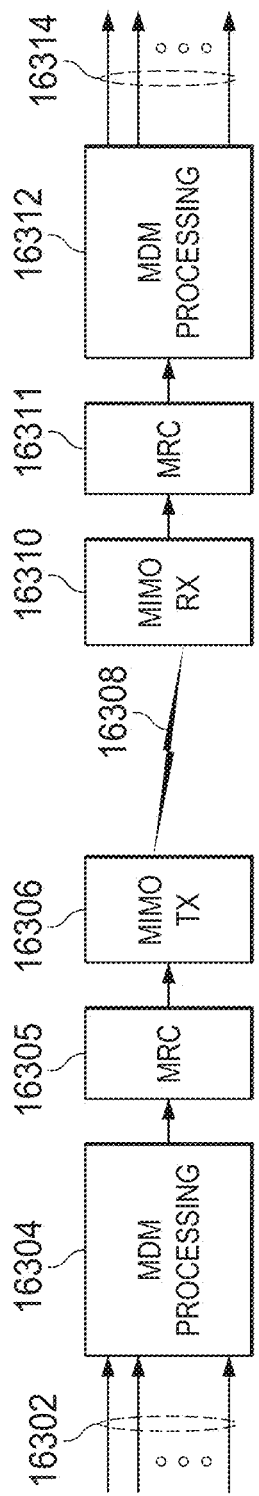
Figure 164:
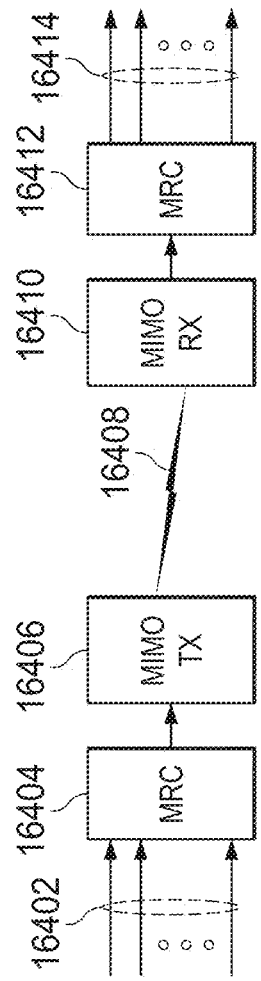

FIG. 109 illustrates the use of a reflective phase hologram for data exchange;

FIG. 110 is a flow diagram illustrating the process for using ROADM for exchanging data signals;

FIG. 111 illustrates the concept of a ROADM for data channels carried on multiplexed OAM beams;

FIG. 112 illustrates observed intensity profiles at each step of an ad/drop operation such as that of FIG. 111;

FIG. 113 illustrates circuitry for the generation of an OAM twisted beam using a hologram within a micro-electromechanical device;

FIG. 114 illustrates multiple holograms generated by a micro-electromechanical device;

FIG. 115 illustrates a square array of holograms on a dark background;

FIG. 116 illustrates a hexagonal array of holograms on a dark background;

FIG. 117 illustrates a process for multiplexing various OAM modes together;

FIG. 118 illustrates fractional binary fork holograms;

FIG. 119 illustrates an array of square holograms with no separation on a light background and associated generated OAM mode image;

FIG. 120 illustrates an array of circular holograms separated on a light background and associated generated OAM mode image;

FIG. 121 illustrates an array of square holograms with no separation on a dark background and associated generated OAM mode image;

FIG. 122 illustrates an array of circular holograms on a dark background and associated generated OAM mode image;

FIG. 123 illustrates circular holograms with separation on a bright background and associated generated OAM mode image;

FIG. 124 illustrates circular holograms with separation on a dark background and associated generated OAM mode image;

FIG. 125 illustrates a hexagonal array of circular holograms on a bright background and associated OAM mode image;

FIG. 126 illustrates an hexagonal array of small holograms on a bright background and associated OAM mode image;

FIG. 127 illustrates a hexagonal array of circular holograms on a dark background and associated OAM mode image;

FIG. 128 illustrates a hexagonal array of small holograms on a dark background and associated OAM mode image;

FIG. 129 illustrates a hexagonal array of small holograms separated on a dark background and associated OAM mode image;

FIG. 130 illustrates a hexagonal array of small holograms closely located on a dark background and associated OAM mode image;

FIG. 131 illustrates a hexagonal array of small holograms that are separated on a bright background and associated OAM mode image;

FIG. 132 illustrates a hexagonal array of small holograms that are closely located on a bright background and associated OAM mode image;

FIG. 133 illustrates reduced binary holograms having a radius equal to 100 micro-mirrors and a period of 50 for various OAM modes;

FIG. 134 illustrates OAM modes for holograms having a radius of 50 micro-mirrors and a period of 50;

FIG. 135 illustrates OAM modes for holograms having a radius of 100 micro-mirrors and a period of 100;

FIG. 136 illustrates OAM modes for holograms having a radius of 50 micro-mirrors and a period of 50;

FIG. 137 illustrates additional methods of multimode OAM generation by implementing multiple holograms within a MEMs device;

FIG. 138 illustrates binary spiral holograms;

FIG. 139 is a block diagram of a circuit for generating a muxed and multiplexed data stream containing multiple new Eigen channels;

FIG. 140 is a flow diagram describing the operation of the circuit of FIG. 139;

FIG. 141 is a block diagram of a circuit for de-muxing and de-multiplexing a data stream containing multiple new Eigen channels;

FIG. 142 is a flow diagram describing the operation of the circuit of FIG. 141;

FIG. 143 illustrates a single input, single output (SISO) channel;

FIG. 144 illustrates a multiple input, multiple output (MIMO) channel;

FIG. 145 illustrates the manner in which a MIMO channel increases capacity without increasing power;

FIG. 146 compares capacity between a MIMO system and a single channel system;

FIG. 147 illustrates multiple links provided by a MIMO system;

FIG. 148 illustrates various types of channels between a transmitter and a receiver;

FIG. 149 illustrates an SISO system, MIMO diversity system and the MIMO multiplexing system;

FIG. 150 illustrates the loss coefficients of a 2×2 MIMO channel over time;

FIG. 151 illustrates the manner in which the bit error rate declines as a function of the exponent of the signal-to-noise ratio;

FIG. 152 illustrates diversity gains in a fading channel;

FIG. 153 illustrates a model decomposition of a MIMO channel with full CSI;

FIG. 154 illustrates SVD decomposition of a matrix channel into parallel equivalent channels;

FIG. 155 illustrates a system channel model;

FIG. 156 illustrates the receive antenna distance versus correlation;

FIG. 157 illustrates the manner in which correlation reduces capacity in frequency selective channels;

FIG. 158 illustrates the manner in which channel information varies with frequency in a frequency selective channel;

FIG. 159 illustrates antenna placement in a MIMO system;

FIG. 160 illustrates multiple communication links at a MIMO receiver;

FIG. 161 illustrates the increased bandwidth provided by MIMO techniques and mode division multiplexing (MDM) techniques;

FIG. 162 illustrates a combined MDM and MIMO transmitter/receiver system;

FIG. 163 illustrates a combined MDM, MRC and MIMO transmitter/receiver system; and FIG. 164 illustrates a combined MRC and MIMO transmitter/receiver system.

DETAILED DESCRIPTION

Referring now to the drawings, wherein like reference numbers are used herein to designate like elements throughout, the various views and embodiments of a system and method for combining MIMO and mode-division multiplexing (MDM) techniques for communications are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Achieving higher data capacity is perhaps one of the primary interest of the communications community. This is led to the investigation of using different physical properties of a light wave for communications, including amplitude, phase, wavelength and polarization. Orthogonal modes in spatial positions are also under investigation and seemed to be useful as well. Generally these investigative efforts can be summarized in 2 categories: 1) encoding and decoding more bets on a single optical pulse; a typical example is the use of advanced modulation formats, which encode information on amplitude, phase and polarization states, and 2) multiplexing and demultiplexing technologies that allow parallel propagation of multiple independent data channels, each of which is addressed by different light property (e.g., wavelength, polarization and space, corresponding to wavelength-division multiplexing (WDM), polarization-division multiplexing (PDM) and space division multiplexing (SDM), respectively).

The recognition that orbital angular momentum (OAM) has applications in communication has made it an interesting research topic. It is well-known that a photon can carry both spin angular momentum and orbital angular momentum. Contrary to spin angular momentum (e.g., circularly polarized light), which is identified by the electrical field erection, OAM is usually carried by a light beam with a helical phase front. Due to the helical phase structure, an OAM carrying beam usually has an annular intensity profile with a phase singularity at the beam center. Importantly, depending on discrete twisting speed of the helical phase, OAM beams can be quantified is different states, which are completely distinguishable while propagating coaxially. This property allows OAM beams to be potentially useful in either of the 2 aforementioned categories to help improve the performance of a free space or fiber communication system. Specifically, OAM states could be used as a different dimension to encode bits on a single pulse (or a single photon), or be used to create additional data carriers in an SDM system.

There are some potential benefits of using OAM for communications, some specially designed novel fibers allow less mode coupling and cross talk while propagating in fibers. In addition, OAM beams with different states share a ring-shaped beam profile, which indicate rotational insensitivity for receiving the beams. Since the distinction of OAM beams does not rely on the wavelength or polarization, OAM multiplexing could be used in addition to WDM and PDM techniques so that potentially improve the system performance may be provided.

Figure 1:
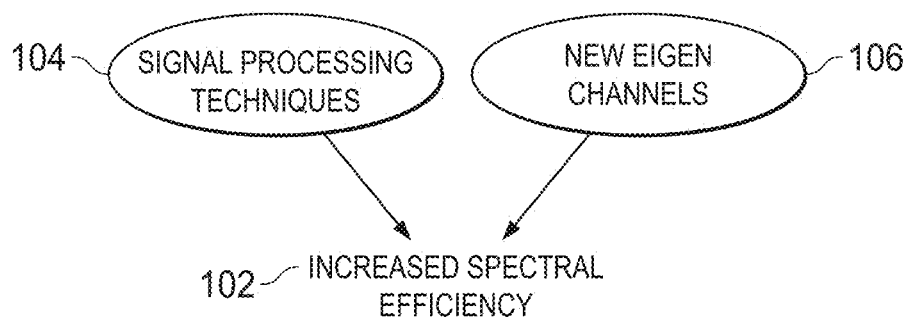
FIG. 1 illustrates various techniques for increasing spectral efficiency within a transmitted signal.

Referring now to the drawings, and more particularly to FIG. 1, wherein there is illustrated two manners for increasing spectral efficiency of a communications system. In general, there are basically two ways to increase spectral efficiency 102 of a communications system. The increase may be brought about by signal processing techniques 104 in the modulation scheme or using multiple access technique. Additionally, the spectral efficiency can be increase by creating new Eigen channels 106 within the electromagnetic propagation. These two techniques are completely independent of one another and innovations from one class can be added to innovations from the second class. Therefore, the combination of this technique introduced a further innovation.

Spectral efficiency 102 is the key driver of the business model of a communications system. The spectral efficiency is defined in units of bit/sec/hz and the higher the spectral efficiency, the better the business model. This is because spectral efficiency can translate to a greater number of users, higher throughput, higher quality or some of each within a communications system.

Regarding techniques using signal processing techniques or multiple access techniques. These techniques include innovations such as TDMA, FDMA, CDMA, EVDO, GSM, WCDMA, HSPA and the most recent OFDM techniques used in 4G WIMAX and LTE. Almost all of these techniques use decades-old modulation techniques based on sinusoidal Eigen functions called QAM modulation. Within the second class of techniques involving the creation of new Eigen channels 106, the innovations include diversity techniques including space and polarization diversity as well as multiple input/multiple output (MIMO) where uncorrelated radio paths create independent Eigen channels and propagation of electromagnetic waves.

Figure 2:
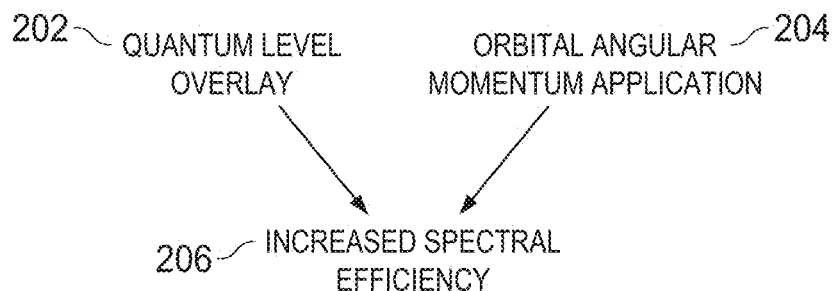
FIG. 2 illustrates a particular technique for increasing spectral efficiency within a transmitted signal.

Referring now to FIG. 2, the present communication system configuration introduces two techniques, one from the signal processing techniques 104 category and one from the creation of new eigen channels 106 category that are entirely independent from each other. Their combination provides a unique manner to disrupt the access part of an end to end communications system from twisted pair and cable to fiber optics, to free space optics, to RF used in cellular, backhaul and satellite, to RF satellite, to RF broadcast, to RF point-to point, to RF point-to-multipoint, to RF point-to-point (backhaul), to RF point-to-point (fronthaul to provide higher throughput CPRI interface for cloudification and virtualization of RAN and cloudified HetNet), to Internet of Things (TOT), to Wi-Fi, to Bluetooth, to a personal device cable replacement, to an RF and FSO hybrid system, to Radar, to electromagnetic tags and to all types of wireless access. The first technique involves the use of a new signal processing technique using new orthogonal signals to upgrade QAM modulation using non sinusoidal functions. This is referred to as quantum level overlay (QLO) 202. The second technique involves the application of new electromagnetic wavefronts using a property of electromagnetic waves or photon, called orbital angular momentum (QAM) 104. Application of each of the quantum level overlay techniques 202 and orbital angular momentum application 204 uniquely offers orders of magnitude higher spectral efficiency 206 within communication systems in their combination.

With respect to the quantum level overlay technique 202, new eigen functions are introduced that when overlapped (on top of one another within a symbol) significantly increases the spectral efficiency of the system. The quantum level overlay technique 302 borrows from quantum mechanics, special orthogonal signals that reduce the time bandwidth product and thereby increase the spectral efficiency of the channel. Each orthogonal signal is overlaid within the symbol acts as an independent channel. These independent channels differentiate the technique from existing modulation techniques.

With respect to the application of orbital angular momentum 204, this technique introduces twisted electromagnetic waves, or light beams, having helical wave fronts that carry orbital angular momentum (OAM). Different OAM carrying waves/beams can be mutually orthogonal to each other within the spatial domain, allowing the waves/beams to be efficiently multiplexed and demultiplexed within a communications link. OAM beams are interesting in communications due to their potential ability in special multiplexing multiple independent data carrying channels.

With respect to the combination of quantum level overlay techniques 202 and orbital angular momentum application 204, the combination is unique as the OAM multiplexing technique is compatible with other electromagnetic techniques such as wave length and polarization division multiplexing. This suggests the possibility of further increasing system performance. The application of these techniques together in high capacity data transmission disrupts the access part of an end to end communications system from twisted pair and cable to fiber optics, to free space optics, to RF used in cellular, backhaul and satellite, to RF satellite, to RF broadcast, to RF point-to point, to RF point-to-multipoint, to RF point-to-point (backhaul), to RF point-to-point (fronthaul to provide higher throughput CPRI interface for cloudification and virtualization of RAN and cloudified HetNet), to Internet of Things (IOT), to Wi-Fi, to Bluetooth, to a personal device cable replacement, to an RF and FSO hybrid system, to Radar, to electromagnetic tags and to all types of wireless access.

Each of these techniques can be applied independent of one another, but the combination provides a unique opportunity to not only increase spectral efficiency, but to increase spectral efficiency without sacrificing distance or signal to noise ratios.

Using the Shannon Capacity Equation, a determination may be made if spectral efficiency is increased. This can be mathematically translated to more bandwidth. Since bandwidth has a value, one can easily convert spectral efficiency gains to financial gains for the business impact of using higher spectral efficiency. Also, when sophisticated forward error correction (FEC) techniques are used, the net impact is higher quality but with the sacrifice of some bandwidth. However, if one can achieve higher spectral efficiency (or more virtual bandwidth), one can sacrifice some of the gained bandwidth for FEC and therefore higher spectral efficiency can also translate to higher quality.

Telecom operators and vendors are interested in increasing spectral efficiency. However, the issue with respect to this increase is the cost. Each technique at different layers of the protocol has a different price tag associated therewith. Techniques that are implemented at a physical layer have the most impact as other techniques can be superimposed on top of the lower layer techniques and thus increase the spectral efficiency further. The price tag for some of the techniques can be drastic when one considers other associated costs. For example, the multiple input multiple output (MIMO) technique uses additional antennas to create additional paths where each RF path can be treated as an independent channel and thus increase the aggregate spectral efficiency. In the MIMO scenario, the operator has other associated soft costs dealing with structural issues such as antenna installations, etc. These techniques not only have tremendous cost, but they have huge timing issues as the structural activities take time and the achieving of higher spectral efficiency comes with significant delays which can also be translated to financial losses.

The quantum level overlay technique 202 has an advantage that the independent channels are created within the symbols without needing new antennas. This will have a tremendous cost and time benefit compared to other techniques. Also, the quantum layer overlay technique 202 is a physical layer technique, which means there are other techniques at higher layers of the protocol that can all ride on top of the QLO techniques 202 and thus increase the spectral efficiency even further. QLO technique 202 uses standard QAM modulation used in OFDM based multiple access technologies such as WIMAX or LTE. QLO technique 202 basically enhances the QAM modulation at the transceiver by injecting new signals to the I & Q components of the baseband and overlaying them before QAM modulation as will be more fully described herein below. At the receiver, the reverse procedure is used to separate the overlaid signal and the net effect is a pulse shaping that allows better localization of the spectrum compared to standard QAM or even the root raised cosine. The impact of this technique is a significantly higher spectral efficiency.

Figure 3:
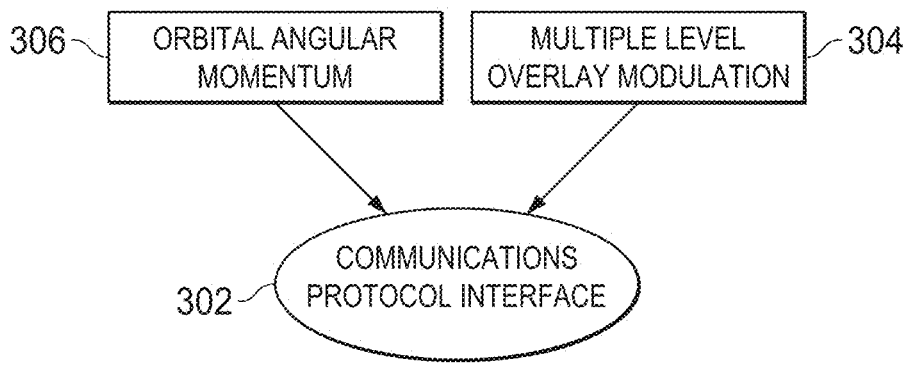
FIG. 3 illustrates a general overview of the manner for providing communication bandwidth between various communication protocol interfaces.

Referring now more particularly to FIG. 3, there is illustrated a general overview of the manner for providing improved communication bandwidth within various communication protocol interfaces 302, using a combination of multiple level overlay modulation 304 and the application of orbital angular momentum 306 to increase the number of communications channels.

The various communication protocol interfaces 302 may comprise a variety of communication links, such as RF communication, wireline communication such as cable or twisted pair connections, or optical communications making use of light wavelengths such as fiber-optic communications or free-space optics. Various types of RF communications may include a combination of RF microwave or RF satellite communication, as well as multiplexing between RF and free-space optics in real time.

By combining a multiple layer overlay modulation technique 304 with orbital angular momentum (OAM) technique 306, a higher throughput over various types of communication links 302 may be achieved. The use of multiple level overlay modulation alone without OAM increases the spectral efficiency of communication links 302, whether wired, optical, or wireless. However, with OAM, the increase in spectral efficiency is even more significant.

Multiple overlay modulation techniques 304 provide a new degree of freedom beyond the conventional 2 degrees of freedom, with time T and frequency F being independent variables in a two-dimensional notational space defining orthogonal axes in an information diagram. This comprises a more general approach rather than modeling signals as fixed in either the frequency or time domain. Previous modeling methods using fixed time or fixed frequency are considered to be more limiting cases of the general approach of using multiple level overlay modulation 304. Within the multiple level overlay modulation technique 304, signals may be differentiated in two-dimensional space rather than along a single axis. Thus, the information-carrying capacity of a communications channel may be determined by a number of signals which occupy different time and frequency coordinates and may be differentiated in a notational two-dimensional space.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta ($\Delta f$), a given signal transmitted through it in minimum time $\Delta t$ will have an envelope described by certain time-bandwidth minimizing signals. The time-bandwidth products for these signals take the form:

$$\Delta t \Delta f = \tfrac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms.

The orbital angular momentum process 306 provides a twist to wave fronts of the electromagnetic fields carrying the data stream that may enable the transmission of multiple data streams on the same frequency, wavelength, or other signal-supporting mechanism. Similarly, other orthogonal signals may be applied to the different data streams to enable transmission of multiple data streams on the same frequency, wavelength or other signal-supporting mechanism. This will increase the bandwidth over a communications link by allowing a single frequency or wavelength to support multiple eigen channels, each of the individual channels having a different orthogonal and independent orbital angular momentum associated therewith.

Figure 4:
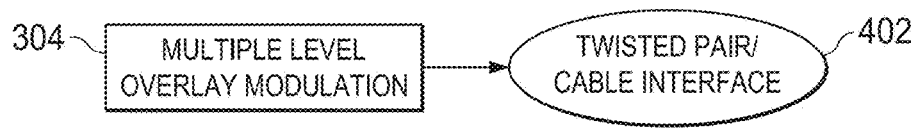
FIG. 4 illustrates the manner for utilizing multiple level overlay modulation with twisted pair/cable interfaces.

Referring now to FIG. 4, there is illustrated a further communication implementation technique using the above described techniques as twisted pairs or cables carry electrons (not photons). Rather than using each of the multiple level overlay modulation 304 and orbital angular momentum techniques 306, only the multiple level overlay modulation 304 can be used in conjunction with a single wireline interface and, more particularly, a twisted pair communication link or a cable communication link 402. The operation of the multiple level overlay modulation 404, is similar to that discussed previously with respect to FIG. 3, but is used by itself without the use of orbital angular momentum techniques 306, and is used with either a twisted pair communication link or cable interface communication link 402 or with fiber optics, free space optics, RF used in cellular, backhaul and satellite, RF satellite, RF broadcast, RF point-to point, RF point-to-multipoint, RF point-to-point (backhaul), RF point-to-point (fronthaul to provide higher throughput CPRI interface for cloudification and virtualization of RAN and cloudified HetNet), Internet of Things (IOT), Wi-Fi, Bluetooth, a personal device cable replacement, an RF and FSO hybrid system, Radar, electromagnetic tags and all types of wireless access.

Figure 5:
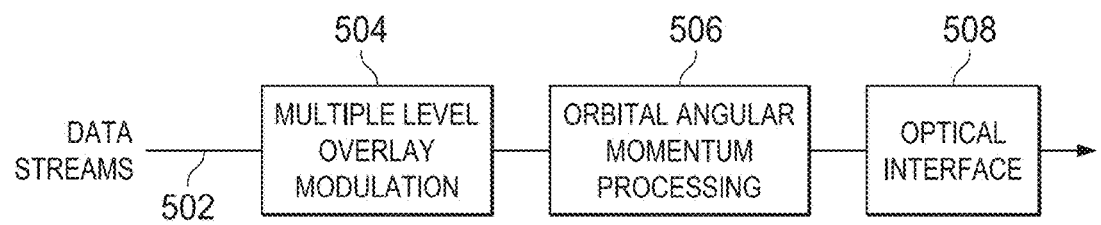
FIG. 5 illustrates a general block diagram for processing a plurality of data streams within an optical communication system.

Referring now to FIG. 5, there is illustrated a general block diagram for processing a plurality of data streams 502 for transmission in an optical communication system. The multiple data streams 502 are provided to the multi-layer overlay modulation circuitry 504 wherein the signals are modulated using the multi-layer overlay modulation technique. The modulated signals are provided to orbital angular momentum processing circuitry 506 which applies a twist to each of the wave fronts being transmitted on the wavelengths of the optical communication channel. The twisted waves are transmitted through the optical interface 508 over an optical or other communications link such as an optical fiber or free space optics communication system. FIG. 5 may also illustrate an RF mechanism wherein the interface 508 would comprise and RF interface rather than an optical interface.

Figure 6:
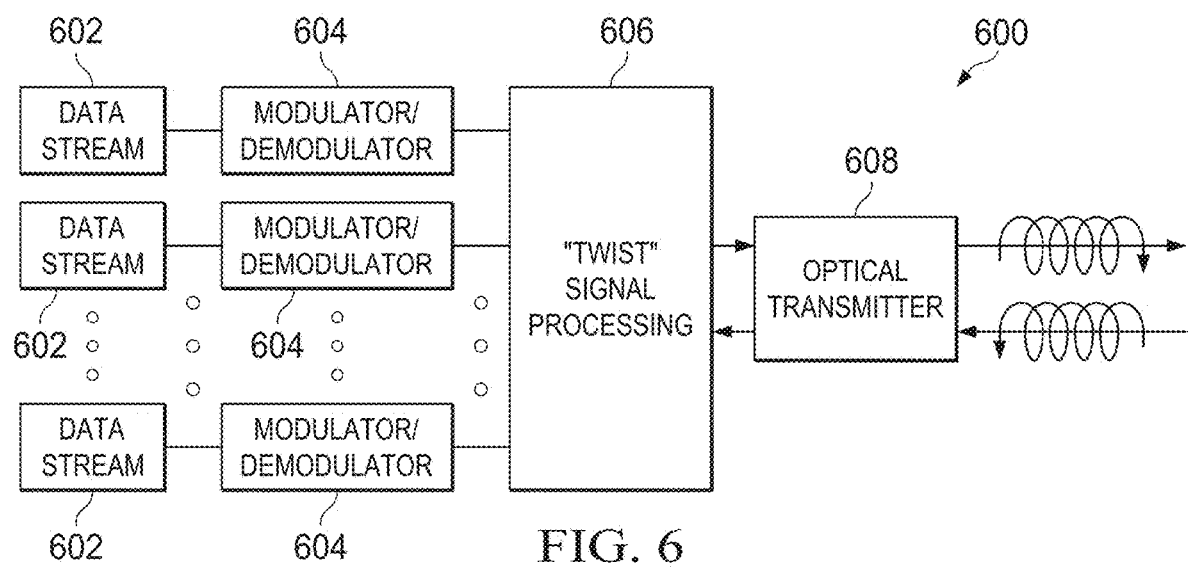
FIG. 6 is a functional block diagram of a system for generating orbital angular momentum within a communication system.

Referring now more particularly to FIG. 6, there is illustrated a functional block diagram of a system for generating the orbital angular momentum "twist" within a communication system, such as that illustrated with respect to FIG. 3, to provide a data stream that may be combined with multiple other data streams for transmission upon a same wavelength or frequency. Multiple data streams 602 are provided to the transmission processing circuitry 600. Each of the data streams 602 comprises, for example, an end to end link connection carrying a voice call or a packet connection transmitting non-circuit switch packed data over a data connection. The multiple data streams 602 are processed by modulator/demodulator circuitry 604. The modulator/demodulator circuitry 604 modulates the received data stream 602 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 606. The orbital angular momentum signal processing block 606 applies in one embodiment an orbital angular momentum to a signal. In other embodiments the processing block 606 can apply any orthogonal function to a signal being transmitted. These orthogonal functions can be spatial Bessel functions, Laguerre-Gaussian functions, Hermite-Gaussian functions, Ince-Gaussian functions or any other orthogonal function. Each of the modulated data streams from the modulator/demodulator 604 are provided a different orbital angular momentum by the orbital angular momentum electromagnetic block 606 such that each of the modulated data streams have a unique and different orbital angular momentum associated therewith. Each of the modulated signals having an associated orbital angular momentum are provided to an optical transmitter 608 that transmits each of the modulated data streams having a unique orbital angular momentum on a same wavelength. Each wavelength has a selected number of bandwidth slots B and may have its data transmission capability increase by a factor of the number of degrees of orbital angular momentum 1 that are provided from the OAM electromagnetic block 606. The optical transmitter 608 transmitting signals at a single wavelength could transmit B groups of information. The optical transmitter 608 and OAM electromagnetic block 606 may transmit 1× B groups of information according to the configuration described herein.

In a receiving mode, the optical transmitter 608 will have a wavelength including multiple signals transmitted therein having different orbital angular momentum signals embedded therein. The optical transmitter 608 forwards these signals to the OAM signal processing block 606, which separates each of the signals having different orbital angular momentum and provides the separated signals to the demodulator circuitry 604. The demodulation process extracts the data streams 602 from the modulated signals and provides it at the receiving end using the multiple layer overlay demodulation technique.

Figure 7:
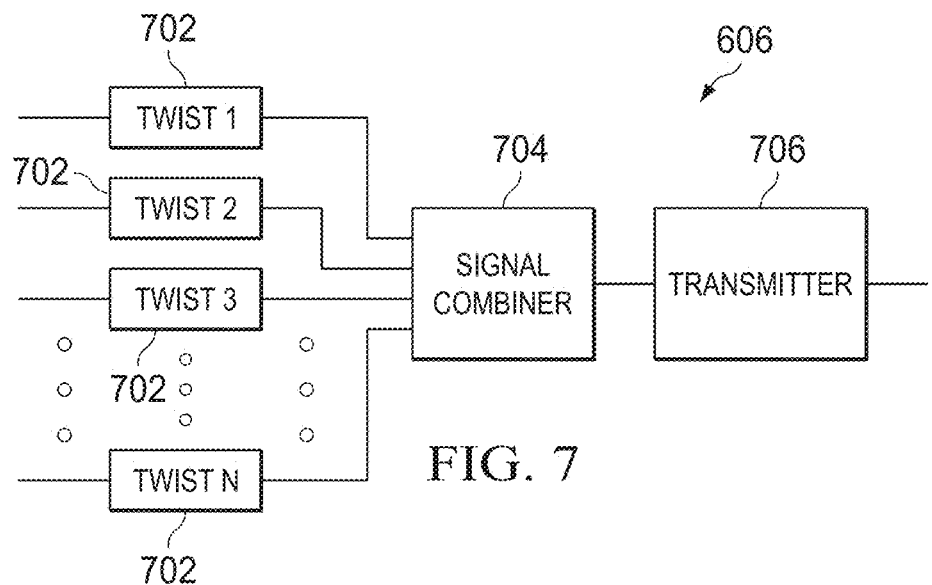
FIG. 7 is a functional block diagram of the orbital angular momentum signal processing block of FIG. 6.

Referring now to FIG. 7, there is provided a more detailed functional description of the OAM signal processing block 606. Each of the input data streams are provided to OAM circuitry 702. Each of the OAM circuitry 702 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 702 are unique to the data stream that is provided thereto. An infinite number of orbital angular momentums may be applied to different input data streams using many different currents. Each of the separately generated data streams are provided to a signal combiner 704, which combines/multiplexes the signals onto a wavelength for transmission from the transmitter 706. The combiner 704 performs a spatial mode division multiplexing to place all of the signals upon a same carrier signal in the space domain.

Figure 8:
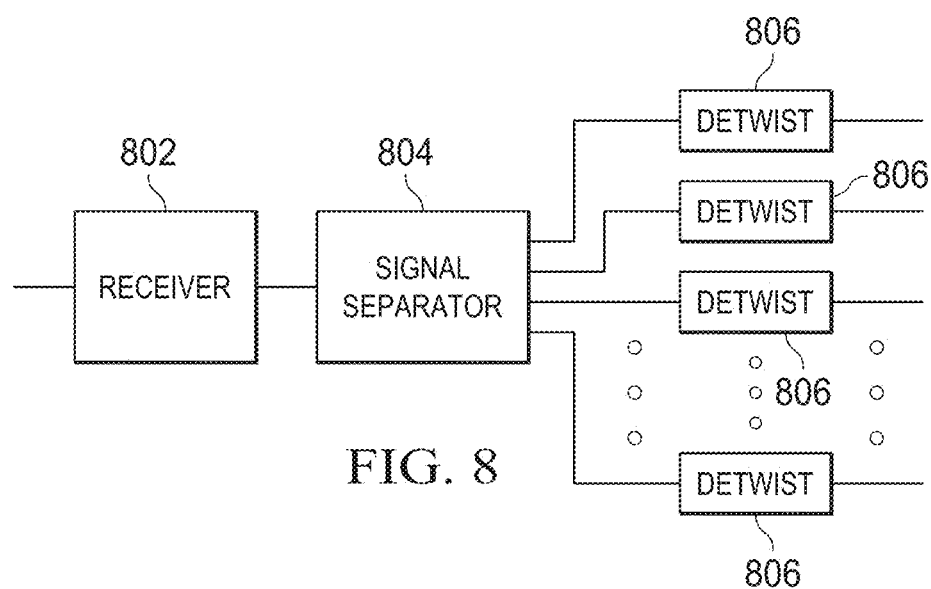
FIG. 8 is a functional block diagram illustrating the manner for removing orbital angular momentum from a received signal including a plurality of data streams.

Referring now to FIG. 8, there is illustrated the manner in which the OAM processing circuitry 606 may separate a received signal into multiple data streams. The receiver 802 receives the combined OAM signals on a single wavelength and provides this information to a signal separator 804. The signal separator 804 separates each of the signals having different orbital angular momentums from the received wavelength and provides the separated signals to OAM de-twisting circuitry 806. The OAM de-twisting circuitry 806 removes the associated OAM twist from each of the associated signals and provides the received modulated data stream for further processing. The signal separator 804 separates each of the received signals that have had the orbital angular momentum removed therefrom into individual received signals. The individually received signals are provided to the receiver 802 for demodulation using, for example, multiple level overlay demodulation as will be more fully described herein below.

Figure 9:
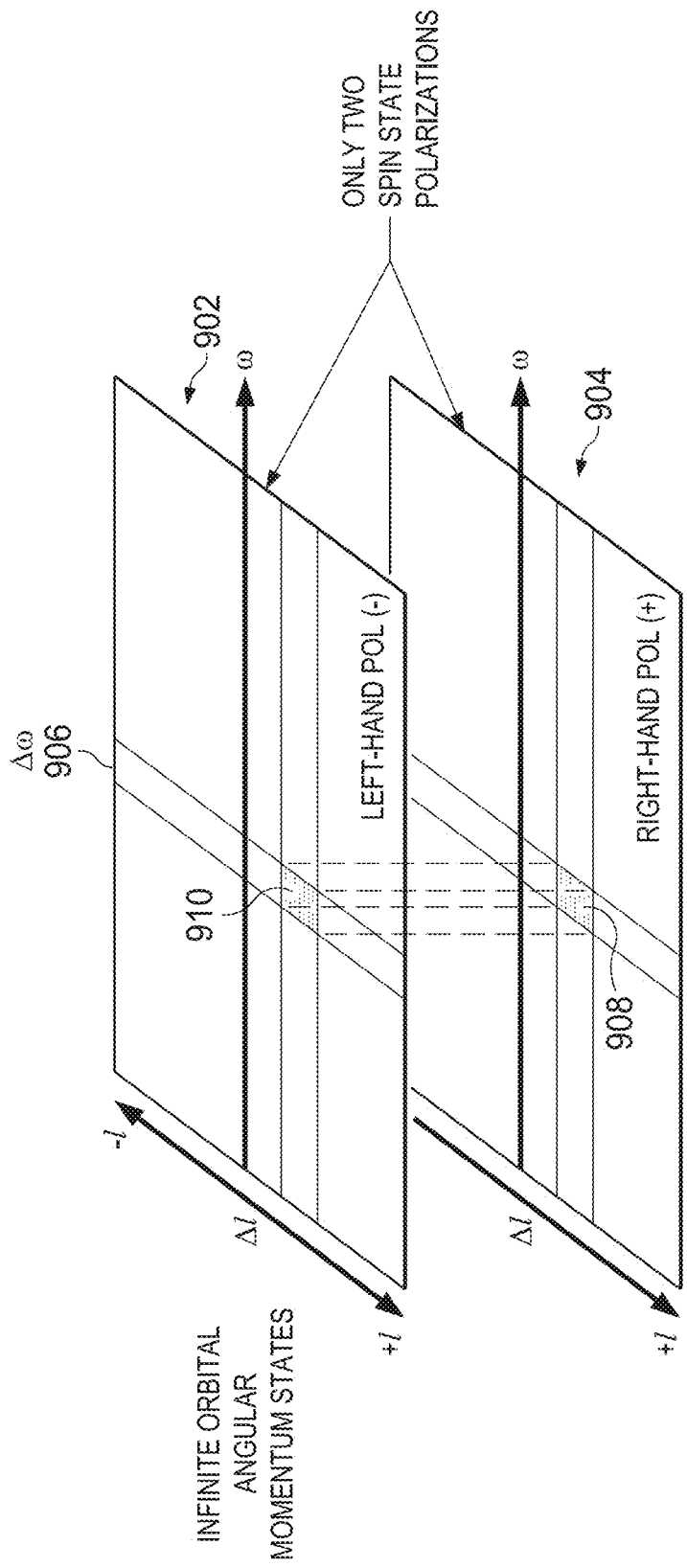
FIG. 9 illustrates a single wavelength having two quanti-spin polarizations providing an infinite number of signals having various orbital angular momentums associated therewith.

FIG. 9 illustrates in a manner in which a single wavelength or frequency, having two quanti-spin polarizations may provide an infinite number of twists having various orbital angular momentums associated therewith. The l axis represents the various quantized orbital angular momentum states which may be applied to a particular signal at a selected frequency or wavelength. The symbol omega (ω) represents the various frequencies to which the signals of differing orbital angular momentum may be applied. The top grid 902 represents the potentially available signals for a left handed signal polarization, while the bottom grid 904 is for potentially available signals having right handed polarization.

By applying different orbital angular momentum states to a signal at a particular frequency or wavelength, a potentially infinite number of states may be provided at the frequency or wavelength. Thus, the state at the frequency Δω or wavelength 906 in both the left handed polarization plane 902 and the right handed polarization plane 904 can provide an infinite number of signals at different orbital angular momentum states Δl. Blocks 908 and 910 represent a particular signal having an orbital angular momentum Δl at a frequency Δω or wavelength in both the right handed polarization plane 904 and left handed polarization plane 910, respectively. By changing to a different orbital angular momentum within the same frequency Δω or wavelength 906, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 9, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Figure 10A:
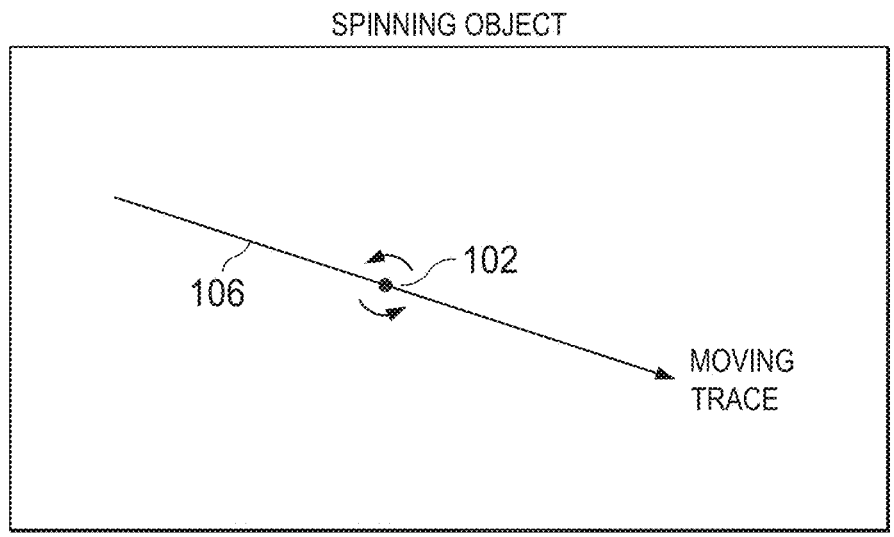
FIG. 10A illustrates an object with only a spin angular momentum.
Figure 10B:
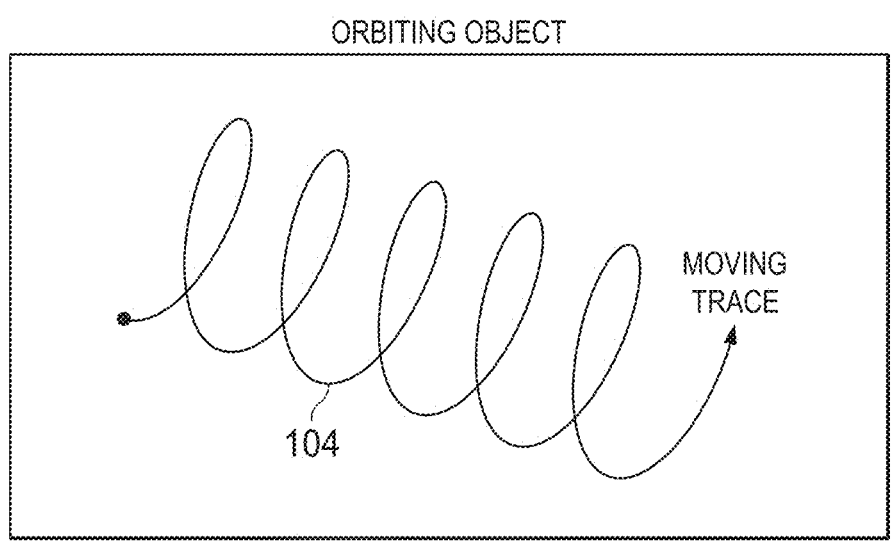
FIG. 10B illustrates an object with an orbital angular momentum.
Figure 10C:
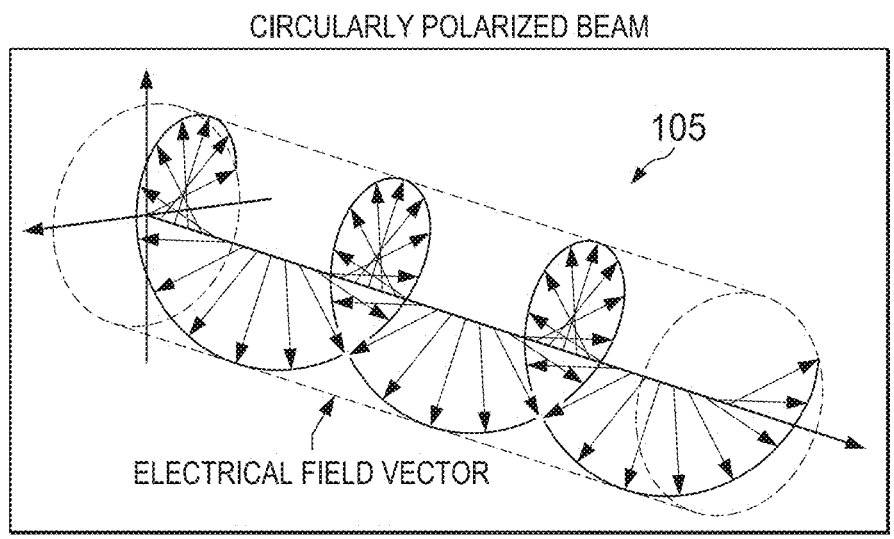
FIG. 10C illustrates a circularly polarized beam carrying spin angular momentum.
Figure 10D:
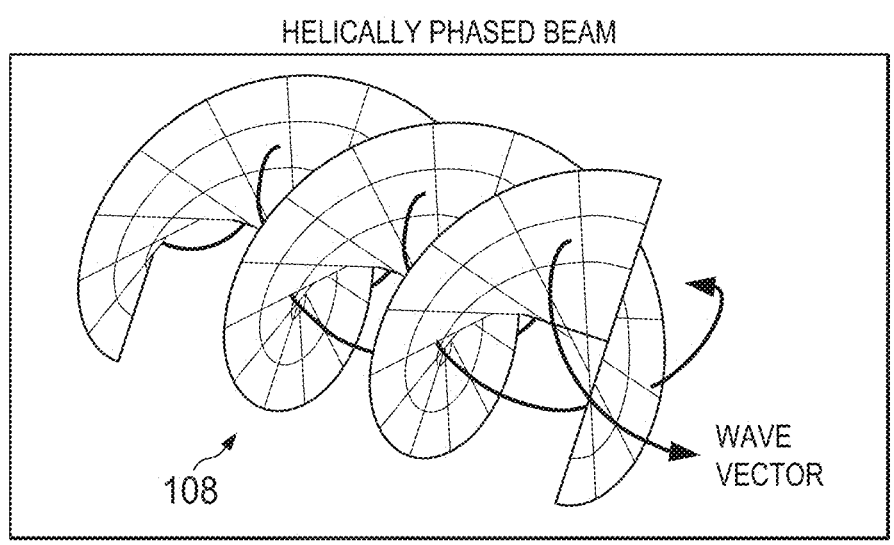
FIG. 10D illustrates the phase structure of a light beam carrying an orbital angular momentum.

It is well-known that the concept of linear momentum is usually associated with objects moving in a straight line. The object could also carry angular momentum if it has a rotational motion, such as spinning (i.e., spin angular momentum (SAM) 1002), or orbiting around an axis 1006 (i.e., OAM 1004), as shown in FIGS. 10A and 10B, respectively. A light beam may also have rotational motion as it propagates. In paraxial approximation, a light beam carries SAM 1002 if the electrical field rotates along the beam axis 1006 (i.e., circularly polarized light 1005), and carries OAM 1004 if the wave vector spirals around the beam axis 1006, leading to a helical phase front 1008, as shown in FIGS. 10C and 10D. In its analytical expression, this helical phase front 1008 is usually related to a phase term of exp(il θ) in the transverse plane, where θ refers to the angular coordinate, and l is an integer indicating the number of intertwined helices (i.e., the number of 2π phase shifts along the circle around the beam axis). l could be a positive, negative integer or zero, corresponding to clockwise, counterclockwise phase helices or a Gaussian beam with no helix, respectively.

Two important concepts relating to OAM include: 1) OAM and polarization: As mentioned above, an OAM beam is manifested as a beam with a helical phase front and therefore a twisting wavevector, while polarization states can only be connected to SAM 1002. A light beam carries SAM 1002 of ±h/2π (h is Plank's constant) per photon if it is left or right circularly polarized, and carries no SAM 1002 if it is linearly polarized. Although the SAM 1002 and OAM 1004 of light can be coupled to each other under certain scenarios, they can be clearly distinguished for a paraxial light beam. Therefore, with the paraxial assumption, OAM 1004 and polarization can be considered as two independent properties of light.

2) OAM beam and Laguerre-Gaussian (LG) beam: In general, an OAM-carrying beam could refer to any helically phased light beam, irrespective of its radial distribution (although sometimes OAM could also be carried by a non-helically phased beam). LG beam is a special subset among all OAM-carrying beams, due to that the analytical expression of LG beams are eigen-solutions of paraxial form of the wave equation in a cylindrical coordinates. For an LG beam, both azimuthal and radial wavefront distributions are well defined, and are indicated by two index numbers, l and p, of which l has the same meaning as that of a general OAM beam, and p refers to the radial nodes in the intensity distribution. Mathematical expressions of LG beams form an orthogonal and complete basis in the spatial domain. In contrast, a general OAM beam actually comprises a group of LG beams (each with the same l index but a different p index) due to the absence of radial definition. The term of "OAM beam" refers to all helically phased beams, and is used to distinguish from LG beams.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0}$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x)$$

where ∇ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

Maxwell's linear theory is of U(1) symmetry with Abelian commutation relations. They can be extended to higher symmetry group SU(2) form with non-Abelian commutation relations that address global (non-local in space) properties. The Wu-Yang and Harmuth interpretation of Maxwell's theory implicates the existence of magnetic monopoles and magnetic charges. As far as the classical fields are concerned, these theoretical constructs are pseudo-particle, or instanton. The interpretation of Maxwell's work actually departs in a significant ways from Maxwell's original intention. In Maxwell's original formulation, Faraday's electronic states (the Aμ field) was central making them compatible with Yang-Mills theory (prior to Heaviside). The mathematical dynamic entities called solutions can be either classical or quantum, linear or non-linear and describe EM waves. However, solutions are of SU(2) symmetry forms. In order for conventional interpreted classical Maxwell's theory of U(1) symmetry to describe such entities, the theory must be extended to SU(2) forms.

Besides the half dozen physical phenomena (that cannot be explained with conventional Maxwell's theory), the recently formulated Harmuth Ansatz also address the incompleteness of Maxwell's theory. Harmuth amended Maxwell's equations can be used to calculate EM signal velocities provided that a magnetic current density and magnetic charge are added which is consistent to Yang-Mills filed equations. Therefore, with the correct geometry and topology, the Aμ potentials always have physical meaning The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3 x (|E|^2 + c^2 |B|^2)$$

Hamiltonian (total energy)

$$\frac{dU^{mech}}{dt} + \frac{dU^{em}}{dt} + \oint_{s'} d^2 x' \hat{n}' \cdot S = 0$$

conservation of energy

The space symmetry, i.e., the conservation of system linear momentum representing the electromagnetic Doppler shift can be represented by the equations:

$$p = \sum_i m_i \gamma_i v_i + \varepsilon_0 \int d^3 x (E \times B)$$

linear momentum $$\frac{dp^{mech}}{dt} + \frac{dp^{em}}{dt} + \oint_{s'} d^2 x' \hat{n}' \cdot T = 0$$

conservation of linear momentum

The conservation of system center of energy is represented by the equation:

$$R = \frac{1}{H} \sum_i (x_i - x_0) m_i \gamma_i c^2 + \frac{\varepsilon_0}{2H} \int d^3 x (x - x_0)(|E^2| + c^2 |B^2|)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{s'} d^2 x' \hat{n}' \cdot M = 0$$

conservation of angular momentum

For radiation beams in free space, the EM field angular momentum $J^{em}$ can be separated into two parts:

$$J^{em} = \varepsilon_0 \int_{V'} d^3 x' (E \times A) + \varepsilon_0 \int_{V'} d^3 x' E_i' [(x' - x_0) \times \nabla] A_i$$

For each singular Fourier mode in real valued representation:

$$J^{em} = -i \frac{\varepsilon_0}{2\omega} \int_{V'} d^3 x' (E^* \times E) - i \frac{\varepsilon_0}{2\omega} \int_{V'} d^3 x' E_i [(x' - x_0) \times \nabla] E_i$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em} = L^{em} + S^{em}$ are radiated all the way to the far field.

By using Poynting theorem, the optical vorticity of the signals may be determined according to the optical velocity equation:

$$\frac{\partial U}{\partial t} + \nabla \cdot S = 0,$$

continuity equation where S is the Poynting vector $$S = \frac{1}{4}(E \times H^* + E^* \times H),$$

and U is the energy density $$U = \frac{1}{4}(\varepsilon |E|^2 + \mu_0 |H|^2),$$

with E and H comprising the electric field and the magnetic field, respectively, and ε and $\mu_0$ being the permittivity and the permeability of the medium, respectively. The optical vorticity V may then be determined by the curl of the optical velocity according to the equation:

$$V = \nabla \times v_{opt} = \nabla \times \left( \frac{E \times H^* + E^* \times H}{\varepsilon |E|^2 + \mu_0 |H|^2} \right)$$

Figure 11A:
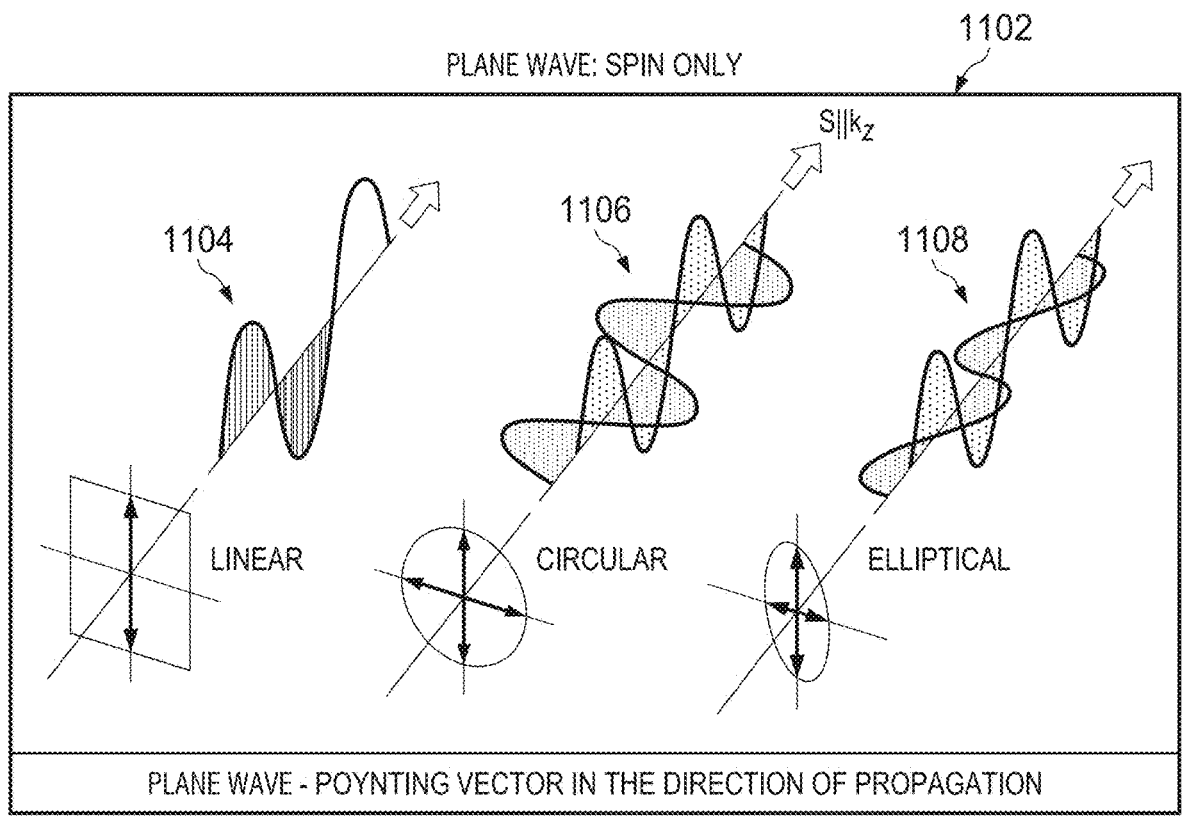
FIG. 11A illustrates a plane wave having only variations in the spin angular momentum.
Figure 11B:
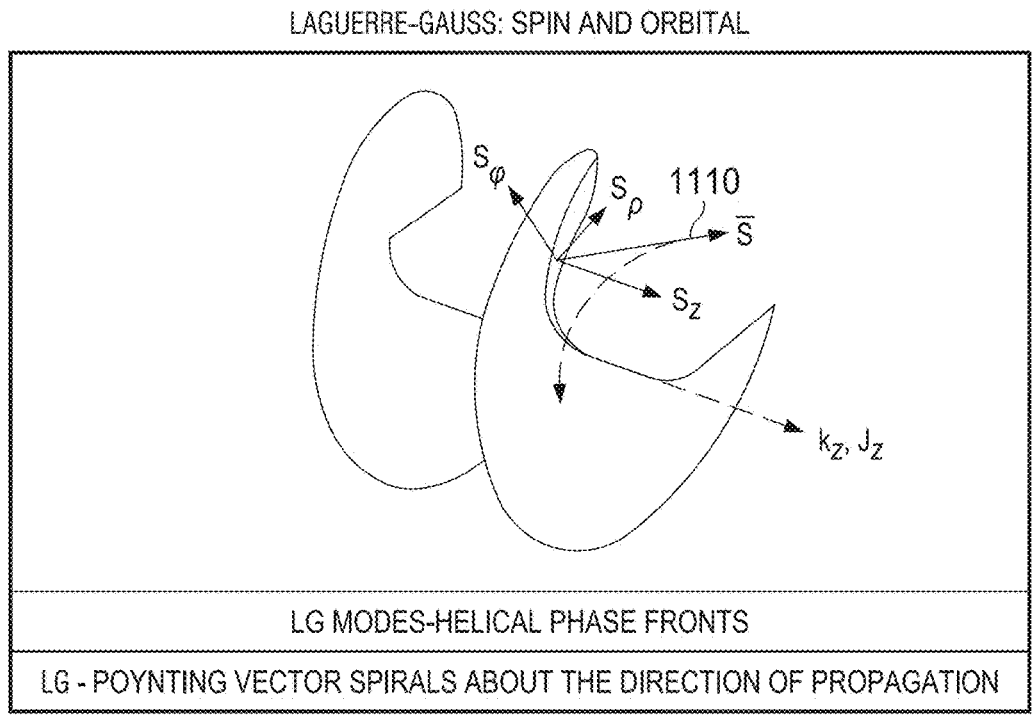
FIG. 11B illustrates a signal having both spin and orbital angular momentum applied thereto.

Referring now to FIGS. 11A and 11B, there is illustrated the manner in which a signal and its associated Poynting vector in a plane wave situation. In the plane wave situation illustrated generally at 1002, the transmitted signal may take one of three configurations. When the electric field vectors are in the same direction, a linear signal is provided, as illustrated generally at 1004. Within a circular polarization 1006, the electric field vectors rotate with the same magnitude. Within the elliptical polarization 1008, the electric field vectors rotate but have differing magnitudes. The Poynting vector remains in a constant direction for the signal configuration to FIG. 10A and always perpendicular to the electric and magnetic fields. Referring now to FIG. 10B, when a unique orbital angular momentum is applied to a signal as described here and above, the Poynting vector S 1010 will spiral about the direction of propagation of the signal. This spiral may be varied in order to enable signals to be transmitted on the same frequency as described herein.

Figure 12A:
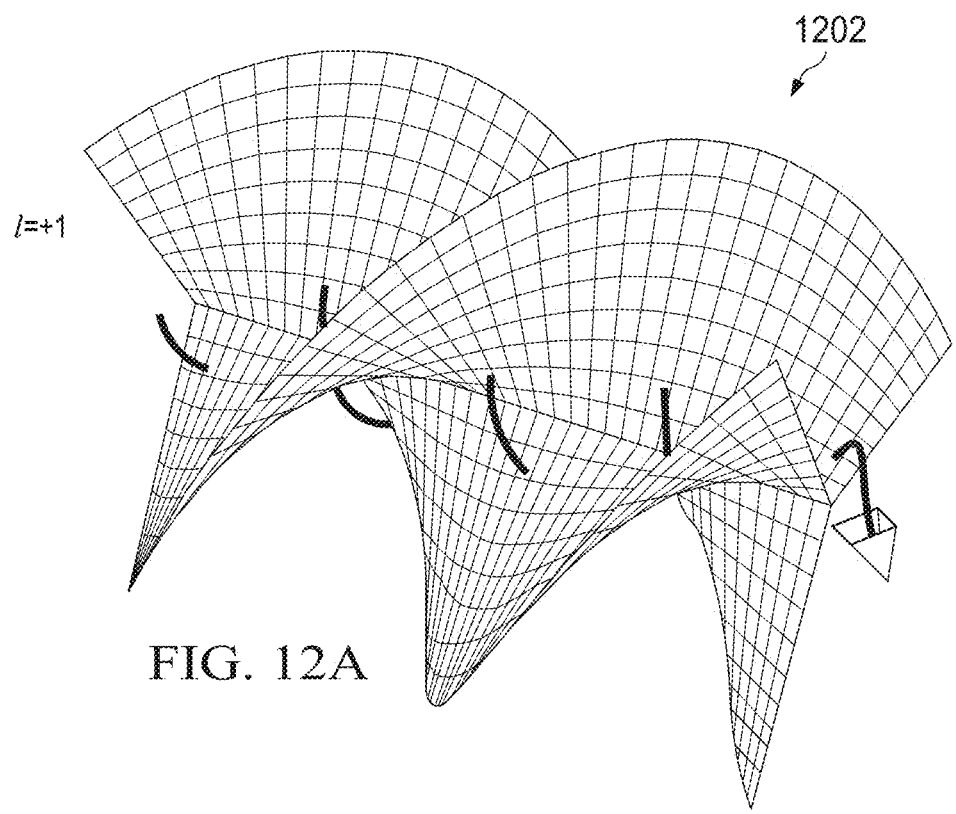
FIGS. 12A-12C illustrate various signals having different orbital angular momentum applied thereto.
Figure 12B:
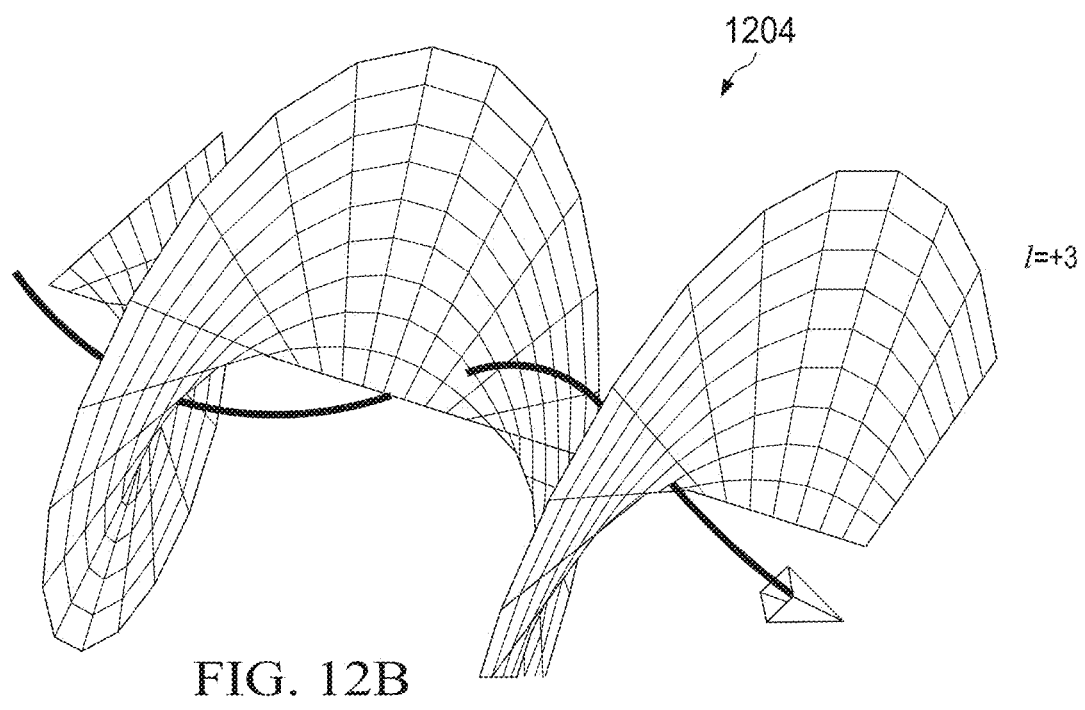
Figure 12C:
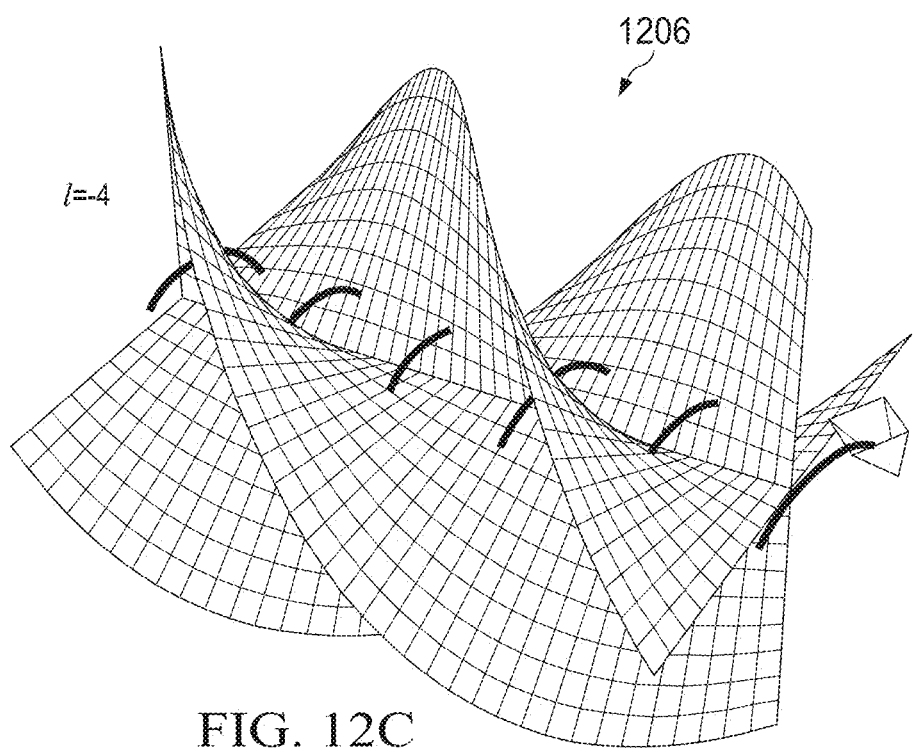
Figure 12D:
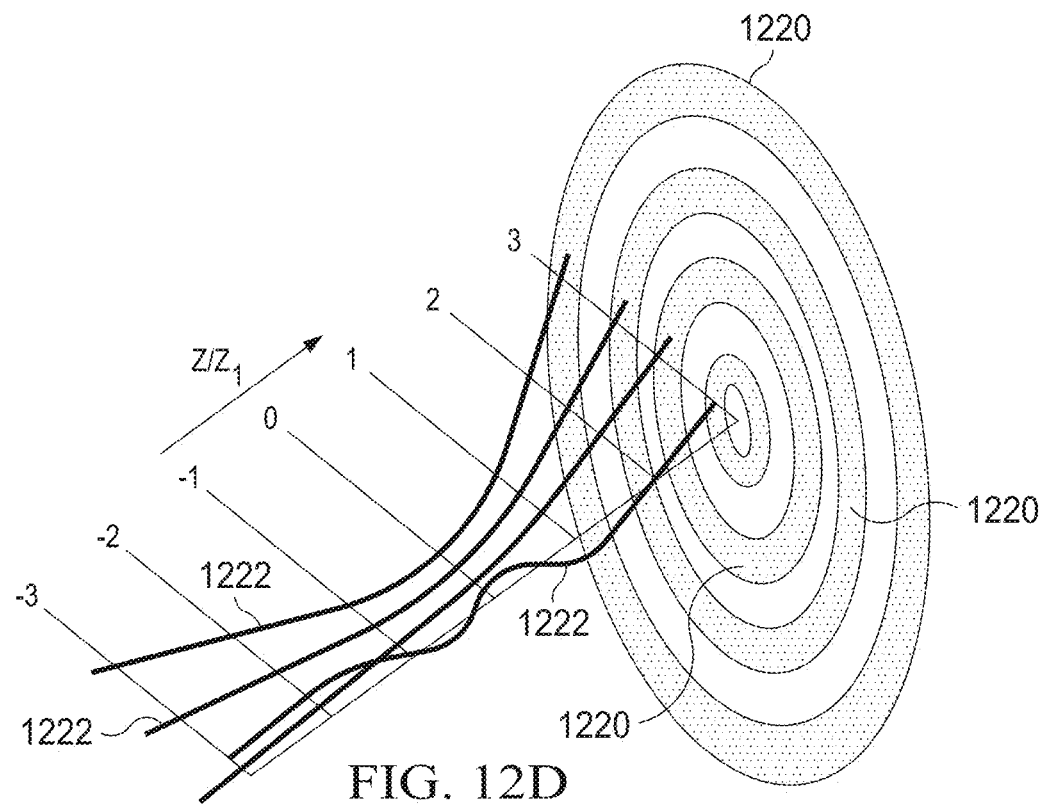
FIG. 12D illustrates a propagation of Poynting vectors for various Eigen modes.

FIGS. 12A through 12C illustrate the differences in signals having different helicity (i.e., orbital angular momentums). Each of the spiraling Poynting vectors associated with the signals 1102, 1104, and 1106 provide a different shaped signal. Signal 1102 has an orbital angular momentum of +1, signal 1104 has an orbital angular momentum of +3, and signal 1106 has an orbital angular momentum of −4. Each signal has a distinct angular momentum and associated Poynting vector enabling the signal to be distinguished from other signals within a same frequency. This allows differing type of information to be transmitted on the same frequency, since these signals are separately detectable and do not interfere with each other (Eigen channels).

FIG. 12 illustrates the propagation of Poynting vectors for various Eigen modes. Each of the rings 1120 represents a different Eigen mode or twist representing a different orbital angular momentum within the same frequency. Each of these rings 1120 represents a different orthogonal channel. Each of the Eigen modes has a Poynting vector 1122 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "I" or the amount of twist or OAM applied to the signal. Also, use of the orthogonal functions discussed herein above may also be multiplexed together onto a same signal in order to transmit multiple streams of information. The helicity index may be positive or negative. In wireless communications, different topological charges/orthogonal functions can be created and muxed together and de-muxed to separate the topological charges charges/orthogonal functions. The signals having different orthogonal function are spatially combined together on a same signal but do not interfere with each other since they are orthogonal to each other.

The topological charges 1 s can be created using Spiral Phase Plates (SPPs) as shown in FIG. 11E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave (l=0) to a twisted RF wave of a specific helicity (i.e. l=+1).

Cross talk and multipath interference can be corrected using RF Multiple-Input-Multiple-Output (MIMO). Most of the channel impairments can be detected using a control or pilot channel and be corrected using algorithmic techniques (closed loop control system).

While the application of orbital angular momentum to various signals allow the signals to be orthogonal to each other and used on a same signal carrying medium, other orthogonal function/signals can be applied to data streams to create the orthogonal signals on the same signal media carrier.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta ($\Delta f$), a given signal transmitted through it in minimum time $\Delta t$ will have an envelope described by certain time-bandwidth minimizing signals. The time-bandwidth products for these signals take the form;

$$\Delta t \Delta f = \frac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms. These types of orthogonal signals that reduce the time bandwidth product and thereby increase the spectral efficiency of the channel.

Hermite-Gaussian polynomials are one example of a classical orthogonal polynomial sequence, which are the Eigenstates of a quantum harmonic oscillator. Signals based on Hermite-Gaussian polynomials possess the minimal time-bandwidth product property described above, and may be used for embodiments of MLO systems. However, it should be understood that other signals may also be used, for example orthogonal polynomials such as Jacobi polynomials, Gegenbauer polynomials, Legendre polynomials, Chebyshev polynomials, Laguerre-Gaussian polynomials, Hermite-Gaussian polynomials and Ince-Gaussian polynomials. Q-functions are another class of functions that can be employed as a basis for MLO signals.

In addition to the time bandwidth minimization described above, the plurality of data streams can be processed to provide minimization of the Space-Momentum products in spatial modulation. In this case:

$$\Delta x \Delta p = \frac{1}{2}$$

Processing of the data streams in this manner create wavefronts that are spatial. The processing creates wavefronts that are also orthogonal to each other like the OAM twisted functions but these comprise different types of orthogonal functions that are in the spatial domain rather than the temporal domain.

The above described scheme is applicable to twisted pair, coaxial cable, fiber optic, RF satellite, RF broadcast, RF point-to point, RF point-to-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE.

Hermite Gaussian Beams

Hermite Gaussian beams may also be used for transmitting orthogonal data streams. In the scalar field approximation (e.g. neglecting the vector character of the electromagnetic field), any electric field amplitude distribution can be represented as a superposition of plane waves, i.e. by:

$$E \propto \int\int \frac{dk_x dk_y}{(2\pi)^2} A(k_x, k_y) e^{ik_x x + ik_y y + ik_z z + iz\sqrt{k^2 - k_x^2 - k_y^2}}$$

This representation is also called angular spectrum of plane waves or plane-wave expansion of the electromagnetic field. Here $A(k_x, k_y)$ is the amplitude of the plane wave. This representation is chosen in such a way that the net energy flux connected with the electromagnetic field is towards the propagation axis z. Every plane wave is connected with an energy flow that has direction k. Actual lasers generate a spatially coherent electromagnetic field which has a finite transversal extension and propagates with moderate spreading. That means that the wave amplitude changes only slowly along the propagation axis (z-axis) compared to the wavelength and finite width of the beam. Thus, the paraxial approximation can be applied, assuming that the amplitude function $A(k_x, k_y)$ falls off sufficiently fast with increasing values of $(k_x, k_y)$.

Two principal characteristics of the total energy flux can be considered: the divergence (spread of the plane wave amplitudes in wave vector space), defined as:

$$\text{Divergence} \propto \int\int \frac{dk_x dk_y}{(2\pi)^2} (K_x^2 + K_y^2) \; |A(k_x, k_y)|^2$$

and the transversal spatial extension (spread of the field intensity perpendicular to the z-direction) defined as:

$$\text{Transversal Extension} \propto \int_{-\infty}^{\infty} dx \int_{-\infty}^{\infty} dy (x^2 + y^2) |E|^2 = \int\int \frac{dk_x dk_y}{(2\pi)^2} \left[ \left|\frac{\partial A}{\partial x}\right|^2 + \left|\frac{\partial A}{\partial y}\right|^2 \right]$$

Let's now look for the fundamental mode of the beam as the electromagnetic field having simultaneously minimal divergence and minimal transversal extension, i.e. as the field that minimizes the product of divergence and extension. By symmetry reasons, this leads to looking for an amplitude function minimizing the product:

$$\left[\int_{-\infty}^{\infty} \frac{dk_x}{(2\pi)} k_x^2 |A|^2\right]\left[\int_{-\infty}^{\infty} \frac{dk_x}{(2\pi)} \left|\frac{\partial A}{\partial k_x}\right|^2\right] = \frac{\|A\|^4}{(8\pi^2)^2}$$

Thus, seeking the field with minimal divergence and minimal transversal extension can lead directly to the fundamental Gaussian beam. This means that the Gaussian beam is the mode with minimum uncertainty, i.e. the product of its sizes in real space and wave-vector space is the theoretical minimum as given by the Heisenberg's uncertainty principle of Quantum Mechanics. Consequently, the Gaussian mode has less dispersion than any other optical field of the same size, and its diffraction sets a lower threshold for the diffraction of real optical beams.

Hermite-Gaussian beams are a family of structurally stable laser modes which have rectangular symmetry along the propagation axis. In order to derive such modes, the simplest approach is to include an additional modulation of the form:

$$E_{m,n}^H = \int_{-\infty}^{\infty} \frac{dk_x dk_y}{(2\pi)^2} (ik_x)^m (ik_y)^n e^S$$

$$S(k_x, k_y, x, y, z) = ik_x x + ik_y y + ik_z z - \frac{w_0}{4}\left(1 + i\frac{Z}{Z_R}\right)[k_x^2 + k_y^2]$$

The new field modes occur to be differential derivatives of the fundamental Gaussian mode $E_0$.

$$E_{m,n}^H = \frac{\partial^{m+n}}{\partial x^m \partial y^n} E_0$$

Looking at the explicit form E0 shows that the differentiations in the last equation lead to expressions of the form:

$$\frac{\partial^P}{\partial x^P} e^{(-\alpha x^2)}$$

with some constant p and α. Using now the definition of Hermits' polynomials, $$H_p(x) = (-1)^p e^{(x^2)} \frac{d^P}{dx^P} e^{(-\alpha x^2)}$$

Then the field amplitude becomes $$E_{m,n}^H(x, y, z) =$$

$$\sum_m \sum_n C_{mn} E_0 \frac{w_0}{w(z)} H_m\left(\sqrt{2}\frac{x}{w(z)}\right) H_n\left(\sqrt{2}\frac{y}{w(z)}\right) e^{\frac{-(x^2+y^2)}{w(z)^2}}$$

$$e^{-j(m+n+1)\tan^{-1} z/z_R} e^{\frac{-(x^2+y^2)}{2R(z)}}$$

Where $$\rho^2 = x^2 + y^2$$

$$\xi = \frac{z}{z_R}$$

and Rayleigh length $z_R$ $$z_R = \frac{\pi w_0^2}{\lambda}$$

And beam diameter $$w(\xi) = w_0 \sqrt{(1+\xi^2)}$$

In cylindrical coordinates, the filed takes the form:

$$E_{l,p}^L(\rho, \varphi, z) = \sum_l \sum_{np} C_{lp} E_0 \frac{w_0}{w(z)} \left(\sqrt{2}\frac{\rho}{w(z)}\right)^l$$

-continued $$L_p^l \left(\sqrt{2}\frac{\rho}{w(z)}\right) e^{\frac{-\rho^2}{w(z)^2}} e^{-j(2p+l+1)\tan^{-1}z/z_R} e^{jl\varphi} e^{\frac{-jk\rho^2}{2R(z)}}$$

Where $L_p^l$ is Laguerre functions.

Mode division multiplexing (MDM) of multiple orthogonal beams increases the system capacity and spectral efficiency in optical communication systems. For free space systems, multiple beams each on a different orthogonal mode can be transmitted through a single transmitter and receiver aperture pair. Moreover, the modal orthogonality of different beans enables the efficient multiplexing at the transmitter and demultiplexing at the receiver.

Different optical modal basis sets exist that exhibit orthogonality. For example, orbital angular momentum (OAM) beams that are either Laguerre Gaussian (LG or Laguerre Gaussian light modes may be used for multiplexing of multiple orthogonal beams in free space optical and RF transmission systems. However, there exist other modal groups that also may be used for multiplexing that do not contain OAM. Hermite Gaussian (HG) modes are one such modal group. The intensity of an $HG_{m,n}$ beam is shown according to the equation:

$$I(x, y, z) = C_{m,n} H_m^2 \left(\frac{\sqrt{2}\,x}{w(z)}\right) H_n^2 \left(\frac{\sqrt{2}\,y}{w(z)}\right) \times \exp\left(-\frac{2x^2}{w(z)^2} - \frac{2y^2}{w(z)^2}\right),$$

$$w(z) = w_0 \sqrt{1 + [\lambda z/\pi w_0^2]}$$

in which $H_m(*)$ and $H_n(*)$ are the Hermite polynomials of the mth and nth order. The value $w_0$ is the beam waist at distance Z=0. The spatial orthogonality of HG modes with the same beam waist $w_0$ relies on the orthogonality of Hermite polynomial in x or y directions.

Figure 13:
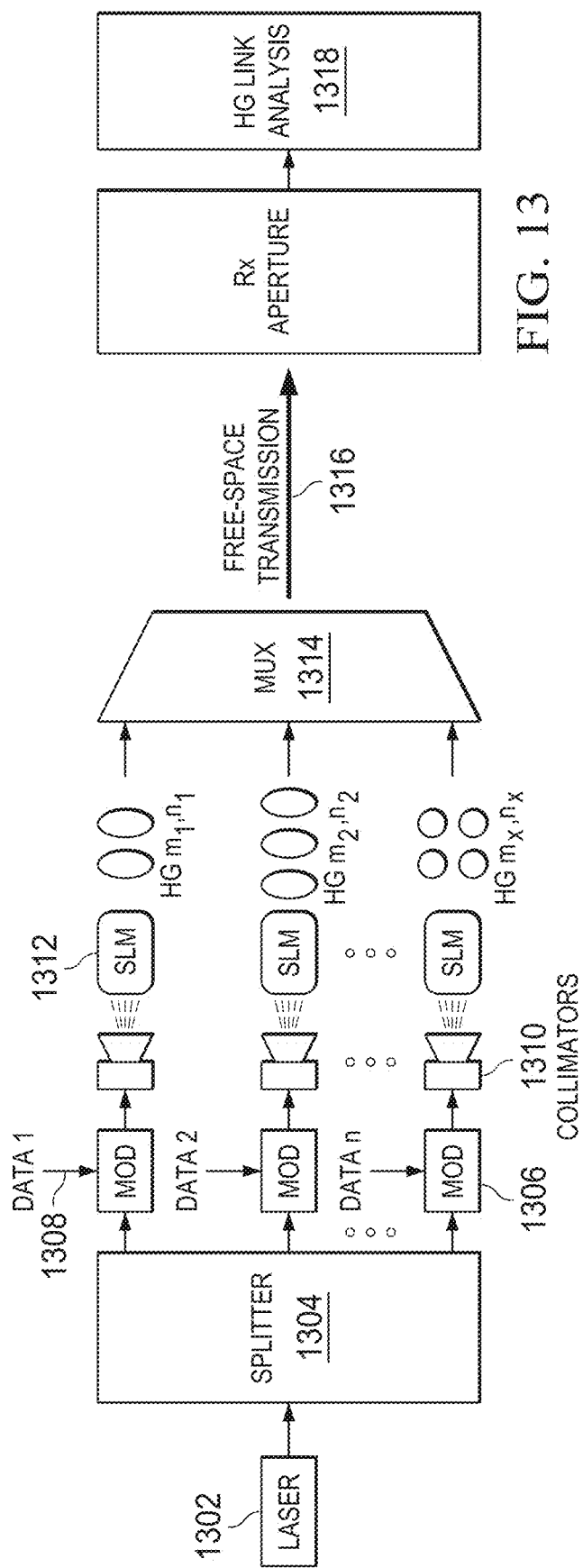
FIG. 13 illustrates a system for using to the orthogonality of an HG modal group for free space spatial multiplexing.

Referring now to FIG. 13, there is illustrated a system for using the orthogonality of an HG modal group for free space spatial multiplexing in free space. A laser 1302 is provided to a beam splitter 1304. The beam splitter 1304 splits the beam into multiple beams that are each provided to a modulator 1306 for modulation with a data stream 1308. The modulated beam is provided to collimators 1310 that provides a collimated light beam to spatial light modulators 1312. Spatial light modulators (SLM's) 1312 may be used for transforming input plane waves into HG modes of different orders, each mode carrying an independent data channel. These HG modes are spatially multiplexed using a multiplexer 1314 and coaxially transmitted over a free space link 1316. At the receiver 1318 there are several factors that may affect the demultiplexing of these HG modes, such as receiver aperture size, receiver lateral displacement and receiver angular error. These factors affect the performance of the data channel such as signal-to-noise ratio and crosstalk.

With respect to the characteristics of a diverged $HG_{m,0}$ beam (m=0-6), the wavelength is assumed to be 1550 nm and the transmitted power for each mode is 0 dBm. Higher order HG modes have been shown to have larger beam sizes. For smaller aperture sizes less power is received for higher order HG modes due to divergence.

Since the orthogonality of HG modes relies on the optical field distribution in the x and y directions, a finite receiver aperture may truncate the beam. The truncation will destroy the orthogonality and cost crosstalk of the HG channels. When an aperture is smaller, there is higher crosstalk to the other modes. When a finite receiver is used, if an HG mode with an even (odd) order is transmitted, it only causes cross talk to other HG modes with even (odd) numbers. This is explained by the fact that the orthogonality of the odd and even HG modal groups remains when the beam is systematically truncated.

Moreover, misalignment of the receiver may cause crosstalk. In one example, lateral displacement can be caused when the receiver is not aligned with the beam axis. In another example, angular error may be caused when the receiver is on axis but there is an angle between the receiver orientation and the beam propagation axis. As the lateral displacement increases, less power is received from the transmitted power mode and more power is leaked to the other modes. There is less crosstalk for the modes with larger mode index spacing from the transmitted mode.

Figure 14:
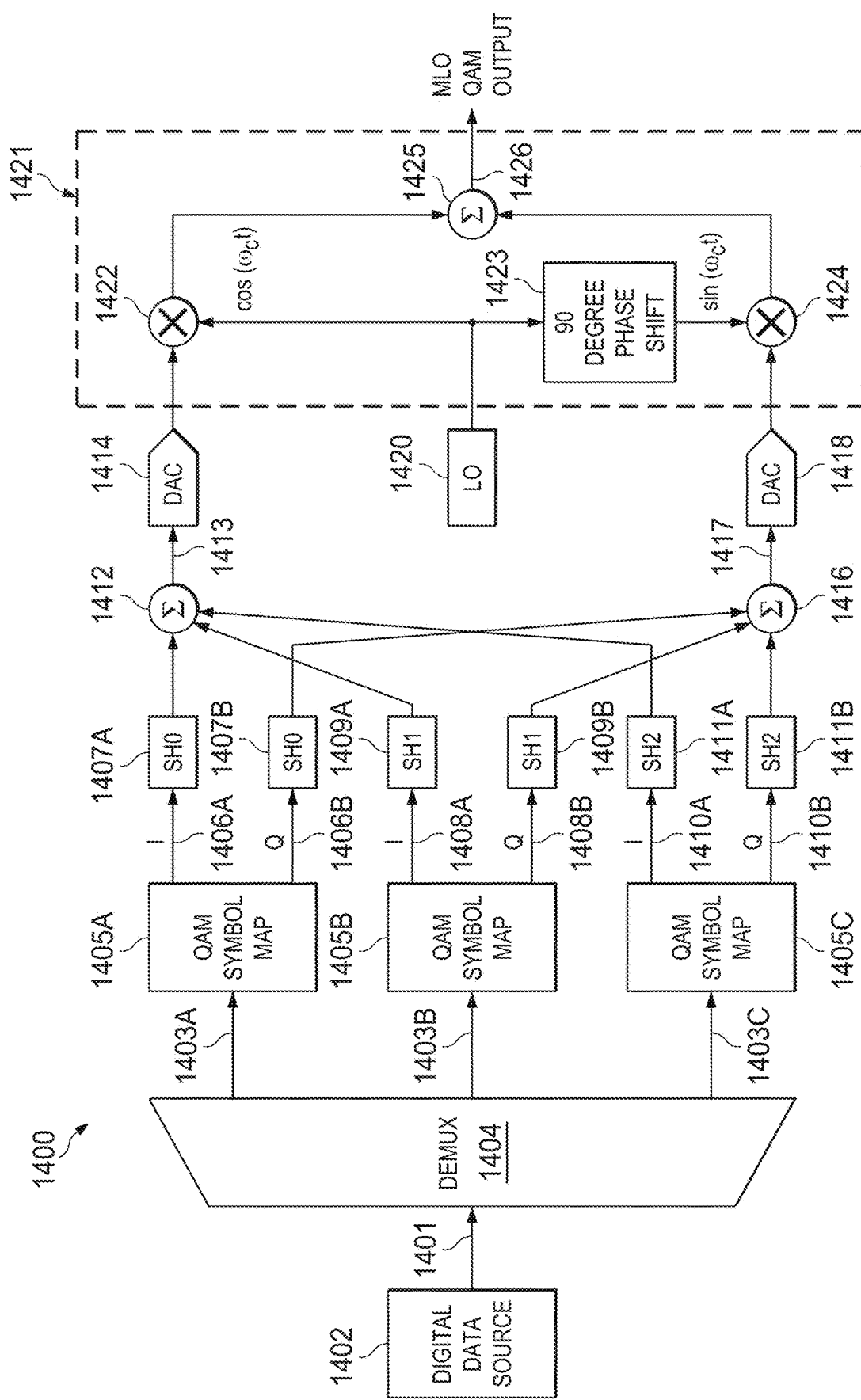
FIG. 14 illustrates a multiple level overlay modulation system.

Referring now to FIG. 14, the reference number 1400 generally indicates an embodiment of a multiple level overlay (MLO) modulation system, although it should be understood that the term MLO and the illustrated system 1400 are examples of embodiments. The MLO system may comprise one such as that disclosed in U.S. Pat. No. 8,503,546 entitled Multiple Layer Overlay Modulation which is incorporated herein by reference. In one example, the modulation system 1400 would be implemented within the multiple level overlay modulation box 504 of FIG. 5. System 1400 takes as input an input data stream 1401 from a digital source 1402, which is separated into three parallel, separate data streams, 1403A-1403C, of logical 1s and 0s by input stage demultiplexer (DEMUX) 1404. Data stream 1401 may represent a data file to be transferred, or an audio or video data stream. It should be understood that a greater or lesser number of separated data streams may be used. In some of the embodiments, each of the separated data streams 1403A-1403C has a data rate of 1/N of the original rate, where N is the number of parallel data streams. In the embodiment illustrated in FIG. 14, N is 3.

Each of the separated data streams 1403A-1403C is mapped to a quadrature amplitude modulation (QAM) symbol in an M-QAM constellation, for example, 16 QAM or 64 QAM, by one of the QAM symbol mappers 1405A-C. The QAM symbol mappers 1405A-C are coupled to respective outputs of DEMUX 1404, and produced parallel in phase (I) 1406A, 1408A, and 1410A and quadrature phase (Q) 1406B, 1408B, and 1410B data streams at discrete levels. For example, in 64 QAM, each I and Q channel uses 8 discrete levels to transmit 3 bits per symbol. Each of the three I and Q pairs, 1406A-1406B, 1408A-1408B, and 1410A-1410B, is used to weight the output of the corresponding pair of function generators 1407A-1407B, 1409A-1409B, and 1411A-1411B, which in some embodiments generate signals such as the modified Hermite polynomials described above and weights them based on the amplitude value of the input symbols. This provides 2N weighted or modulated signals, each carrying a portion of the data originally from income data stream 1401, and is in place of modulating each symbol in the I and Q pairs, 1406A-1406B, 1408A-1408B, and 1410A-1410B with a raised cosine filter, as would be done for a prior art QAM system. In the illustrated embodiment, three signals are used, SH0, SH1, and SH2, which correspond to modifications of H0, H1, and H2, respectively, although it should be understood that different signals may be used in other embodiments.

While the description relates to the application of QLO modulation to improve operation of a quadrature amplitude modulation (QAM) system, the application of QLO modulation will also improve the spectral efficiency of other legacy modulation schemes.

The weighted signals are not subcarriers, but rather are sublayers of a modulated carrier, and are combined, superimposed in both frequency and time, using summers 1412 and 1416, without mutual interference in each of the I and Q dimensions, due to the signal orthogonality. Summers 1412 and 1416 act as signal combiners to produce composite signals 1413 and 1417. The weighted orthogonal signals are used for both I and Q channels, which have been processed equivalently by system 1400, and are summed before the QAM signal is transmitted. Therefore, although new orthogonal functions are used, some embodiments additionally use QAM for transmission. Because of the tapering of the signals in the time domain, as will be shown in FIGS. 18A through 18K, the time domain waveform of the weighted signals will be confined to the duration of the symbols. Further, because of the tapering of the special signals and frequency domain, the signal will also be confined to frequency domain, minimizing interface with signals and adjacent channels.

The composite signals 1413 and 1417 are converted to analogue signals 1415 and 1419 using digital to analogue converters 1414 and 1418, and are then used to modulate a carrier signal at the frequency of local oscillator (LO) 1420, using modulator 1421. Modulator 1421 comprises mixers 1422 and 1424 coupled to DACs 1414 and 1418, respectively. Ninety degree phase shifter 1423 converts the signals from LO 1420 into a Q component of the carrier signal. The output of mixers 1422 and 1424 are summed in summer 1425 to produce output signals 1426.

MLO can be used with a variety of transport mediums, such as wire, optical, and wireless, and may be used in conjunction with QAM. This is because MLO uses spectral overlay of various signals, rather than spectral overlap. Bandwidth utilization efficiency may be increased by an order of magnitude, through extensions of available spectral resources into multiple layers. The number of orthogonal signals is increased from 2, cosine and sine, in the prior art, to a number limited by the accuracy and jitter limits of generators used to produce the orthogonal polynomials. In this manner, MLO extends each of the I and Q dimensions of QAM to any multiple access techniques such as GSM, code division multiple access (CDMA), wide band CDMA (WCDMA), high speed downlink packet access (HSPDA), evolution-data optimized (EV-DO), orthogonal frequency division multiplexing (OFDM), world-wide interoperability for microwave access (WIMAX), and long term evolution (LTE) systems. MLO may be further used in conjunction with other multiple access (MA) schemes such as frequency division duplexing (FDD), time division duplexing (TDD), frequency division multiple access (FDMA), and time division multiple access (TDMA). Overlaying individual orthogonal signals over the same frequency band allows creation of a virtual bandwidth wider than the physical bandwidth, thus adding a new dimension to signal processing. This modulation is applicable to twisted pair, coaxial cable, fiber optic, RF satellite, RF broadcast, RF point-to-point, RF point-to-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE.

Figure 15:
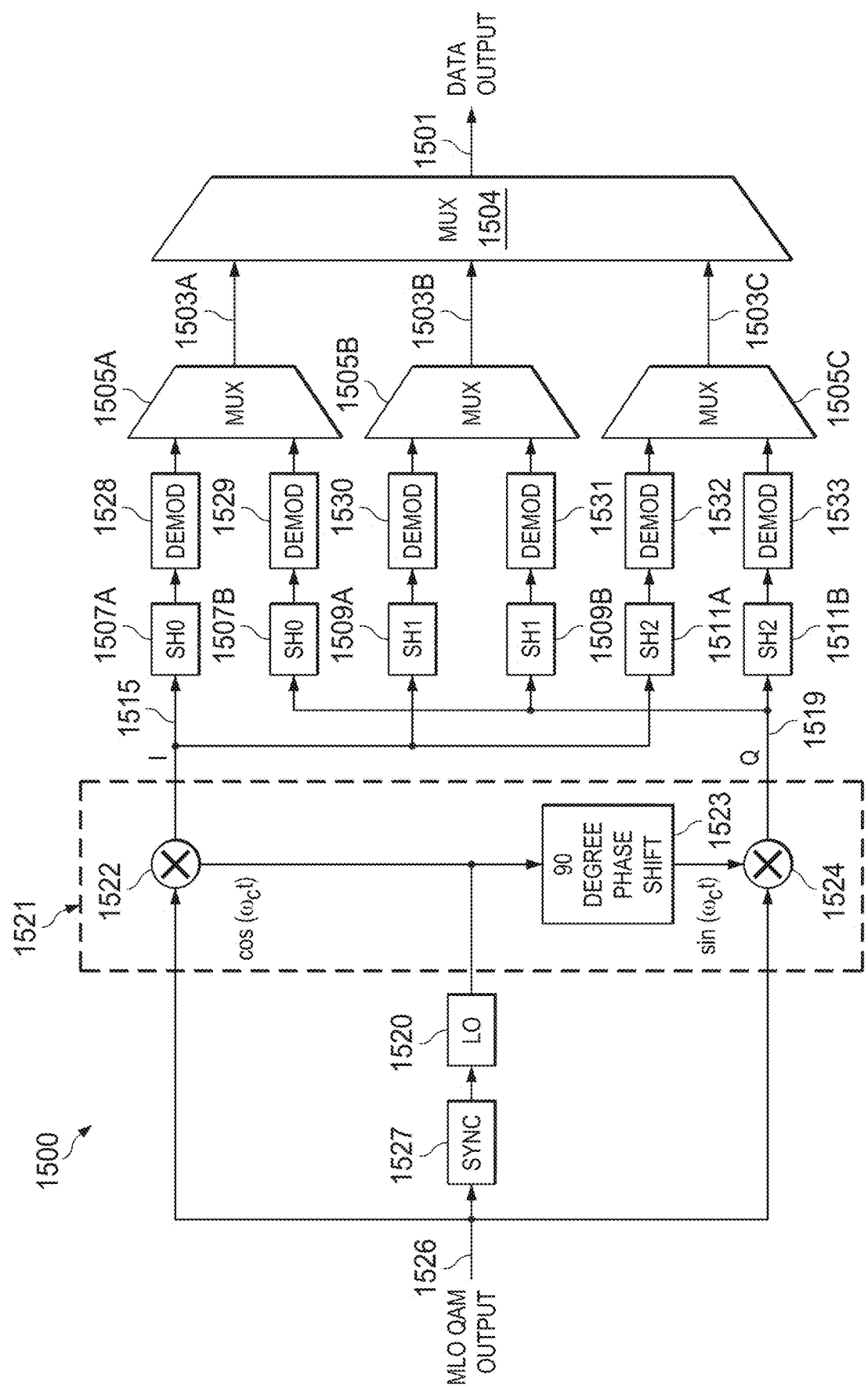
FIG. 15 illustrates a multiple level overlay demodulator.

Referring now back to FIG. 15, an MLO demodulator 1500 is illustrated, although it should be understood that the term MLO and the illustrated system 1500 are examples of embodiments. The modulator 1500 takes as input an MLO signal 1526 which may be similar to output signal 1526 from system 1400. Synchronizer 1527 extracts phase information, which is input to local oscillator 1520 to maintain coherence so that the modulator 1521 can produce base band to analogue I signal 1515 and Q signal 1519. The modulator 1521 comprises mixers 1522 and 1524, which, coupled to OL1520 through 90 degree phase shifter 1523. I signal 1515 is input to each of signal filters 1507A, 1509A, and 1511A, and Q signal 1519 is input to each of signal filters 1507B, 1509B, and 1511B. Since the orthogonal functions are known, they can be separated using correlation or other techniques to recover the modulated data. Information in each of the I and Q signals 1515 and 1519 can be extracted from the overlapped functions which have been summed within each of the symbols because the functions are orthogonal in a correlative sense.

In some embodiments, signal filters 1507A-1507B, 1509A-1509B, and 1511A-1511B use locally generated replicas of the polynomials as known signals in match filters. The outputs of the match filters are the recovered data bits, for example, equivalence of the QAM symbols 1506A-1506B, 1508A-1508B, and 1510A-1510B of system 1500. Signal filters 1507A-1507B, 1509A-1509B, and 1511A-1511B produce 2n streams of n, I, and Q signal pairs, which are input into demodulators 1528-1533. Demodulators 1528-1533 integrate the energy in their respective input signals to determine the value of the QAM symbol, and hence the logical 1s and 0s data bit stream segment represented by the determined symbol. The outputs of the modulators 1528-1533 are then input into multiplexers (MUXs) 1505A-1505C to generate data streams 1503A-1503C. If system 1500 is demodulating a signal from system 1400, data streams 1503A-1503C correspond to data streams 1403A-1403C. Data streams 1503A-1503C are multiplexed by MUX 1504 to generate data output stream 1501. In summary, MLO signals are overlayed (stacked) on top of one another on transmitter and separated on receiver.

MLO may be differentiated from CDMA or OFDM by the manner in which orthogonality among signals is achieved. MLO signals are mutually orthogonal in both time and frequency domains, and can be overlaid in the same symbol time bandwidth product. Orthogonality is attained by the correlation properties, for example, by least sum of squares, of the overlaid signals. In comparison, CDMA uses orthogonal interleaving or displacement of signals in the time domain, whereas OFDM uses orthogonal displacement of signals in the frequency domain.

Bandwidth efficiency may be increased for a channel by assigning the same channel to multiple users. This is feasible if individual user information is mapped to special orthogonal functions. CDMA systems overlap multiple user information and views time intersymbol orthogonal code sequences to distinguish individual users, and OFDM assigns unique signals to each user, but which are not overlaid, are only orthogonal in the frequency domain. Neither CDMA nor OFDM increases bandwidth efficiency. CDMA uses more bandwidth than is necessary to transmit data when the signal has a low signal to noise ratio (SNR). OFDM spreads data over many subcarriers to achieve superior performance in multipath radiofrequency environments. OFDM uses a cyclic prefix OFDM to mitigate multipath effects and a guard time to minimize intersymbol interference (ISI), and each channel is mechanistically made to behave as if the transmitted waveform is orthogonal. (Sync function for each subcarrier in frequency domain.)

In contrast, MLO uses a set of functions which effectively form an alphabet that provides more usable channels in the same bandwidth, thereby enabling high bandwidth efficiency. Some embodiments of MLO do not require the use of cyclic prefixes or guard times, and therefore, outperforms OFDM in spectral efficiency, peak to average power ratio, power consumption, and requires fewer operations per bit. In addition, embodiments of MLO are more tolerant of amplifier nonlinearities than are CDMA and OFDM systems.

Figure 16:
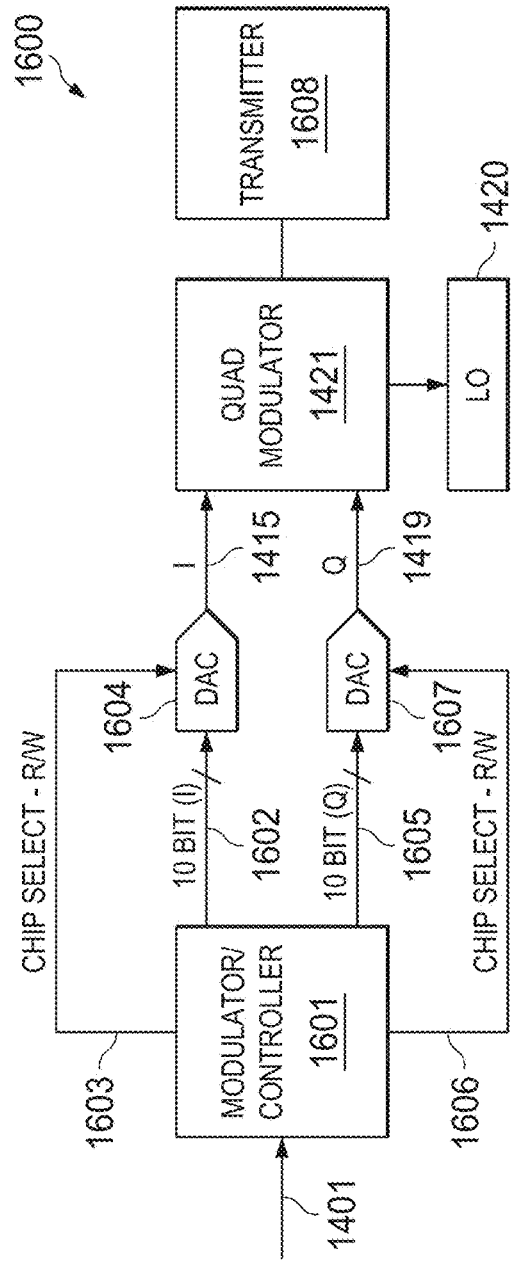
FIG. 16 illustrates a multiple level overlay transmitter system.
Figure 17:
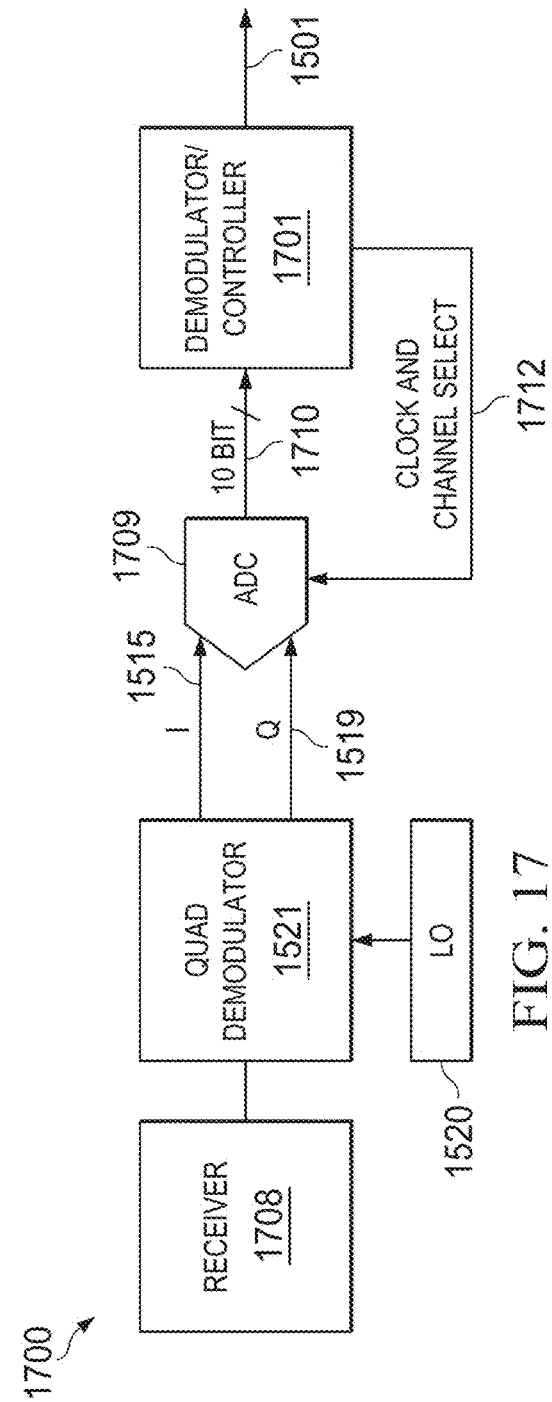
FIG. 17 illustrates a multiple level overlay receiver system.

FIG. 16 illustrates an embodiment of an MLO transmitter system 1600, which receives input data stream 1601. System 1600 represents a modulator/controller, which incorporates equivalent functionality of DEMUX 1604, QAM symbol mappers 1405A-C, function generators 1407A-1407B, 1409A-1409B, and 1411A-1411B, and summers 1412 and 1416 of system 1400, shown in FIG. 14. However, it should be understood that modulator/controller 1601 may use a greater or lesser quantity of signals than the three illustrated in system 1400. Modulator/controller 1601 may comprise an application specific integrated circuit (ASIC), a field programmable gate array (FPGA), and/or other components, whether discrete circuit elements or integrated into a single integrated circuit (IC) chip.

Modulator/controller 1601 is coupled to DACs 1604 and 1607, communicating a 10 bit I signal 1602 and a 10 bit Q signal 1605, respectively. In some embodiments, I signal 1602 and Q signal 1605 correspond to composite signals 1413 and 1417 of system 1400. It should be understood, however, that the 10 bit capacity of I signal 1602 and Q signal 1605 is merely representative of an embodiment. As illustrated, modulator/controller 1601 also controls DACs 1604 and 1607 using control signals 1603 and 1606, respectively. In some embodiments, DACs 1604 and 1607 each comprise an AD5433, complementary metal oxide semiconductor (CMOS) 10 bit current output DAC. In some embodiments, multiple control signals are sent to each of DACs 1604 and 1607.

DACs 1604 and 1607 output analogue signals 1415 and 1419 to quadrature modulator 1421, which is coupled to LO 1420. The output of modulator 1420 is illustrated as coupled to a transmitter 1608 to transmit data wirelessly, although in some embodiments, modulator 1421 may be coupled to a fiber-optic modem, a twisted pair, a coaxial cable, or other suitable transmission media.

FIG. 15 illustrates an embodiment of an MLO receiver system 1500 capable of receiving and demodulating signals from system 1600. System 1500 receives an input signal from a receiver 1508 that may comprise input medium, such as RF, wired or optical. The modulator 1321 driven by LO 1320 converts the input to baseband I signal 1315 and Q signal 1319. I signal 1315 and Q signal 1319 are input to analogue to digital converter (ADC) 1509.

ADC 1709 outputs 10 bit signal 1710 to demodulator/controller 1701 and receives a control signal 1712 from demodulator/controller 1701. Demodulator/controller 1701 may comprise an application specific integrated circuit (ASIC), a field programmable gate array (FPGA), and/or other components, whether discrete circuit elements or integrated into a single integrated circuit (IC) chip. Demodulator/controller 1701 correlates received signals with locally generated replicas of the signal set used, in order to perform demodulation and identify the symbols sent. Demodulator/controller 1701 also estimates frequency errors and recovers the data clock, which is used to read data from the ADC 1709. The clock timing is sent back to ADC 1709 using control signal 1712, enabling ADC 1709 to segment the digital I and Q signals 1517 and 1519. In some embodiments, multiple control signals are sent by demodulator/controller 1701 to ADC 1709. Demodulator/controller 1701 also outputs data signal 1301.

Hermite-Gaussian polynomials are a classical orthogonal polynomial sequence, which are the Eigenstates of a quantum harmonic oscillator. Signals based on Hermite-Gaussian polynomials possess the minimal time-bandwidth product property described above, and may be used for embodiments of MLO systems. However, it should be understood that other signals may also be used, for example orthogonal polynomials such as Jacobi polynomials, Gegenbauer polynomials, Legendre polynomials, Chebyshev polynomials, Laguerre-Gaussian polynomials, Hermite-Gaussian polynomials and Ince-Gaussian polynomials. Q-functions are another class of functions that can be employed as a basis for MLO signals.

In quantum mechanics, a coherent state is a state of a quantum harmonic oscillator whose dynamics most closely resemble the oscillating behavior of a classical harmonic oscillator system. A squeezed coherent state is any state of the quantum mechanical Hilbert space, such that the uncertainty principle is saturated. That is, the product of the corresponding two operators takes on its minimum value. In embodiments of an MLO system, operators correspond to time and frequency domains wherein the time-bandwidth product of the signals is minimized. The squeezing property of the signals allows scaling in time and frequency domain simultaneously, without losing mutual orthogonality among the signals in each layer. This property enables flexible implementations of MLO systems in various communications systems.

Because signals with different orders are mutually orthogonal, they can be overlaid to increase the spectral efficiency of a communication channel. For example, when n=0, the optimal baseband signal will have a time-bandwidth product of ½, which is the Nyquist Inter-Symbol Interference (ISI) criteria for avoiding ISI. However, signals with time-bandwidth products of 3/2, 5/2, 7/2, and higher, can be overlaid to increase spectral efficiency.

An embodiment of an MLO system uses functions based on modified Hermite polynomials, 4n, and are defined by:

$$\psi_n(t, \xi) = \frac{(\tanh \xi)^{n/2}}{2^{n/2}(n! \cosh \xi)^{1/2}} e^{\frac{1}{2}t^2[1-\tanh \xi]} H_n\left(\frac{t}{\sqrt{2 \cosh \xi \sinh \xi}}\right)$$

where t is time, and $\xi$ is a bandwidth utilization parameter. Plots of $\Psi_n$ for n ranging from 0 to 9, along with their Fourier transforms (amplitude squared), are shown in FIGS. 5A-5K. The orthogonality of different orders of the functions may be verified by integrating:

$$\iint \psi_n(t,\xi)\psi_m(t,\xi)dtd\xi$$

The Hermite polynomial is defined by the contour integral:

$$H_n(z) = \frac{n!}{2\pi i} \oint e^{-t^2+2tz} t^{-n-1} dt$$

where the contour encloses the origin and is traversed in a counterclockwise direction. Hermite polynomials are described in Mathematical Methods for Physicists, by George Arfken, for example on page 416, the disclosure of which is incorporated by reference.

Figure 18A:
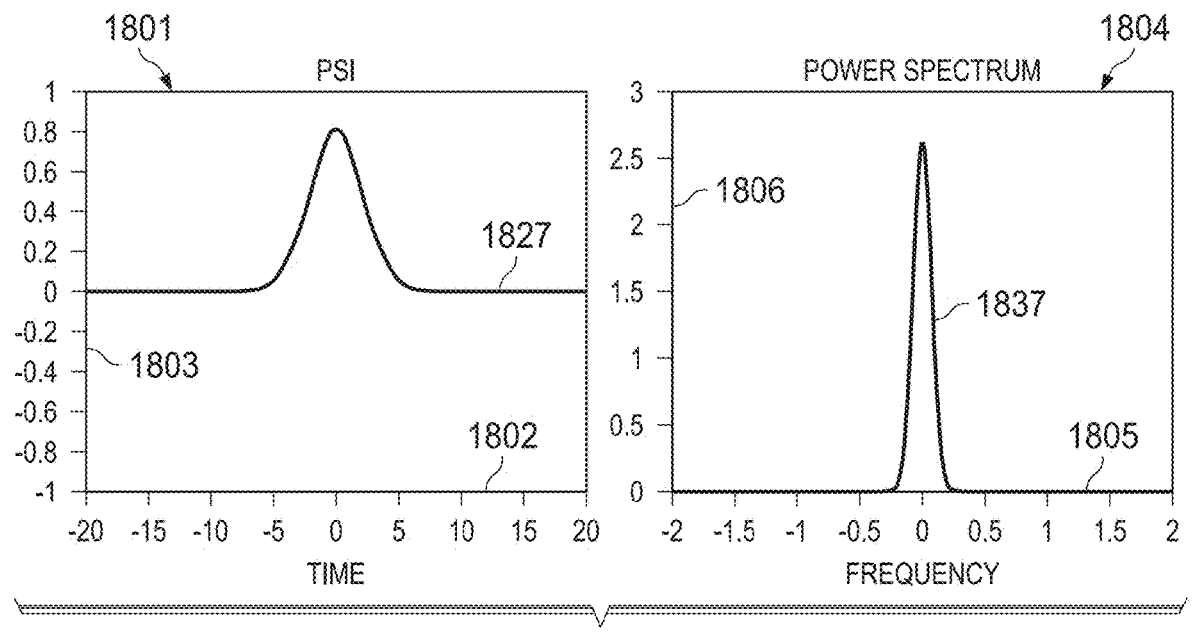
FIGS. 18A-18K illustrate representative multiple level overlay signals and their respective spectral power densities.
Figure 18B:
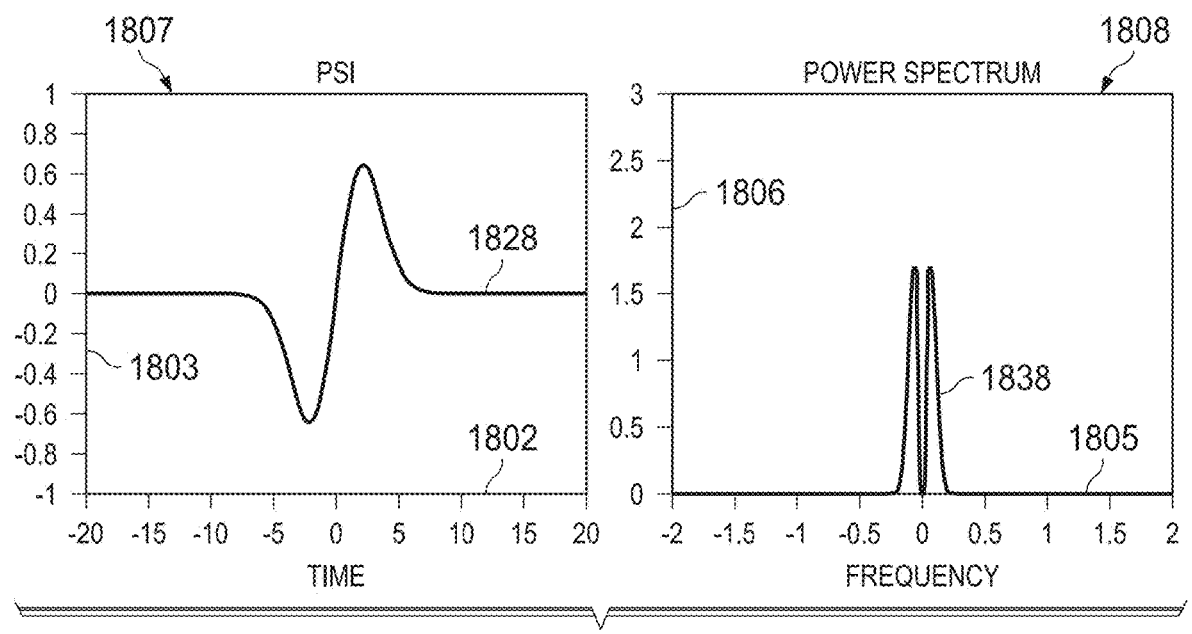
Figure 18C:
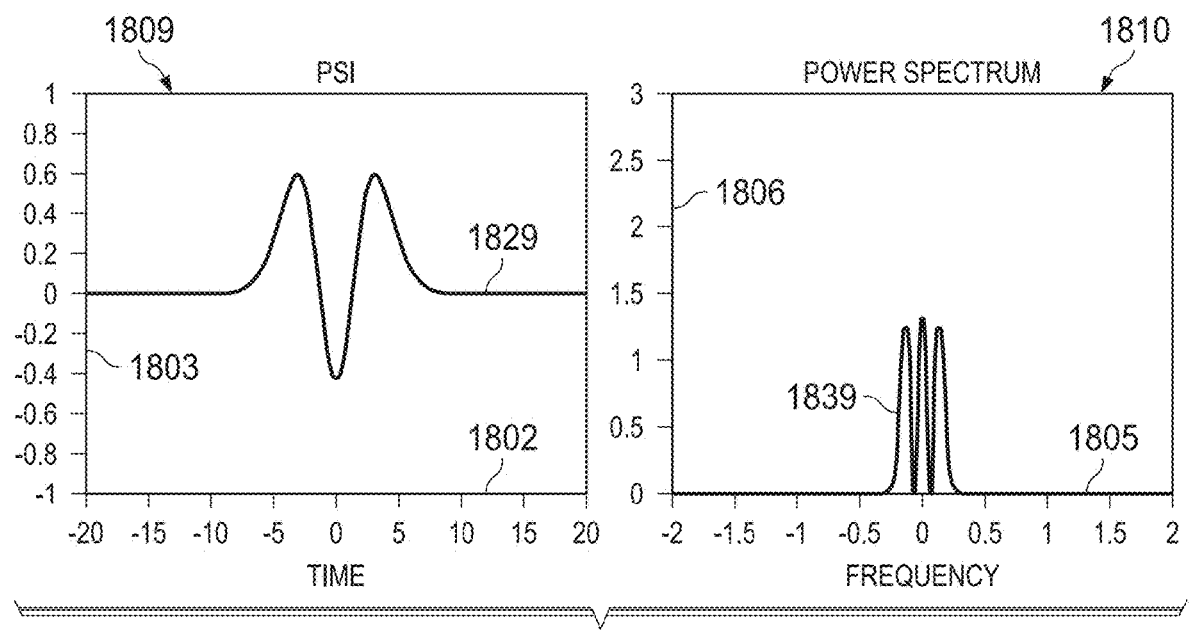
Figure 18D:
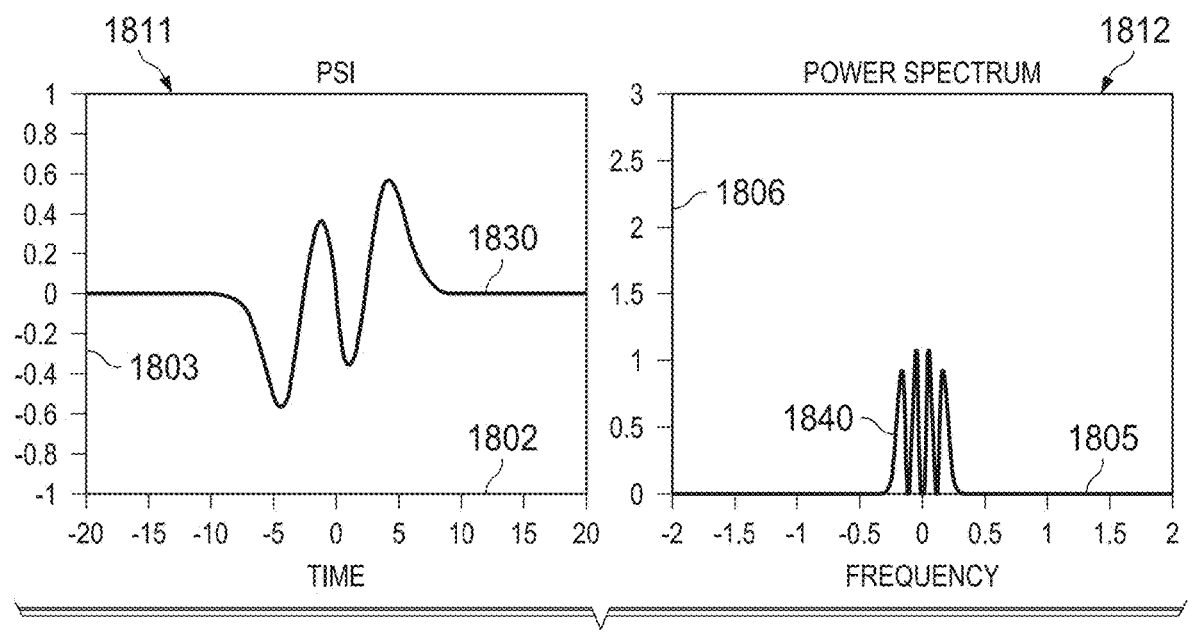
Figure 18E:
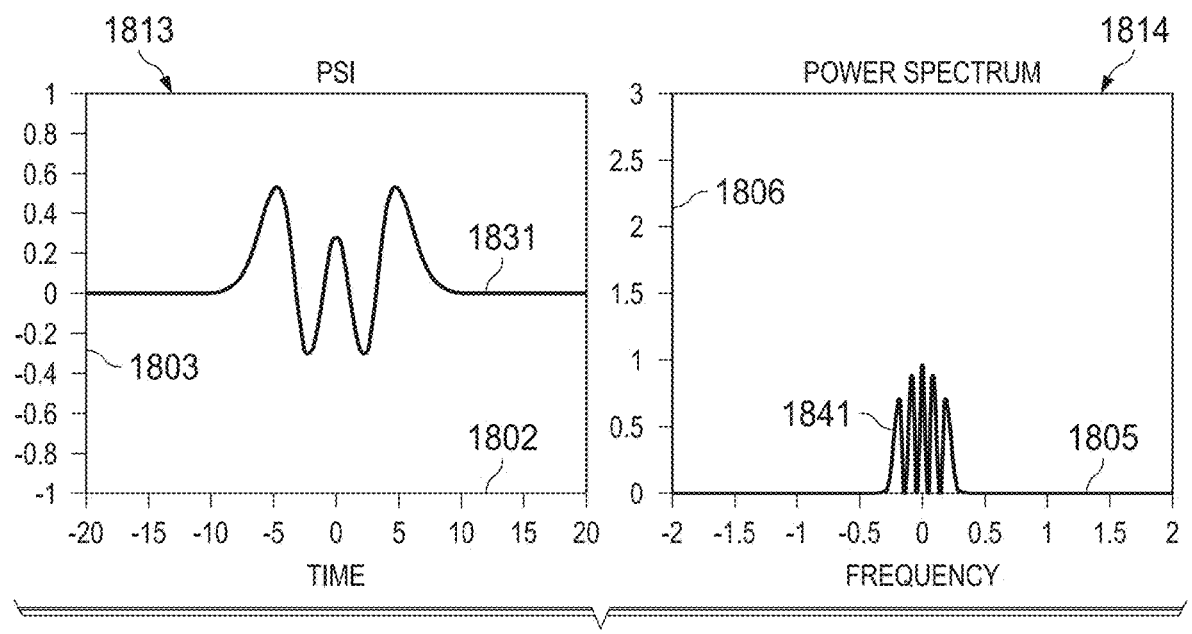
Figure 18F:
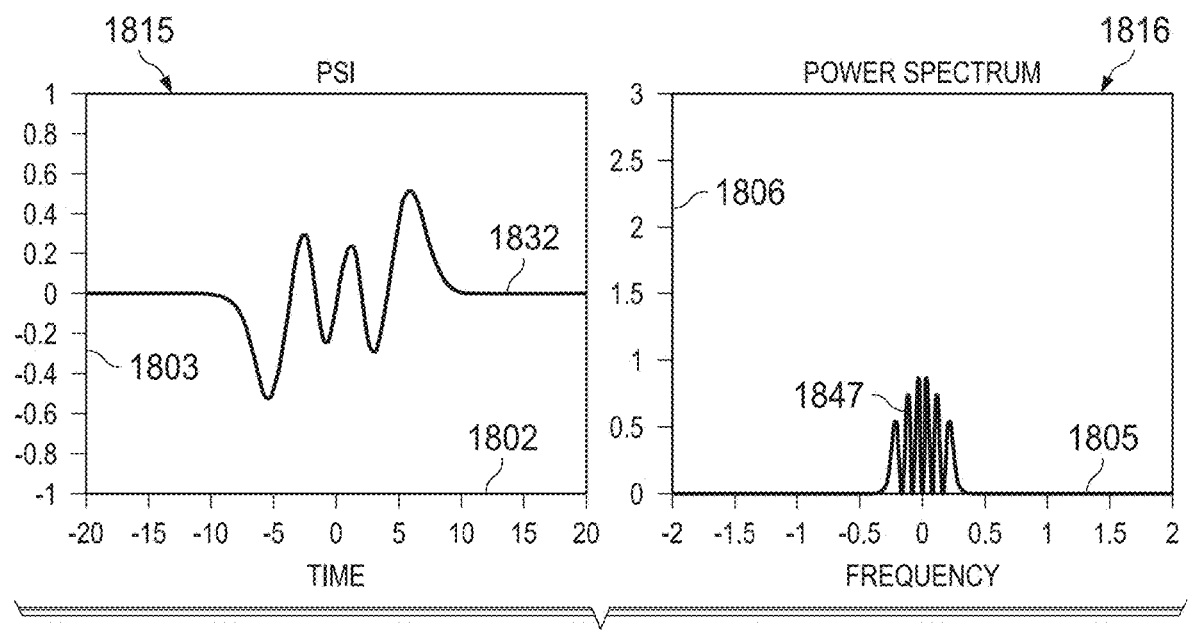
Figure 18G:
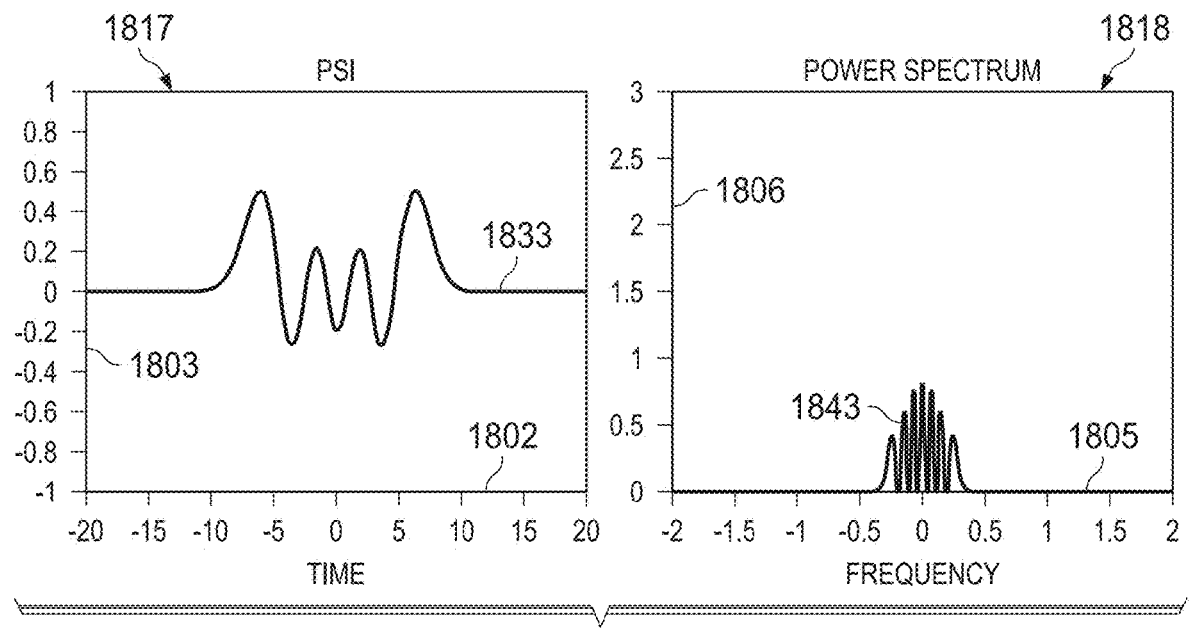
Figure 18H:
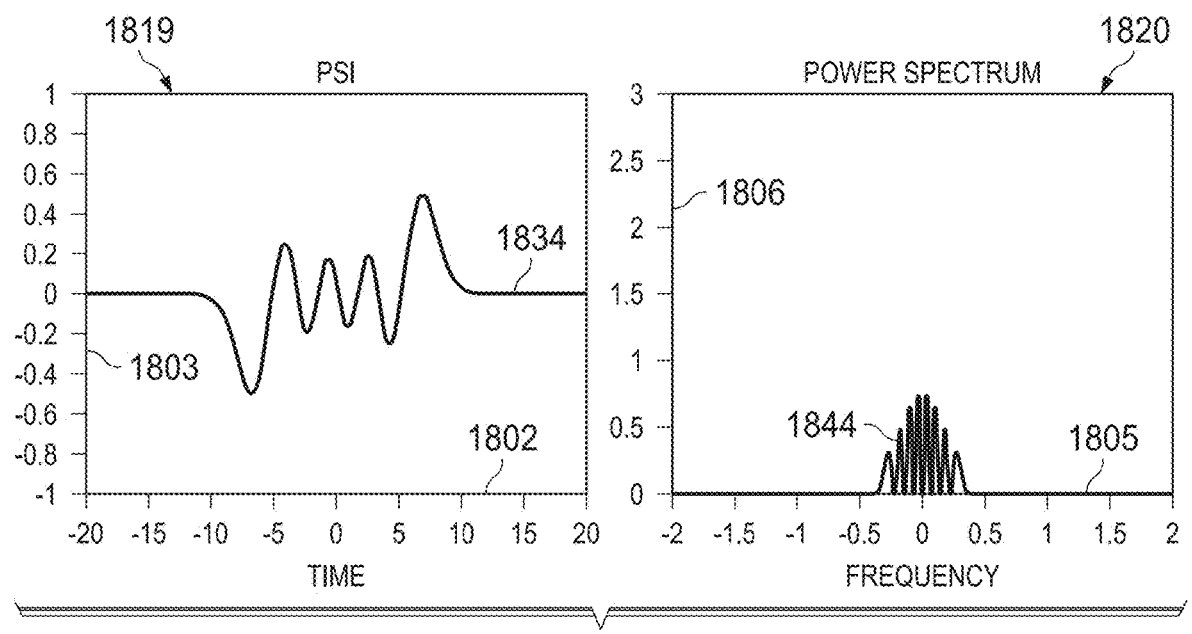
Figure 18I:
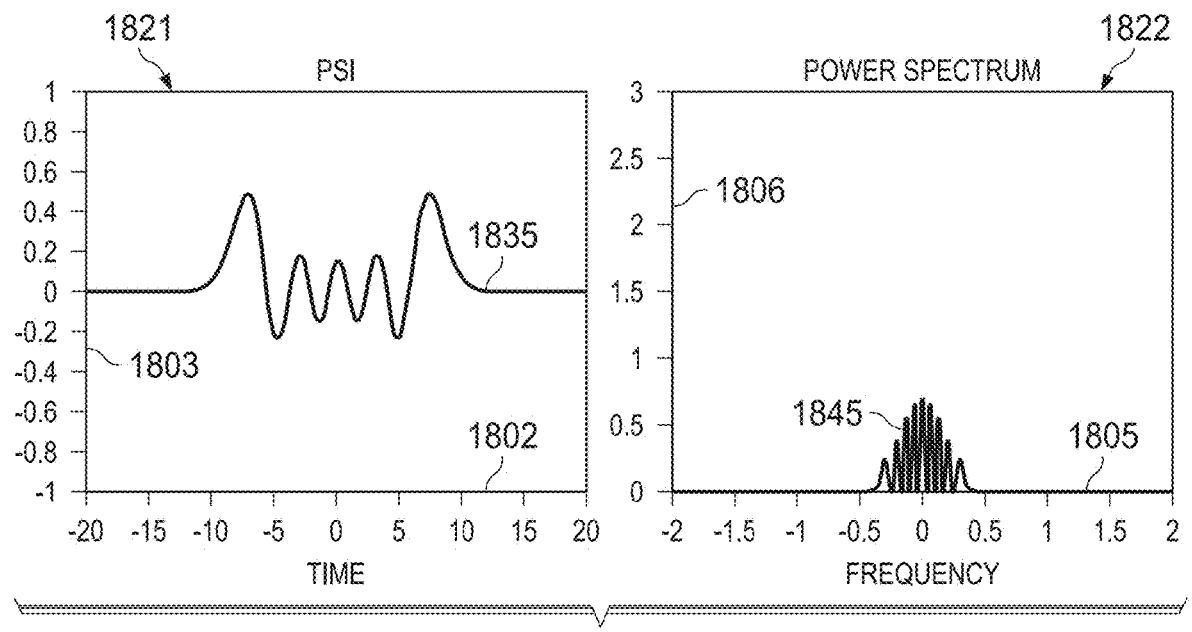
Figure 18J:
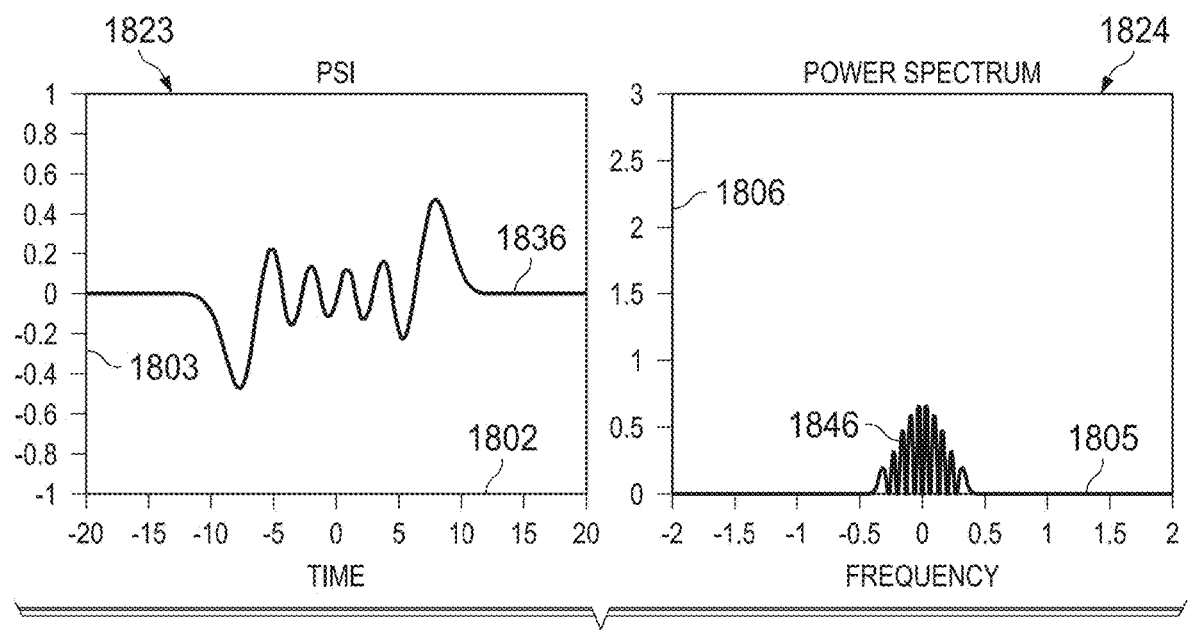

FIGS. 18A-18K illustrate representative MLO signals and their respective spectral power densities based on the modified Hermite polynomials $\Psi_n$ for n ranging from 0 to 9. FIG. 18A shows plots 1801 and 1804. Plot 1801 comprises a curve 1827 representing $\Psi_0$ plotted against a time axis 1802 and an amplitude axis 1803. As can be seen in plot 1801, curve 1827 approximates a Gaussian curve. Plot 1804 comprises a curve 1837 representing the power spectrum of $\Psi_0$ plotted against a frequency axis 1805 and a power axis 1806. As can be seen in plot 1804, curve 1837 also approximates a Gaussian curve. Frequency domain curve 1807 is generated using a Fourier transform of time domain curve 1827. The units of time and frequency on axis 1802 and 1805 are normalized for baseband analysis, although it should be understood that since the time and frequency units are related by the Fourier transform, a desired time or frequency span in one domain dictates the units of the corresponding curve in the other domain. For example, various embodiments of MLO systems may communicate using symbol rates in the megahertz (MHz) or gigahertz (GHz) ranges and the non-0 duration of a symbol represented by curve 1827, i.e., the time period at which curve 1827 is above 0 would be compressed to the appropriate length calculated using the inverse of the desired symbol rate. For an available bandwidth in the megahertz range, the non-0 duration of a time domain signal will be in the microsecond range.

FIGS. 18B-18J show plots 1807-1824, with time domain curves 1828-1836 representing $\Psi_1$ through $\Psi_9$, respectively, and their corresponding frequency domain curves 1838-1846. As can be seen in FIGS. 18A-18J, the number of peaks in the time domain plots, whether positive or negative, corresponds to the number of peaks in the corresponding frequency domain plot. For example, in plot 1823 of FIG. 18J, time domain curve 1836 has five positive and five negative peaks. In corresponding plot 1824 therefore, frequency domain curve 1846 has ten peaks.

Figure 18K:
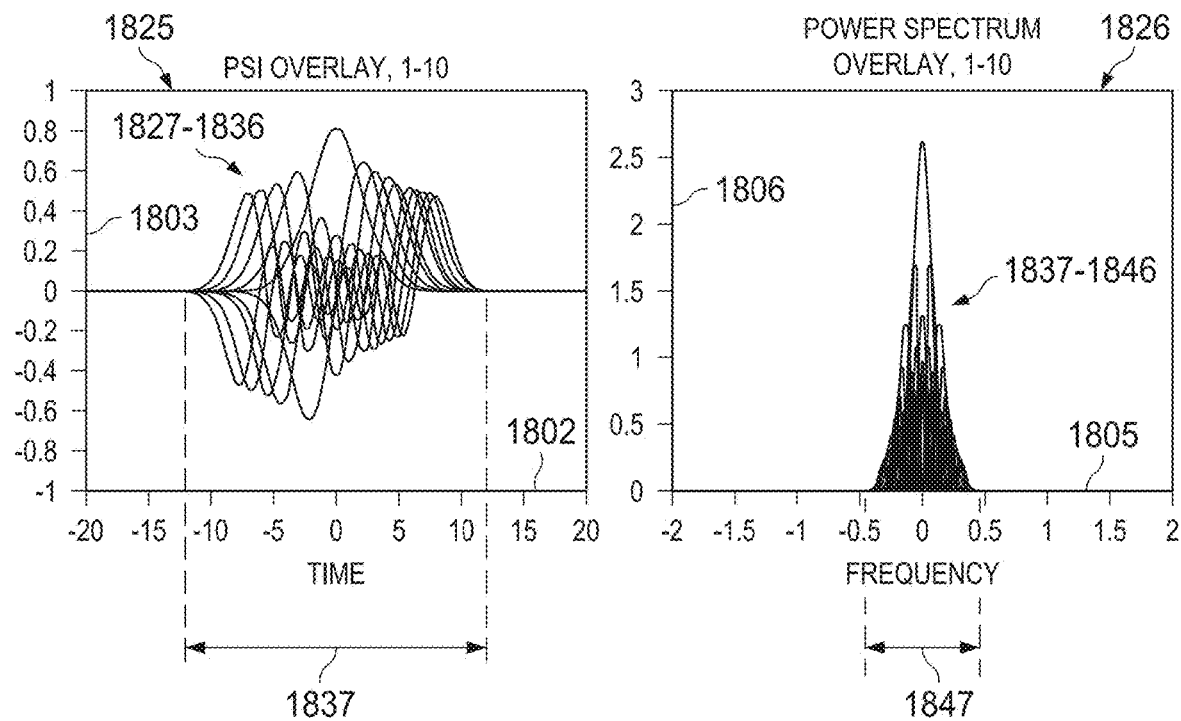

FIG. 18K shows overlay plots 1825 and 1826, which overlay curves 1827-1836 and 1837-1846, respectively. As indicated in plot 1825, the various time domain curves have different durations. However, in some embodiments, the non-zero durations of the time domain curves are of similar lengths. For an MLO system, the number of signals used represents the number of overlays and the improvement in spectral efficiency. It should be understood that, while ten signals are disclosed in FIGS. 18A-18K, a greater or lesser quantity of signals may be used, and that further, a different set of signals, rather than the $\Psi_n$ signals plotted, may be used.

MLO signals used in a modulation layer have minimum time-bandwidth products, which enable improvements in spectral efficiency, and are quadratically integrable. This is accomplished by overlaying multiple demultiplexed parallel data streams, transmitting them simultaneously within the same bandwidth. The key to successful separation of the overlaid data streams at the receiver is that the signals used within each symbols period are mutually orthogonal. MLO overlays orthogonal signals within a single symbol period. This orthogonality prevents ISI and inter-carrier interference (ICI).

Because MLO works in the baseband layer of signal processing, and some embodiments use QAM architecture, conventional wireless techniques for optimizing air interface, or wireless segments, to other layers of the protocol stack will also work with MLO. Techniques such as channel diversity, equalization, error correction coding, spread spectrum, interleaving and space-time encoding are applicable to MLO. For example, time diversity using a multipath-mitigating rake receiver can also be used with MLO. MLO provides an alternative for higher order QAM, when channel conditions are only suitable for low order QAM, such as in fading channels. MLO can also be used with CDMA to extend the number of orthogonal channels by overcoming the Walsh code limitation of CDMA. MLO can also be applied to each tone in an OFDM signal to increase the spectral efficiency of the OFDM systems.

Embodiments of MLO systems amplitude modulate a symbol envelope to create sub-envelopes, rather than sub-carriers. For data encoding, each sub-envelope is independently modulated according to N-QAM, resulting in each sub-envelope independently carrying information, unlike OFDM. Rather than spreading information over many sub-carriers, as is done in OFDM, for MLO, each sub-envelope of the carrier carries separate information. This information can be recovered due to the orthogonality of the sub-envelopes defined with respect to the sum of squares over their duration and/or spectrum. Pulse train synchronization or temporal code synchronization, as needed for CDMA, is not an issue, because MLO is transparent beyond the symbol level. MLO addresses modification of the symbol, but since CDMA and TDMA are spreading techniques of multiple symbol sequences over time. MLO can be used along with CDMA and TDMA.

Figure 19:
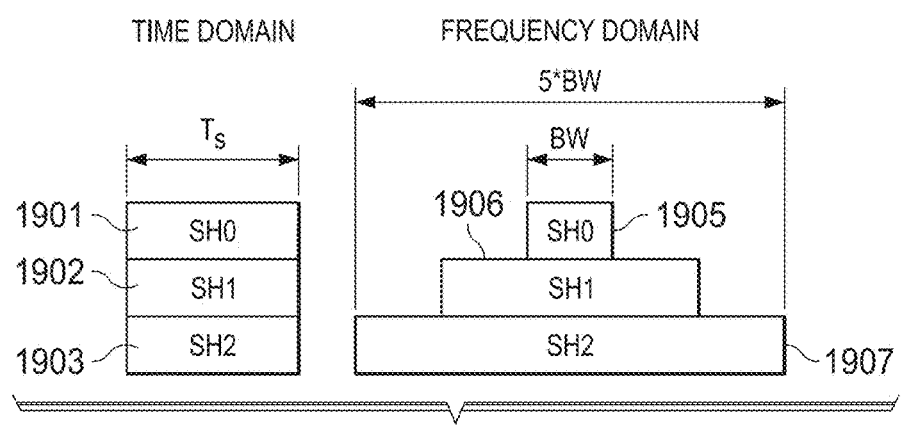
FIG. 19 illustrates comparisons of multiple level overlay signals within the time and frequency domain.

FIG. 19 illustrates a comparison of MLO signal widths in the time and frequency domains. Time domain envelope representations 1901-1903 of signals SH0-SH3 are illustrated as all having a duration $T_S$. SH0-SH3 may represent $PSI_0$-$PSI_2$, or may be other signals. The corresponding frequency domain envelope representations are 1905-1907, respectively. SH0 has a bandwidth BW, SH1 has a bandwidth three times BW, and SH2 has a bandwidth of 5BW, which is five times as great as that of SH0. The bandwidth used by an MLO system will be determined, at least in part, by the widest bandwidth of any of the signals used. The highest order signal must set within the available bandwidth. This will set the parameters for each of the lower order signals in each of the layers and enable the signals to fit together without interference. If each layer uses only a single signal type within identical time windows, the spectrum will not be fully utilized, because the lower order signals will use less of the available bandwidth than is used by the higher order signals.

FIG. 20A illustrates a spectral alignment of MLO signals that accounts for the differing bandwidths of the signals, and makes spectral usage more uniform, using SH0-SH3. Blocks 2001-2004 are frequency domain blocks of an OFDM signal with multiple subcarriers. Block 2003 is expanded to show further detail. Block 2003 comprises a first layer 2003x comprised of multiple SH0 envelopes 2003a-2003o. A second layer 2003y of SH1 envelopes 2003p-2003t has one third the number of envelopes as the first layer. In the illustrated example, first layer 2003x has 15 SH0 envelopes, and second layer 2003y has five SH1 envelopes. This is because, since the SH1 bandwidth envelope is three times as wide as that of SH0, 15 SH0 envelopes occupy the same spectral width as five SH1 envelopes. The third layer 2003z of block 2003 comprises three SH2 envelopes 2003u-2003w, because the SH2 envelope is five times the width of the SH0 envelope.

The total required bandwidth for such an implementation is a multiple of the least common multiple of the bandwidths of the MLO signals. In the illustrated example, the least common multiple of the bandwidth required for SH0, SH1, and SH2 is 15BW, which is a block in the frequency domain. The OFDM-MLO signal can have multiple blocks, and the spectral efficiency of this illustrated implementation is proportional to (15+5+3)/15.

FIGS. 20B-20C illustrate a situation wherein the frequency domain envelopes 2020-2024 are each located in a separate layer within a same physical band width 2025. However, each envelope rather than being centered on a same center frequency as shown in FIG. 19 has its own center frequency 2026-2030 shifted in order to allow a slided overlay. The purposed of the slided center frequency is to allow better use of the available bandwidth and insert more envelopes in a same physical bandwidth.

Since each of the layers within the MLO signal comprises a different channel, different service providers may share a same bandwidth by being assigned to different MLO layers within a same bandwidth. Thus, within a same bandwidth, service provider one may be assigned to a first MLO layer, service provider two may be assigned to a second MLO layer and so forth.

Figure 21:
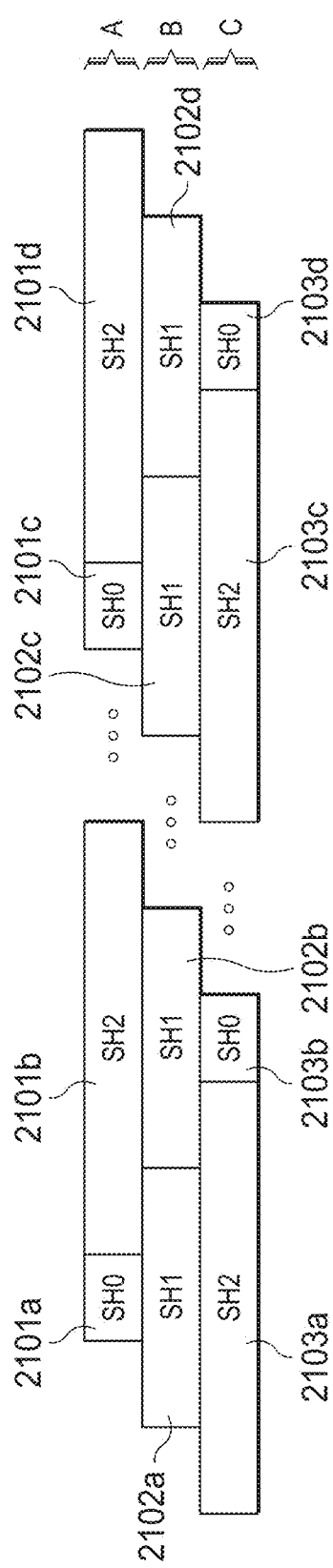
FIG. 21 illustrates an alternative spectral alignment of multiple level overlay signals.

FIG. 21 illustrates another spectral alignment of MLO signals, which may be used alternatively to alignment scheme shown in FIG. 20. In the embodiment illustrated in FIG. 21, the OFDM-MLO implementation stacks the spectrum of SH0, SH1, and SH2 in such a way that the spectrum in each layer is utilized uniformly. Layer 2100A comprises envelopes 2101A-2101D, which includes both SH0 and SH2 envelopes. Similarly, layer 2100C, comprising envelopes 2103A-2103D, includes both SH0 and SH2 envelopes. Layer 2100B, however, comprising envelopes 2102A-2102D, includes only SH1 envelopes. Using the ratio of envelope sizes described above, it can be easily seen that BW+5BW=3BW+3BW. Thus, for each SH0 envelope in layer 2100A, there is one SH2 envelope also in layer 2100C and two SH1 envelopes in layer 2100B.

Three Scenarios Compared:
1) MLO with 3 Layers defined by:

$$f_0(t) = W_0 \, e^{-\frac{t^2}{4}}, \, W_0 = 0.6316$$

$$f_1(t) = W_1 \, t \, e^{-\frac{t^2}{4}}, \, W_1 \approx 0.6316$$

$$f_2(t) = W_2 \, (t^2 - 1) \, e^{-\frac{t^2}{4}}, \, W_2 \approx 0.4466$$

(The current FPGA implementation uses the truncation interval of [−6, 6].)
2) Conventional scheme using rectangular pulse
3) Conventional scheme using a square-root raised cosine (SRRC) pulse with a roll-off factor of 0.5

For MLO pulses and SRRC pulse, the truncation interval is denoted by [−t1, t1] in the following figures. For simplicity, we used the MLO pulses defined above, which can be easily scaled in time to get the desired time interval (say micro-seconds or nano-seconds). For the SRRC pulse, we fix the truncation interval of [−3T, 3T] where T is the symbol duration for all results presented in this document.

Bandwidth Efficiency

The X-dB bounded power spectral density bandwidth is defined as the smallest frequency interval outside which the power spectral density (PSD) is X dB below the maximum value of the PSD. The X-dB can be considered as the out-of-band attenuation.

The bandwidth efficiency is expressed in Symbols per second per Hertz. The bit per second per Hertz can be obtained by multiplying the symbols per second per Hertz with the number of bits per symbol (i.e., multiplying with log 2 M for M-ary QAM).

Figure 22:
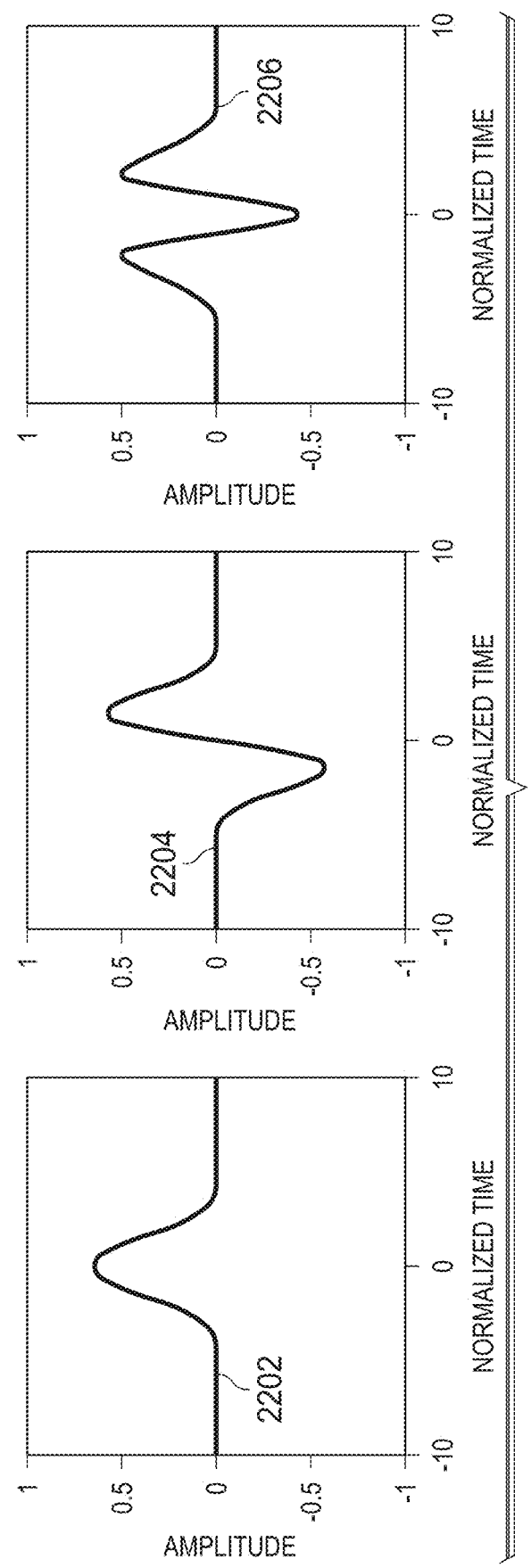
FIG. 22 illustrates three different super QAM signals.
Figure 66:
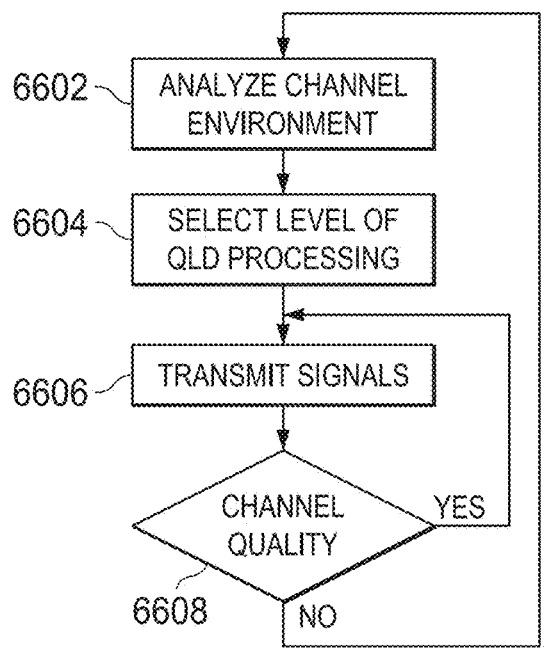
FIG. 66 is a flow diagram illustrating an adaptive QLO process.

Truncation of MLO pulses introduces inter-layer interferences (ILI). However, the truncation interval of [−6, 6] yields negligible ILI while [−4, 4] causes slight tolerable ILI. Referring now to FIG. 22, there is illustrated the manner in which a signal, for example a superQAM signal, may be layered to create ILI. FIG. 22 illustrates 3 different super-QAM signals 2202, 2204 and 2206. The superQAM signals 2202-2206 may be truncated and overlapped into multiple layers using QLO in the manner described herein above. However, as illustrated in FIG. 66, the truncation of the superQAM signals 2202-2206 that enables the signals to be layered together within a bandwidth $T_d$ 2302 creates a single signal 2304 having the interlayer interference between each of the layers containing a different signal produced by the QLO process. The ILI is caused between a specific bit within a specific layer having an effect on other bits within another layer of the same symbol.

Figures 23, 26:
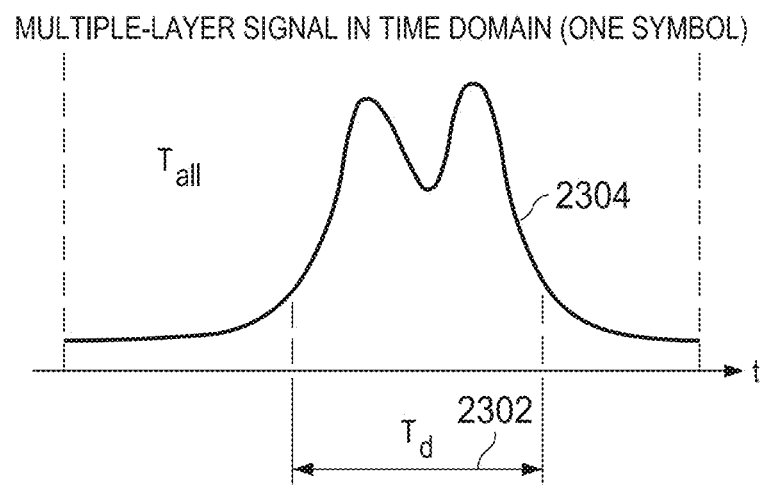
FIG. 23 illustrates the creation of inter-symbol interference in overlapped multilayer signals.
FIG. 26 illustrates truncated orthogonal functions.
Figure 24:
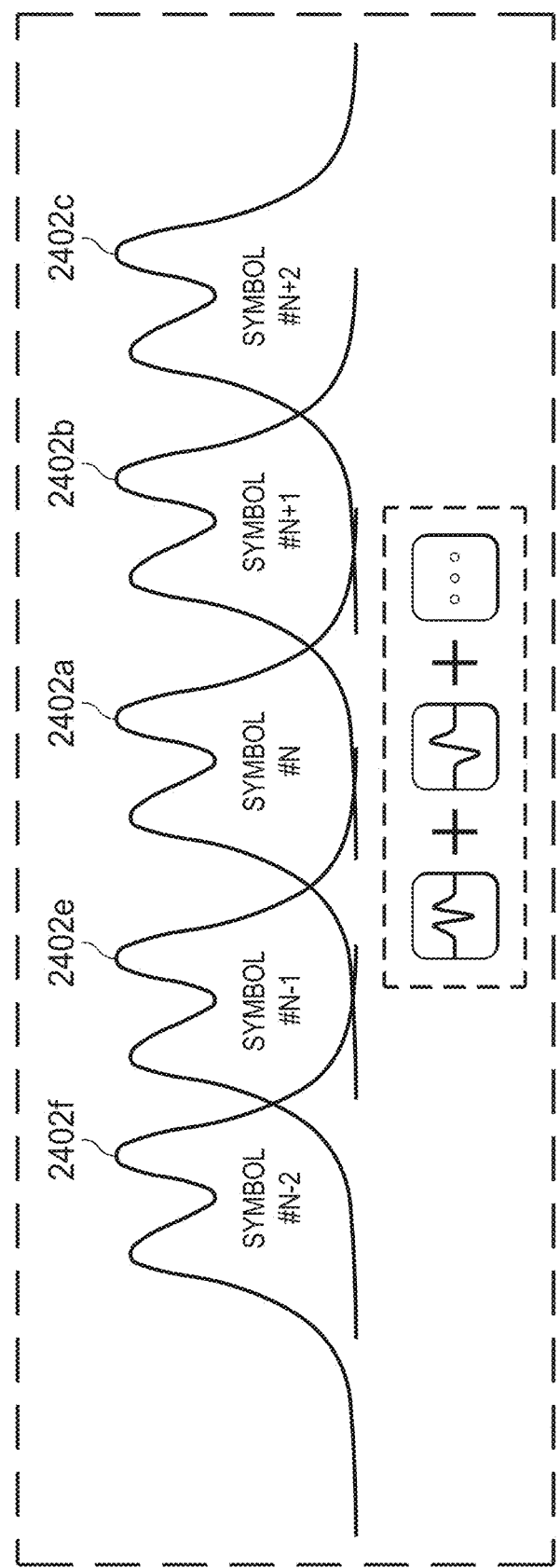
FIG. 24 illustrates overlapped multilayer signals.

The bandwidth efficiency of MLO may be enhanced by allowing inter-symbol interference (ISI). To realize this enhancement, designing transmitter side parameters as well as developing receiver side detection algorithms and error performance evaluation can be performed. One manner in which ISI may be created is when multilayer signals such as that illustrated in FIG. 23 are overlapped with each other in the manner illustrated in FIG. 24. Multiple signal symbols 2402 are overlapped with each other in order to enable to enable more symbols to be located within a single bandwidth. The portions of the signal symbols 2402 that are overlapping cause the creation of ISI. Thus, a specific bit at a specific layer will have an effect on the bits of nearby symbols.

The QLO transmission and reception system can be designed to have a particular known overlap between symbols. The system can also be designed to calculate the overlaps causing ISI (symbol overlap) and ILI (layer overlay). The ISI and ILI can be expressed in the format of a NM*NM matrix derived from a N*NM matrix. N comprises the number of layers and M is the number of symbols when considering ISI. Referring now to FIG. 25, there is illustrated a fixed channel matrix $H_{xy}$ which is a N*NM matrix. From this we can calculate another matrix which is $H_{yx}$ which is a NM*NM matrix. The ISI and ILI can be canceled by (a) applying a filter of $H_{yx}^{-1}$ to the received vector or (b) pre-distorting the transmitted signal by the SVD (singular value decomposition) of $H_{yx}^{-1}$. Therefore, by determining the matrix H of the fixed channel, the signal may be mathematically processed to remove ISL and ILI.

When using orthogonal functions such as Hermite Gaussian (HG) functions, the functions are all orthogonal for any permutations of the index if infinitely extended. However, when the orthogonal functions are truncated as discussed herein above, the functions become pseudo-orthogonal. This is more particularly illustrated in FIG. 26. In this case, orthogonal functions are represented along each of the axes. At the intersection of the same orthogonal functions, functions are completely correlated and a value of "1" is indicated. Thus, a diagonal of "1" exists with each of the off diagonal elements comprising a "0" since these functions are completely orthogonal with each other. When truncated HG choose functions are used the 0 values will not be exactly 0 since the functions are no longer orthogonal but are pseudo-orthogonal.

However, the HG functions can be selected in a manner that the functions are practically orthogonal. This is achieved by selecting the HG signals in a sequence to achieve better orthogonality. Thus, rather than selecting the initial three signals in a three signal HG signal sequence (P0 P1 P2), various other sequences that do not necessarily comprise the first three signals of the HG sequence may be selected as shown below.

| | |
|---|---|
| P0 P1 P4 | P0 P3 P6 |
| P0 P1 P6 | P0 P4 P5 |
| P0 P2 P3 | P0 P5 P6 |
| P0 P2 P5 | P1 P3 P6 |
| P0 P3 P4 | P2 P5 P6 |

Similar selection of sequences may be done to achieve better orthogonality with two signals, four signals, etc.

The techniques described herein are applicable to a wide variety of communication band environments. They may be applied across the visible and invisible bands and include RF, Fiber, Freespace optical and any other communications bands that can benefit from the increased bandwidth provided by the disclosed techniques.

Application of OAM to Optical Communication

Utilization of OAM for optical communications is based on the fact that coaxially propagating light beams with different OAM states can be efficiently separated. This is certainly true for orthogonal modes such as the LG beam. Interestingly, it is also true for general OAM beams with cylindrical symmetry by relying only on the azimuthal phase. Considering any two OAM beams with an azimuthal index of $\ell$ 1 and $\ell$ 2, respectively:

$$U_1(r,\theta,z) = A_1(r,z)\exp(il_1\theta) \quad (12)$$

where r and z refers to the radial position and propagation distance respectively, one can quickly conclude that these two beams are orthogonal in the sense that:

$$\int_0^{2\pi} U_1 U_2^* d\theta = \begin{cases} 0 & \text{if } l_1 \neq l_2 \\ A_1 A_2^* & \text{if } l_1 = l_2 \end{cases} \quad (13)$$

There are two different ways to take advantage of the distinction between OAM beams with different l states in communications. In the first approach, N different OAM states can be encoded as N different data symbols representing "0", "1", . . . , "N−1", respectively. A sequence of OAM states sent by the transmitter therefore represents data information. At the receiver, the data can be decoded by checking the received OAM state. This approach seems to be more favorable to the quantum communications community, since OAM could provide for the encoding of multiple bits (log 2(N)) per photon due to the infinitely countable possibilities of the OAM states, and so could potentially achieve a higher photon efficiency. The encoding/decoding of OAM states could also have some potential applications for on-chip interconnection to increase computing speed or data capacity.

Figure 27:
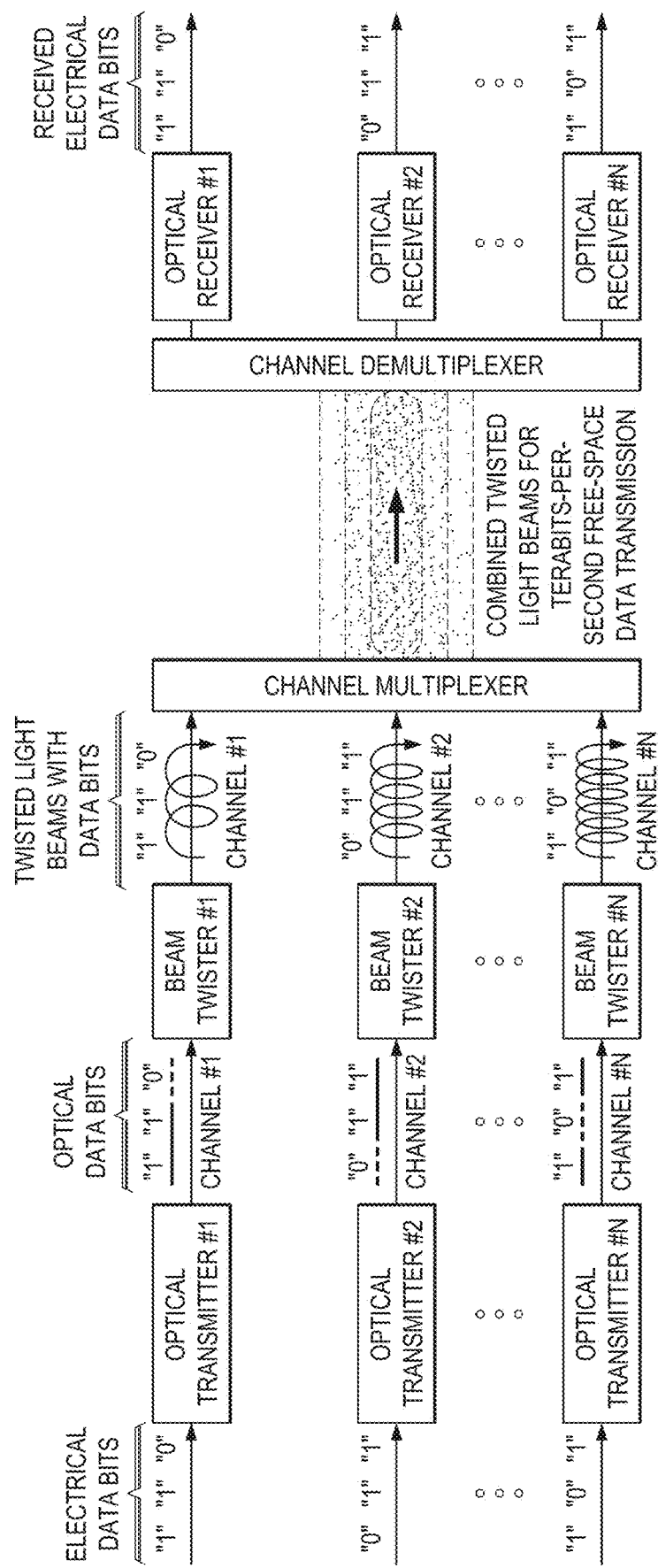
FIG. 27 illustrates a typical OAM multiplexing scheme.

The second approach is to use each OAM beam as a different data carrier in an SDM (Spatial Division Multiplexing) system. For an SDM system, one could use either a multi-core fiber/free space laser beam array so that the data channels in each core/laser beam are spatially separated, or use a group of orthogonal mode sets to carry different data channels in a multi-mode fiber (MMF) or in free space. Greater than 1 petabit/s data transmission in a multi-core fiber and up to 6 linearly polarized (LP) modes each with two polarizations in a single core multi-mode fiber has been reported. Similar to the SDM using orthogonal modes, OAM beams with different states can be spatially multiplexed and demultiplexed, thereby providing independent data carriers in addition to wavelength and polarization. Ideally, the orthogonality of OAM beams can be maintained in transmission, which allows all the data channels to be separated and recovered at the receiver. A typical embodiments of OAM multiplexing is conceptually depicted in FIG. 27. An obvious benefit of OAM multiplexing is the improvement in system spectral efficiency, since the same bandwidth can be reused for additional data channels.

OAM Beam Generation and Detection

Many approaches for creating OAM beams have been proposed and demonstrated. One could obtain a single or multiple OAM beams directly from the output of a laser cavity, or by converting a fundamental Gaussian beam into an OAM beam outside a cavity. The converter could be a spiral phase plate, diffractive phase holograms, metal materials, cylindrical lens pairs, q-plates or fiber structures. There are also different ways to detect an OAM beam, such as using a converter that creates a conjugate helical phase, or using a plasmonic detector.

Mode Conversion Approaches

Figure 12E:
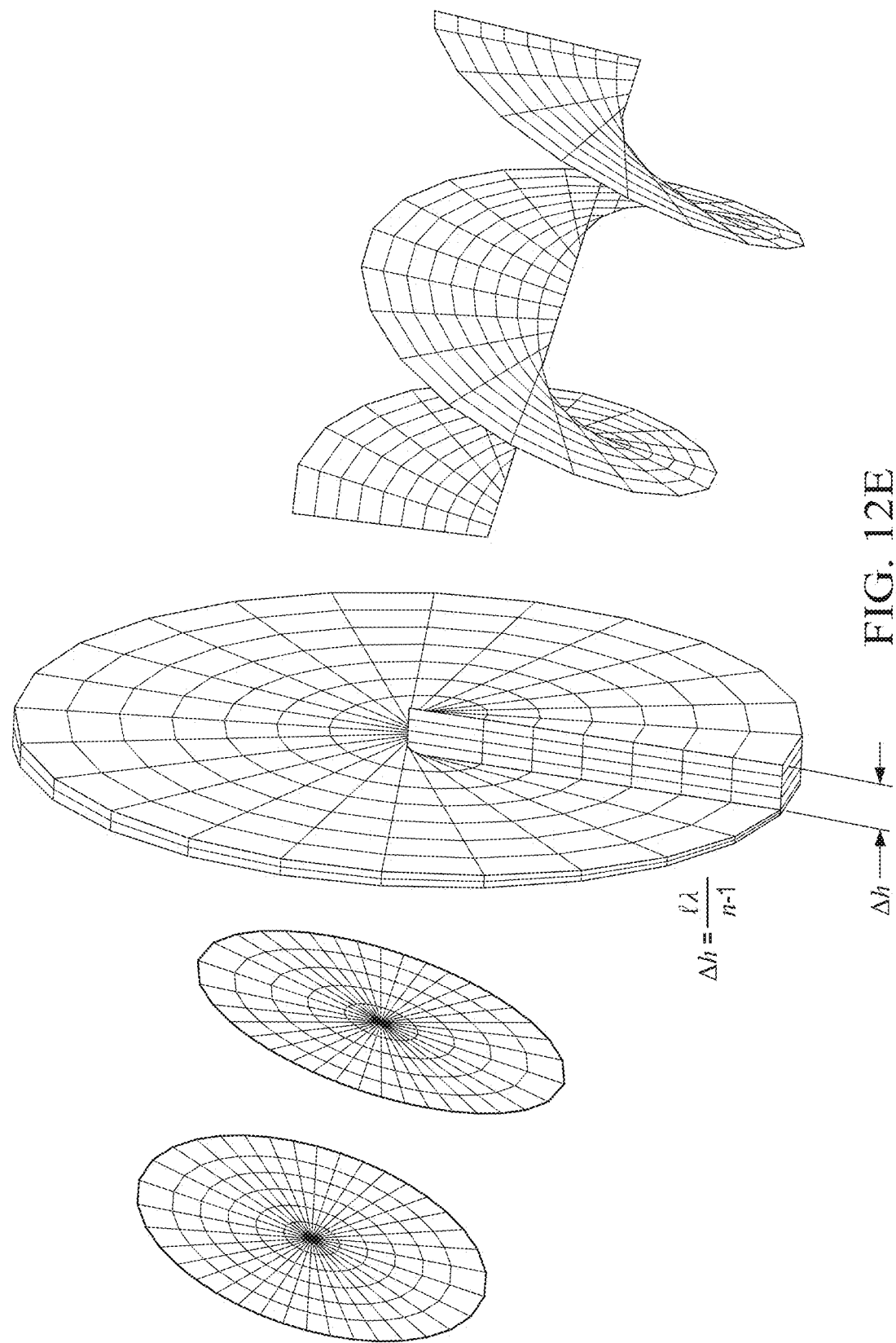
FIG. 12E illustrates a spiral phase plate.
Figure 28:
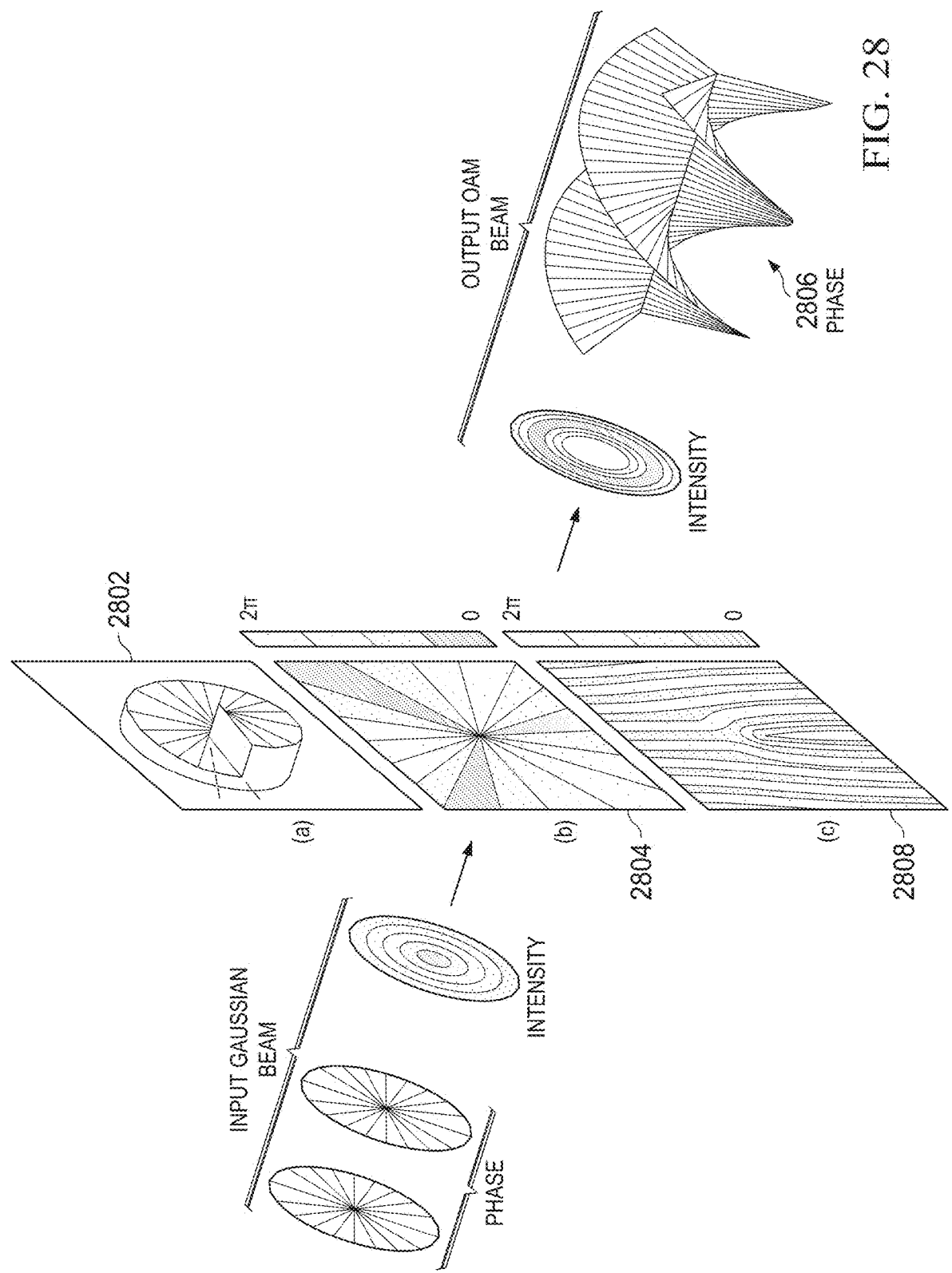
FIG. 28 illustrates various manners for converting a Gaussian beam into an OAM beam.

Referring now to FIG. 28, among all external-cavity methods, perhaps the most straightforward one is to pass a Gaussian beam through a coaxially placed spiral phase plate (SPP) 2802. An SPP 2802 is an optical element with a helical surface, as shown in FIG. 12E. To produce an OAM beam with a state of $\ell$, the thickness profile of the plate should be machined as $\ell\lambda\theta/2\pi(n-1)$, where n is the refractive index of the medium. A limitation of using an SPP 2802 is that each OAM state requires a different specific plate. As an alternative, reconfigurable diffractive optical elements, e.g., a pixelated spatial light modulator (SLM) 2804, or a digital micro-mirror device can be programmed to function as any refractive element of choice at a given wavelength. As mentioned above, a helical phase profile exp(i $\ell$ θ) converts a linearly polarized Gaussian laser beam into an OAM mode, whose wave front resembles an $\ell$-fold corkscrew 2806, as shown at 2804. Importantly, the generated OAM beam can be easily changed by simply updating the hologram loaded on the SLM 2804. To spatially separate the phase-modulated beam from the zeroth-order non-phase-modulated reflection from the SLM, a linear phase ramp is added to helical phase code (i.e., a "fork"-like phase pattern 2808 to produce a spatially distinct first-order diffracted OAM beam, carrying the desired charge. It should also be noted that the aforementioned methods produce OAM beams with only an azimuthal index control. To generate a pure LG_(l,p) mode, one must jointly control both the phase and the intensity of the wavefront. This could be achieved using a phase-only SLM with a more complex phase hologram.

Figure 29A:
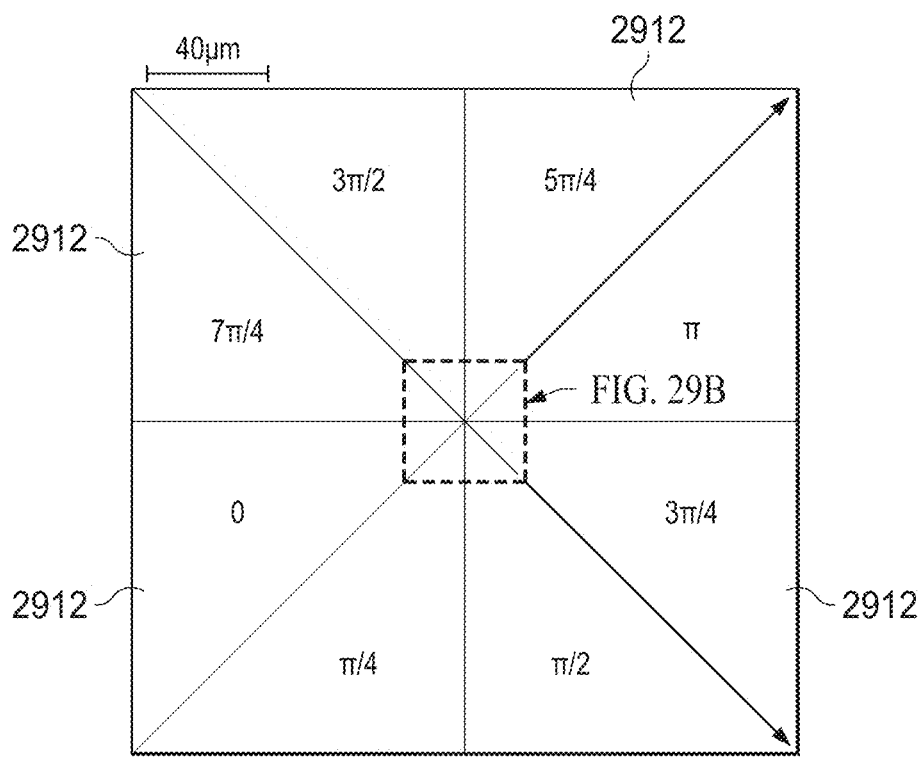
FIG. 29A illustrates a fabricated metasurface phase plate.
Figure 29B:
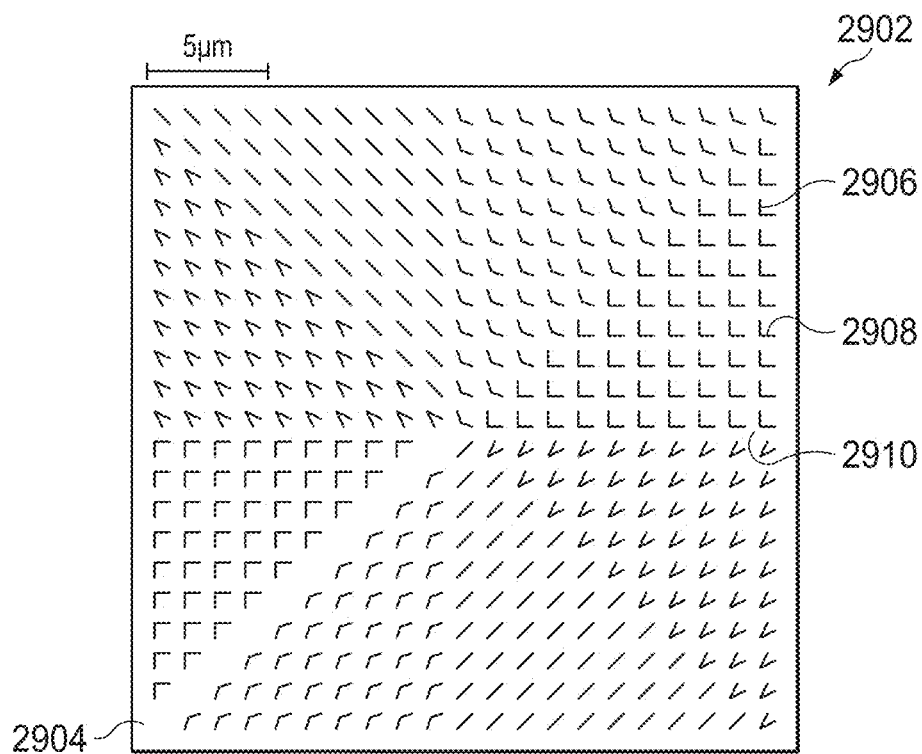
FIG. 29B illustrates a magnified structure of the metasurface phase plate.
Figure 29C:
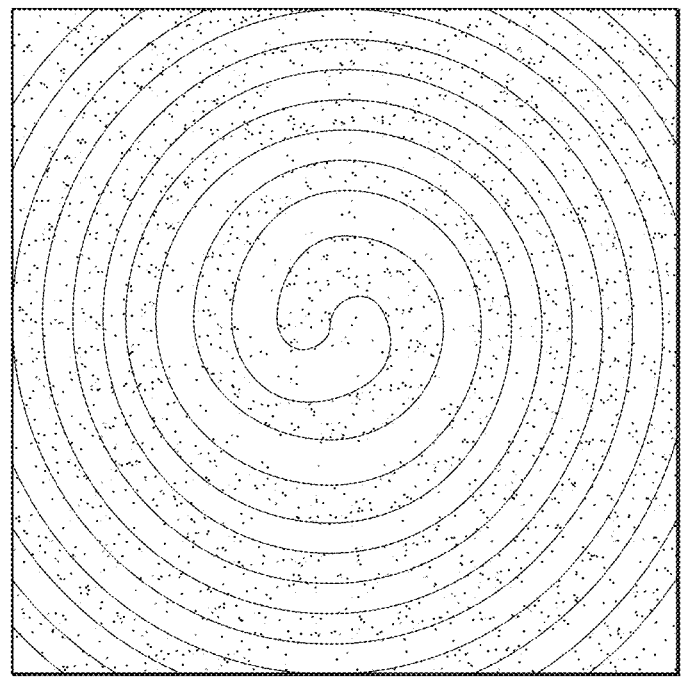
FIG. 29C illustrates an OAM beam generated using the phase plate with l=+1.

Some novel material structures, such as metal-surface, can also be used for OAM generation. A compact metal-surface could be made into a phase plate by manipulation of the structure caused spatial phase response. As shown in FIGS. 29A and 29B, a V-shaped antenna array 2902 is fabricated on the metal surface 2904, each of which is composed of two arms 2906, 2908 connected at one end 2910. A light reflected by this plate would experience a phase change ranging from 0 to 2π, determined by the length of the arms and angle between two arms. To generate an OAM beam, the surface is divided into 8 sectors 2912, each of which introduces a phase shift from 0 to 7π/4 with a step of π/4. The OAM beam with ℓ=+1 is obtained after the reflection, as shown in FIG. 29C.

Figure 30:
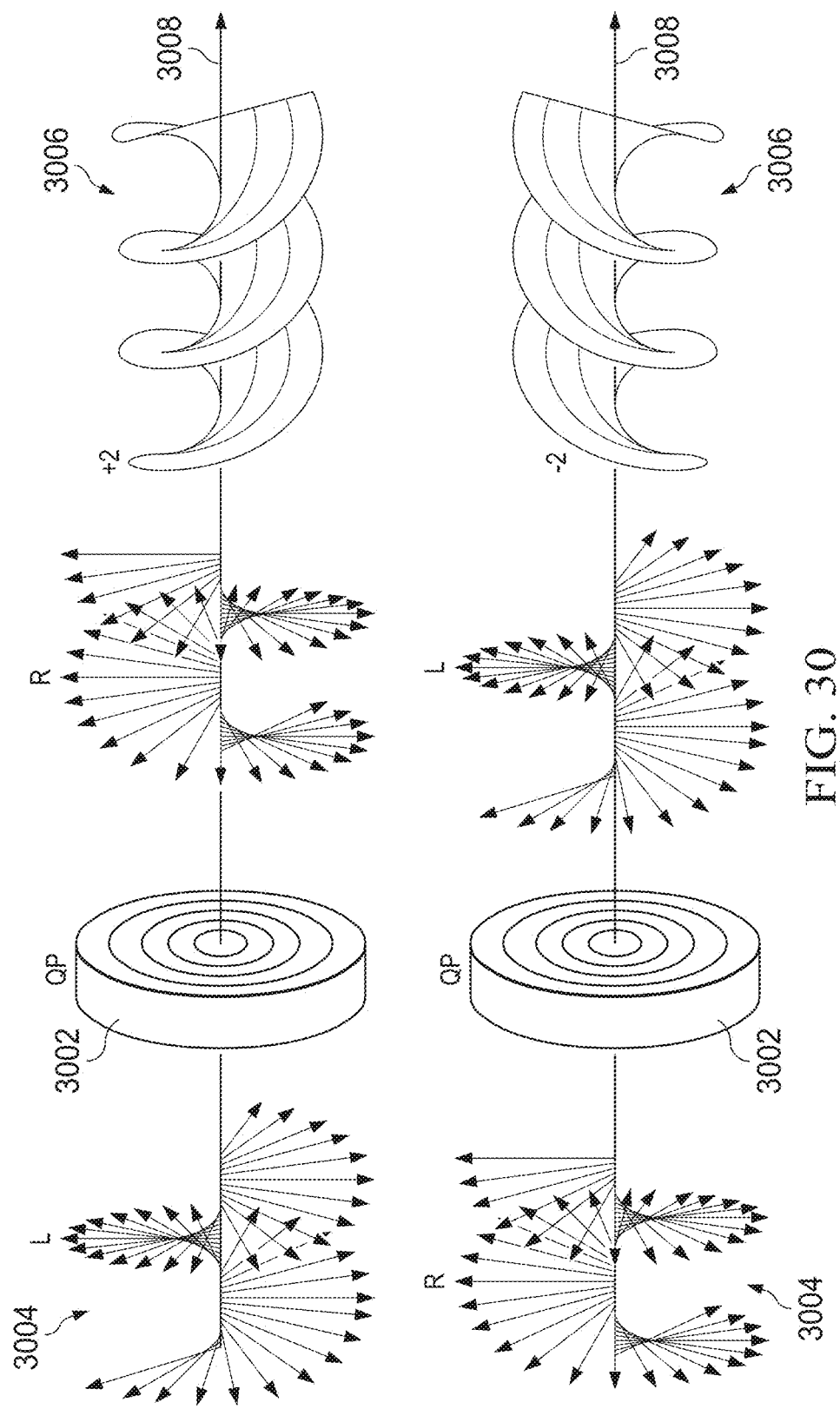
FIG. 30 illustrates the manner in which a q-plate can convert a left circularly polarized beam into a right circular polarization or vice-versa.

Referring now to FIG. 30, another interesting liquid crystal-based device named "q-plate" 3002 is also used as a mode converter which converts a circularly polarized beam 3004 into an OAM beam 3006. A q-plate is essentially a liquid crystal slab with a uniform birefringent phase retardation of π and a spatially varying transverse optical axis 3008 pattern. Along the path circling once around the center of the plate, the optical axis of the distributed crystal elements may have a number of rotations defined by the value of q. A circularly polarized beam 3004 passing through this plate 3002 would experience a helical phase change of exp (iℓθ) with ℓ=2q, as shown in FIG. 30.

Note that almost all the mode conversion approaches can also be used to detect an OAM beam. For example, an OAM beam can be converted back to a Gaussian-like non-OAM beam if the helical phase front is removed, e.g., by passing the OAM beam through a conjugate SPP or phase hologram.

Intra-Cavity Approaches

Figure 31:
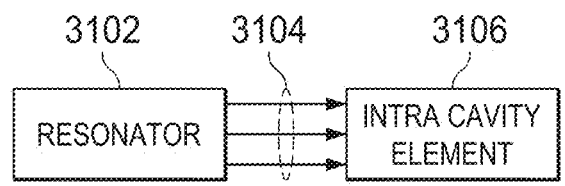
FIG. 31 illustrates the use of a laser resonator cavity for producing an OAM beam.

Referring now to FIG. 31, OAM beams are essentially higher order modes and can be directly generated from a laser resonator cavity. The resonator 3100 supporting higher order modes usually produce the mixture of multiple modes 3104, including the fundamental mode. In order to avoid the resonance of fundamental Gaussian mode, a typical approach is to place an intra-cavity element 3106 (spiral phase plate, tiled mirror) to force the oscillator to resonate on a specific OAM mode. Other reported demonstrations include the use of an annular shaped beam as laser pump, the use of thermal lensing, or by using a defect spot on one of the resonator mirrors.

OAM Beams Multiplexing and Demultiplexing

One of the benefits of OAM is that multiple coaxially propagating OAM beams with different ℓ states provide additional data carriers as they can be separated based only on the twisting wavefront. Hence, one of the critical techniques is the efficient multiplexing/demultiplexing of OAM beams of different ℓ states, where each carries an independent data channel and all beams can be transmitted and received using a single aperture pair. Several multiplexing and demultiplexing techniques have been demonstrated, including the use of an inverse helical phase hologram to down-convert the OAM into a Gaussian beam, a mode sorter, free-space interferometers, a photonic integrated circuit, and q-plates. Some of these techniques are briefly described below.

Beam Splitter and Inverse Phase Hologram

Figure 32:
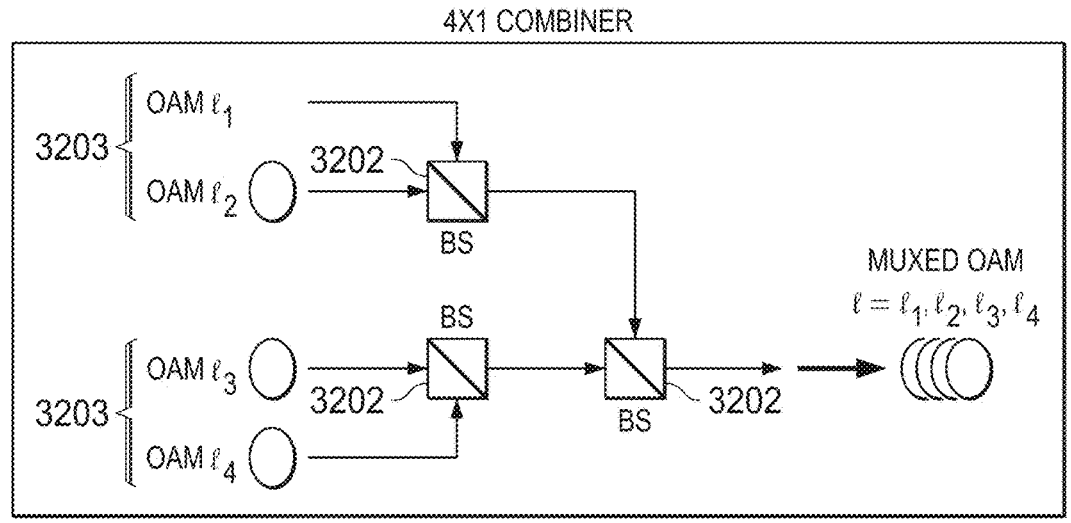
FIG. 32 illustrates spatial multiplexing using cascaded beam splitters.
Figure 33:
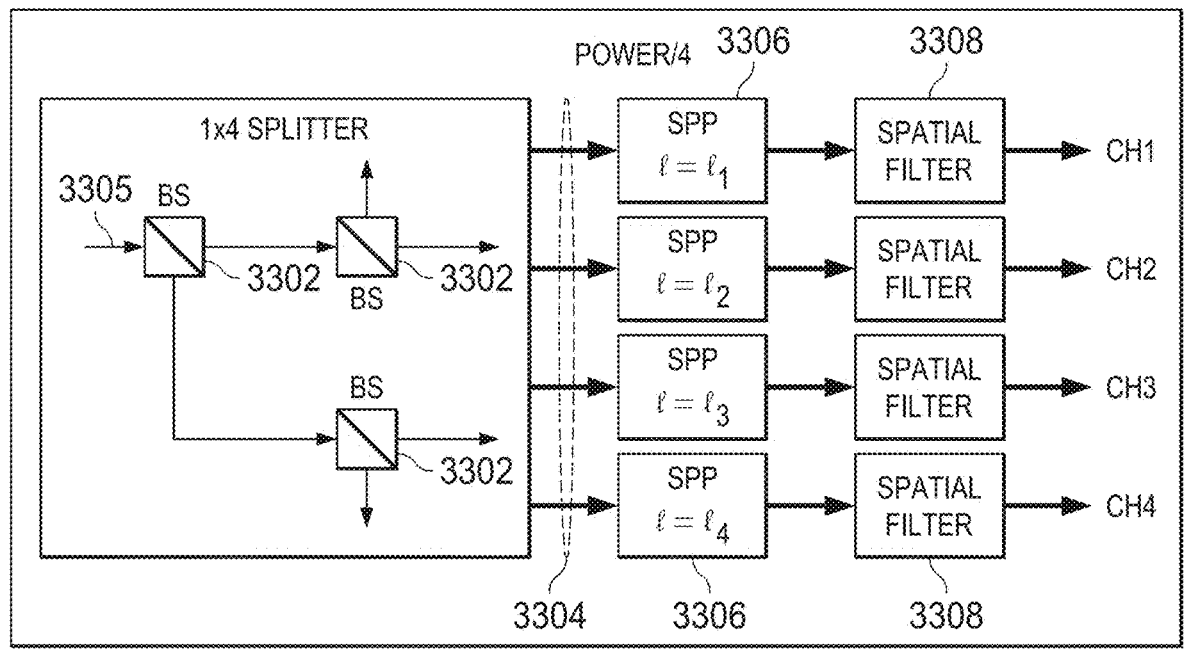
FIG. 33 illustrated de-multiplexing using cascaded beam splitters and conjugated spiral phase holograms.

A straightforward way of multiplexing is simply to use cascaded 3-dB beam splitters (BS) 3202. Each BS 3202 can coaxially multiplex two beams 3203 that are properly aligned, and cascaded N BSs can multiplex N+1 independent OAM beams at most, as shown in FIG. 32. Similarly, at the receiver end, the multiplexed beam 3205 is divided into four copies 3204 by BS 3202. To demultiplex the data channel on one of the beams (e.g., with l=l_i), a phase hologram 3206 with a spiral charge of [(−l]_i is applied to all the multiplexed beams 3204. As a result, the helical phase on the target beam is removed, and this beam evolves into a fundamental Gaussian beam, as shown in FIG. 33. The down-converted beam can be isolated from the other beams, which still have helical phase fronts by using a spatial mode filter 3308 (e.g., a single mode fiber only couples the power of the fundamental Gaussian mode due to the mode matching theory). Accordingly, each of the multiplexed beams 3304 can be demultiplexed by changing the spiral phase hologram 3306. Although this method is very power-inefficient since the BSs 3302 and the spatial mode filter 3306 cause a lot of power loss, it was used in the initial lab demonstrations of OAM multiplexing/demultiplexing, due to the simplicity of understanding and the reconfigurability provided by programmable SLMs.

Optical Geometrical Transformation-Based Mode Sorter

Figure 34:
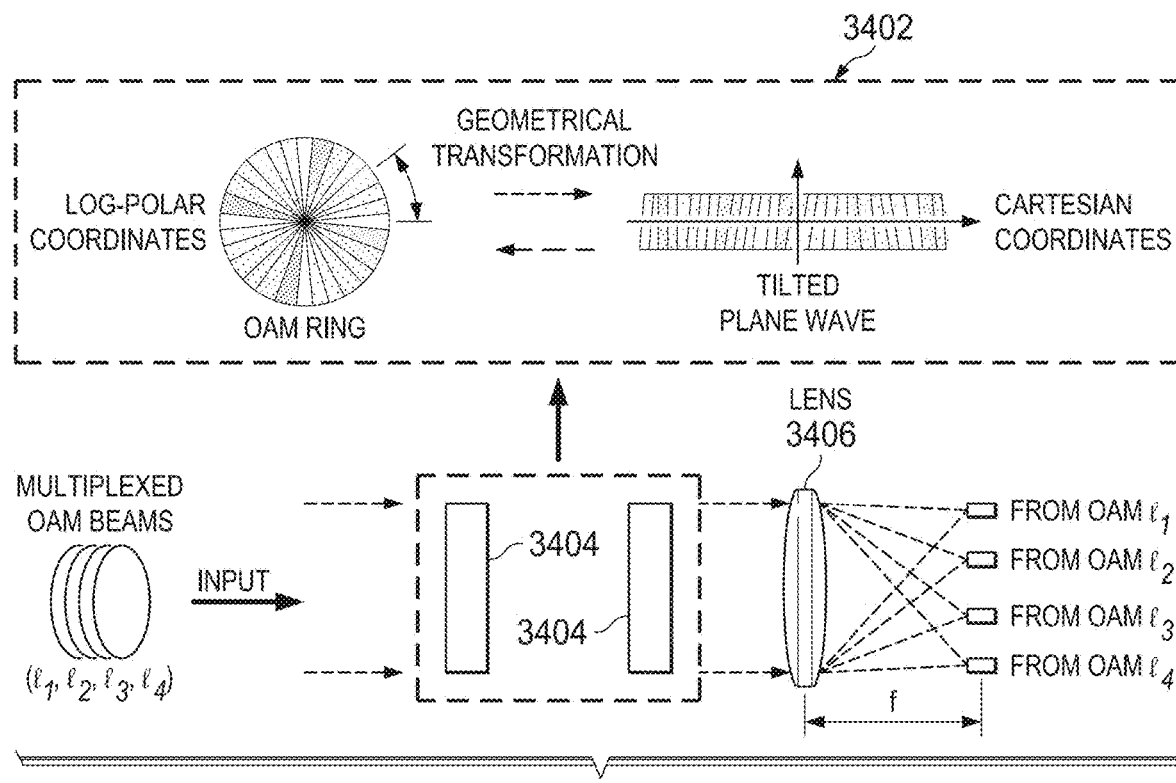
FIG. 34 illustrates a log polar geometrical transformation based on OAM multiplexing and de-multiplexing.

Referring now to FIG. 34, another method of multiplexing and demultiplexing, which could be more power-efficient than the previous one (using beam splitters), is the use of an OAM mode sorter. This mode sorter usually comprises three optical elements, including a transformer 3402, a corrector 3404, and a lens 3406, as shown in FIG. 34. The transformer 3402 performs a geometrical transformation of the input beam from log-polar coordinates to Cartesian coordinates, such that the position (x,y) in the input plane is mapped to a new position (u,v) in the output plane, where $$u = -a \ln\left(\frac{\sqrt{x^2 + y^2}}{b}\right),$$

and v=a arctan(y/x). Here, a and b are scaling constants. The corrector 3404 compensates for phase errors and ensures that the transformed beam is collimated. Considering an input OAM beam with a ring-shaped beam profile, it can be unfolded and mapped into a rectangular-shaped plane wave with a tilted phase front. Similarly, multiple OAM beams having different l states will be transformed into a series of plane waves each with a different phase tilt. A lens 3406 focuses these tilted plane waves into spatially separated spots in the focal plane such that all the OAM beams are simultaneously demultiplexed. As the transformation is reciprocal, if the mode sorter is used in reverse it can become a multiplexer for OAM. A Gaussian beam array placed in the focal plane of the lens 3406 is converted into superimposed plane waves with different tilts. These beams then pass through the corrector and the transformer sequentially to produce properly multiplexed OAM beams.

Free Space Communications

The first proof-of-concept experiment using OAM for free space communications transmitted eight different OAM states each representing a data symbol one at a time. The azimuthal index of the transmitted OAM beam is measured at the receiver using a phase hologram modulated with a binary grating. To effectively use this approach, fast switching is required between different OAM states to achieve a high data rate. Alternatively, classic communications using OAM states as data carriers can be multiplexed at the transmitter, co-propagated through a free space link, and demultiplexed at a receiver. The total data rate of a free space communication link has reached 100 Tbit/s or even beyond by using OAM multiplexing. The propagation of OAM beams through a real environment (e.g., across a city) is also under investigation.

Basic Link Demonstrations

Figure 35:
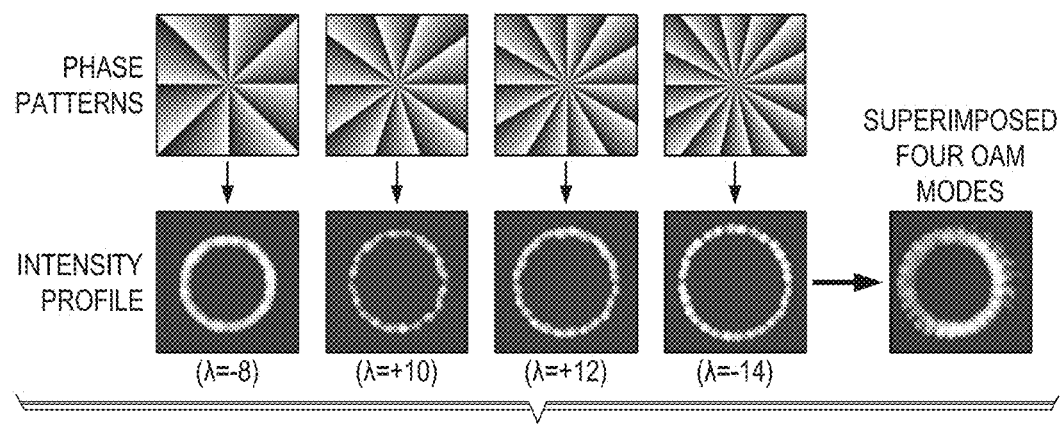
FIG. 35 illustrates an intensity profile of generated OAM beams and their multiplexing.
Figure 36A:
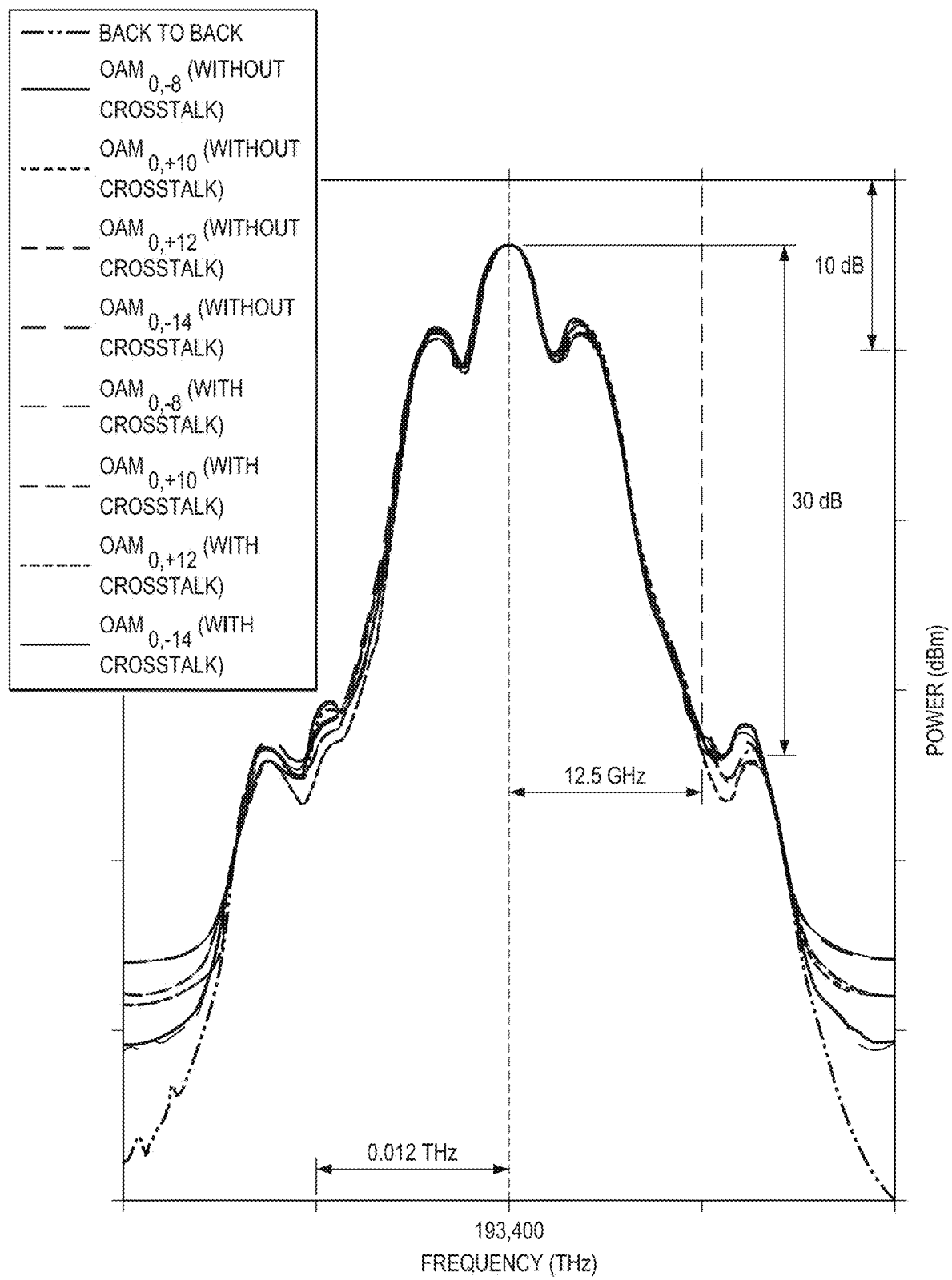
FIG. 36A illustrates the optical spectrum of each channel after each multiplexing for the OAM beams of FIG. 10A.
Figure 36B:
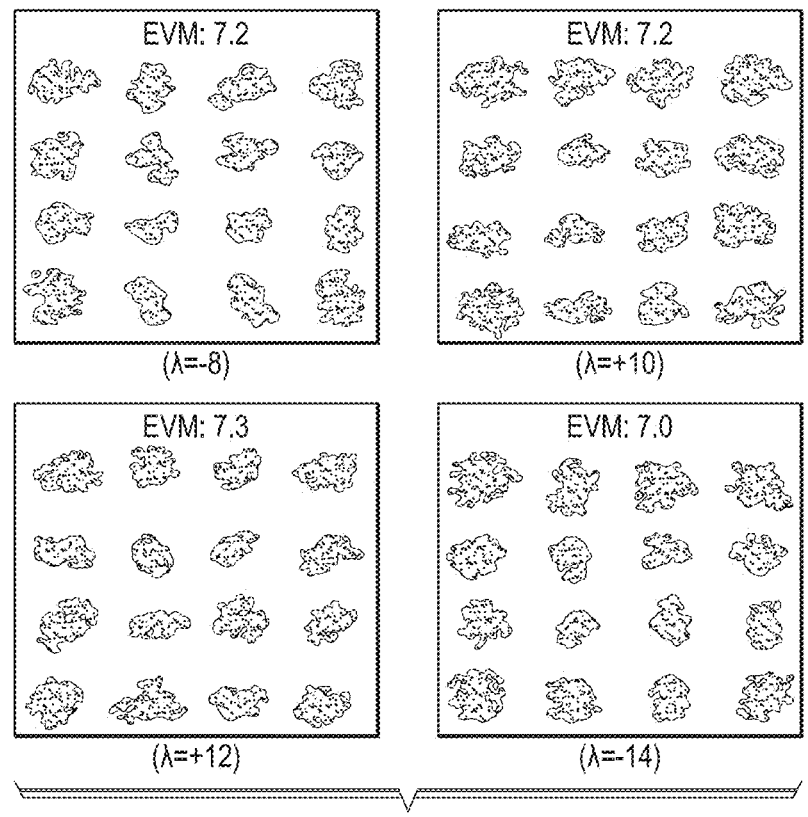
FIG. 36B illustrates the recovered constellations of 16-QAM signals carried on each OAM beam.

Referring now to FIGS. 35-36B, initial demonstrates of using OAM multiplexing for optical communications include free space links using a Gaussian beam and an OAM beam encoded with OOK data. Four monochromatic Gaussian beams each carrying an independent 50.8 Gbit/s (4×12.7 Gbit/s) 16-QAM signal were prepared from an IQ modulator and free-space collimators. The beams were converted to OAM beams with ℓ=−8, +10, +12 and −14, respectively, using 4 SLMs each loaded with a helical phase hologram, as shown in FIG. 30A. After being coaxially multiplexed using cascaded 3 dB-beam splitters, the beams were propagated through ~1 m distance in free-space under lab conditions. The OAM beams were detected one at a time, using an inverse helical phase hologram and a fiber collimator together with a SMF. The 16-QAM data on each channel was successfully recovered, and a spectral efficiency of 12.8 bit/s/Hz in this data link was achieved, as shown in FIGS. 36A and 36B.

A following experiment doubled the spectral efficiency by adding the polarization multiplexing into the OAM-multiplexed free-space data link. Four different OAM beams (ℓ=+4, +8, −8, +16) on each of two orthogonal polarizations (eight channels in total) were used to achieve a Terabit/s transmission link. The eight OAM beams were multiplexed and demultiplexed using the same approach as mentioned above. The measured crosstalk among channels carried by the eight OAM beams is shown in Table 1, with the largest crosstalk being ~−18.5 dB. Each of the beams was encoded with a 42.8 Gbaud 16-QAM signal, allowing a total capacity of ~1.4 (42.8×4×4×2) Tbit/s.

TABLE 1

| Measured Crosstalk | | $OAM_{+4}$ | | $OAM_{+8}$ | | $OAM_{-8}$ | | $OAM_{+16}$ | |
| --- | --- | --- | --- | --- | --- | --- | --- | --- | --- |
| | | X-Pol. | Y-Pol. | X-Pol. | Y-Pol. | X-Pol. | Y-Pol. | X-Pol. | Y-Pol. |
| $OAM_{+4}$ (dB) | X-Pol. | | −23.2 | −26.7 | −30.8 | −30.5 | −27.7 | −24.6 | −30.1 |
| | Y-Pol. | −25.7 | | | | | | | |
| $OAM_{+8}$ (dB) | X-Pol. | −26.6 | −23.5 | | −21.6 | −18.9 | −25.4 | −23.9 | −28.8 |
| | Y-Pol. | | | −25.0 | | | | | |
| $OAM_{-8}$ (dB) | X-Pol. | −27.5 | −33.9 | −27.6 | −30.8 | | −20.5 | −26.5 | −21.6 |
| | Y-Pol. | | | | | −26.8 | | | |
| $OAM_{+16}$ (dB) | X-Pol. | −24.5 | −31.2 | −23.7 | −23.3 | −25.8 | −26.1 | | −30.2 |
| | Y-Pol. | | | | | | | −24.0 | |
| Total from other OAMs *(dB) | | −21.8 | −21.0 | −21.2 | −21.4 | −18.5 | −21.2 | −22.2 | −20.7 |

Figure 37A:
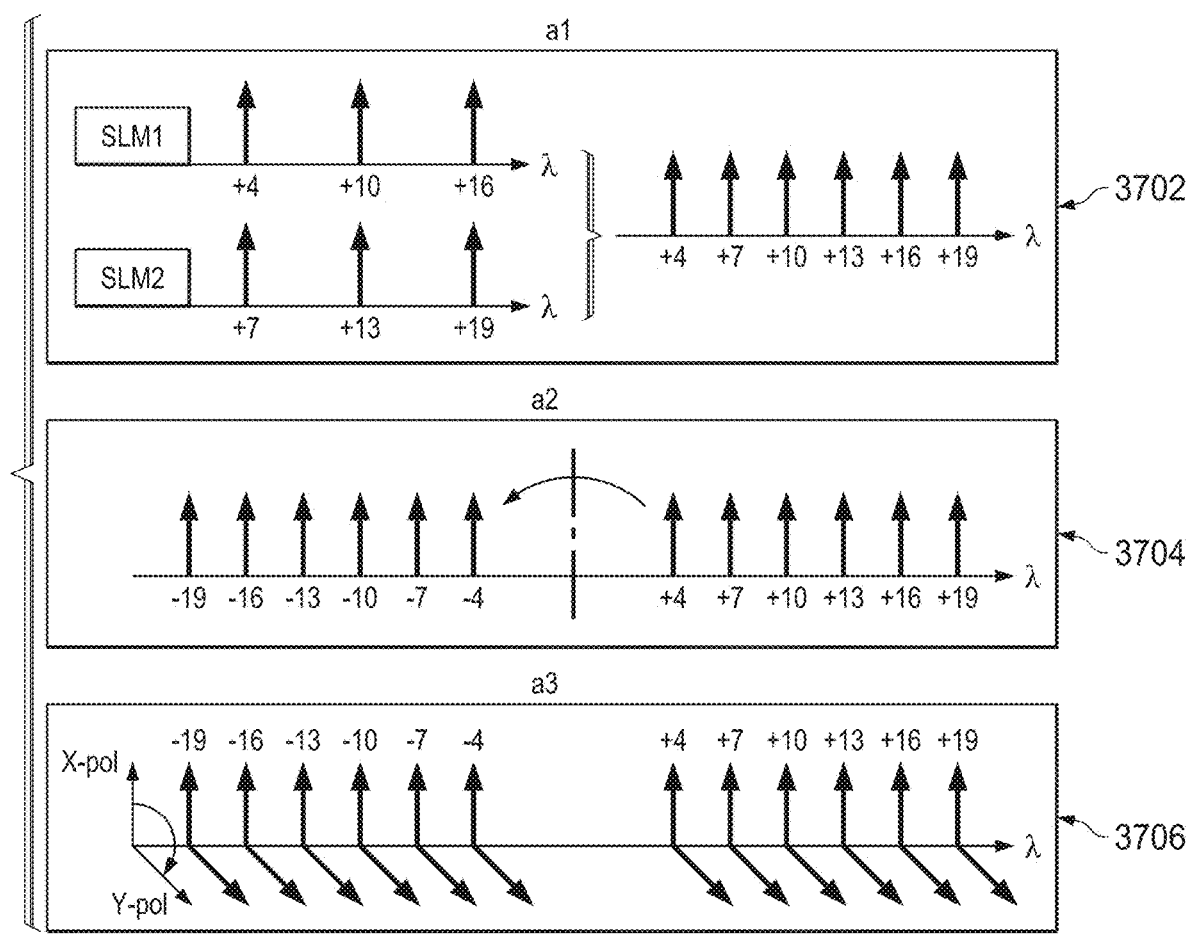
FIG. 37A illustrates the steps to produce 24 multiplex OAM beams.
Figure 37B:
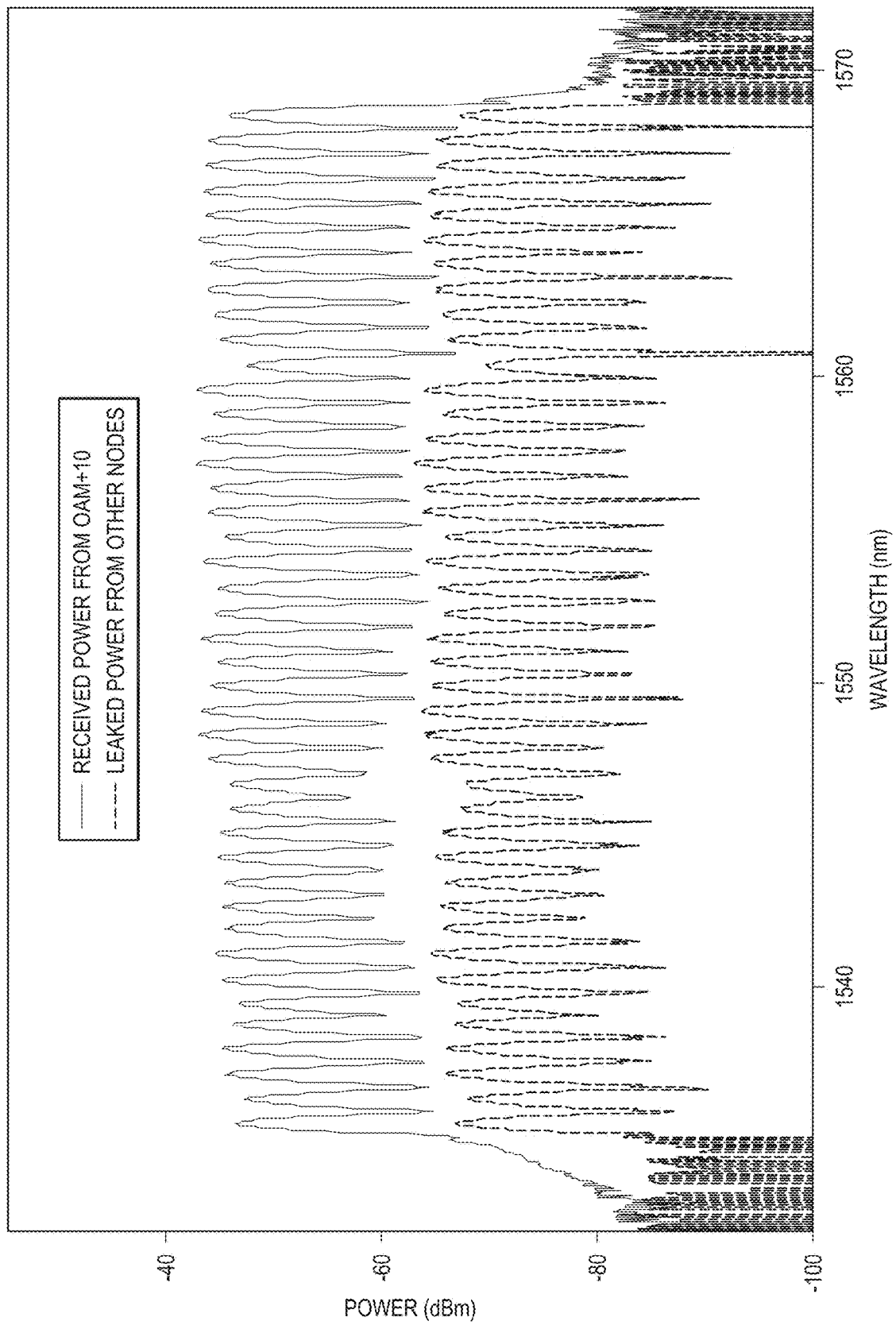
FIG. 37B illustrates the optical spectrum of a WDM signal carrier on an OAM beam.

The capacity of the free-space data link was further increased to 100 Tbit/s by combining OAM multiplexing with PDM (phase division multiplexing) and WDM (wave division multiplexing). In this experiment, 24 OAM beams (ℓ=±4, ±7, ±10, ±13, ±16, and ±19, each with two polarizations) were prepared using 2 SLMs, the procedures for which are shown in FIG. 37A at 3702-3706. Specifically, one SLM generated a superposition of OAM beams with ℓ=+4, +10, and +16, while the other SLM generated another set of three OAM beams with ℓ=+7, +13, and +19 (FIG. 37A). These two outputs were multiplexed together using a beam splitter, thereby multiplexing six OAM beams: ℓ=+4, +7, +10, +13, +16, and +19 (FIG. 37A). Secondly, the six multiplexed OAM beams were split into two copies. One copy was reflected five times by three mirrors and two beam splitters, to create another six OAM beams with inverse charges (FIG. 37B). There was a differential delay between the two light paths to de-correlate the data. These two copies were then combined again to achieve 12 multiplexed OAM beams with ℓ=±4, ±7, ±10, ±13, ±16, and ±19 (FIG. 37B). These 12 OAM beams were split again via a beam splitter. One of these was polarization-rotated by 90 degrees, delayed by ~33 symbols, and then recombined with the other copy using a polarization beam splitter (PBS), finally multiplexing 24 OAM beams (with ℓ=±4, ±7, ±10, ±13, ±16, and ±19 on two polarizations). Each of the beam carried a WDM signal comprising 100 GHz-spaced 42 wavelengths (1,536.34-1,568.5 nm), each of which was modulated with 100 Gbit/s QPSK data. The observed optical spectrum of the WDM signal carried on one of the demultiplexed OAM beams (ℓ=+10).

Atmospheric Turbulence Effects on OAM Beams

One of the critical challenges for a practical free-space optical communication system using OAM multiplexing is atmospheric turbulence. It is known that inhomogeneities in the temperature and pressure of the atmosphere lead to random variations in the refractive index along the transmission path, and can easily distort the phase front of a light beam. This could be particularly important for OAM communications, since the separation of multiplexed OAM beams relies on the helical phase-front. As predicted by simulations in the literature, these refractive index inhomogeneities may cause inter-modal crosstalk among data channels with different OAM states.

Figure 38A:
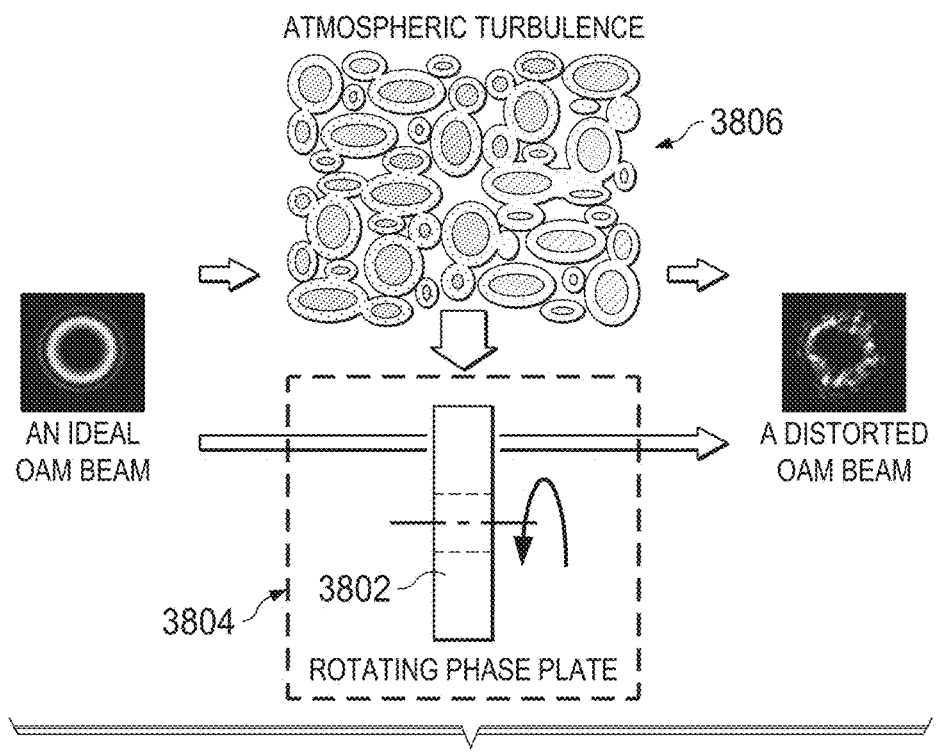
FIG. 38A illustrates a turbulence emulator.
Figure 38B:
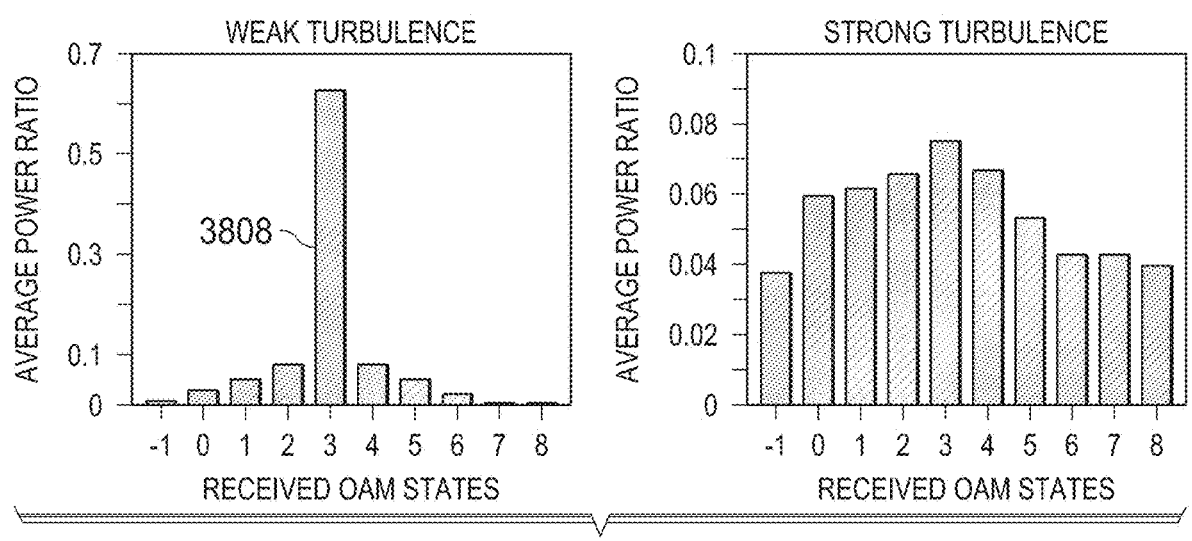
FIG. 38B illustrates the measured power distribution of an OAM beam after passing through turbulence with a different strength.

The effect of atmospheric turbulence is also experimentally evaluated. For the convenience of estimating the turbulence strength, one approach is to emulate the turbulence in the lab using an SLM or a rotating phase plate. FIG. 38A illustrates an emulator built using a thin phase screen plate 3802 that is mounted on a rotation stage 3804 and placed in the middle of the optical path. The pseudo-random phase distribution machined on the plate 3802 obeys Kolmogorov spectrum statistics, which are usually characterized by a specific effective Fried coherence length r0. The strength of the simulated turbulence 3806 can be varied either by changing to a plate 3802 with a different r0, or by adjusting the size of the beam that is incident on the plate. The resultant turbulence effect is mainly evaluated by measuring the power of the distorted beam distributed to each OAM mode using an OAM mode sorter. It was found that, as the turbulence strength increases, the power of the transmitted OAM mode would leak to neighboring modes and tend to be equally distributed among modes for stronger turbulence. As an example, FIG. 38B shows the measured average power (normalized) l=3 beam under different emulated turbulence conditions. It can be seen that the majority of the power is still in the transmitted OAM mode 3808 under weak turbulence, but it spreads to neighboring modes as the turbulence strength increases.

Turbulence Effects Mitigation Techniques

Figure 39A:
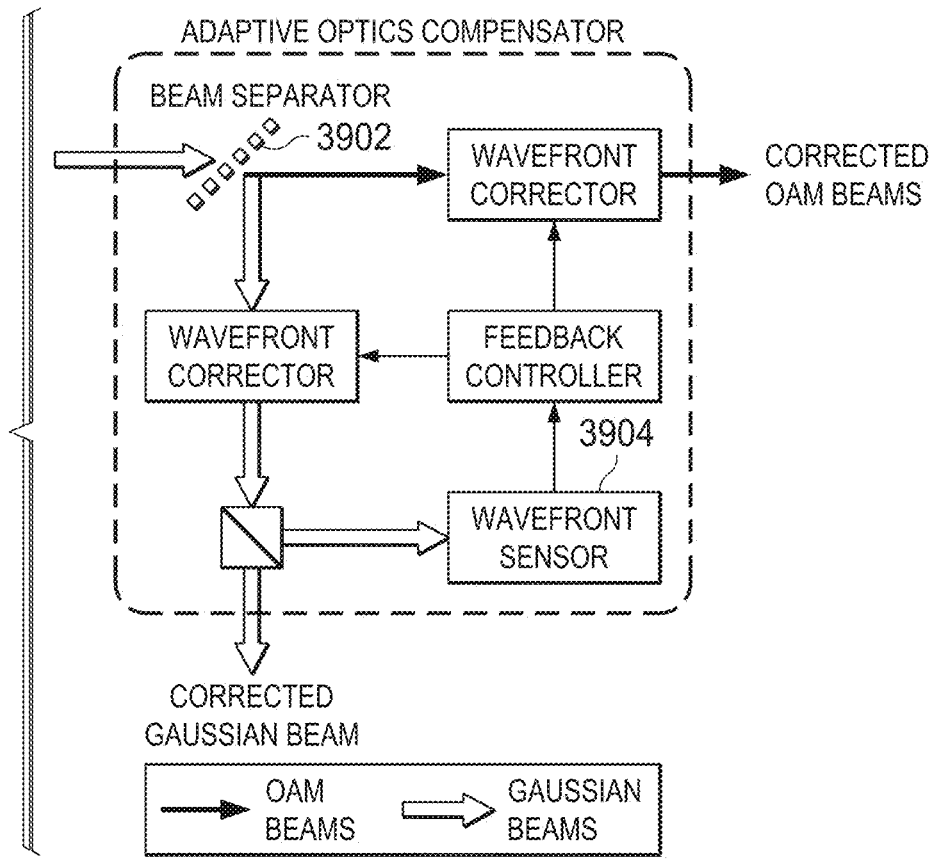
FIG. 39A illustrates how turbulence effects mitigation using adaptive optics.
Figure 39B:
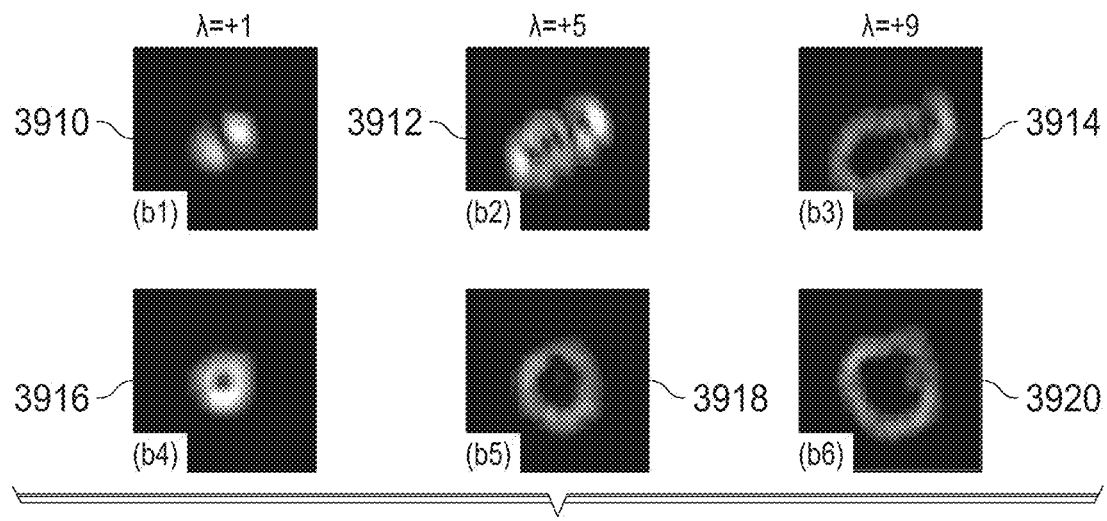
FIG. 39B illustrates experimental results of distortion mitigation using adaptive optics.

One approach to mitigate the effects of atmospheric turbulence on OAM beams is to use an adaptive optical (AO) system. The general idea of an AO system is to measure the phase front of the distorted beam first, based on which an error correction pattern can be produced and can be applied onto the beam transmitter to undo the distortion. As for OAM beams with helical phase fronts, it is challenging to directly measure the phase front using typical wavefront sensors due to the phase singularity. A modified AO system can overcome this problem by sending a Gaussian beam as a probe beam to sense the distortion, as shown in FIG. 39A. Due to the fact that turbulence is almost independent of the light polarization, the probe beam is orthogonally polarized as compared to all other beams for the sake of convenient separation at beam separator 3902. The correction phase pattern can be derived based on the probe beam distortion that is directly measured by a wavefront sensor 3804. It is noted that this phase correction pattern can be used to simultaneously compensate multiple coaxially propagating OAM beams. FIG. 39 at 3910-3980 illustrate the intensity profiles of OAM beams with l=1, 5 and 9, respectively, for a random turbulence realization with and without mitigation. From the far-field images, one can see that the distorted OAM beams (upper), up to l=9, were partially corrected, and the measured power distribution also indicates that the channel crosstalk can be reduced.

Another approach for combating turbulence effects is to partially move the complexity of optical setup into the electrical domain, and use digital signal processing (DSP) to mitigate the channel crosstalk. A typical DSP method is the multiple-input-multiple-output (MIMO) equalization, which is able to blindly estimate the channel crosstalk and cancel the interference. The implementation of a 4×4 adaptive MIMO equalizer in a four-channel OAM multiplexed free space optical link using heterodyne detection may be used. Four OAM beams (l=+2, +4, +6 and +8), each carrying 20 Gbit/s QPSK data, were collinearly multiplexed and propagated through a weak turbulence emulated by the rotating phase plate under laboratory condition to introduce distortions. After demultiplexing, four channels were coherently detected and recorded simultaneously. The standard constant modulus algorithm is employed in addition to the standard procedures of coherent detection to equalize the channel interference. Results indicate that MIMO equalization could be helpful to mitigate the crosstalk caused by either turbulence or imperfect mode generation/detection, and improve both error vector magnitude (EVM) and the bit-error-rate (BER) of the signal in an OAM-multiplexed communication link. MIMO DSP may not be universally useful as outage could happen in some scenarios involving free space data links. For example, the majority power of the transmitted OAM beams may be transferred to other OAM states under a strong turbulence without being detected, in which case MIMO would not help to improve the system performance.

OAM Free Space Link Design Considerations

Figure 40:
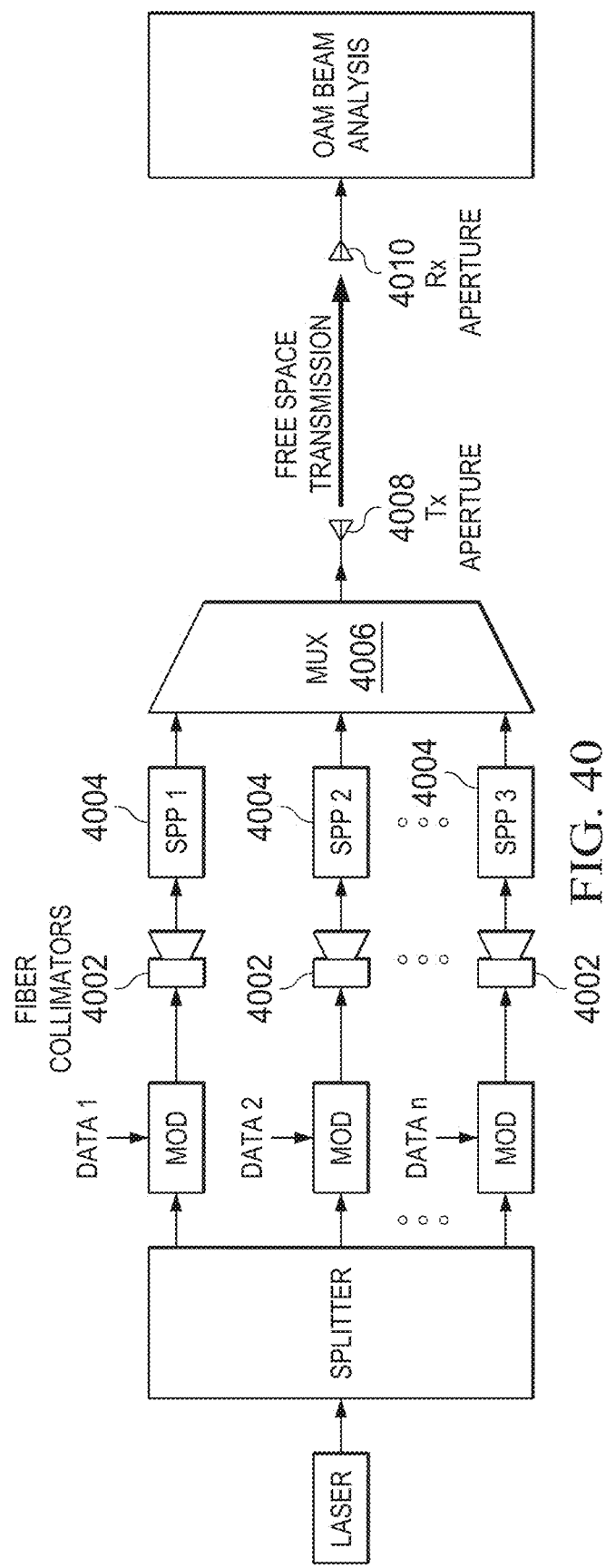
FIG. 40 illustrates a free-space optical data link using OAM.

To date, most of the experimental demonstrations of optical communication links using OAM beams took place in the lab conditions. There is a possibility that OAM beams may also be used in a free space optical communication link with longer distances. To design such a data link using OAM multiplexing, several important issues such as beam divergence, aperture size and misalignment of two transmitter and receiver, need to be resolved. To study how those parameters affect the performance of an OAM multiplexed system, a simulation model was described by Xie et al, the schematic setup of which is shown in FIG. 40. Each of the different collimated Gaussian beams 4002 at the same wavelength is followed by a spiral phase plate 4004 with a unique order to convert the Gaussian beam into a data-carrying OAM beam. Different orders of OAM beams are then multiplexed at multiplexor 4006 to form a concentric-ring-shape and coaxially propagate from transmitter 4008 through free space to the receiver aperture located at a certain propagation distance. Propagation of multiplexed OAM beams is numerically propagated using the Kirchhoff-Fresnel diffraction integral. To investigate the signal power and crosstalk effect on neighboring OAM channels, power distribution among different OAM modes is analyzed through a modal decomposition approach, which corresponds to the case where the received OAM beams are demultiplexed without power loss and the power of a desired OAM channel is completely collected by its receiver 4010.

Beam Divergence

Figure 41A:
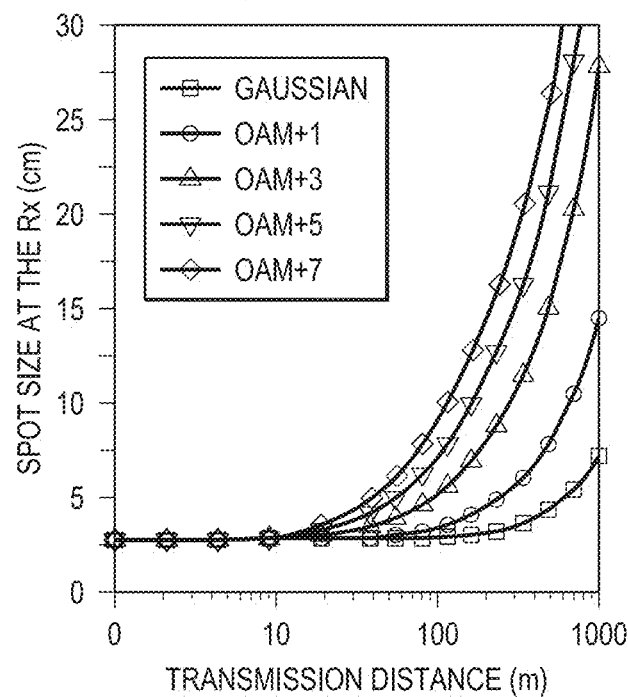
FIG. 41A illustrates simulated spot sized of different orders of OAM beams as a function of transmission distance for a 3 cm transmitted beam.
Figure 41B:
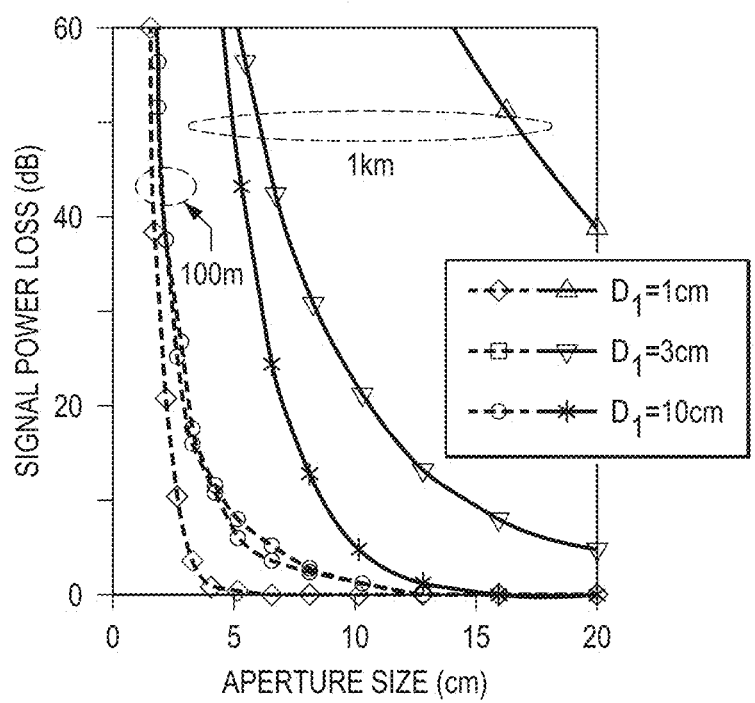
FIG. 41B illustrates simulated power loss as a function of aperture size.

For a communication link, it is generally preferable to collect as much signal power as possible at the receiver to ensure a reasonable signal-to-noise ratio (SNR). Based on the diffraction theory, it is known that a collimated OAM beam diverges while propagating in free space. Given the same spot size of three cm at the transmitter, an OAM beam with a higher azimuthal index diverges even faster, as shown in FIG. 41A. On the other hand, the receiving optical element usually has a limited aperture size and may not be able to collect all of the beam power. The calculated link power loss as a function of receiver aperture size is shown in FIG. 41B, with different transmission distances and various transmitted beam sizes. Unsurprisingly, the power loss of a 1-km link is higher than that of a 100-m link under the same transmitted beam size due to larger beam divergence. It is interesting to note that a system with a transmitted beam size of 3 cm suffers less power loss than that of 1 cm and 10 cm over a 100-m link. The 1-cm transmitted beam diverges faster than the 3 cm beam due to its larger diffraction. However, when the transmitted beam size is 10 cm, the geometrical characteristics of the beam dominate over the diffraction, thus leading larger spot size at the receiver than the 3 cm transmitted beam. A trade-off between the diffraction, geometrical characteristics and the number of OAMs of the beam therefore needs to be carefully considered in order to achieve a proper-size received beam when designing a link.

Misalignment Tolerance

Figure 42A:
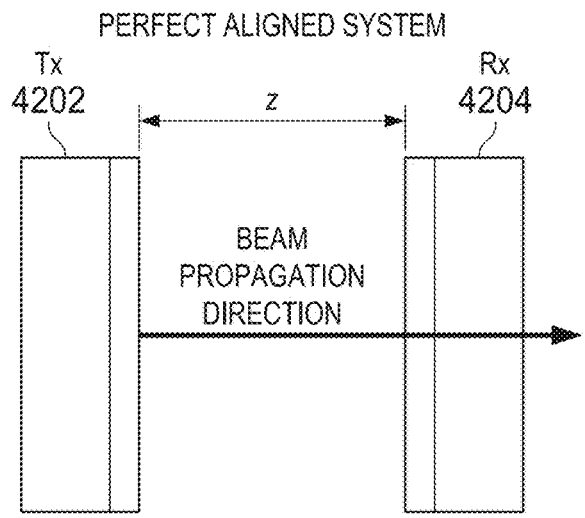
FIG. 42A illustrates a perfectly aligned system between a transmitter and receiver.
Figure 42B:
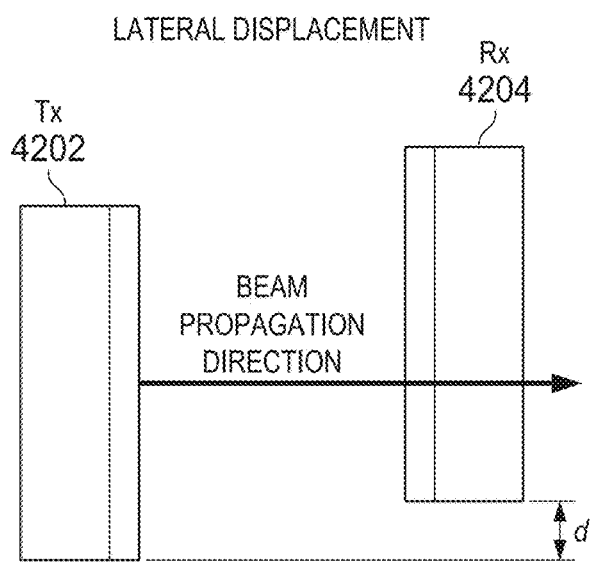
FIG. 42B illustrates a system with lateral displacement of alignment between a transmitter and receiver.
Figure 42C:
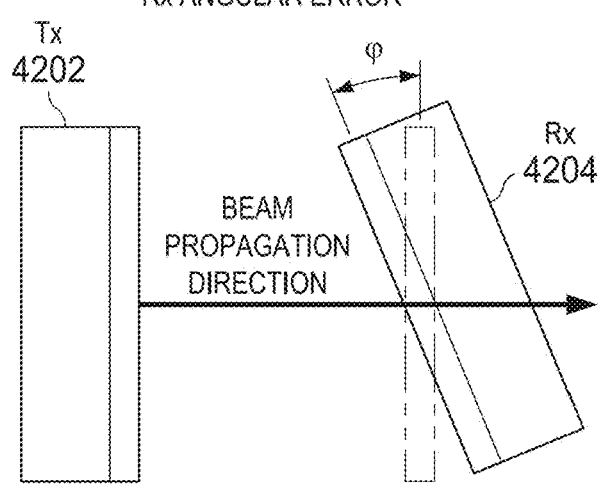
FIG. 42C illustrates a system with receiver angular error for alignment between a transmitter and receiver.

Referring now to FIGS. 42A-42C, besides the power loss due to limited-size aperture and beam divergence, another issue that needs further discussion is the potential misalignment between the transmitter and the receiver. In an ideal OAM multiplexed communication link, transmitter and receiver would be perfectly aligned, (i.e., the center of the receiver would overlap with the center of the transmitted beam 4202, and the receiver plane 4204 would be perpendicular to the line connecting their centers, as shown in FIG. 42A). However, due to difficulties in aligning because of substrate distances, and jitter and vibration of the transmitter/receiver platform, the transmitter and receiver may have relative lateral shift (i.e., lateral displacement) (FIG. 42B) or angular shift (i.e., receiver angular error) (FIG. 42C). Both types of misalignment may lead to degradation of system performance.

Figure 43A:
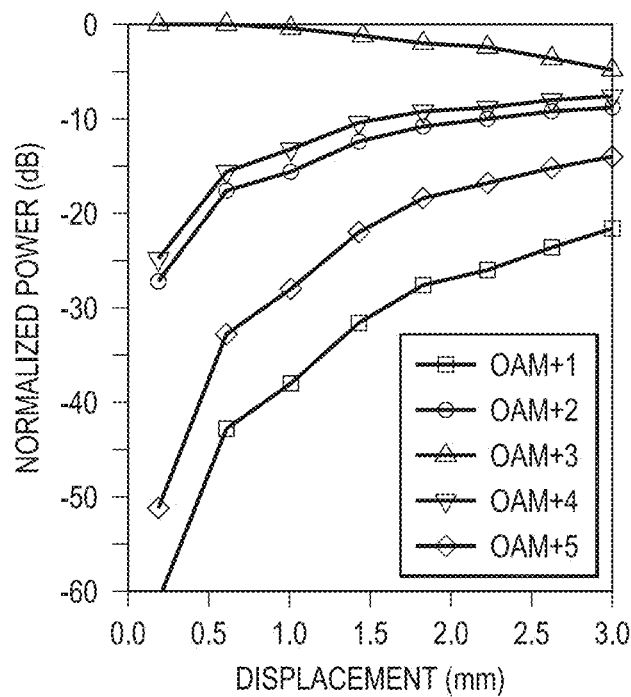
FIG. 43A illustrates simulated power distribution among different OAM modes with a function of lateral displacement.
Figure 43B:
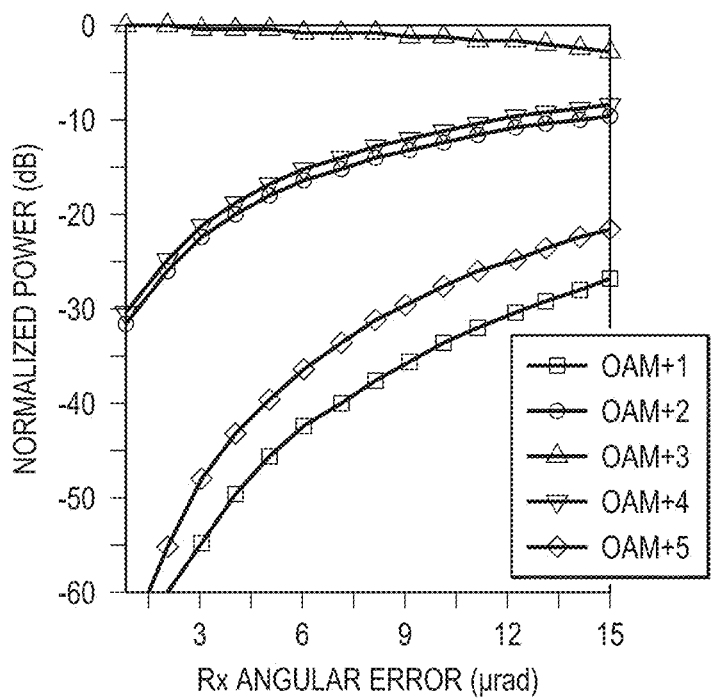
FIG. 43B illustrates simulated power distribution among different OAM modes as a function of receiver angular error.

Focusing on a link distance of 100 m, FIGS. 43A and 43B show the power distribution among different OAM modes due to lateral displacement and receiver angular error when only ℓ=+3 is transmitted with a transmitted beam size of 3 cm. In order to investigate the effect of misalignment, the receiver aperture size is chosen to be 10 cm, which could cover the whole OAM beam at the receiver. As the lateral displacement or receiver angular error increases, power leakage to other modes (i.e., channel crosstalk) increases while the power on ℓ=+3 state decreases. This is because larger lateral displacement or receiver angular causes larger phase profile mismatch between the received OAM beams and receiver. The power leakage to ℓ=+1 and ℓ=+5 is greater than that of ℓ=+2 and ℓ=+3 due to their larger mode spacing with respect to ℓ=+3. Therefore, a system with larger mode spacing (which also uses higher order OAM states suffers less crosstalk. However, such a system may also have a larger power loss due to the fast divergence of higher order OAM beams, as discussed above. Clearly, this trade-off between channel crosstalk and power loss shall be considered when choosing the mode spacing in a specific OAM multiplexed link.

Figure 44:
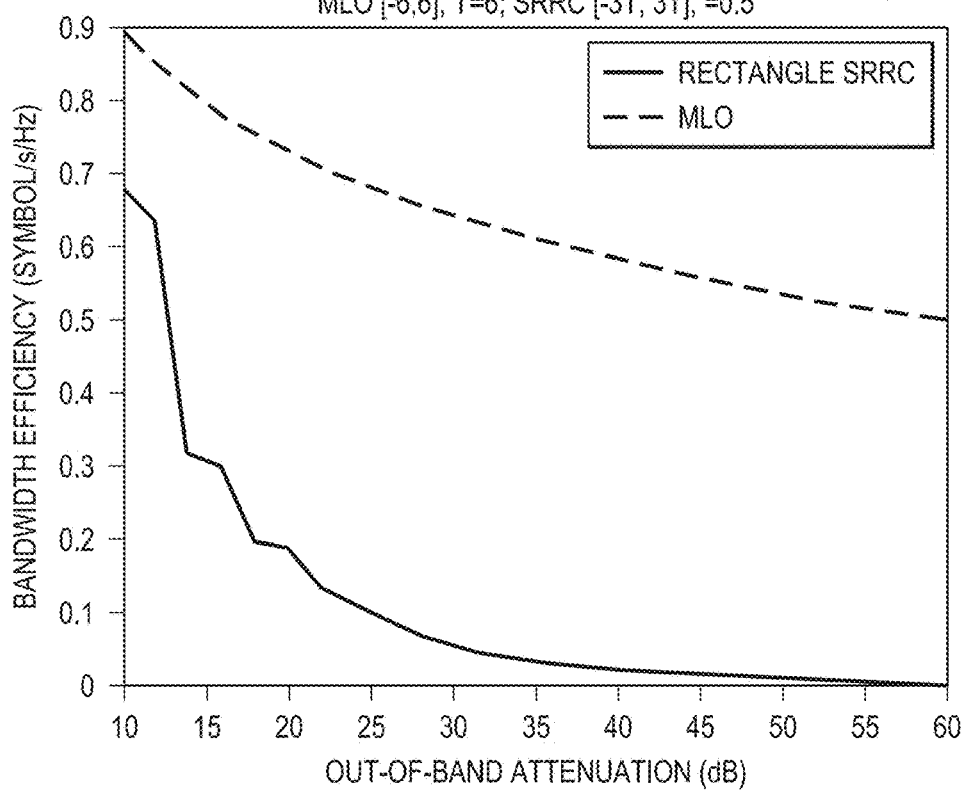
FIG. 44 illustrates a bandwidth efficiency comparison for square root raised cosine versus multiple layer overlay for a symbol rate of ⅙.
Figure 45:
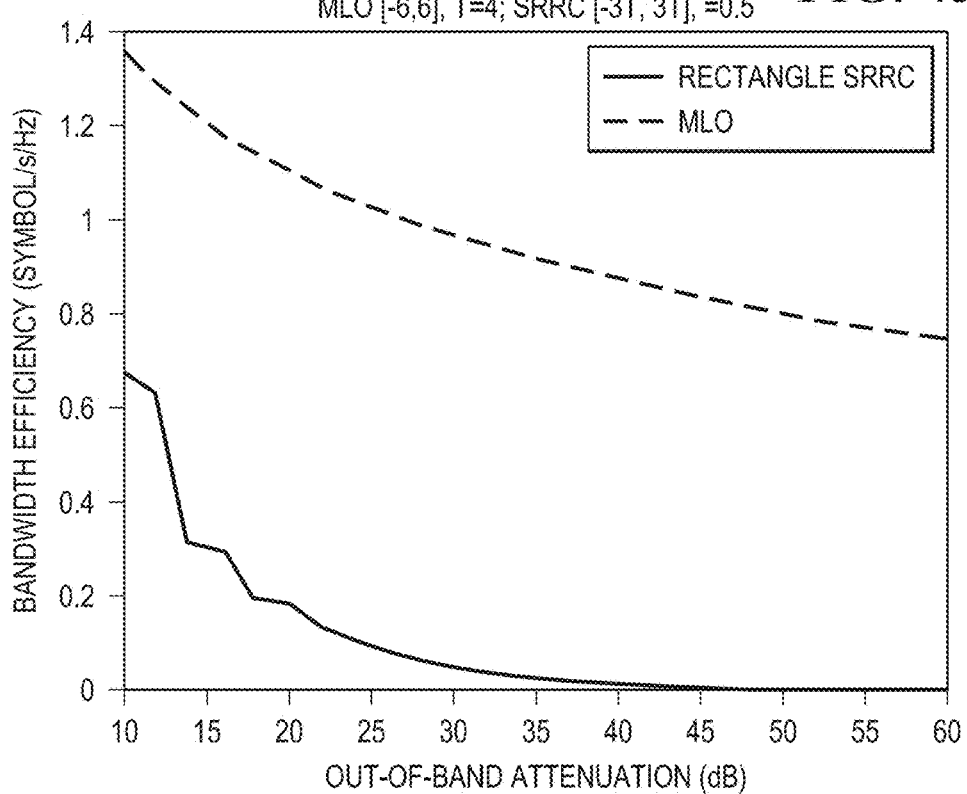
FIG. 45 illustrates a bandwidth efficiency comparison between square root raised cosine and multiple layer overlay for a symbol rate of ¼.

Referring now to FIG. 44, there is a bandwidth efficiency comparison versus out of band attenuation (X-dB) where quantum level overlay pulse truncation interval is [−6,6] and the symbol rate is ⅙. Referring also to FIG. 45, there is illustrated the bandwidth efficiency comparison versus out of band attenuation (X-dB) where quantum level overlay pulse truncation interval is [−6,6] and the symbol rate is ¼.

The QLO signals are generated from the Physicist's special Hermite functions:

$$f_n(t, \alpha) = \sqrt{\frac{\alpha}{\sqrt{\pi}\, n!\, 2^n}}\, H_n(\alpha t)\, e^{-\frac{\alpha^2 t^2}{2}}, \alpha > 0$$

Note that the initial hardware implementation is using $$\alpha = \frac{1}{\sqrt{2}}$$

and for consistency with his part, $$\alpha = \frac{1}{\sqrt{2}}$$

is used in all figures related to the spectral efficiency.

Let the low-pass-equivalent power spectral density (PSD) of the combined QLO signals be X(f) and its bandwidth be B. Here the bandwidth is defined by one of the following criteria.

ACLR1 (First Adjacent Channel Leakage Ratio) in dBc Equals:

$$ACLR1 = \frac{\int_{B/2}^{3B/2} X(f)\, df}{\int_{-\infty}^{\infty} X(f) df}$$

ACLR2 (Second Adjacent Channel Leakage Ratio) in dBc Equals:

$$ACLR2 = \frac{\int_{3B/2}^{5B/2} X(f)\, df}{\int_{-\infty}^{\infty} X(f) df}$$

Out-of-Band Power to Total Power Ratio is:

$$\frac{2\int_{B/2}^{\infty} X(f)\, df}{\int_{-\infty}^{\infty} X(f) df}$$

The Band-Edge PSD in dBc/100 kHz Equals:

$$\frac{\int_{B/2}^{\frac{B}{2}+10^5} X(f)\, df}{\int_{-\infty}^{\infty} X(f) df}$$

Figure 46:
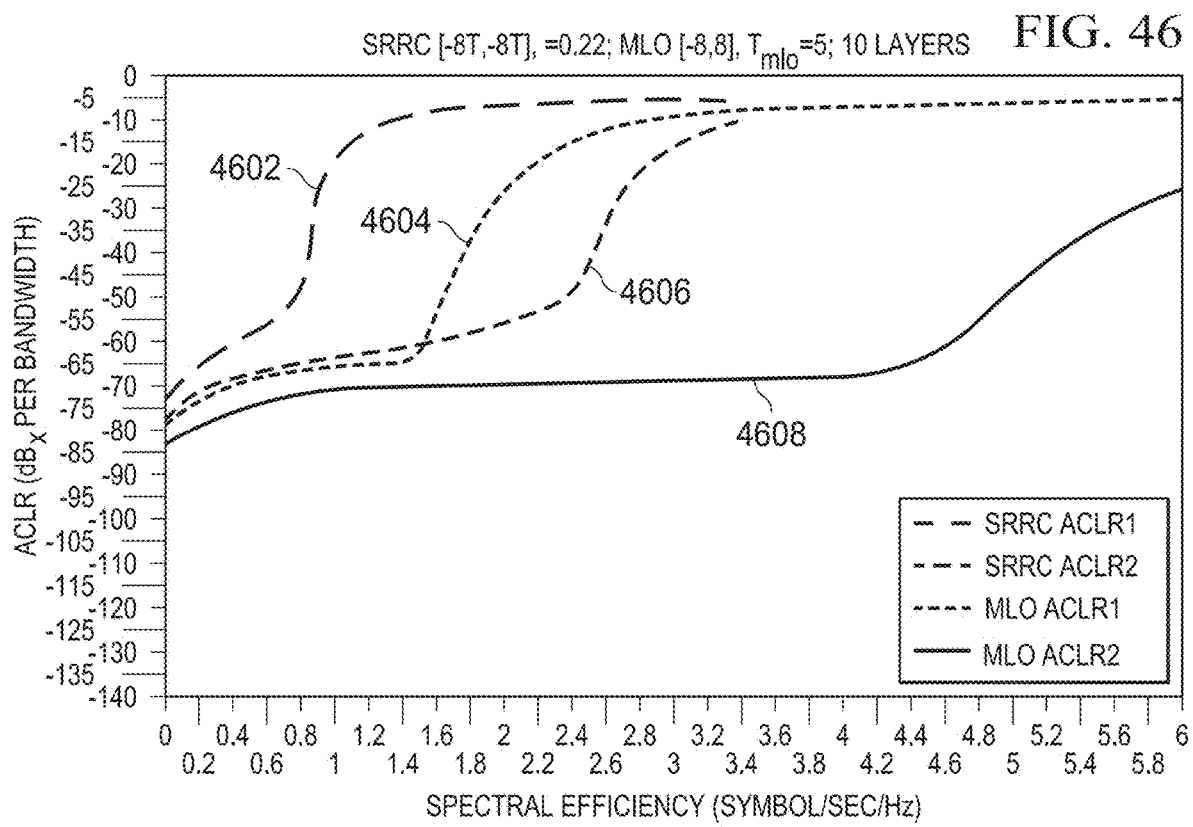
FIG. 46 illustrates a performance comparison between square root raised cosine and multiple level overlay using ACLR.

Referring now to FIG. 46 there is illustrated a performance comparison using ACLR1 and ACLR2 for both a square root raised cosine scheme and a multiple layer overlay scheme. Line 4602 illustrates the performance of a square root raised cosine 4602 using ACLR1 versus an MLO 4604 using ACLR1. Additionally, a comparison between a square root raised cosine 4606 using ACLR2 versus MLO 4608 using ACLR2 is illustrated. Table 2 illustrates the performance comparison using ACLR.

TABLE 2

| Criteria: ACLR1 ≤ −30 dBc per bandwidth ACLR2 ≤ −43 dBc per bandwidth | | | Spectral Efficiency (Symbol/sec/Hz) | Gain |
|---|---|---|---|---|
| SRRC [−8T, 8T] β = 0.22 | | | 0.8765 | 1.0 |
| | N layers | Symbol Duration (Tmol) | | |
| QLO [−8, 8] | N = 3 | Tmol = 4 | 1.133 | 1.2926 |
| | N = 4 | Tmol = 5 | 1.094 | 1.2481 |
| | | Tmol = 4 | 1.367 | 1.5596 |
| | N = 10 | Tmol = 8 | 1.185 | 1.3520 |
| | | Tmol = 7 | 1.355 | 1.5459 |
| | | Tmol = 6 | 1.580 | 1.8026 |
| | | Tmol = 5 | 1.896 | 2.1631 |
| | | Tmol = 4 | 2.371 | 2.7051 |

Figure 47:
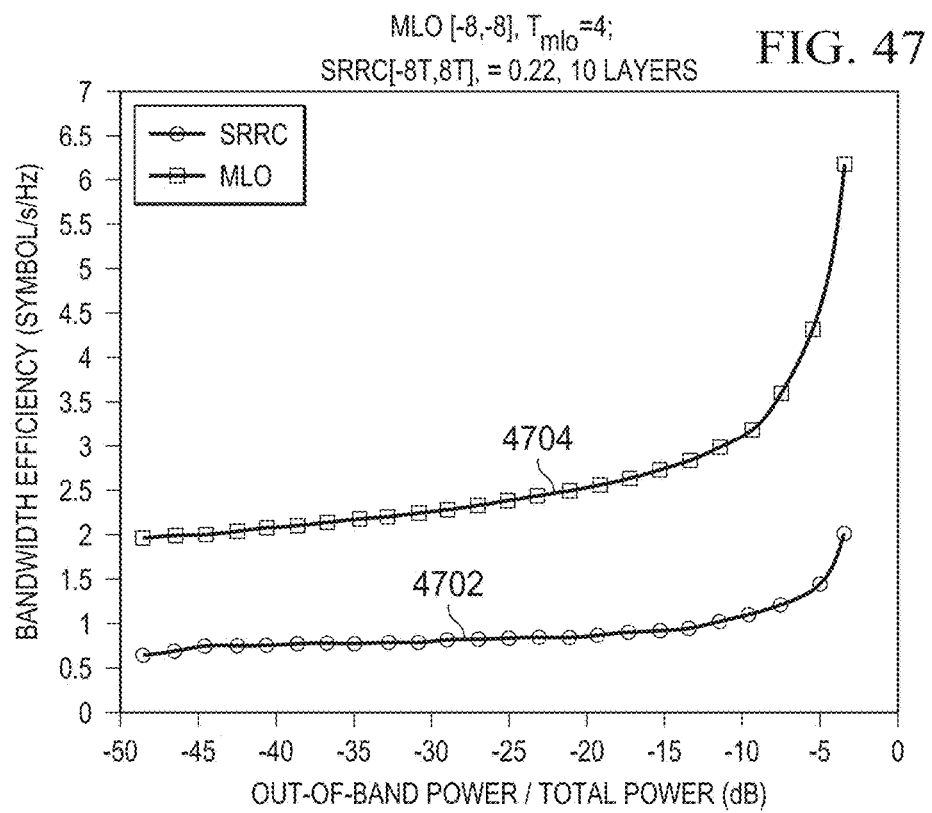
FIG. 47 illustrates a performance comparison between square root raised cosine and multiple lever overlay using out of band power.

Referring now to FIG. 47, there is illustrated a performance comparison between a square root raised cosine 4702 and a MLO 4704 using out-of-band power. Referring now also to Table 3, there is illustrated a more detailed comparison of the performance using out-of-band power.

TABLE 3

Performance Comparison Using Out-of-Band Power

| Criterion: Out-of-band Power/Total Power ≤ −30 dB | | | Spectral Efficiency (Symbol/sec/Hz) | Gain |
|---|---|---|---|---|
| SRRC [−8 T, 8 T] β = 0.22 | | | 0.861 | 1.0 |
| | N Layers | Symbol Duration (Tmol) | | |
| QLO [−8, 8] | N = 3 | Tmol = 3 | 1.080 | 1.2544 |
| | N = 4 | Tmol = 5 | 1.049 | 1.2184 |
| | | Tmol = 4 | 1.311 | 1.5226 |
| | N = 10 | Tmol = 8 | 1.152 | 1.3380 |
| | | Tmol = 7 | 1.311 | 1.5226 |
| | | Tmol = 6 | 1.536 | 1.7840 |
| | | Tmol = 5 | 1.844 | 2.1417 |
| | | Tmol = 4 | 2.305 | 2.6771 |

Figure 48:
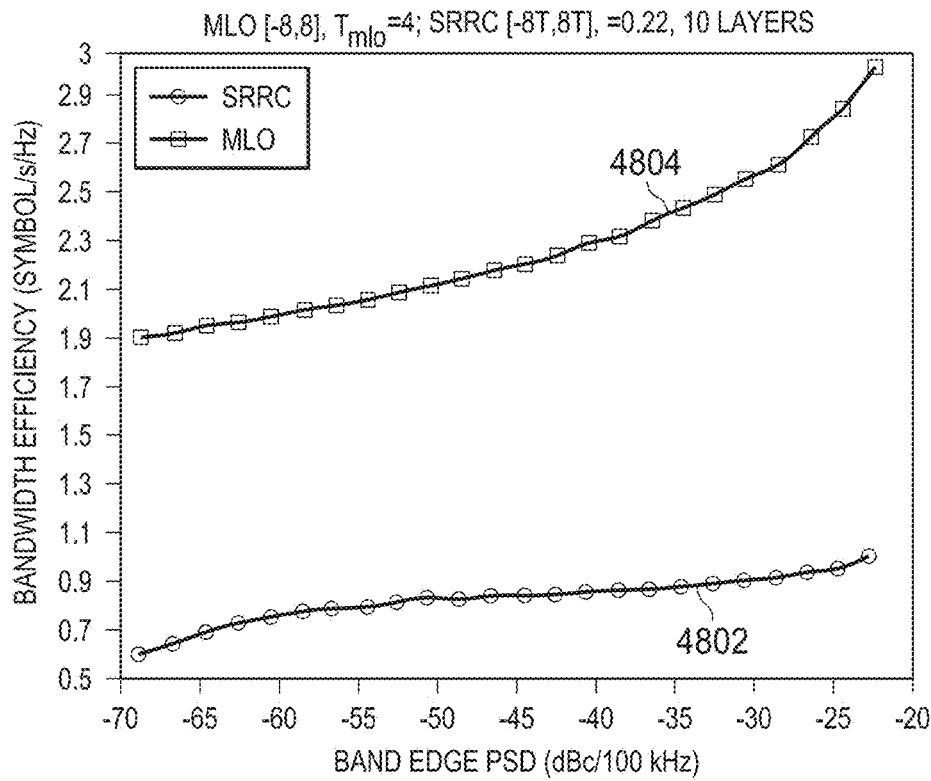
FIG. 48 illustrates a performance comparison between square root raised cosine and multiple lever overlay using band edge PSD.

Referring now to FIG. 48, there is further provided a performance comparison between a square root raised cosine 4802 and a MLO 4804 using band-edge PSD. A more detailed illustration of the performance comparison is provided in Table 4.

TABLE 4

Performance Comparison Using Band-Edge PSD

| Criterion:<br>Band-Edge PSD = −50 dBc/100 kHz | | | Spectral Efficiency<br>(Symbol/sec/Hz) | Gain |
|---|---|---|---|---|
| SRRC [−8 T, 8 T] β = 0.22 | | | 0.810 | 1.0 |
| | N Layers | Symbol Duration (Tmol) | | |
| QLO<br>[−8, 8] | N = 3 | Tmol = 4 | 0.925 | 1.1420 |
| | N = 8 | Tmol = 5 | 0.912 | 1.1259 |
| | | Tmol = 4 | 1.14 | 1.4074 |
| | N = 10 | Tmol = 8 | 1.049 | 1.2951 |
| | | Tmol = 7 | 1.198 | 1.4790 |
| | | Tmol = 6 | 1.398 | 1.7259 |
| | | Tmol = 5 | 1.678 | 2.0716 |
| | | Tmol = 4 | 2.097 | 2.5889 |

Figure 49:
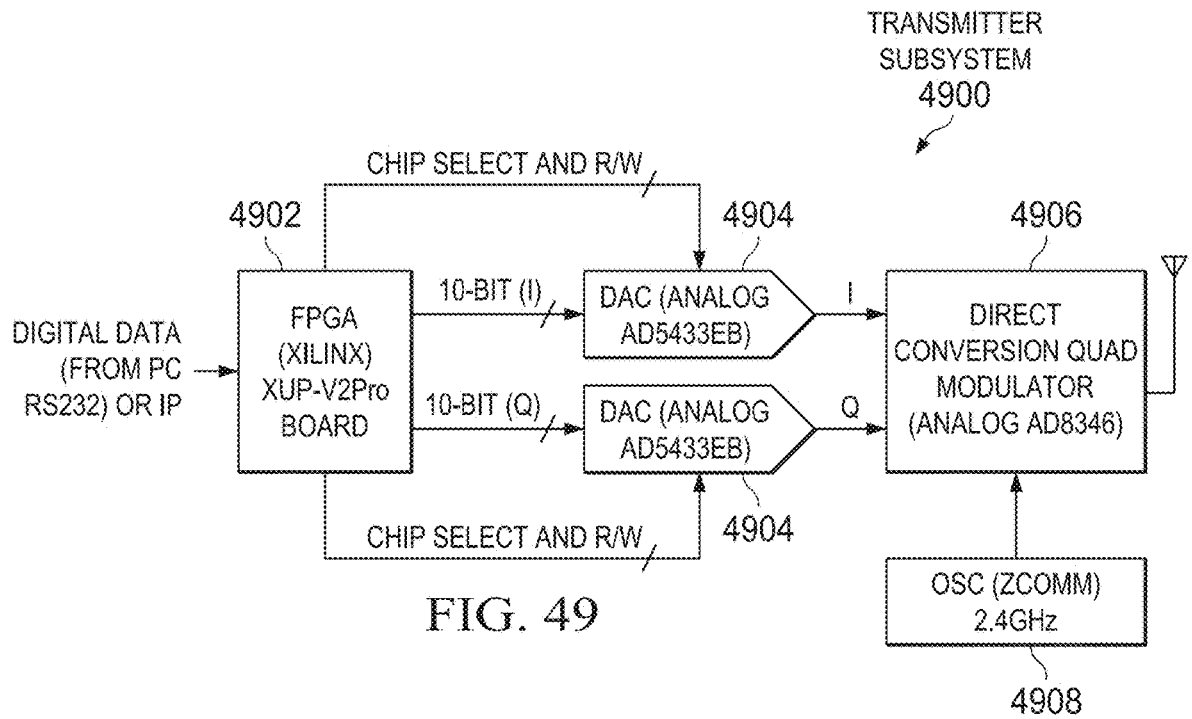
FIG. 49 is a block diagram of a transmitter subsystem for use with multiple level overlay.
Figure 50:
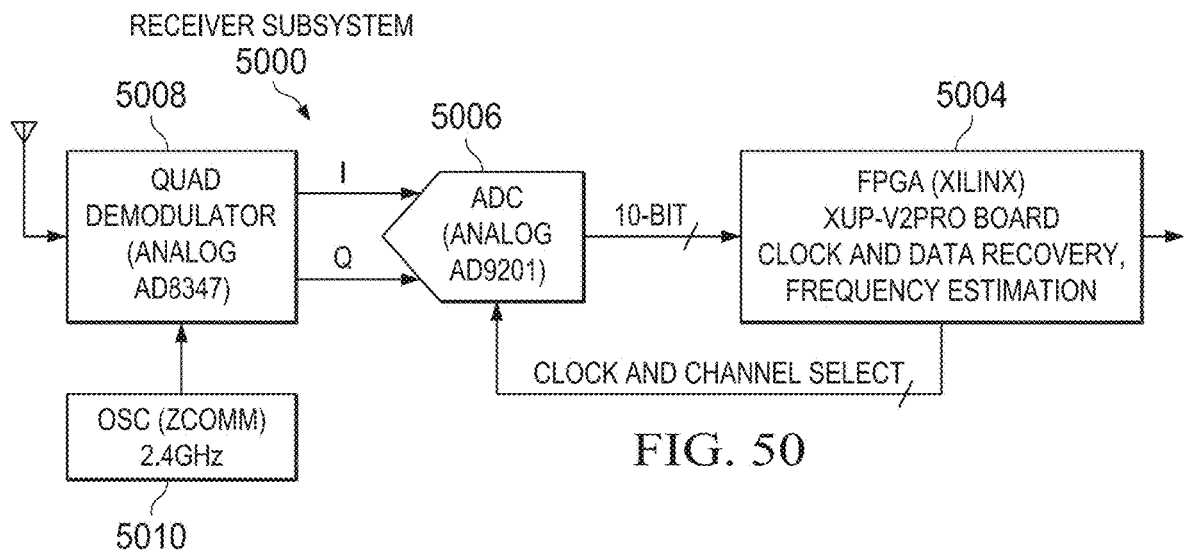
FIG. 50 is a block diagram of a receiver subsystem using multiple level overlay.

Referring now to FIGS. 49 and 50, there are more particularly illustrated the transmit subsystem (FIG. 49) and the receiver subsystem (FIG. 50). The transceiver is realized using basic building blocks available as Commercially Off The Shelf products. Modulation, demodulation and Special Hermite correlation and de-correlation are implemented on a FPGA board. The FPGA board 5002 at the receiver 5000 estimated the frequency error and recovers the data clock (as well as data), which is used to read data from the analog-to-digital (ADC) board 5006. The FGBA board 5000 also segments the digital I and Q channels.

On the transmitter side 4900, the FPGA board 4902 realizes the special hermite correlated QAM signal as well as the necessary control signals to control the digital-to-analog (DAC) boards 4904 to produce analog I&Q baseband channels for the subsequent up conversion within the direct conversion quad modulator 4906. The direct conversion quad modulator 4906 receives an oscillator signal from oscillator 4908.

The ADC 5006 receives the I&Q signals from the quad demodulator 5008 that receives an oscillator signal from 5010.

Neither power amplifier in the transmitter nor an LNA in the receiver is used since the communication will take place over a short distance. The frequency band of 2.4-2.5 GHz (ISM band) is selected, but any frequency band of interest may be utilized.

MIMO uses diversity to achieve some incremental spectral efficiency. Each of the signals from the antennas acts as an independent orthogonal channel. With QLO, the gain in spectral efficiency comes from within the symbol and each QLO signal acts as independent channels as they are all orthogonal to one another in any permutation. However, since QLO is implemented at the bottom of the protocol stack (physical layer), any technologies at higher levels of the protocol (i.e. Transport) will work with QLO. Therefore one can use all the conventional techniques with QLO. This includes RAKE receivers and equalizers to combat fading, cyclical prefix insertion to combat time dispersion and all other techniques using beam forming and MIMO to increase spectral efficiency even further.

When considering spectral efficiency of a practical wireless communication system, due to possibly different practical bandwidth definitions (and also not strictly bandlimited nature of actual transmit signal), the following approach would be more appropriate.

Figure 51:
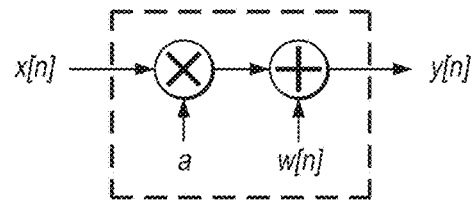
FIG. 51 illustrates an equivalent discreet time orthogonal channel of modified multiple level overlay.

Referring now to FIG. 51, consider the equivalent discrete time system, and obtain the Shannon capacity for that system (will be denoted by Cd). Regarding the discrete time system, for example, for conventional QAM systems in AWGN, the system will be:

$$y[n]=a\,x[n]+w[n]$$

where a is a scalar representing channel gain and amplitude scaling, x[n] is the input signal (QAM symbol) with unit average energy (scaling is embedded in a), y[n] is the demodulator (matched filter) output symbol, and index n is the discrete time index.

The corresponding Shannon capacity is:

$$C_d = \log_2(1+|a|^2/\sigma^2)$$

where σ2 is the noise variance (in complex dimension) and |a|2/σ2 is the SNR of the discrete time system.

Second, compute the bandwidth W based on the adopted bandwidth definition (e.g., bandwidth defined by −40 dBc out of band power). If the symbol duration corresponding to a sample in discrete time (or the time required to transmit $C_d$ bits) is T, then the spectral efficiency can be obtained as:

$$C/W = C_d/(T\,W)\,\text{bps/Hz}$$

In discrete time system in AWGN channels, using Turbo or similar codes will give performance quite close to Shannon limit $C_d$. This performance in discrete time domain will be the same regardless of the pulse shape used. For example, using either SRRC (square root raised cosine) pulse or a rectangle pulse gives the same $C_d$ (or $C_d/T$). However, when we consider continuous time practical systems, the bandwidths of SRRC and the rectangle pulse will be different. For a typical practical bandwidth definition, the bandwidth for a SRRC pulse will be smaller than that for the rectangle pulse and hence SRRC will give better spectral efficiency. In other words, in discrete time system in AWGN channels, there is little room for improvement. However, in continuous time practical systems, there can be significant room for improvement in spectral efficiency.

Figure 52:
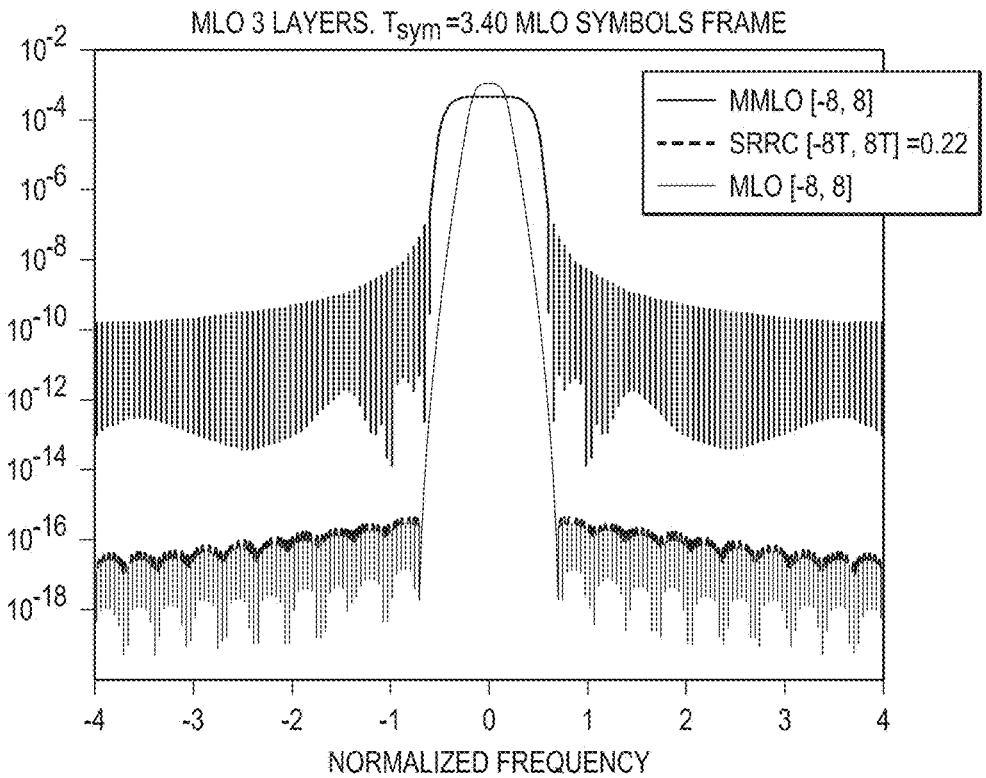
FIG. 52 illustrates the PSDs of multiple layer overlay, modified multiple layer overlay and square root raised cosine.
Figure 53:
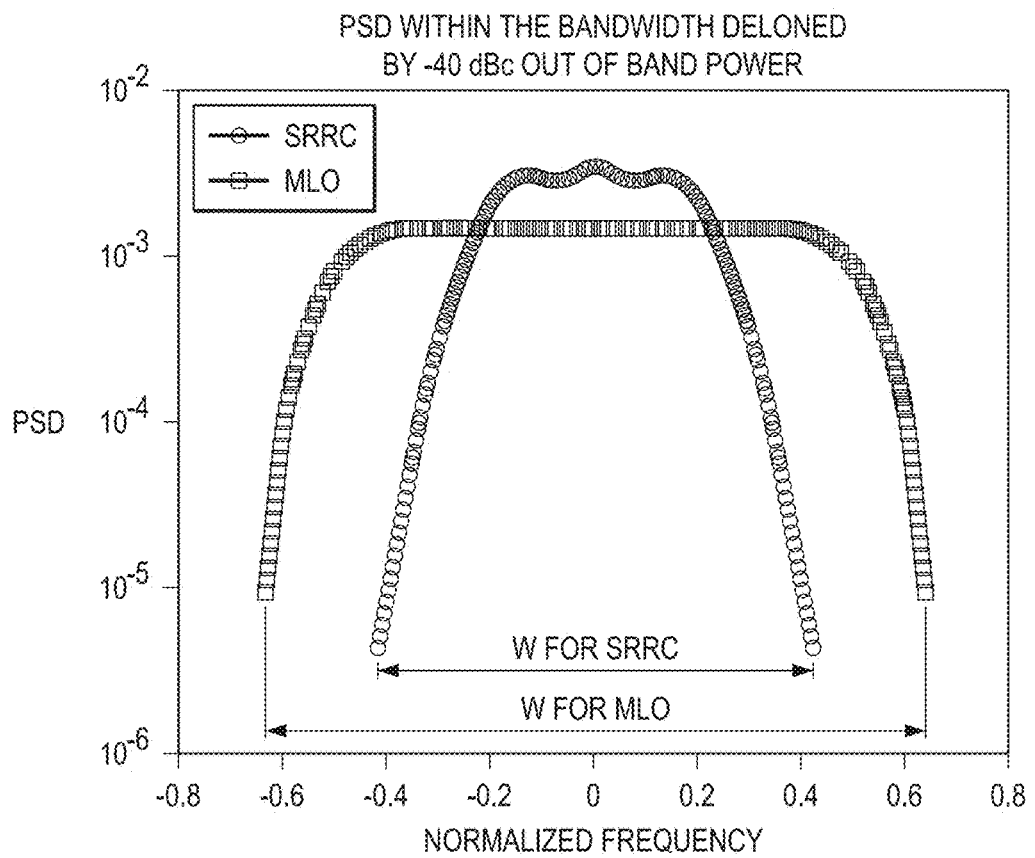
FIG. 53 illustrates a bandwidth comparison based on −40 dBc out of band power bandwidth between multiple layer overlay and square root raised cosine.

Referring now to FIG. 52, there is illustrated a PSD plot (BLANK) of MLO, modified MLO (MMLO) and square root raised cosine (SRRC). From the illustration in FIG. 30, demonstrates the better localization property of MLO. An advantage of MLO is the bandwidth. FIG. 30 also illustrates the interferences to adjacent channels will be much smaller for MLO. This will provide additional advantages in managing, allocating or packaging spectral resources of several channels and systems, and further improvement in overall spectral efficiency. If the bandwidth is defined by the −40 dBc out of band power, the within-bandwidth PSDs of MLO and SRRC are illustrated in FIG. 53. The ratio of the bandwidths is about 1.536. Thus, there is significant room for improvement in spectral efficiency.

Figure 54:
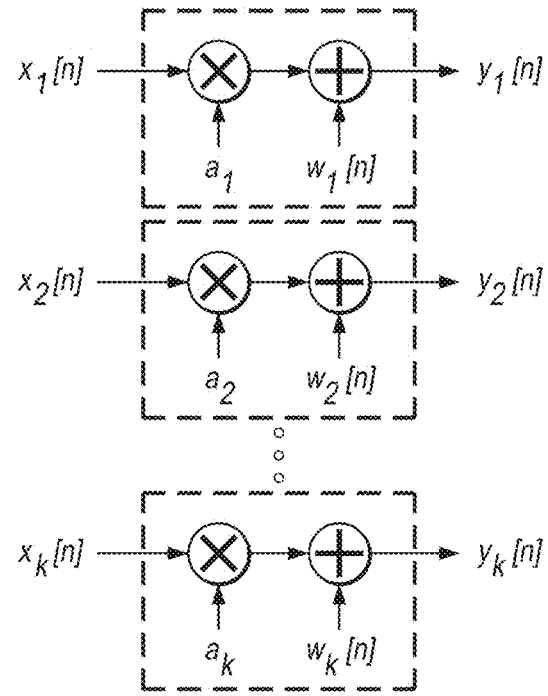
FIG. 54 illustrates equivalent discrete time parallel orthogonal channels of modified multiple layer overlay.

Modified MLO systems are based on block-processing wherein each block contains N MLO symbols and each MLO symbol has L layers. MMLO can be converted into parallel (virtual) orthogonal channels with different channel SNRs as illustrated in FIG. 54. The outputs provide equivalent discrete time parallel orthogonal channels of MMLO.

Figure 55:
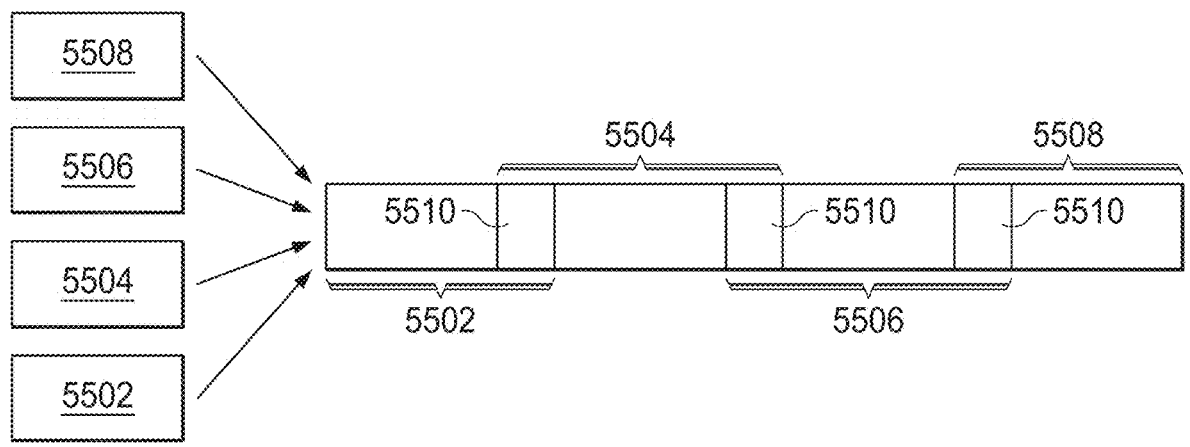
FIG. 55 illustrates four MLO symbols that are included in a single block.

Referring now to FIG. 55, there are illustrated four MLO symbols that are included in a single block 5500. The four symbols 5502-5508 are combined together into the single block 5500. The adjacent symbols 5502-5508 each have an overlapping region 5510. This overlapping region 5510 causes intersymbol interference between the symbols which must be accounted for when processing data streams.

Figure 56:
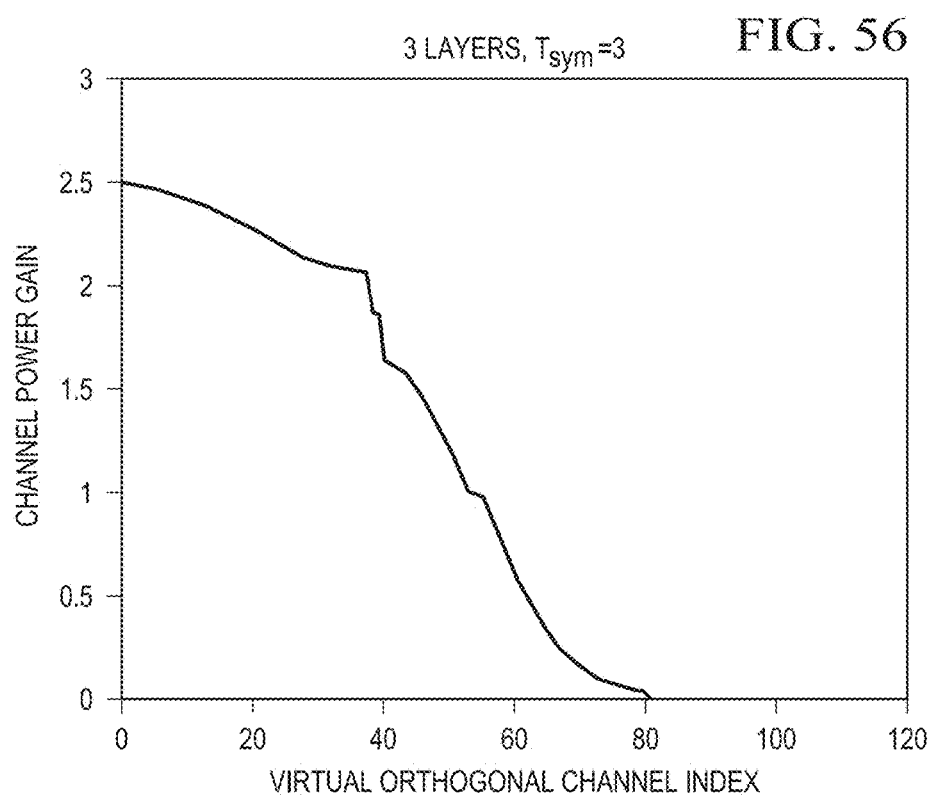
FIG. 56 illustrates the channel power gain of the parallel orthogonal channels of modified multiple layer overlay with three layers and $T_{sym}=3$.

Note that the intersymbol interference caused by pulse overlapping of MLO has been addressed by the parallel orthogonal channel conversion. As an example, the power gain of a parallel orthogonal virtual channel of MMLO with three layers and 40 symbols per block is illustrated in FIG. 56. FIG. 56 illustrates the channel power gain of the parallel orthogonal channels of MMLO with three layers and $T_{sim}=3$. By applying a water filling solution, an optimal power distribution across the orthogonal channels for a fixed transmit power may be obtained. The transmit power on the $k^{th}$ orthogonal channel is denoted by $P_k$. Then the discrete time capacity of the MMLO can be given by:

$$C_d = \sum_{k=1}^{k} \log_2\left(1 + \frac{P_k |a_k|^2}{\sigma_k^2}\right) \text{ bits per block}$$

Note that K depends on the number of MLO layers, the number of MLO symbols per block, and MLO symbol duration.

For MLO pulse duration defined by $[-t_1, t_1]$, and symbol duration $T_{mlo}$, the MMLO block length is:

$$T_{block} = (N-1)T_{mlo} + 2t_1$$

Suppose the bandwidth of MMLO signal based on the adopted bandwidth definition (ACLR, OBP, or other) is $W_{mmlo}$, then the practical spectral efficiency of MMLO is given by:

$$\frac{C_d}{W_{mmlo} T_{block}} = \frac{1}{W_{mmlo}\{(N-1) T_{mlo} + 2 t_1\}} \sum_{k=1}^{K} \log_2\left(1 + \frac{P_k |\alpha_k|^2}{\sigma_k^2}\right) \frac{bps}{Hz}$$

FIGS. 57-58 show the spectral efficiency comparison of MMLO with N=40 symbols per block, L=3 layers, $T_{mlo}=3$, $t_1=8$, and SRRC with duration [−8T, 8T], T=1, and the roll-off factor β=0.22, at SNR of 5 dB. Two bandwidth definitions based on ACLR1 (first adjacent channel leakage power ratio) and OBP (out of band power) are used.

Figure 59:
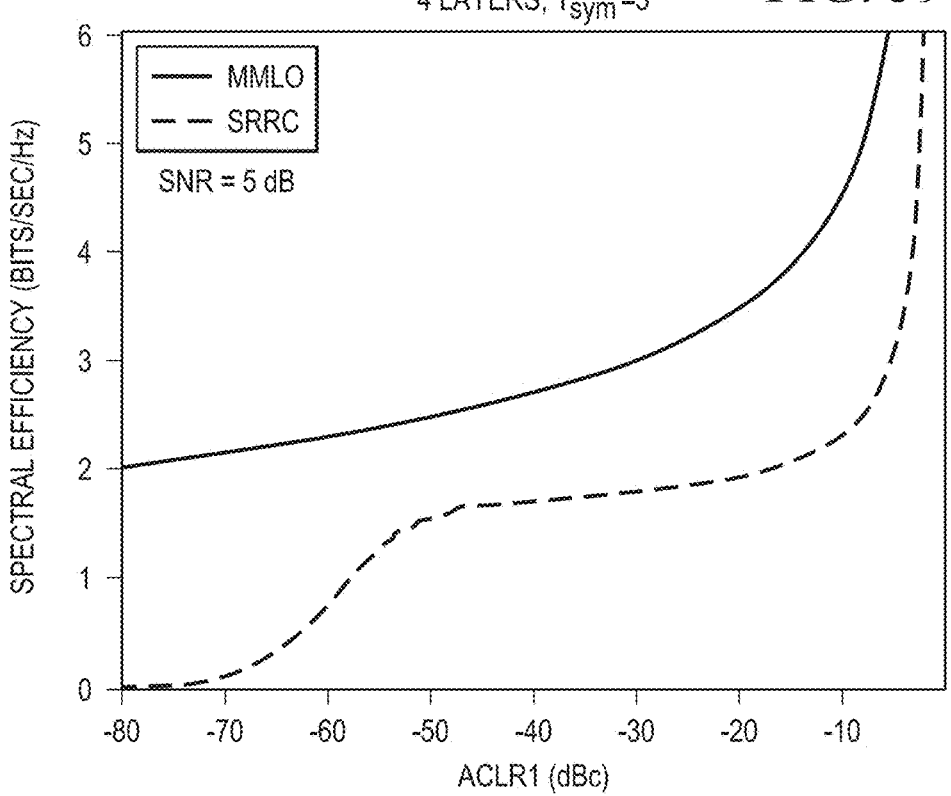
FIG. 59 illustrates a spectral efficiency comparison based on ACLR1 between modified multiple layer overlay and square root raised cosine.
Figure 60:
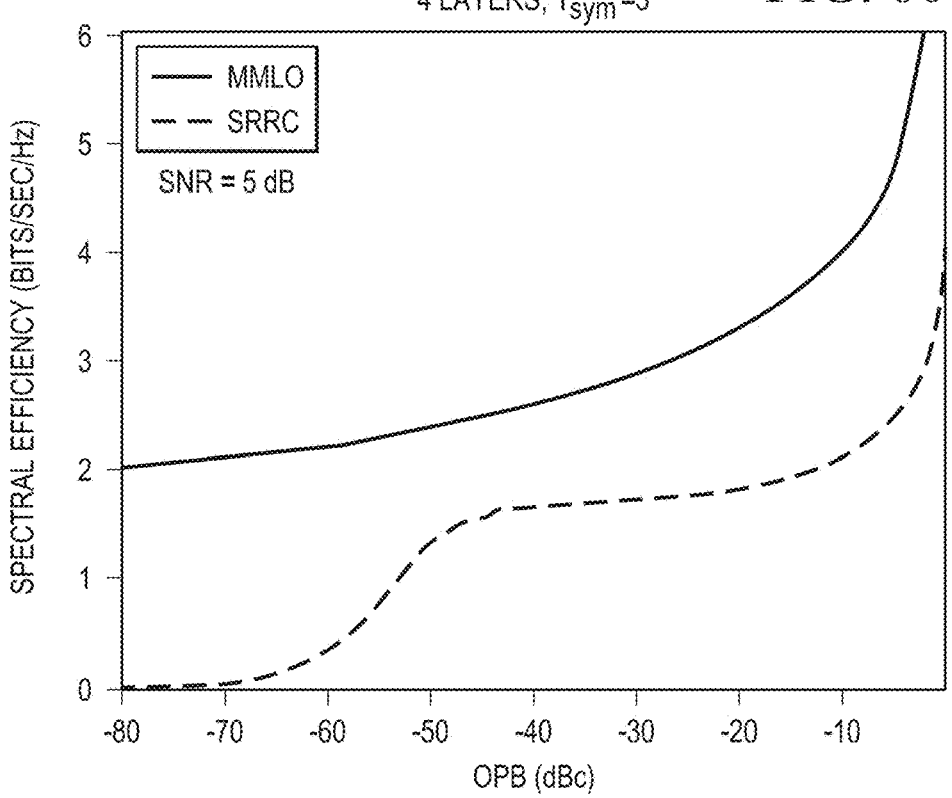
FIG. 60 illustrates a spectral efficiency comparison based on OBP between modified multiple layer overlay and square root raised cosine.

FIGS. 59-60 show the spectral efficiency comparison of MMLO with L=4 layers. The spectral efficiencies and the gains of MMLO for specific bandwidth definitions are shown in the following tables.

TABLE 5

|  | Spectral Efficiency (bps/Hz) based on ACLR1 ≤ 30 dBc per bandwidth | Gain with reference to SRRC |
|---|---|---|
| SRRC | 1.7859 | 1 |
| MMLO (3 layers, Tmlo = 3) | 2.7928 | 1.5638 |
| MMLO (4 layers, Tmlo = 3) | 3.0849 | 1.7274 |

TABLE 6

|  | Spectral Efficiency (bps/Hz) based on OBP ≤ −40 dBc | Gain with reference to SRRC |
|---|---|---|
| SRRC | 1.7046 | 1 |
| MMLO (3 layers, Tmlo = 3) | 2.3030 | 1.3510 |
| MMLO (4 layers, Tmlo = 3) | 2.6697 | 1.5662 |

Figure 61:
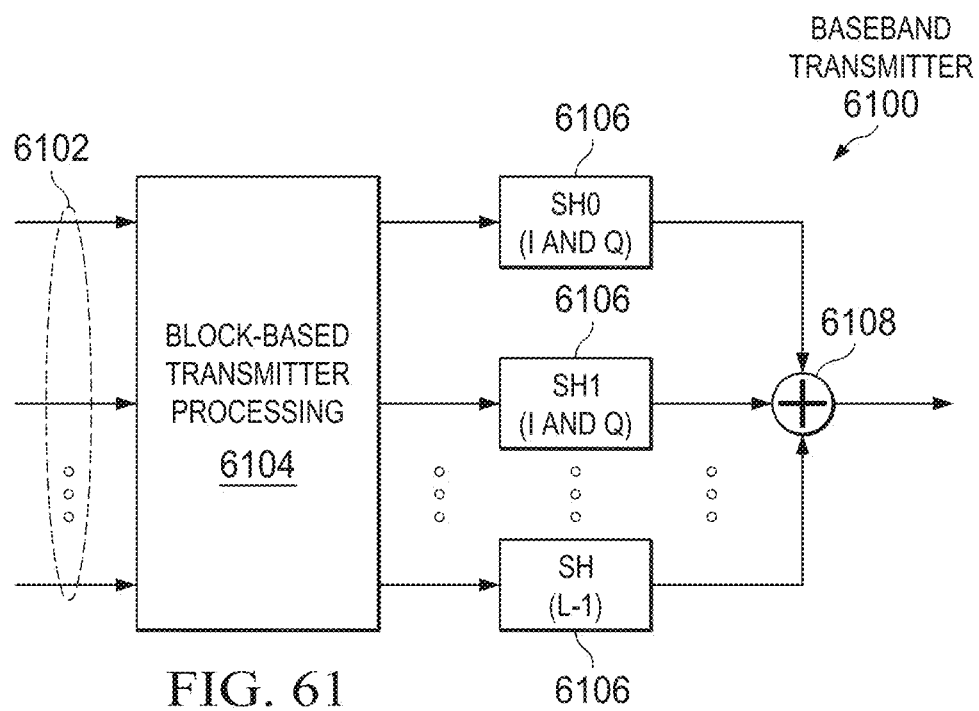
FIG. 61 illustrates a block diagram of a baseband transmitter for a low pass equivalent modified multiple layer overlay system.
Figure 62:
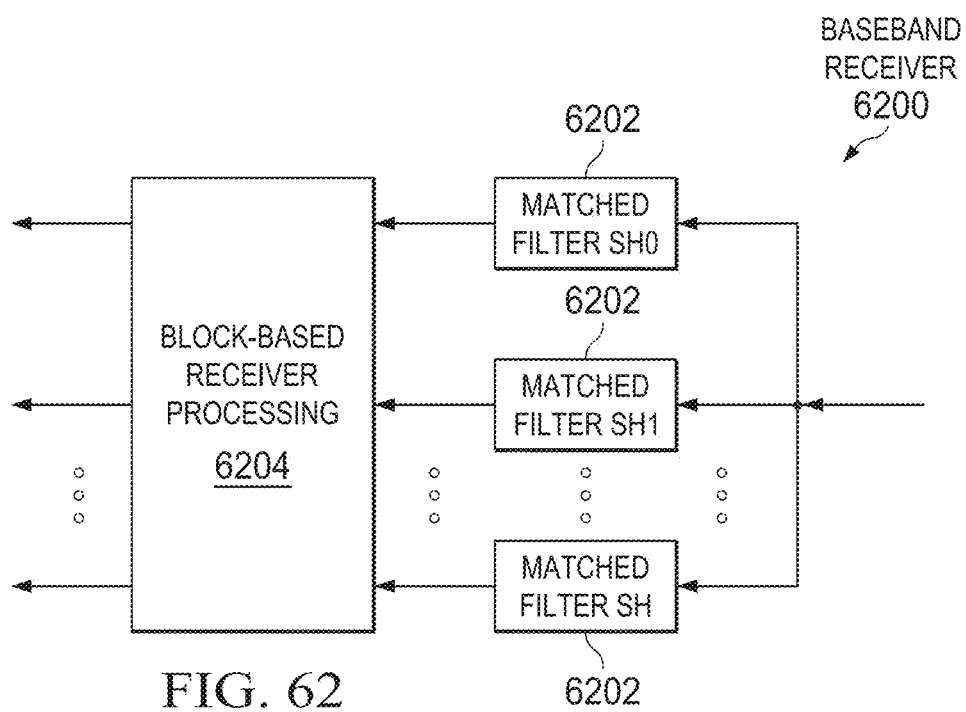
FIG. 62 illustrates a block diagram of a baseband receiver for a low pass equivalent modified multiple layer overlay system.

Referring now to FIGS. 61 and 62, there are provided basic block diagrams of low-pass-equivalent MMLO transmitters (FIG. 61) and receivers (FIG. 62). The low-pass-equivalent MMLO transmitter 6100 receives a number of input signals 6102 at a block-based transmitter processing 6104. The transmitter processing outputs signals to the SH(L−1) blocks 6106 which produce the I&Q outputs. These signals are then all combined together at a combining circuit 6108 for transmission.

Within the baseband receiver (FIG. 62) 6200, the received signal is separated and applied to a series of match filters 6202. The outputs of the match filters are then provided to the block-based receiver processing block 6204 to generate the various output streams.

Consider a block of N MLO-symbols with each MLO symbol carrying L symbols from L layers. Then there are NL symbols in a block. Define c(m, n)=symbol transmitted by the m-th MLO layer at the n-th MLO symbol. Write all NL symbols of a block as a column vector as follows: c=[c(0,0), c(1,0), . . . , c(L−1,0), c(0,1), c(1,1), . . . , c(L−1,1), . . . , c(L−1, N−1)]T. Then the outputs of the receiver matched filters for that transmitted block in an AWGN channel, defined by the column vector y of length NL, can be given as y=H c+n, where H is an NL×NL matrix representing the equivalent MLO channel, and n is a correlated Gaussian noise vector.

By applying SVD to H, we have H=U D VH where D is a diagonal matrix containing singular values. Transmitter side processing using V and the receiver side processing UH, provides an equivalent system with NL parallel orthogonal channels, (i.e., y=H Vc+n and UH y=Dc+UH n). These parallel channel gains are given by diagonal elements of D. The channel SNR of these parallel channels can be computed. Note that by the transmit and receive block-based processing, we obtain parallel orthogonal channels and hence the ISI issue has be resolved.

Since the channel SNRs of these parallel channels are not the same, we can apply the optimal Water filling solution to compute the transmit power on each channel given a fixed total transmit power. Using this transmit power and corresponding channel SNR, we can compute capacity of the equivalent system as given in the previous report.

Issues of Fading, Multipath, and Multi-Cell Interference

Techniques used to counteract channel fading (e.g., diversity techniques) in conventional systems can also be applied in MMLO. For slowly-varying multi-path dispersive channels, if the channel impulse response can be fed back, it can be incorporated into the equivalent system mentioned above, by which the channel induced ISI and the intentionally introduced MMLO ISI can be addressed jointly. For fast time-varying channels or when channel feedback is impossible, channel equalization needs to be performed at the receiver. A block-based frequency-domain equalization can be applied and an oversampling would be required.

If we consider the same adjacent channel power leakage for MMLO and the conventional system, then the adjacent cells' interference power would be approximately the same for both systems. If interference cancellation techniques are necessary, they can also be developed for MMLO.

Channel fading can be another source of intersymbol interference (ISI) and interlayer interference (ILI). One manner for representing small-scale signal fading is the use of statistical models. White Gaussian noise may be used to model system noise. The effects of multipath fading may be modeled using Rayleigh or Rician probability density functions. Additive white Gaussian noise (AWGN) may be represented in the following manner. A received signal is:

$$r(t)=s(t)+n(t)$$

where: r(t)=a received signal; s(t)=a transmitted signal; and n(t)=random noise signal Rayleigh fading functions are useful for predicting bit error rate (BER) any multipath environment. When there is no line of sight (LOS) or dominate received signal, the power the transmitted signal may be represented by:

$$P_r(r) = \begin{cases} \frac{r}{\sigma^2} e^{\frac{-r^2}{2\sigma^2}}, & r \geq 0 \\ 0, & r < 0 \end{cases}$$

where: σ=rms value of received signal before envelope detection,
σ=time average power of the received signal before envelope detection.

Figure 63:
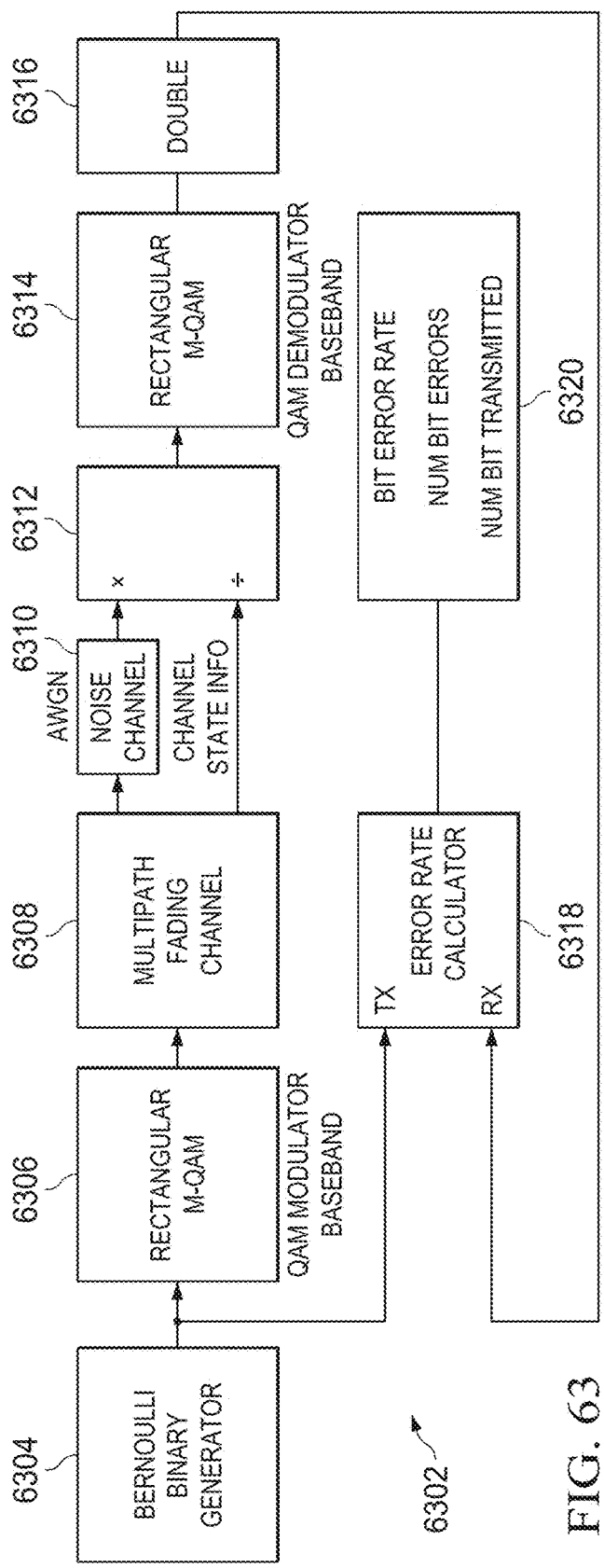
FIG. 63 illustrates a channel simulator.

In a similar manner, Rician functions may be used in situations where there is a line of sight or dominant signal within a transmitted signal. In this case, the power of the transmitted signal can be represented by:

$$P_r(r) = \begin{cases} \frac{r}{\sigma^2} e^{\frac{-(r^2+A^2)}{2\sigma^2}} II_0\left(\frac{A_r}{\sigma^2}\right), & A \geq r \geq 0 \\ 0, & r < 0 \end{cases}$$

where A=peak amplitude of LOS component
$II_0$=modified Bessel Function of the first kind and zero-order These functions may be implemented in a channel simulation to calculate fading within a particular channel using a channel simulator such as that illustrated in FIG. 63. The channel simulator 6302 includes a Bernoulli binary generator 6304 for generating an input signal that is provided to a rectangular M-QAM modulator 6306 that generates a QAM signal at baseband. Multipath fading channel block 6308 uses the Rician equations to simulate multipath channel fading. The simulated multipath fading channel is provided to a noise channel simulator 6310. The noise channel simulator 6310 simulates AWGN noise. The multipath fading channel simulator 6308 further provides channel state information to arithmetic processing block 6312 which utilizes the simulated multipath fading information and the AWGN information into a signal that is demodulated at QAM demodulator block 6314. The demodulated simulated signal is provided to the doubler block 6316 which is input to a receive input of an error rate calculator 6318. The error rate calculator 6318 further receives at a transmitter input, the simulated transmission signal from the Bernoulli binary generator 6304. The error rate calculator 6318 uses the transmitter input and the received input to provide in error rate calculation to a bit error rate block 6320 that determines the channel bit error rate. This type of channel simulation for determining bit error rate will enable a determination of the amount of QLO that may be applied to a signal in order to increase throughput without overly increasing the bit error rate within the channel.

Scope and System Description

This report presents the symbol error probability (or symbol error rate) performance of MLO signals in additive white Gaussian noise channel with various inter-symbol interference levels. As a reference, the performance of the conventional QAM without ISI is also included. The same QAM size is considered for all layers of MLO and the conventional QAM.

The MLO signals are generated from the Physicist's special Hermite functions:

$$f_n(t, \alpha) = \sqrt{\frac{\alpha}{\sqrt{\pi} n \, !2^2}} H_n(\alpha t) e^{-\frac{\alpha^2 t^2}{2}}$$

where Hn(αt) is the $n^{th}$ order Hermite polynomial. Note that the functions used in the lab setup correspond to $$\alpha = \frac{1}{\sqrt{2}}$$

and, for consistency, $$\alpha = \frac{1}{\sqrt{2}}$$

is used in this report.

MLO signals with 3, 4 or 10 layers corresponding to n=0~2, 0~3, or 0~9 are used and the pulse duration (the range of t) is [−8, 8] in the above function.

AWGN channel with perfect synchronization is considered.

The receiver consists of matched filters and conventional detectors without any interference cancellation, i.e., QAM slicing at the matched filter outputs.

$$\% \text{ pulse-overlapping} = \frac{T_p - T_{sym}}{T_p} \times 100\%$$

where Tp is the pulse duration (16 in the considered setup) and Tsym is the reciprocal of the symbol rate in each MLO layer. The considered cases are listed in the following table.

TABLE 7

| % of Pulse Overlapping | $T_{sym}$ | $T_p$ |
|---|---|---|
| 0% | 16 | 16 |
| 12.5% | 14 | 16 |
| 18.75% | 13 | 16 |
| 25% | 12 | 16 |
| 37.5% | 10 | 16 |
| 43.75% | 9 | 16 |
| 50% | 8 | 16 |
| 56.25% | 7 | 16 |
| 62.5% | 6 | 16 |
| 75% | 4 | 16 |

Derivation of the Signals Used in Modulation

To do that, it would be convenient to express signal amplitude s(t) in a complex form close to quantum mechanical formalism. Therefore the complex signal can be represented as:

$$\psi(t) = s(t) + j\sigma(t)$$

where $s(t) \equiv$ real signal $\sigma(t) \equiv$ imaginary signal (quadrature)

$$\sigma(t) = \frac{1}{\tau} \int_{-\infty}^{\infty} s(\tau) \frac{d\tau}{\tau - t}$$

-continued $$s(t) = -\frac{1}{\pi} \int_{-\infty}^{\infty} \sigma(t) \frac{d\tau}{\tau - t}$$

Where s(t) and σ(t) are Hilbert transforms of one another and since σ(t) is quadratures of s(t), they have similar spectral components. That is if they were the amplitudes of sound waves, the ear could not distinguish one form from the other.

Let us also define the Fourier transform pairs as follows:

$$\psi(t) = \frac{1}{\pi} \int_{-\infty}^{\infty} \varphi(f) e^{j\omega t} df$$

$$\varphi(f) = \frac{1}{\pi} \int_{-\infty}^{\infty} \psi(t) e^{-j\omega t} dt$$

$$\psi^*(t)\psi(t) = [s(t)]^2 + [\sigma(t)]^2 + \ldots \equiv signal\ power$$

Let's also normalize all moments to $M_0$ $$M_0 = \int_0^\tau s(t)\ dt$$

$$M_0 = \int_0^\tau \varphi^* \varphi\ df$$

Then the moments are as follows:

$$M_0 = \int_0^\tau s(t)\ dt$$

$$M_1 = \int_0^\tau t\ s(t)\ dt$$

$$M_2 = \int_0^\tau t^2\ s(t)\ dt$$

$$M_{N-1} = \int_0^\tau t^{N-1}\ s(t)\ dt$$

In general, one can consider the signal s(t) be represented by a polynomial of order N, to fit closely to s(t) and use the coefficient of the polynomial as representation of data. This is equivalent to specifying the polynomial in such a way that its first N "moments" $M_j$ shall represent the data. That is, instead of the coefficient of the polynomial, we can use the moments. Another method is to expand the signal s(t) in terms of a set of N orthogonal functions $\varphi_k(t)$, instead of powers of time. Here, we can consider the data to be the coefficients of the orthogonal expansion. One class of such orthogonal functions are sine and cosine functions (like in Fourier series).

Therefore we can now represent the above moments using the orthogonal function w with the following moments:

$$\bar{t} = \frac{\int \psi^*(t) t \psi(t)\ dt}{\int \psi^*(t)\ \psi(t)\ dt}$$

$$\overline{t^2} = \frac{\int \psi^*(t) t^2\ \psi(t)\ dt}{\int \psi^*(t)\ \psi(t)\ dt}$$

$$\overline{t^n} = \frac{\int \psi^*(t) t^n\ \psi(t)\ dt}{\int \psi^*(t)\ \psi(t)\ dt}$$

Similarly, $$\bar{f} = \frac{\int \varphi^*(f) f \varphi(f)\ df}{\int \varphi^*(f)\ \varphi(f)\ df}$$

$$\overline{f^2} = \frac{\int \varphi^*(f) f^2\ \varphi(f)\ df}{\int \varphi^*(f)\ \varphi(f)\ df}$$

$$\overline{f^n} = \frac{\int \varphi^*(f) f^n\ \varphi(f)\ df}{\int \varphi^*(f)\ \varphi(f)\ df}$$

If we did not use complex signal, then:

$$\bar{f}=0$$

To represent the mean values from time to frequency domains, replace:

$$\varphi(f) \to \psi(t)$$

$$f \to \frac{1}{2\pi j} \frac{d}{dt}$$

These are equivalent to somewhat mysterious rule in quantum mechanics where classical momentum becomes an operator:

$$P_x \to \frac{h}{2\pi j} \frac{\partial}{\partial x}$$

Therefore using the above substitutions, we have:

$$\bar{f} = \frac{\int \varphi^*(f) f \varphi(f)\ df}{\int \varphi^*(f) \varphi(f)\ df} = \frac{\int \psi^*(t) \left(\frac{1}{2\pi j}\right) \frac{d\psi(t)}{dt} dt}{\int \psi^*(t)\ \psi(t)\ dt} = \left(\frac{1}{2\pi j}\right) \frac{\int \psi^* \frac{d\psi}{dt} dt}{\int \psi^* \psi dt}$$

And:

$$\overline{f^2} =$$

$$\frac{\int \varphi^*(f) f^2\ \varphi(f)\ df}{\int \varphi^*(f)\ \varphi(f)\ df} = \frac{\int \psi^* \left(\frac{1}{2\pi j}\right)^2 \frac{d^2}{dt^2} \psi\ dt}{\int \psi^* \psi\ dt} = -\left(\frac{1}{2\pi}\right)^2 \frac{\int \psi^* \frac{d^2}{dt^2} \psi\ dt}{\int \psi^* \psi\ dt}$$

$$\overline{t^2} = \frac{\int \psi^* t^2 \psi \, dt}{\int \psi^* \psi \, dt}$$

We can now define an effective duration and effective bandwidth as:

$\Delta t = \sqrt{2\pi \overline{(t-\bar{t})^2}} = 2\pi \cdot \text{rms in time}$ $\Delta t = \sqrt{2\pi \overline{(f-\bar{f})^2}} = 2\pi \cdot \text{rms in frequency}$ But we know that:

$\overline{(t-\bar{t})^2} = \overline{t^2} - (\bar{t})^2$ $\overline{(f-\bar{f})^2} = \overline{f^2} - (\bar{f})^2$ We can simplify if we make the following substitutions:

$\tau = t - \bar{t}$ $\Psi(\tau) = \psi(t) e^{-j\bar{\omega}\tau}$ $\omega_0 = \bar{\omega} = 2\pi \bar{f} = 2\pi f_0$ We also know that:

$(\Delta t)^2 (\Delta f)^2 = (\Delta t \Delta f)^2$

And therefore:

$$(\Delta t \, \Delta f)^2 = \frac{1}{4}\left[ 4 \frac{\int \Psi^*(\tau)\tau^2 \Psi(\tau) d\tau \int \frac{d\Psi^*}{d\tau} \frac{d\Psi}{d\tau} d\tau}{(\int \Psi^*(\tau) \psi(\tau) \, d\tau)^2} \right] \geq \left(\frac{1}{4}\right)$$

$(\Delta t \, \Delta f) \geq \left(\frac{1}{2}\right)$

Now instead of $(\Delta t \Delta f) \geq \left(\frac{1}{2}\right)$ we are interested to force the equality $(\Delta t \Delta f) \geq \left(\frac{1}{2}\right)$ and see what signals satisfy the equality. Given the fixed bandwidth $\Delta f$, the most efficient transmission is one that minimizes the time-bandwidth product $(\Delta t \Delta f) \geq \left(\frac{1}{2}\right)$ For a given bandwidth $\Delta f$, the signal that minimizes the transmission in minimum time will be a Gaussian envelope. However, we are often given not the effective bandwidth, but always the total bandwidth $f_2 - f_1$. Now, what is the signal shape which can be transmitted through this channel in the shortest effective time and what is the effective duration?

$$\Delta t = \frac{\frac{1}{(2\pi)^2} \int_{f_1}^{f_2} \frac{d\varphi^*}{df} \frac{d\varphi}{df}}{\int_{f_1}^{f_2} \varphi^* \varphi \, df} \to \min$$

Where $\varphi(f)$ is zero outside the range $f_2 - f_1$.

To do the minimization, we would use the calculus of variations (Lagrange's Multiplier technique). Note that the denominator is constant and therefore we only need to minimize the numerator as:

$$\Delta t \to \min \to \delta \int_{f_1}^{f_2} \left( \frac{d\varphi^*}{df} \frac{d\varphi}{df} + \Lambda \varphi^* \varphi \right) df = 0$$

First *Trem*

$$\delta \int_{f_1}^{f_2} \frac{d\varphi^*}{df} \frac{d\varphi}{df} df =$$

$$\int \left( \frac{d\varphi^*}{df} \delta \frac{d\varphi}{df} + \frac{d\varphi}{df} \delta \frac{d\varphi^*}{df} \right) df = \int \left( \frac{d\varphi^*}{df} \frac{d\delta\varphi}{df} + \frac{d\varphi}{df} \frac{d\delta\varphi^*}{df} \right) df =$$

$$\left[ \frac{d\varphi^*}{df} \delta\varphi + \frac{d\varphi}{df} \delta\varphi^* \right]_{f_1}^{f_2} - \int \left( \frac{d^2\varphi^*}{df^2} \delta\varphi + \frac{d^2\varphi}{df^2} \delta\varphi^* \right) df =$$

$$\int \left( \frac{d^2\varphi^*}{df^2} \delta\varphi + \frac{d^2\varphi}{df^2} \delta\varphi^* \right) df$$

Second *Trem*

$$\delta \int_{f_1}^{f_2} (\Lambda \varphi^* \varphi) df = \Lambda \int_{f_1}^{f_2} (\varphi^* \delta\varphi + \varphi \delta\varphi^*) df$$

Both *Trems*

$$= \int \left[ \left( \frac{d^2\varphi^*}{df^2} + \Lambda \varphi^* \right) \delta\varphi + \left( \frac{d^2\varphi}{df^2} + \Lambda \varphi \right) \delta\varphi^* \right] df = 0$$

This is only possible if and only if.

$$\left( \frac{d^2\varphi}{df^2} + \Lambda \varphi \right) = 0$$

The solution to this is of the form $$\varphi(f) = \sin k\pi \left( \frac{f - f_1}{f_2 - f_1} \right)$$

Now if we require that the wave vanishes at infinity, but still satisfy the minimum time-bandwidth product:

$(\Delta t \Delta f) = \left(\frac{1}{2}\right)$

Then we have the wave equation of a Harmonic Oscillator:

$$\frac{d^2 \Psi(\tau)}{d\tau^2} + (\lambda - \alpha^2 \tau^2) \Psi(\tau) = 0$$

which vanishes at infinity only if:

$$\lambda = \alpha(2n+1)$$

$$\psi_n = e^{-\frac{1}{2}\omega^2\tau^2} \frac{d^n}{d\tau^n} e^{-\alpha^2\tau^2} \propto H_n(\tau)$$

Where $H_n(\tau)$ is the Hermit functions and:

$$(\Delta t \Delta f) = \frac{1}{2}(2n+1)$$

So Hermit functions $H_n(\tau)$ occupy information blocks of ½, 3/2, 5/2, ... with ½ as the minimum information quanta.

Squeezed States

Here we would derive the complete Eigen functions in the most generalized form using quantum mechanical approach of Dirac algebra. We start by defining the following operators:

$$b = \sqrt{\frac{m\omega'}{2\eta}}\left(x + \frac{ip}{m\omega'}\right)$$

$$b^+ = \sqrt{\frac{m\omega'}{2\eta}}\left(x - \frac{ip}{m\omega'}\right)$$

$$[b, b^+] = 1$$

$$a = \lambda b - \mu b^+$$

$$a^+ = \lambda b^+ - \mu b$$

Now we are ready to define $\Delta x$ and $\Delta p$ as:

$$(\Delta x)^2 = \frac{\eta}{2m\omega}\left(\frac{\omega}{\omega'}\right) = \frac{\eta}{2m\omega}(\lambda - \mu)^2$$

$$(\Delta p)^2 = \frac{\eta m\omega}{2}\left(\frac{\omega'}{\omega}\right) = \frac{\eta m\omega}{2}(\lambda + \mu)^2$$

$$(\Delta x)^2(\Delta p)^2 = \frac{\eta^2}{4}(\lambda^2 - \mu^2)^2$$

$$\Delta x \Delta p = \frac{\eta}{2}(\lambda^2 - \mu^2) = \frac{\eta}{2}$$

Now let parameterize differently and instead of two variables $\lambda$ and $\mu$, we would use only one variable $\xi$ as follows:

$$\lambda = \sin h\, \xi$$

$$\mu = \cos h\, \xi$$

$$\lambda + \mu = e^\xi$$

$$\lambda - \mu = -e^{-\xi}$$

Now the Eigen states of the squeezed case are:

$$b|\beta\rangle = \beta|\beta\rangle$$

$$(\lambda a + \mu a^+)|\beta\rangle = \beta|\beta\rangle$$

$$b = UaU^+$$

-continued $$U = e^{\xi/2(a^2 - a^{+2})}$$

$$U^+(\xi)aU(\xi) = a\cosh\xi - a^+\sinh\xi$$

$$U^+(\xi)a^+U(\xi) = a^+\cosh\xi - a\sinh\xi$$

We can now consider the squeezed operator:

$$|\alpha, \xi\rangle = U(\xi)D(\alpha)|0\rangle$$

$$D(\alpha) = e^{\frac{-|\alpha|^2}{2}} e^{\alpha a^+} e^{-\alpha^* a}$$

$$|\alpha\rangle = \sum_{n=0}^{\infty} \frac{\alpha^n}{\sqrt{n!}} e^{\frac{-|\alpha|^2}{2}} |n\rangle$$

$$|\alpha\rangle = e^{\frac{-|\alpha|^2}{2} + \alpha a^+}|0\rangle$$

For a distribution P(n) we would have:

$$P(n) = |\langle n||\beta, \xi\rangle|^2$$

$$\langle \alpha||\beta, \xi\rangle = \sum_{n=0}^{\infty} \frac{\alpha^n}{\sqrt{n!}} e^{\frac{-|\alpha|^2}{2}} \langle n||\beta, \xi\rangle$$

$$e^{2zt - t^2} = \sum_{n=0}^{\infty} \frac{H_n(z)t^n}{n!}$$

Therefore the final result is:

$$\langle n||\beta, \xi\rangle = \frac{(\tanh\xi)^{n/2}}{2^{n/2}(n!\cosh\xi)^2} e^{-1/2(|\beta|^2 - \beta^2 \tanh\xi)} H_n\left(\frac{\beta}{2\sinh\xi\cosh\xi}\right)$$

Figure 64:
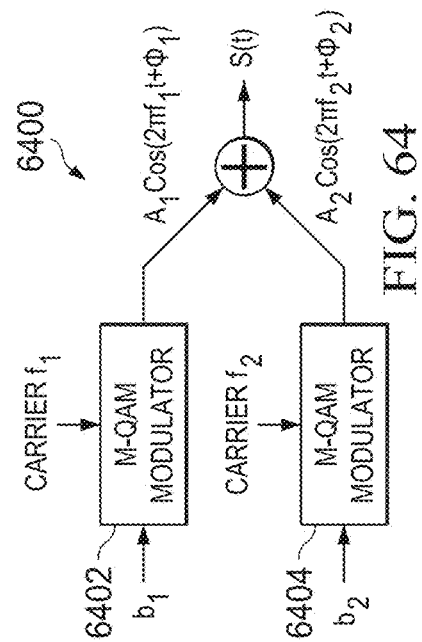
FIG. 64 illustrates the generation of bit streams for a QAM modulator.

Another issue of concern with the use of QLO with QAM is a desire to improve bit error rate (BER) performance without impacting the information rate or bandwidth requirements of the queue a low signal. One manner for improving BER performance utilizes two separate oscillators that are separated by a known frequency $\Delta f$. Signals generated in this fashion will enable a determination of the BER. Referring now to FIG. 64, there is illustrated the generation of two bit streams b1 and B2 that are provided to a pair of QAM modulators 6402 and 6404 by a transmitter 6400. Modulator 6402 receives a first carrier frequency F1 and modulator 6404 receives a second carrier frequency F2. The frequencies F1 and at two are separated by a known value $\Delta f$. The signals for each modulator are generated and combined at a summing circuit 6406 to provide the output s(t). The variables in the outputs of the QAM modulators are $A_i$ (amplitude), $f_i$ (frequency) and $\phi_i$ (phase).

Therefore, each constituent QAM modulation occupies a bandwidth:

$$BW = r_s = \frac{r_b}{\log_2 m} \text{symbols/sec}$$

where $r_s$ equals the symbol rate of each constituent QAM signal.

The total bandwidth of signal s(t) is:

$$W = r_s\left(1 + \frac{\Delta f}{r_s}\right) = r_s + \Delta f \; H_z$$

Therefore, the spectral efficiency η of this two oscillator system is:

$$\eta = \frac{2r_b}{W}$$

but $$r_b = r_2 \log_2 m$$

$$\eta = \frac{2r_b}{W} = \frac{2r_s \log_2 m}{r_s\left(1+\frac{\Delta f}{r_s}\right)} = \frac{2\log_2 m}{1+\frac{\Delta f}{r_s}} \text{ bits/sec/Hz}$$

The narrowband noise over the signal s(t) is:

$$n(t) = n_I(t)\cos(2\pi f_0 t) - n_q(t)\sin(2\pi f_0 t)$$

Where: $n_I(t)$=noise in I $N_q(t)$=noise in Q

Each noise occupies a bandwidth of W [Hz] and the average power of each component is $N_0 W$. $N_0$ is the noise power spectral density in Watts/Hz. The value of $f_0$ is the mean value of $f_1$ and $f_2$.

Figure 65:
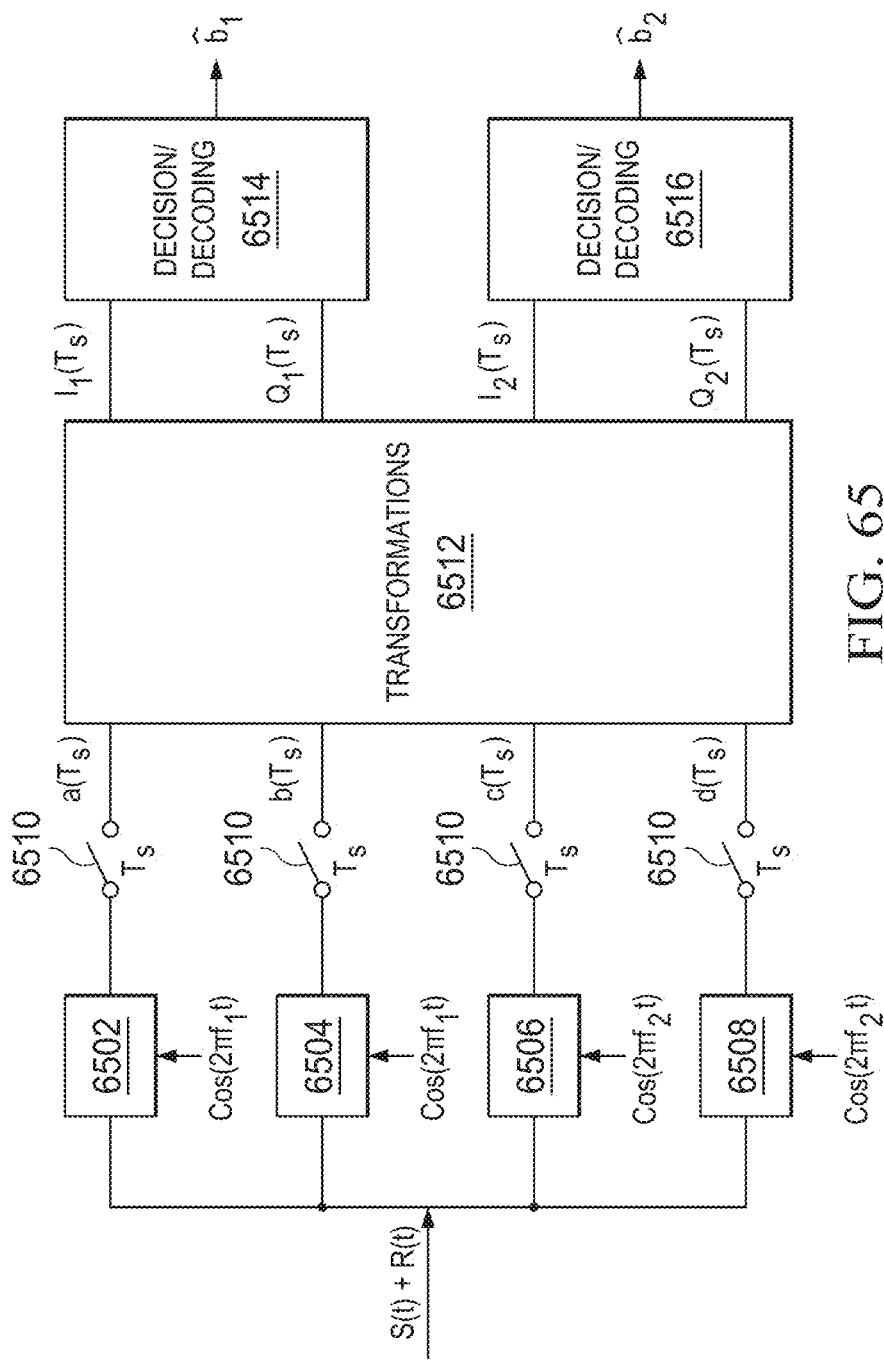
FIG. 65 illustrates a block diagram of a receiver.

Referring now to FIG. 65, there is illustrated a receiver side block diagram for demodulating the signal generated with respect to FIG. 65. The received signal s(t)+n(t) is provided to a number of cosine filters 6502-6508. Cosine filters 6502 and 6504 filter with respect to carrier frequency $f_1$ and cosine filters 6506 and 6508 filter the received signal for carrier frequency $f_2$. Each of the filters 6502-6508 provide an output to a switch 6510 that provides a number of output to a transformation block 6512. Transformation block 6512 provides two output signals having a real portion and an imaginary portion. Each of the real and imaginary portions associated with a signal are provided to an associated decoding circuit 6514, 6516 to provide the decoded signals $b_1$ and $b_2$.

$$\begin{bmatrix} a(T_s) \\ b(T_s) \\ c(T_s) \\ d(T_s) \end{bmatrix} = T_s \begin{bmatrix} 1 & 0 & K_1 & K_2 \\ 0 & 1 & -K_2 & K_1 \\ K_1 & -K_2 & 1 & 0 \\ K_2 & K_1 & 0 & 1 \end{bmatrix} \begin{bmatrix} A_1(\cos\varphi_1) \\ A_1(\sin\varphi_1) \\ A_2(\cos\varphi_2) \\ A_2(\sin\varphi_2) \end{bmatrix} + \begin{bmatrix} N_{I1}(T_s) \\ N_{Q1}(T_s) \\ N_{I2}(T_s) \\ N_{Q2}(T_s) \end{bmatrix}$$

|A⟩ 𝕄 |S⟩ |N⟩

(nonsingular so it has $𝕄^{-1}$)

$|A⟩ = T_s 𝕄 |S⟩ + |N⟩$

Where $$N_{I\frac{1}{2}^{+}_{-}}(T_s) = \int_0^{T_s} \eta_s(t)\cos\left(\frac{2\pi\Delta f}{2}t\right) \mp \eta_G(t)\sin\left(\frac{2\pi\Delta f}{2}t\right) dt$$

$$N_{Q\frac{1}{2}^{+}_{-}}(T_s) = \int_0^{T_s} \eta_I(t)\sin\left(\frac{2\pi\Delta f}{2}t\right) \mp \eta_G(t)\cos\left(\frac{2\pi\Delta f}{2}t\right) dt$$

$|A⟩ = T_s 𝕄 |S⟩ + |N⟩$

Multiply by $$\frac{1}{T_s}𝕄^{-1}$$

$$\frac{1}{T_s}𝕄^{-1}|A⟩ = |S⟩ + \frac{1}{T_s}𝕄^{-1}|N⟩ = |S⟩ + |\tilde{N}⟩$$

Output |O⟩ |Ñ⟩

$$\begin{bmatrix} I_1(T_s) \\ Q_1(T_s) \\ I_2(T_s) \\ Q_2(T_s) \end{bmatrix} = \begin{bmatrix} A_1(\cos\varphi_1) \\ A_1(\sin\varphi_1) \\ A_2(\cos\varphi_2) \\ A_2(\sin\varphi_2) \end{bmatrix} + \begin{bmatrix} \tilde{N}_{I1}(T_s) \\ \tilde{N}_{Q1}(T_s) \\ \tilde{N}_{I2}(T_s) \\ \tilde{N}_{Q2}(T_s) \end{bmatrix}$$

|O⟩ |S⟩ |Ñ⟩

Then the probability of correct decision $P_e$ is $$P_e \approx (1-P_e)^4 \approx 1-4P_e \text{ for } P_e \ll 1$$

$P_e$=well known error probability in one dimension for each constituent m-QAM modulation.

Therefore, one can calculate BER.

$P_e$ comprises the known error probability in one dimension for each constituent member of the QAM modulation. Using the known probability error the bit error rate for the channel based upon the known difference between frequencies $f_1$ and $f_2$ may be calculated.

Adaptive Processing

The processing of signals using QLO may also be adaptively selected to combat channel impairments and interference. The process for adaptive QLO is generally illustrated in FIG. 66. First at step 6602 an analysis of the channel environment is made to determine the present operating environment. The level of QLO processing is selected at step 6604 based on the analysis and used to configure communications. Next, at step 6606, the signals are transmitted at the selected level of QLO processing. Inquiry step 6608 determines if sufficient channel quality has been achieved. If so, the system continues to transmit and the selected QLO processing level at step 6606. If not, control passes back to step 6602 to adjust the level of QLO processing to achieve better channel performance.

Figure 67:
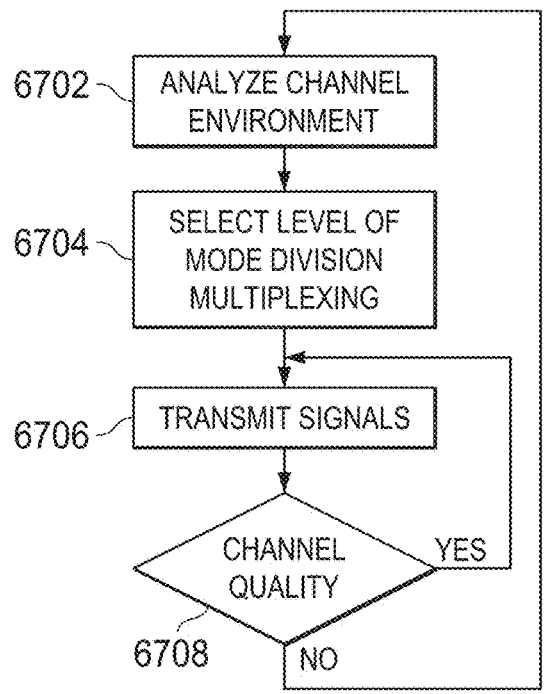
FIG. 67 is a flow diagram illustrating an adaptive MDM process.

The processing of signals using mode division multiplexing (MDM) may also be adaptively selected to combat channel impairments and interference and maximize spectral efficiency. The process for adaptive MDM is generally illustrated in FIG. 67. First at step 6702 an analysis of the channel environment is made to determine the present operating environment. The level of MDM processing is selected at step 6704 based on the analysis and used to configure communications. Next, at step 6706, the signals are transmitted at the selected level of MDM processing. Inquiry step 6708 determines if sufficient channel quality has been achieved. If so, the system continues to transmit and the selected MDM processing level at step 6706. If not, control passes back to step 6702 to adjust the level of MDM processing to achieve better channel performance.

Figure 68:
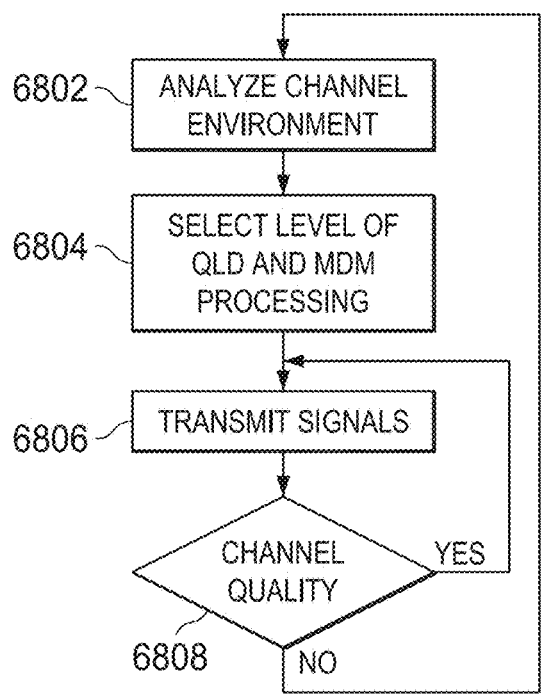
FIG. 68 is a flow diagram illustrating an adaptive QLO and MDM process

The processing of signals using an optimal combination of QLO and MDM may also be adaptively selected to combat channel impairments and interference and maximize spectral efficiency. The process for adaptive QLO and MDM is generally illustrated in FIG. 68. First at step 6802 an analysis of the channel environment is made to determine the present operating environment. A selected combination of a level of QLO process and a level of MDM processing are selected at step 6804 based on the analysis and used to configure communications. Next, at step 6806, the signals are transmitted at the selected level of QLO and MDM processing. Inquiry step 6808 determines if sufficient channel quality has been achieved. If so, the system continues to transmit and the selected combination of QLO and MDM processing levels at step 6806. If not, control passes back to step 6802 to adjust the levels of QLO and MDM processing to achieve better channel performance. Adjustments through the steps continue until a most optimal combination of QLO and MDM processing is achieved to maximize spectral efficiency using a 2-dimensional optimization.

Figure 69:
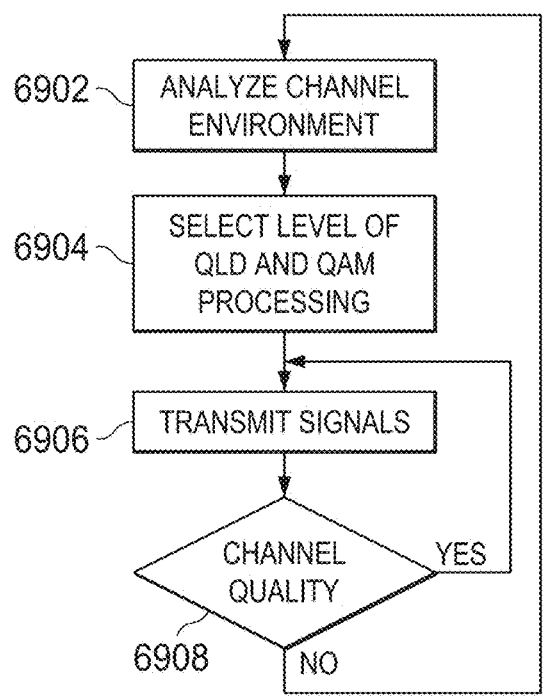
FIG. 69 is a flow diagram illustrating an adaptive QLO and QAM process.

The processing of signals using an optimal combination of QLO and QAM may also be adaptively selected to combat channel impairments and interference and maximize spectral efficiency. The process for adaptive QLO and QAM is generally illustrated in FIG. 69. First at step 6902 an analysis of the channel environment is made to determine the present operating environment. A selected combination of a level of QLO process and a level of QAM processing are selected at step 6904 based on the analysis and used to configure communications. Next, at step 6906, the signals are transmitted at the selected level of QLO and QAM processing. Inquiry step 6908 determines if sufficient channel quality has been achieved. If so, the system continues to transmit and the selected combination of QLO and QAM processing levels at step 6906. If not, control passes back to step 6902 to adjust the levels of QLO and QAM processing to achieve better channel performance. Adjustments through the steps continue until a most optimal combination of QLO and QAM processing is achieved to maximize spectral efficiency using a 2-dimensional optimization.

Figure 70:
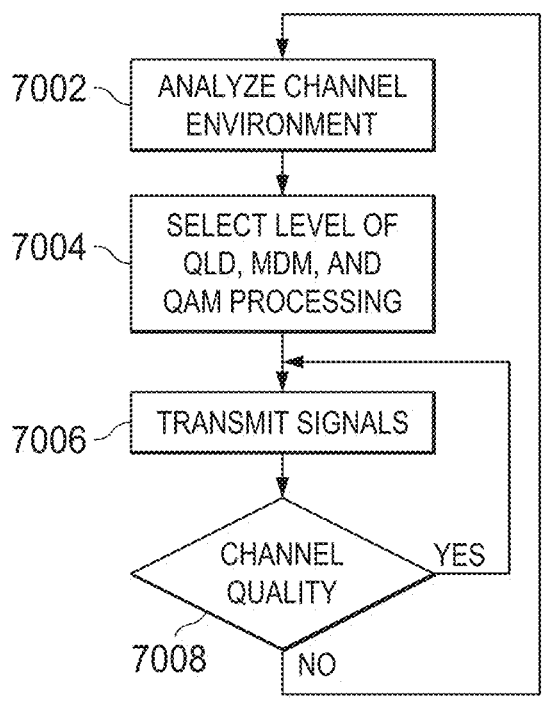
FIG. 70 is a flow diagram illustrating an adaptive QLO, MDM and QAM process.

The processing of signals using an optimal combination of QLO, MDM and QAM may also be adaptively selected to combat channel impairments and interference and maximize spectral efficiency. The process for adaptive QLO, MDM and QAM is generally illustrated in FIG. 70. First at step 7002 an analysis of the channel environment is made to determine the present operating environment. A selected combination of a level of QLO processing, a level of MDM processing and a level of QAM processing are selected at step 7004 based on the analysis and used to configure communications. Next, at step 7006, the signals are transmitted at the selected level of QLO, MDM and QAM processing. Inquiry step 7008 determines if sufficient channel quality has been achieved. If so, the system continues to transmit and the selected combination of QLO, MDM and QAM processing levels at step 7006. If not, control passes back to step 7002 to adjust the levels of QLO, MDM and QAM processing to achieve better channel performance. Adjustments through the steps continue until a most optimal combination of QLO, MDM and QAM processing is achieved to maximize spectral efficiency using a 3-dimensional optimization.

The adaptive approaches described herein above may be used with any combination of QLO, MDM and QAM processing in order to achieve optimal channel efficiency. In another application distinct modal combinations may also be utilized.

Improvement of Pilot Signal Modulation

Figure 71:
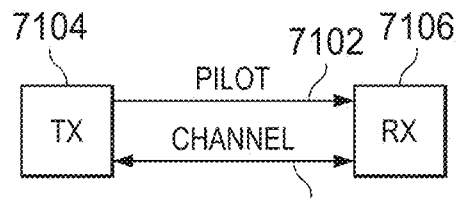
FIG. 71 illustrates the use of a pilot signal to improve channel impairments.

The above described QLO, MDM and QAM processing techniques may also be used to improve the manner in which a system deals with noise, fading and other channel impairments by the use of pilot signal modulation techniques. As illustrated in FIG. 71, a pilot signal 7102 is transmitted between a transmitter 7104 to a receiver 7106. The pilot signal includes an impulse signal that is received, detected and processed at the receiver 7106. Using the information received from the pilot impulse signal, the channel 7108 between the transmitter 7104 and receiver 7106 may be processed to remove noise, fading and other channel impairment issues from the channel 7108.

Figure 72:
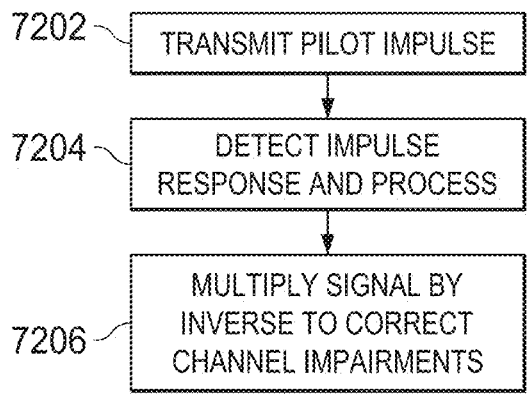
FIG. 72 is a flowchart illustrating the use of a pilot signal to improve channel impairment.

This process is generally described with respect to the flowchart of FIG. 72. The pilot impulse signal is transmitted at 7202 over the transmission channel. The impulse response is detected at step 7204 and processed to determine the impulse response over the transmission channel. Effects of channel impairments such as noise and fading may be countered by multiplying signals transmitted over the transmission channel by the inverse of the impulse response at step 7206 in order to correct for the various channel impairments that may be up on the transmission channel. In this way the channel impairments are counteracted and improved signal quality and reception may be provided over the transmission channel.

Power Control

Figure 73:
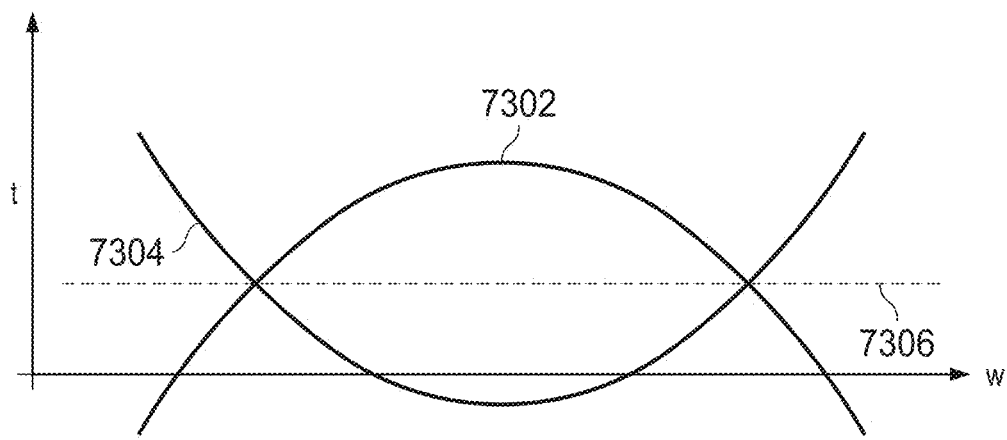
FIG. 73 illustrates a channel response and the effects of amplifier nonlinearities.

Adaptive power control may be provided on systems utilizing QLO, MDM and QAM processing to also improve channel transmission. Amplifier nonlinearities within the transmission circuitry and the receiver circuitry will cause impairments in the channel response as more particularly illustrated in FIG. 73. As can be seen the channel impairments and frequency response increase and decrease over frequency as illustrated generally at 7302. By adaptively controlling the power of a transmitting unit or a receiving unit and inverse frequency response such as that generated at 7304 may be generated. Thus, when the normal frequency response 7302 and the inverse frequency response 7304 are combined, a consistent response 7306 is provided by use of the adaptive power control.

Backward and Forward Channel Estimation

Figure 74:
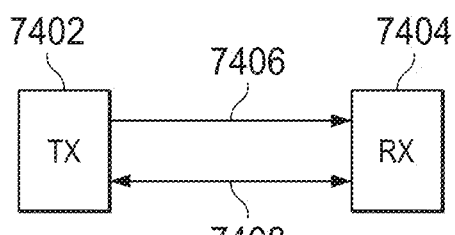
FIG. 74 illustrates the use of QLO in forward and backward channel estimation processes.

QLO techniques may also be used with forward and backward channel estimation processes when communications between a transmitter 7402 and a receiver 7404 do not have the same channel response over both the forward and backward channels. As shown in FIG. 74, the forward channel 7406 and backward channel 7408 between a transmitter 7402 and receiver 7404 may each be processed to determine their channel impulse responses. Separate forward channel estimation response and backward channel estimation response may be used for processing QLO signals transmitted over the forward channel 7406 and backward channel 7408. The differences in the channel response between the forward channel 7406 and the backward channel 7408 may arise from differences in the topography or number of buildings located within the area of the transmitter 7402 and the receiver 7404. By treating each of the forward channel 7406 and a backward channel 7408 differently better overall communications may be achieved.

Using MIMO Techniques with QLO

MIMO techniques may be used to improve the performance of QLO-based transmission systems. MIMO (multiple input and multiple output) is a method for multiplying the capacity of a radio link using multiple transmit and receive antennas to exploit multipath propagation. MIMO uses multiple antennas to transmit a signal instead of only a single antenna. The multiple antennas may transmit the same signal using modulation with the signals from each antenna modulated by different orthogonal signals such as that described with respect to the QLO modulation in order to provide an improved MIMO based system.

Diversions within OAM beams may also be reduced using phased arrays. By using multiple transmitting elements in a geometrical configuration and controlling the current and phase for each transmitting element, the electrical size of the antenna increases as does the performance of the antenna. The antenna system created by two or more individual intended elements is called an antenna array. Each transmitting element does not have to be identical but for simplification reasons the elements are often alike. To determine the properties of the electric field from an array the array factor (AF) is utilized.

The total field from an array can be calculated by a superposition of the fields from each element. However, with many elements this procedure is very unpractical and time consuming. By using different kinds of symmetries and identical elements within an array, a much simpler expression for the total field may be determined. This is achieved by calculating the so-called array factor (AF) which depends on the displacement (and shape of the array), phase, current amplitude and number of elements. After calculating the array factor, the total field is obtained by the pattern multiplication rule which is such that the total field is the product of the array factor in the field from one single element.

$$E_{total} = E_{single\ element} \times AF$$

This formula is valid for all arrays consisting of identical elements. The array factor does not depend on the type of elements used, so for calculating AF it is preferred to use point sources instead of the actual antennas. After calculating the AF, the equation above is used to obtain the total field. Arrays can be 1D (linear), 2D (planar) or 3D. In a linear array, the elements are placed along the line and in a planar they are situated in a plane.

Figure 75:
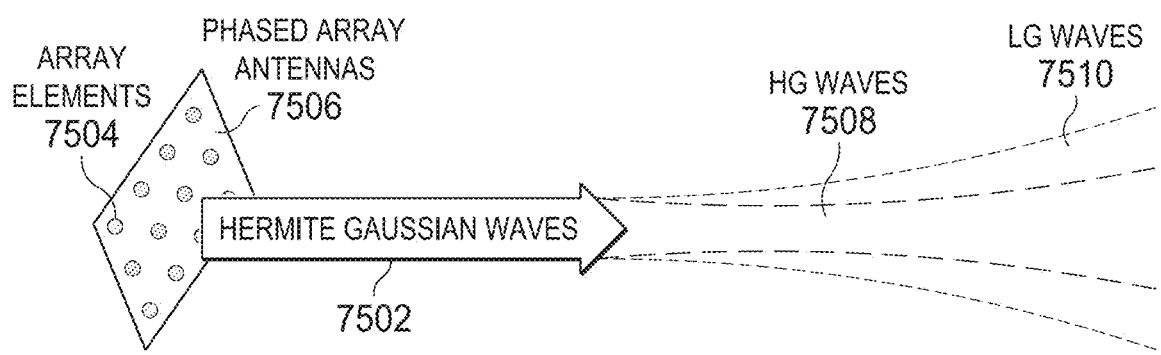
FIG. 75 illustrates the manner in which Hermite Gaussian beams and Laguerre Gaussian beams diverge when transmitted from phased array antennas.

Referring now to FIG. 75, there is illustrated in the manner in which Hermite Gaussian beams and Laguerre Gaussian beams will diverge when transmitted from a phased array of antennas. For the generation of Laguerre Gaussian beams a circular symmetry over the cross-section of the phased antenna array is used, and thus, a circular grid will be utilized. For the generation of Hermite Gaussian beams 7502, a rectangular array 7504 of array elements 7506 is utilized. As can be seen with respect to FIG. 75, the Hermite Gaussian waves 7508 provide a more focused beam front then the Laguerre Gaussian waves 7510.

Figure 76A:
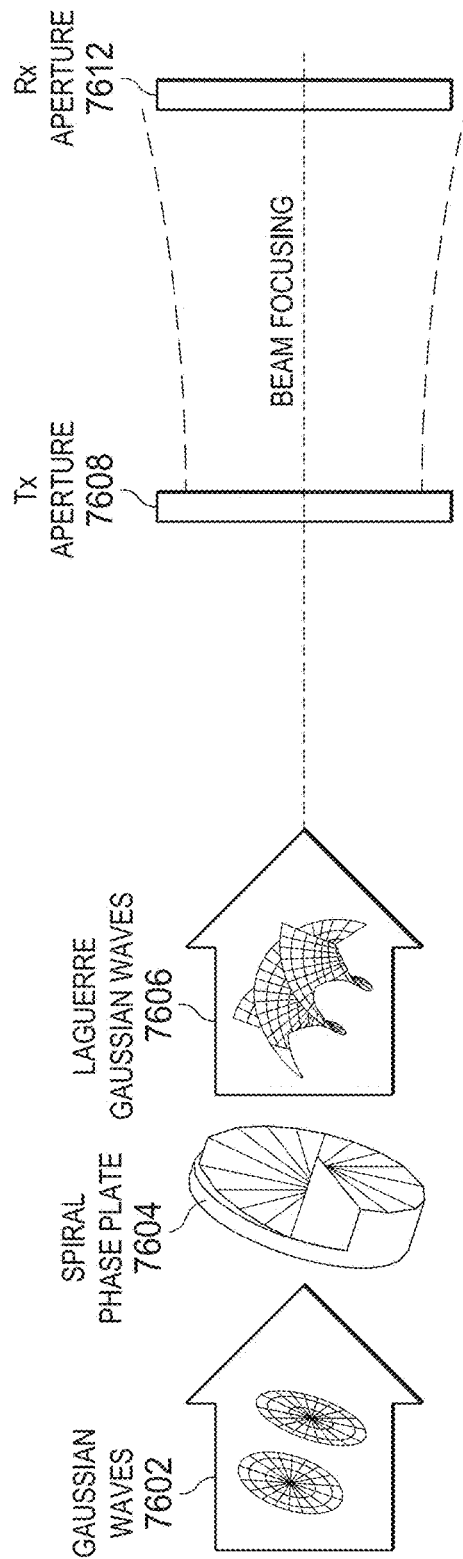
FIG. 76A illustrates beam divergence between a transmitting aperture and a receiving aperture.
Figure 76B:
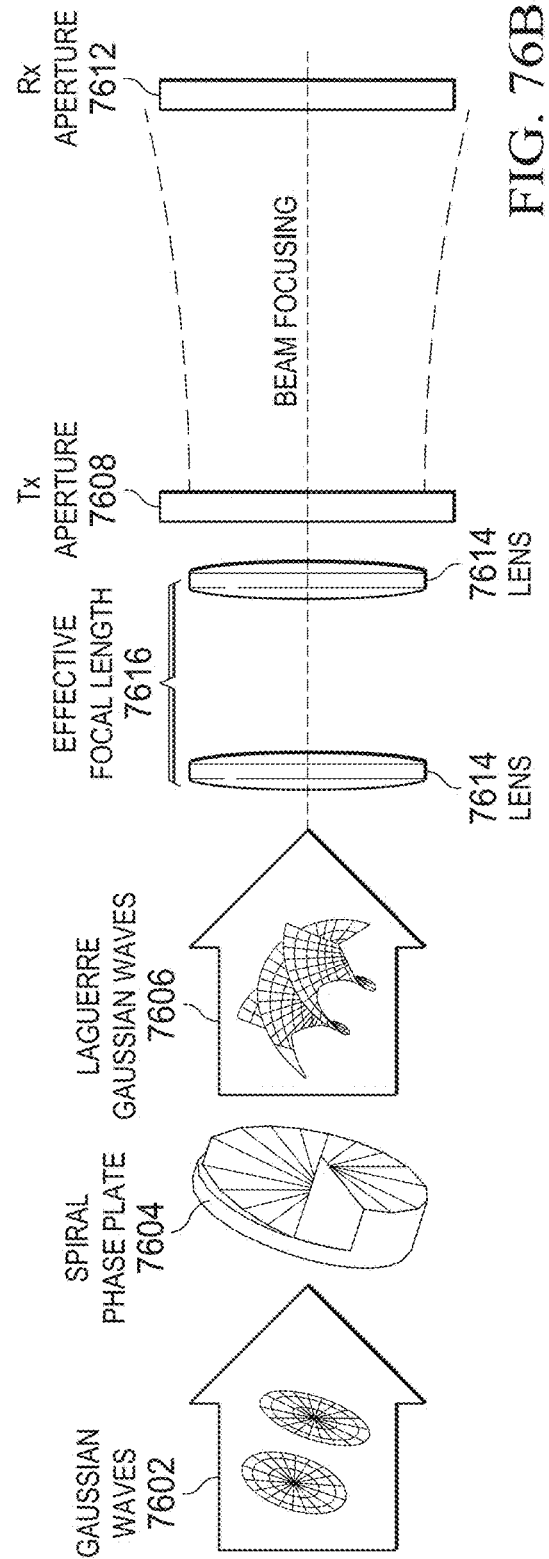
FIG. 76B illustrates the use of a pair of lenses for reducing beam divergence.

Reduced beam divergence may also be accomplished using a pair of lenses. As illustrated in FIG. 76A, a Gaussian wave 7602 passing through a spiral phase plate 7604 generates an output Laguerre Gaussian wave 7606. The Laguerre Gaussian wave 7606 when passing from a transmitter aperture 7608 to a receiver aperture 7610 diverges such that the entire Laguerre Gaussian beam does not intersect the receiver aperture 7610. This issue may be addressed as illustrated in FIG. 76B. As before the Gaussian waves 7602 pass through the spiral phase plate 7604 generating Laguerre Gaussian waves 7606. Prior to passing through the transmitter aperture 7608 the Laguerre Gaussian waves 7606 pass through a pair of lenses 7614. The pair of lenses 7614 have an effective focal length 7616 that focuses the beam 7618 passing through the transmitter aperture 7608. Due to the focusing lenses 7614, the focused beam 7618 fully intersects the receiver aperture 7612. By providing the lenses 7614 separated by an effective focal length 7616, a more focused beam 7618 may be provided at the receiver aperture 7612 preventing the loss of data within the transmission of the Laguerre Gaussian wave 7606.

Application of OAM to Optical Communication

Utilization of OAM for optical communications is based on the fact that coaxially propagating light beams with different OAM states can be efficiently separated. This is certainly true for orthogonal modes such as the LG beam. Interestingly, it is also true for general OAM beams with cylindrical symmetry by relying only on the azimuthal phase. Considering any two OAM beams with an azimuthal index of ℓ1 and ℓ2, respectively:

$$U_1(r,\theta,z) = A_1(r,z)\exp(i l_1 \theta) \quad (12)$$

where r and z refers to the radial position and propagation distance respectively, one can quickly conclude that these two beams are orthogonal in the sense that:

$$\int_0^{2\pi} U_1 U_2^* d\theta = \begin{cases} 0 & \text{if } l_1 \neq l_2 \\ A_1 A_2^* & \text{if } l_1 = l_2 \end{cases} \quad (13)$$

There are two different ways to take advantage of the distinction between OAM beams with different ℓ states in communications. In the first approach, N different OAM states can be encoded as N different data symbols representing "0", "1", ..., "N−1", respectively. A sequence of OAM states sent by the transmitter therefore represents data information. At the receiver, the data can be decoded by checking the received OAM state. This approach seems to be more favorable to the quantum communications community, since OAM could provide for the encoding of multiple bits (log 2(N)) per photon due to the infinitely countable possibilities of the OAM states, and so could potentially achieve a higher photon efficiency. The encoding/decoding of OAM states could also have some potential applications for on-chip interconnection to increase computing speed or data capacity.

The second approach is to use each OAM beam as a different data carrier in an SDM (Spatial Division Multiplexing) system. For an SDM system, one could use either a multi-core fiber/free space laser beam array so that the data channels in each core/laser beam are spatially separated, or use a group of orthogonal mode sets to carry different data channels in a multi-mode fiber (MMF) or in free space. Greater than 1 petabit/s data transmission in a multi-core fiber and up to 6 linearly polarized (LP) modes each with two polarizations in a single core multi-mode fiber has been reported. Similar to the SDM using orthogonal modes, OAM beams with different states can be spatially multiplexed and demultiplexed, thereby providing independent data carriers in addition to wavelength and polarization. Ideally, the orthogonality of OAM beams can be maintained in transmission, which allows all the data channels to be separated and recovered at the receiver. A typical embodiments of OAM multiplexing is conceptually depicted in FIG. 27. An obvious benefit of OAM multiplexing is the improvement in system spectral efficiency, since the same bandwidth can be reused for additional data channels.

Optical Fiber Communications

Figure 77:
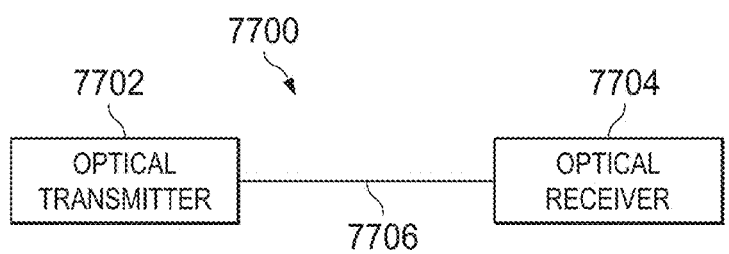
FIG. 77 illustrates the configuration of an optical fiber communication system.

The use of orbital angular momentum and multiple layer overlay modulation processing techniques within an optical communications interface environment as described with respect to FIG. 3 can provide a number of opportunities within the optical communications environment for enabling the use of the greater signal bandwidths provided by the use of optical orbital angular momentum processing, or multiple layer overlay modulation techniques alone. FIG. 77 illustrates the general configuration of an optical fiber communication system. The optical fiber communication system 7700 includes an optical transmitter 7702 and an optical receiver 7704. The transmitter 7702 and receiver 7704 communicate over an optical fiber 7706. The transmitter 7702 includes information within a light wavelength or wavelengths that is propagated over the optical fiber 7706 to the optical receiver 7704.

Optical communications network traffic has been steadily increasing by a factor of 100 every decade. The capacity of single mode optical fibers has increased 10,000 times within the last three decades. Historically, the growth in the bandwidth of optical fiber communications has been sustained by information multiplexing techniques using wavelength, amplitude, phase, and polarization of light as a means for encoding information. Several major discoveries within the fiber-optics domain have enabled today's optical networks. An additional discovery was led by Charles M. Kao's groundbreaking work that recognized glass impurities within an optical fiber as a major signal loss mechanism. Existing glass losses at the time of his discovery were approximately 200 dB per kilometer at 1 micrometer.

Figure 78A:
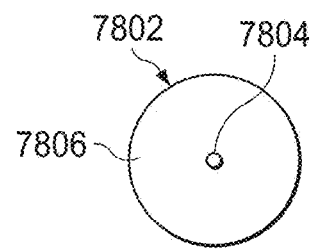
FIG. 78A illustrates a single mode fiber.
Figure 78B:
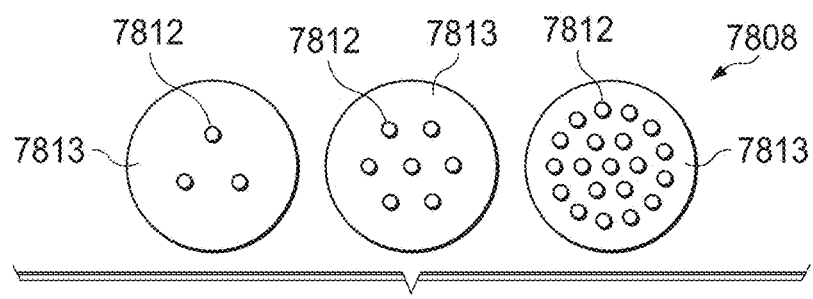
FIG. 78B illustrates multi-core fibers.
Figure 78C:
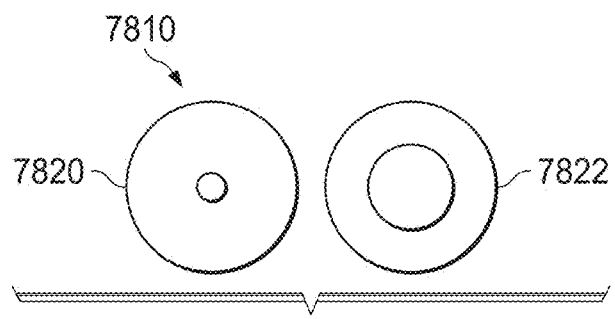
FIG. 78C illustrates multi-mode fibers.
Figure 78D:
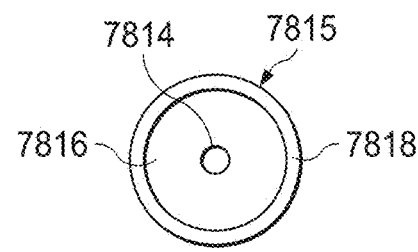
FIG. 78D illustrates a hollow core fiber.

These discoveries gave birth to optical fibers and led to the first commercial optical fibers in the 1970s, having an attenuation low enough for communication purposes in the range of approximately 20 dBs per kilometer. Referring now to FIGS. 78a-78c, there is more particularly illustrated the single mode fiber 7802, multicore fibers 7808, and multimode fibers 7810 described herein above. The multicore fibers 7808 consist of multiple cores 7812 included within the cladding 7813 of the fiber. As can be seen in FIG. 78b, there are illustrated a 3 core fiber, 7 core fiber, and 19 core fiber. Multimode fibers 7810 comprise multimode fibers comprising a few mode fiber 7820 and a multimode fiber 7822. Finally, there is illustrated a hollow core fiber 7815 including a hollow core 7814 within the center of the cladding 7816 and sheathing 7818. The development of single mode fibers (SMF) such as that illustrated at 7802 (FIG. 78a) in the early 1980s reduced pulse dispersion and led to the first fiber-optic based trans-Atlantic telephone cable. This single mode fiber included a single transmission core 7804 within an outer sheathing 7806. Development of indium gallium arsenide photodiodes in the early 1990s shifted the focus to near-infrared wavelengths (1550 NM), were silica had the lowest loss, enabling extended reach of the optical fibers. At roughly the same time, the invention of erbium-doped fiber amplifiers resulted in one of the biggest leaps in fiber capacity within the history of communication, a thousand fold increase in capacity occurred over a 10 year period. The development was mainly due to the removed need for expensive repeaters for signal regeneration, as well as efficient amplification of many wavelengths at the same time, enabling wave division multiplexing (WDM).

Throughout the 2000s, increases in bandwidth capacity came mainly from introduction of complex signal modulation formats and coherent detection, allowing information encoding using the phase of light. More recently, polarization division multiplexing (PDM) doubled channel capacity. Through fiber communication based on SMFs featured tremendous growth in the last three decades, recent research has indicated SMF limitations. Non-linear effects in silica play a significant role in long range transmission, mainly through the Kerr effect, where a presence of a channel at one wavelength can change the refractive index of a fiber, causing distortions of other wavelength channels. More recently, a spectral efficiency (SE) or bandwidth efficiency, referring to the transmitted information rate over a given bandwidth, has become theoretically analyzed assuming nonlinear effects in a noisy fiber channel. This research indicates a specific spectral efficiency limit that a fiber of a certain length can reach for any signal to noise (SNR). Recently achieved spectral efficiency results indeed show that the proximity to the spectral efficiency limit, indicating the need for new technologies to address the capacity issue in the future.

Among several possible directions for optical communications in the future, the introduction of new optical fibers 7706 other than single mode fibers 7802 has shown promising results. In particular, researchers have focused on spatial dimensions in new fibers, leading to so-called space division multiplexing (SDM) where information is transmitted using cores of multi-core fibers (MCF) 7808 (FIG. 78b) or mode division multiplexing (MDM) or information is transmitted using modes of multimode fibers (MMFs) 7810 (FIG. 78c). The latest results show spectral efficiency of 91 bits/S/Hz using 12 core multicore fiber 7808 for 52 kilometer long fibers and 12 bits/S/Hz using 6 mode multimode fiber 7810 and 112 kilometer long fibers. Somewhat unconventional transmissions at 2.08 micrometers have also been demonstrated in two 90 meter long photonic crystal fibers, though these fibers had high losses of 4.5 decibels per kilometer.

While offering promising results, these new types of fibers have their own limitations. Being noncircularly symmetric structures, multicore fibers are known to require more complex, expensive manufacturing. On the other hand, multimode fibers 7810 are easily created using existing technologies. However, conventional multimode fibers 7810 are known to suffer from mode coupling caused by both random perturbations in the fibers and in modal multiplexers/demultiplexers.

Several techniques have been used for mitigating mode coupling. In a strong coupling regime, modal cross talk can be compensated using computationally intensive multi-input multi-output (MIMO) digital signal processing (DSP). While MIMO DSP leverages the technique's current success in wireless networks, the wireless network data rates are several orders of magnitude lower than the ones required for optical networks. Furthermore, MIMO DSP complexity inevitably increases with an increasing number of modes and no MIMO based data transmission demonstrations have been demonstrated in real time thus far. Furthermore, unlike wireless communication systems, optical systems are further complicated because of fiber's nonlinear effects. In a weak coupling regime, where cross talk is smaller, methods that also use computationally intensive adapted optics, feedback algorithms have been demonstrated. These methods reverse the effects of mode coupling by sending a desired superposition of modes at the input, so that desired output modes can be obtained. This approach is limited, however, since mode coupling is a random process that can change on the order of a millisecond in conventional fibers.

Thus, the adaptation of multimode fibers 7810 can be problematic in long haul systems where the round trip signal propagation delay can be tens of milliseconds. Though 2×56 GB/S transmission at 8 kilometers length has been demonstrated in the case of two higher order modes, none of the adaptive optics MDM methods to date have demonstrated for more than two modes. Optical fibers act as wave guides for the information carrying light signals that are transmitted over the fiber. Within an ideal case, optical fibers are 2D, cylindrical wave guides comprising one or several cores surrounded by a cladding having a slightly lower refractive index as illustrated in FIGS. 78a-78d. A fiber mode is a solution (an eigenstate) of a wave guide equation describing the field distribution that propagates within a fiber without changing except for the scaling factor. All fibers have a limit on the number of modes that they can propagate, and have both spatial and polarization degrees of freedom.

Single mode fibers (SMFs) 7802 is illustrated in FIG. 78a support propagation of two orthogonal polarizations of the fundamental mode only (N=2). For sufficiently large core radius and/or the core cladding difference, a fiber is multi-moded for N >2 as illustrated in FIG. 78c. For optical signals having orbital angular momentums and multilayer modulation schemes applied thereto, multimode fibers 7810 that are weakly guided may be used. Weakly guided fibers have a core cladding refractive index difference that is very small. Most glass fibers manufactured today are weakly guided, with the exception of some photonic crystal fibers and air-core fibers. Fiber guide modes of multimode fibers 7810 may be associated in step indexed groups where, within each group, modes typically having similar effective indexes are grouped together. Within a group, the modes are degenerate. However, these degeneracies can be broken in a certain fiber profile design.

We start by describing translationally invariant waveguide with refractive index n=n(x, y), with $n_{co}$ being maximum refractive index ("core" of a waveguide), and $n_{cl}$ being refractive index of the uniform cladding, and ρ represents the maximum radius of the refractive index n. Due to translational invariance the solutions (or modes) for this waveguide can be written as:

$$E_j(x,y,z) = e_j(x,y)e^{i\beta_j z},$$

$$H_j(x,y,z) = h_j(x,y)e^{i\beta_j z},$$

where $\beta_j$ is the propagation constant of the j-th mode. Vector wave equation for source free Maxwell's equation can be written in this case as:

$$(\nabla^2 + n^2 k^2 - \beta_j^2)e_j = -(\nabla_t + i\beta_j \hat{z})(e_{tj} \nabla_t \ln(n^2))$$

$$(\nabla^2 + n^2 k^2 - \beta_j^2)h_j = -(\nabla_t \ln(n^2)) \times ([\nabla]_t + i\beta_j \hat{z}) \times h_j)$$

where k=2π/λ is the free-space wavenumber, λ is a free-space wavelength, $e_t = e_x \hat{x} + e_y \hat{y}$ is a transverse part of the electric field, $\nabla^2$ is a transverse Laplacian and $\nabla_t$ transverse vector gradient operator. Waveguide polarization properties are built into the wave equation through the $\nabla_t \ln(n^2)$ terms and ignoring them would lead to the scalar wave equation, with linearly polarized modes. While previous equations satisfy arbitrary waveguide profile n(x, y), in most cases of interest, profile height parameter Δ can be considered small Δ<<1, in which case waveguide is said to be weakly guided, or that weakly guided approximation (WGA) holds. If this is the case, a perturbation theory can be applied to approximate the solutions as:

$$E(x, y, z) = e(x, y)e^{i(\beta+\tilde{\beta})z} = (e_t + \hat{z}e_z)e^{i(\beta+\tilde{\beta})z}$$

$$H(x, y, z) = h(x, y)e^{i(\beta+\tilde{\beta})z} = (h_t + \hat{z}h_z)e^{i(\beta+\tilde{\beta})z}$$

where subscripts t and z denote transverse and longitudinal components respectively. Longitudinal components can be considered much smaller in WGA and we can approximate (but not neglect) them as:

$$e_z = \frac{i(2\Delta)^{\frac{1}{2}}}{v}(\rho \nabla_t \cdot e_t)$$

$$h_z = \frac{i(2\Delta)^{\frac{1}{2}}}{V}(\rho \nabla_t \cdot h_t)$$

Where Δ and V are profile height and fiber parameters and transversal components satisfy the simplified wave equation.

$$(\nabla^2 + n^2 k^2 - \beta_j^2)e_j = 0$$

Though WGA simplified the waveguide equation, further simplification can be obtained by assuming circularly symmetric waveguide (such as ideal fiber). If this is the case refractive index that can be written as:

$$n(r) = n^2_{co}(1 - 2f(R)\Delta)$$

where f(R)≥0 is a small arbitrary profile variation.

For a circularly symmetric waveguide, we would have propagation constants $\beta_{lm}$ that are classified using azimuthal (l) and radial (m) numbers. Another classification uses effective indices $n_{lm}$ (sometimes noted as $n^{eff}_{lm}$ or simply $n_{eff}$, that are related to propagation constant as: $\beta_{lm} = kn^{eff}$). For the case of l=0, the solutions can be separated into two classes that have either transverse electric (T $E_{0m}$) or transverse magnetic (T $M_{0m}$) fields (called meridional modes). In the case of l≠0, both electric and magnetic field have z-component, and depending on which one is more dominant, so-called hybrid modes are denoted as: $HE_{lm}$ and $EH_{lm}$.

Polarization correction δβ has different values within the same group of modes with the same orbital number (l), even in the circularly symmetric fiber. This is an important observation that led to development of a special type of fiber.

In case of a step refractive index, solutions are the Bessel functions of the first kind, $J_l(r)$, in the core region, and modified Bessel functions of the second kind, $K_l(r)$, in the cladding region.

In the case of step-index fiber the groups of modes are almost degenerate, also meaning that the polarization correction δβ can be considered very small. Unlike $HE_{11}$ modes, higher order modes (HOMs) can have elaborate polarizations. In the case of circularly symmetric fiber, the odd and even modes (for example $HE^{odd}$ and $HE^{even}$ modes) are always degenerate (i.e. have equal $n_{eff}$), regardless of the index profile. These modes will be non-degenerate only in the case of circularly asymmetric index profiles.

Figure 79:
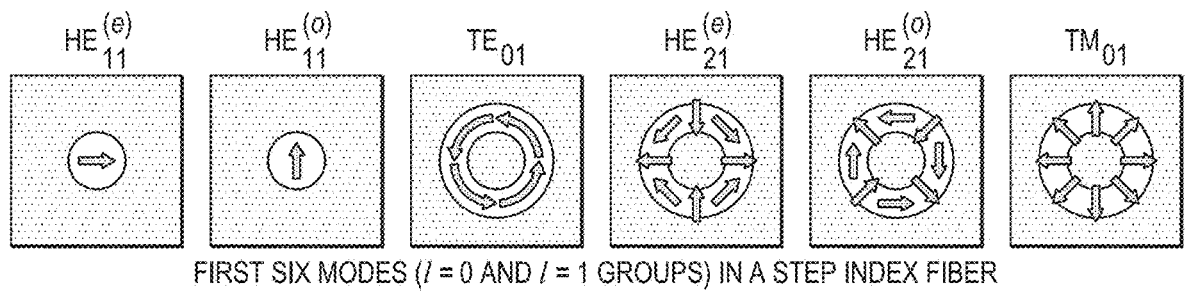
FIG. 79 illustrates the first six modes within a step index fiber.

Referring now to FIG. 79, there are illustrated the first six modes within a step indexed fiber for the groups L=0 and L=1.

When orbital angular momentums are applied to the light wavelength within an optical transmitter of an optical fiber communication system, the various orbital angular momentums applied to the light wavelength may transmit information and be determined within the fiber mode.

Angular momentum density (M) of light in a medium is defined as:

$$M = \frac{1}{c^2} r \times (E \times H) = r \times P = \frac{1}{c^2} r \times S$$

with r as position, E electric field, H magnetic field, P linear momentum density and S Poynting vector.

The total angular momentum (J), and angular momentum flux ($\Phi_M$) can be defined as:

$$J = \iiint M \, dV$$

$$\Phi = \iint M \, dA$$

In order to verify whether certain mode has an OAM let us look at the time averages of the angular momentum flux $\Phi_M$:

$$\langle \Phi_M \rangle = \iint \langle M \rangle \, dA$$

as well as the time average of the energy flux:

$$\langle \Phi_M \rangle = \iint \frac{\langle S_z \rangle}{c} dA$$

Because of the symmetry of radial and axial components about the fiber axis, we note that the integration in equation will leave only z-component of the angular momentum density non zero. Hence:

$$\langle M \rangle = \langle M \rangle_z = \frac{1}{c^2} r \times \langle E \times H \rangle_z$$

and knowing $\langle S \rangle = \text{Re}\{S\}$ and $S = \frac{1}{2} E \times H^*$ leads to:

$$S_\Phi = \frac{1}{2}(-E_r H_z^* + E_z H_r^*)$$

$$S_z = \frac{1}{2}(E_x H_y^* - E_y H_x^*)$$

Let us now focus on a specific linear combination of the $HE_{l+1,m}^{even}$ and $HE_{l+1,m}^{odd}$ modes with $\pi/2$ phase shift among them:

$$V_{lm}^+ = HE_{l+1,m}^{even} + iEH_{l+1,m}^{odd}$$

The idea for this linear combination comes from observing azimuthal dependence of the $HE_{l+1,m}^{even}$ and modes comprising $\cos(\varphi)$ and $\sin(\varphi)$. If we denote the electric field of $HE_{l+1,m}^{even}$ and $HE_{l+1,m}^{odd}$ modes as $e_1$ and $e_2$, respectively, and similarly, denote their magnetic fields as $h_1$ and $h_2$, the expression for this new mode can be written as:

$$e = e_1 i e_2, \quad (2.35)$$

$$h = i h_2. \quad (2.36)$$

then we derive:

$$e_r = e^{i(l+1)\varphi} F_l(R)$$

$$h_z = e^{i(l+1)\varphi} n_{co} \left(\frac{\epsilon_0}{\mu_0}\right)^{\frac{1}{2}} \frac{(2\Delta)^{\frac{1}{2}}}{V} G_l^-$$

$$e_z = i e^{i(l+1)\varphi} \frac{(2\Delta)^{\frac{1}{2}}}{V} G_l^-$$

$$h_r = -i e^{i(l+1)\varphi} n_{co} \left(\frac{\epsilon_0}{\mu_0}\right)^{\frac{1}{2}} F_l(R)$$

Where $F_l(R)$ is the Bessel function and $$G_l^\pm = \frac{dF_l}{dR} \pm \frac{l}{R} F_l$$

We note that all the quantities have $e^{i(l+1)\varphi}$ dependence that indicates these modes might have OAM, similarly to the free space case. Therefore the azimuthal and the longitudinal component of the Poynting vector are:

$$S_\varphi = -n_{co} \left(\frac{\epsilon_0}{\mu_0}\right)^{\frac{1}{2}} \frac{(2\Delta)^{\frac{1}{2}}}{V} \text{Re}\{F_l^* G_l^-\}$$

$$S_z = n_{co} \left(\frac{\epsilon_0}{\mu_0}\right)^{\frac{1}{2}} [F_l]^2$$

The ratio of the angular momentum flux to the energy flux therefore becomes:

$$\frac{\phi_M}{\phi_W} = \frac{l+1}{\omega}$$

We note that in the free-space case, this ratio is similar:

$$\frac{\phi_M}{\phi_W} = \frac{\sigma+1}{\omega}$$

where $\sigma$ represents the polarization of the beam and is bounded to be $-1 < \sigma < 1$. In our case, it can be easily shown that SAM of the $V^+$ state, is 1, leading to important conclusion that the OAM of the $V^{+lm}$ state is 1. Hence, this shows that, in an ideal fiber, OAM mode exists.

Thus, since an orbital angular momentum mode may be detected within the ideal fiber, it is possible to encode information using this OAM mode in order to transmit different types of information having different orbital angular momentums within the same optical wavelength.

Figure 80:
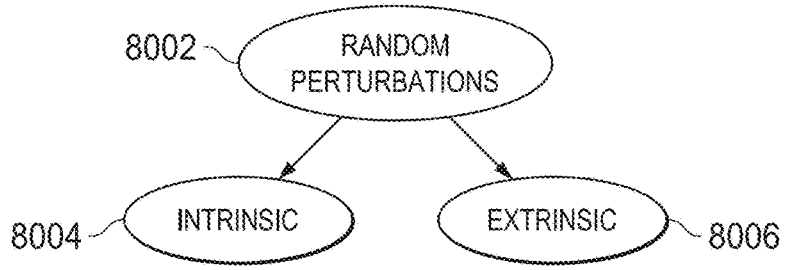
FIG. 80 illustrates the classes of random perturbations within a fiber.

The above description with respect to optical fiber assumed an ideal scenario of perfectly symmetrical fibers having no longitudinal changes within the fiber profile. Within real world fibers, random perturbations can induce coupling between spatial and/or polarization modes, causing propagating fields to evolve randomly through the fiber. The random perturbations can be divided into two classes, as illustrated in FIG. 80. Within the random perturbations 8002, the first class comprises extrinsic perturbations 8004. Extrinsic perturbations 8004 include static and dynamic fluctuations throughout the longitudinal direction of the fiber, such as the density and concentration fluctuations natural to random glassy polymer materials that are included within fibers. The second class includes extrinsic variations 8006 such as microscopic random bends caused by stress, diameter variations, and fiber core defects such as microvoids, cracks, or dust particles.

Mode coupling can be described by field coupling modes which account for complex valued modal electric field amplitudes, or by power coupling modes, which is a simplified description that accounts only for real value modal powers. Early multimode fiber systems used incoherent light emitting diode sources and power coupling models were widely used to describe several properties including steady state, modal power distributions, and fiber impulse responses. While recent multimode fiber systems use coherent sources, power coupling modes are still used to describe effects such as reduced differential group delays and plastic multimode fibers.

By contrast, single mode fiber systems have been using laser sources. The study of random birefringence and mode coupling in single mode fibers which leads to polarization mode dispersion (PMD), uses field coupling modes which predict the existence of principal states of polarization (PSPs). PSPs are polarization states shown to undergo minimal dispersion and are used for optical compensation of polarization mode dispersion in direct detection single mode fiber systems. In recent years, field coupling modes have been applied to multimode fibers, predicting principal mode which are the basis for optical compensation of modal dispersion in direct detection multimode fiber systems.

Mode coupling can be classified as weak or strong, depending on whether the total system length of the optical fiber is comparable to, or much longer than, a length scale over which propagating fields remain correlated. Depending on the detection format, communication systems can be divided into direct and coherent detection systems. In direct detection systems, mode coupling must either be avoided by careful design of fibers and modal D (multiplexers) and/or mitigated by adaptive optical signal processing. In systems using coherent detection, any linear cross talk between modes can be compensated by multiple input multiple output (MIMO) digital signal processing (DSP), as previously discussed, but DSP complexity increases with an increasing number of modes.

Figure 81:
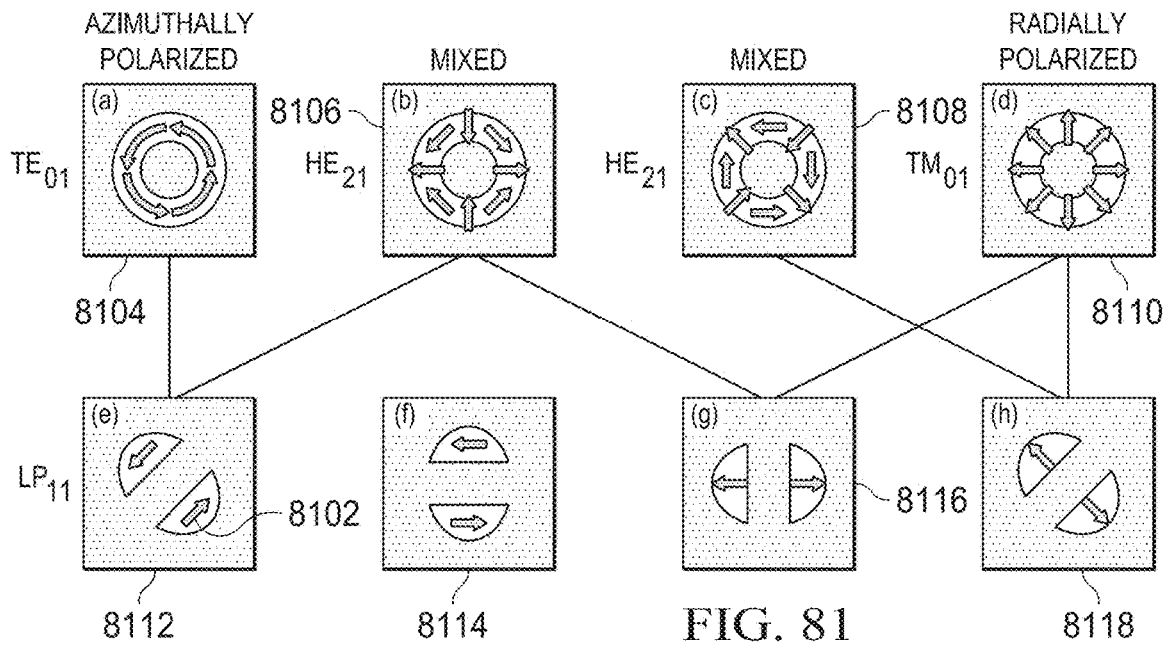
FIG. 81 illustrates the intensity patterns of first order groups within a vortex fiber.

Referring now to FIG. 81, there were illustrated the intensity patterns of the first order mode group within a vortex fiber. Arrows 8102 within the illustration show the polarization of the electric field within the fiber. The top row illustrates vector modes that are the exact vector solutions, and the bottom row shows the resultant, unstable LP11 modes commonly obtained at a fiber output. Specific linear combinations of pairs of top row modes resulting in the variety of LP11 modes obtained at the fiber output. Coupled mode 8102 is provided by the coupled pair of mode 8104 and 8106. Coupled mode 8104 is provided by the coupled pair of mode 8104 and mode 8108. Coupled mode 8116 is provided by the coupled pair of mode 8106 and mode 8110, and coupled mode 8118 is provided by the coupled pair of mode 8108 and mode 8110.

Typically, index separation of two polarizations and single mode fibers is on the order of 10-7. While this small separation lowers the PMD of the fiber, external perturbations can easily couple one mode into another, and indeed in a single mode fiber, arbitrary polarizations are typically observed at the output. Simple fiber polarization controller that uses stress induced birefringence can be used to achieve any desired polarization at the output of the fiber.

By the origin, mode coupling can be classified as distributed (caused by random perturbations in fibers), or discrete (caused at the modal couplers and the multiplexers). Most importantly, it has been shown that small, effective index separation among higher order modes is the main reason for mode coupling and mode instabilities. In particular, the distributed mode coupling has been shown to be inversely proportional to $\Delta$–P with P greater than 4, depending on coupling conditions. Modes within one group are degenerate. For this reason, in most multimode fiber modes that are observed in the fiber output are in fact the linear combinations of vector modes and are linearly polarized states. Hence, optical angular momentum modes that are the linear combination of the HE even, odd modes cannot coexist in these fibers due to coupling to degenerate TE01 and TM01 states.

Thus, the combination of the various OAM modes is not likely to generate modal coupling within the optical systems and by increasing the number of OAM modes, the reduction in mode coupling is further benefited.

Figure 82A:
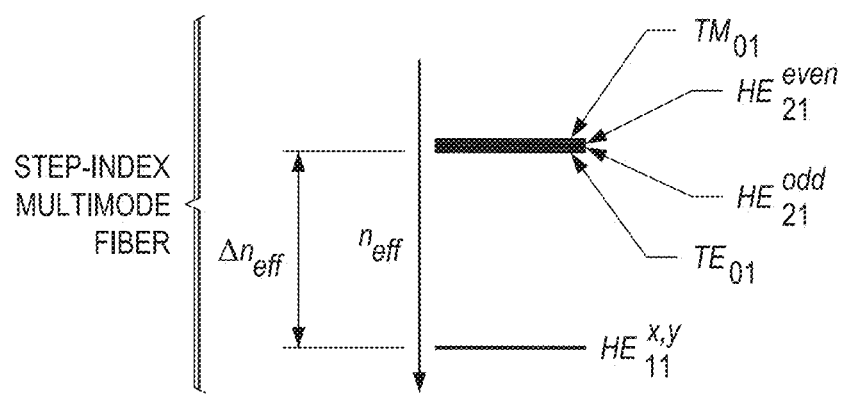
FIGS. 82A and 82B illustrate index separation in first order modes of a multi-mode fiber.
Figure 82B:
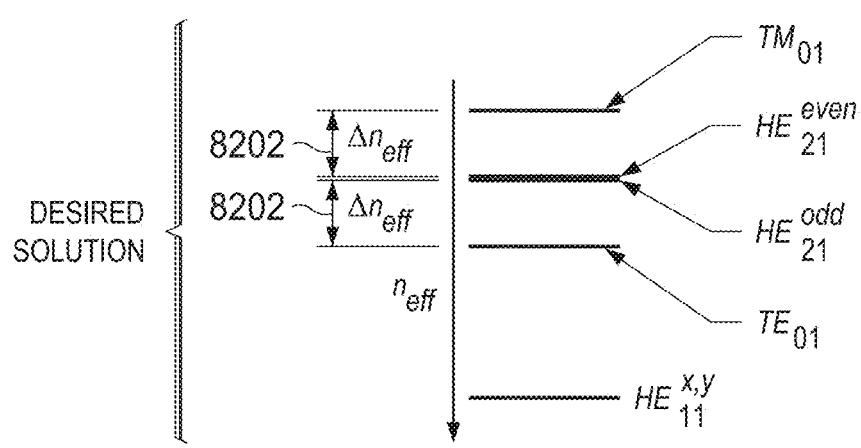

Referring now to FIGS. 82A and 82B, there is illustrated the benefit of effective index separation in first order modes. FIG. 82A illustrates a typical step index multimode fiber that does not exhibit effective index separation causing mode coupling. The mode $TM_{01}HE^{even}_{21}$, mode $HE^{odd}_{21}$, and mode $TE_{01}$ have little effective index separation, and these modes would be coupled together. Mode $HE^{x,1}_{11}$ has an effective index separation such that this mode is not coupled with these other modes.

This can be compared with the same modes in FIG. 82B. In this case, there is an effective separation 8202 between the $TM_{01}$ mode and the $HE^{even}_{21}$ mode and the $TE_{01}$ mode and the $HE^{odd}_{21}$ mode. This effective separation causes no mode coupling between these mode levels in a similar manner that was done in the same modes in FIG. 82A.

In addition to effective index separation, mode coupling also depends on the strength of perturbation. An increase in the cladding diameter of an optical fiber can reduce the bend induced perturbations in the fiber. Special fiber design that includes the trench region can achieve so-called bend insensitivity, which is predominant in fiber to the home. Fiber design that demonstrates reduced bends and sensitivity of higher order Bessel modes for high power lasers have been demonstrated. Most important, a special fiber design can remove the degeneracy of the first order mode, thus reducing the mode coupling and enabling the OAM modes to propagate within these fibers.

Topological charge may be multiplexed to the wave length for either linear or circular polarization. In the case of linear polarizations, topological charge would be multiplexed on vertical and horizontal polarization. In case of circular polarization, topological charge would be multiplexed on left hand and right hand circular polarization.

The topological charges can be created using Spiral Phase Plates (SPPs) such as that illustrated in FIG. 11*e*, phase mask holograms or a Spatial Light Modulator (SLM) by adjusting the voltages on SLM which creates properly varying index of refraction resulting in twisting of the beam with a specific topological charge. Different topological charges can be created and muxed together and de-muxed to separate charges. When signals are muxed together, multiple signals having different orthogonal functions or helicities applied thereto are located in a same signal. The muxed signals are spatially combined in a same signal.

As Spiral Phase plates can transform a plane wave (1=0) to a twisted wave of a specific helicity (i.e. 1=+1), Quarter Wave Plates (QWP) can transform a linear polarization (s=0) to circular polarization (i.e. s=+1).

Cross talk and multipath interference can be reduced using Multiple-Input-Multiple-Output (MIMO).

Most of the channel impairments can be detected using a control or pilot channel and be corrected using algorithmic techniques (closed loop control system).

Optical Fiber Communications Using OAM Multiplexing

OAM multiplexing may be implemented in fiber communications. OAM modes are essentially a group of higher order modes defined on a different basis as compared to other forms of modes in fiber, such as "linearly polarized" (LP) modes and fiber vector modes. In principle each of the mode sets form an orthogonal mode basis spanning the spatial domain, and may be used to transmit different data channels. Both LP modes and OAM modes face challenges of mode coupling when propagating in a fiber, and may also cause channel crosstalk problems.

In general, two approaches may be involved in fiber transmission using OAM multiplexing. The first approach is to implement OAM transmission in a regular few mode fiber such as that illustrated in FIG. 78. As is the case of SDM using LP modes, MIMO DSP is generally required to equalize the channel interface. The second approach is to utilize a specially designed vortex fiber that suffers from less mode coupling, and DSP equalization can therefore be saved for a certain distance of transmission.

OAM Transmission in Regular Few Mode Fiber

In a regular few mode fiber, each OAM mode represents approximately a linear combination of the true fiber modes (the solution to the wave equation in fiber). For example, as illustrated in FIG. 83, a linearly polarized OAM beam 8302 with $\ell=+1$ comprises the components of Eigen modes including $TE_{01}$, $TM_{01}$ and $HE_{21}$. Due to the perturbations or other non-idealities, OAM modes that are launched into a few mode fiber (FMF) may quickly coupled to each other, most likely manifesting in a group of LP modes at the fiber output. The mutual mode coupling in fiber may lead to inter-channel crosstalk and eventually failure of the transmission. One possible solution for the mode coupling effects is to use MIMO DSP in combination with coherent detection.

Figure 85A:
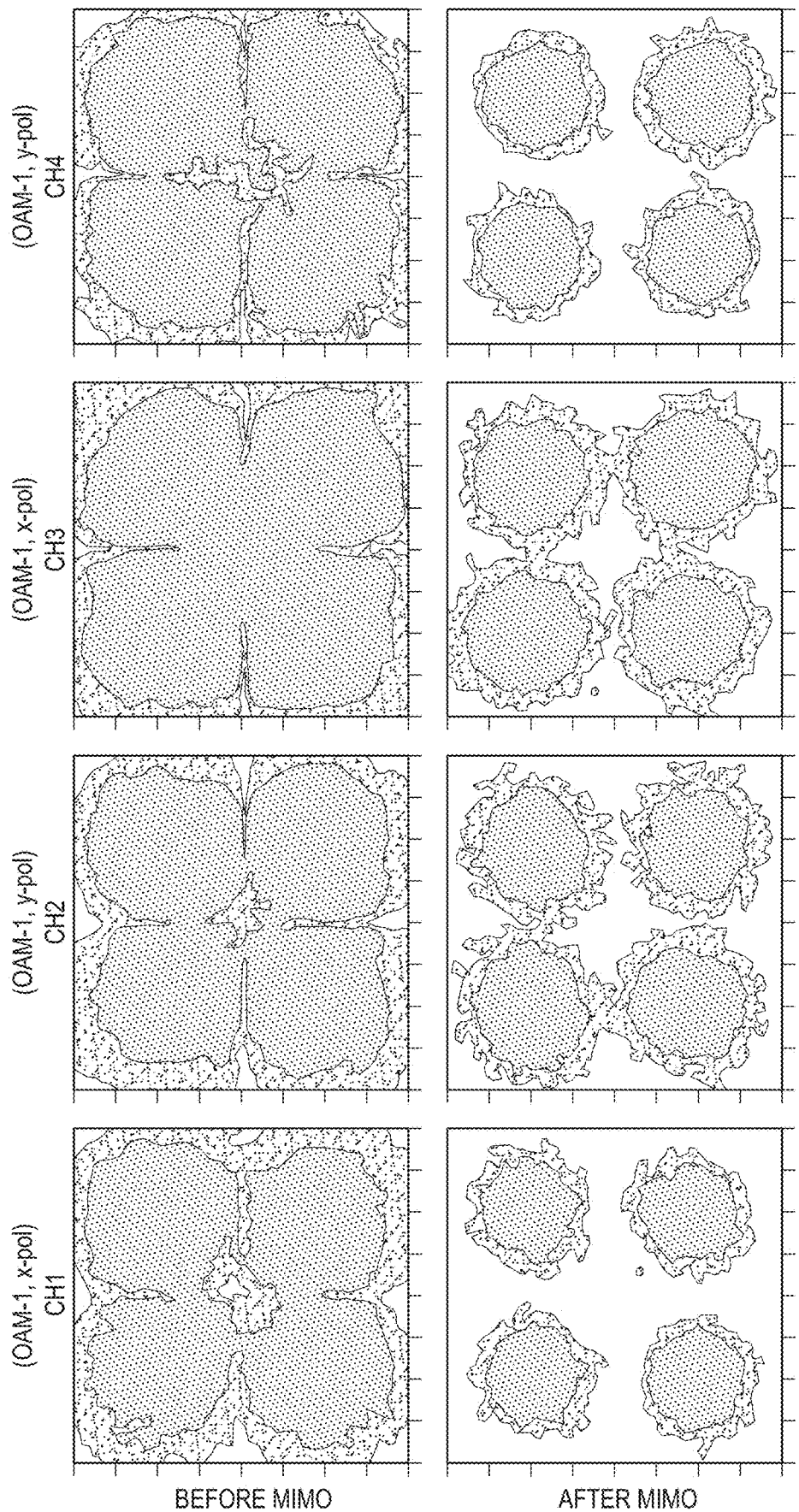
FIG. 85A illustrates the recovered constellations of 20 Gbit/sec QPSK signals carried on each OAM beam of the device of FIG. 84.
Figure 85B:
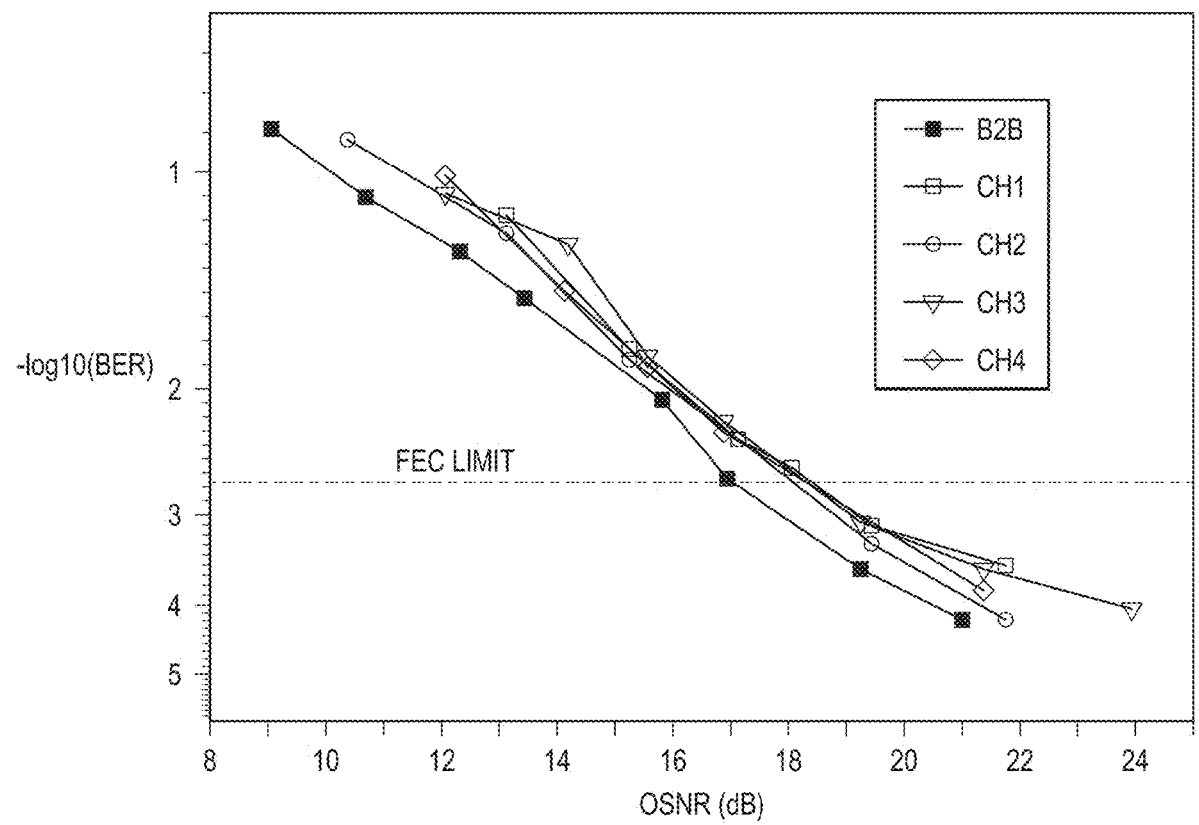
FIG. 85B illustrates the measured BER curves of the device of FIG. 84.

Referring now to FIG. 84, there is illustrated a demonstration of the transmission of four OAM beams ($\ell=+1$ and $-1$ each with 2 orthogonal polarization states), each carrying 20 Gbit/s QPSK data, in an approximately 5 kilometer regular FMF (few mode fiber) 8404. Four data channels 8402 (2 with x-pol and 2 with y-pol) were converted to pol-muxed OAM beams with $\ell=+1$ and $-1$ using an inverse mode sorter 8406. The pol-muxed to OAM beams 8408 (four in total) are coupled into the FMF 8404 for propagation. At the fiber output, the received modes were decomposed onto an OAM basis ($\ell=+1$ and $-1$) using a mode sorter 8410. In each of the two OAM components of light were coupled onto a fiber-based PBS for polarization demultiplexing. Each output 8412 is detected by a photodiode, followed by ADC (analog-to-digital converter) and off-line processing. To mitigate the inter-channel interference, a constant modulus algorithm is used to blindly estimate the channel crosstalk and compensate for the inter-channel interference using linear equalization. Eventually, the QPSK data carried on each OAM beam is recovered with the assistance of a MIMO DSP as illustrated in FIGS. 85A and 85B.

OAM Transmission in a Vortex Fiber

Figure 86:
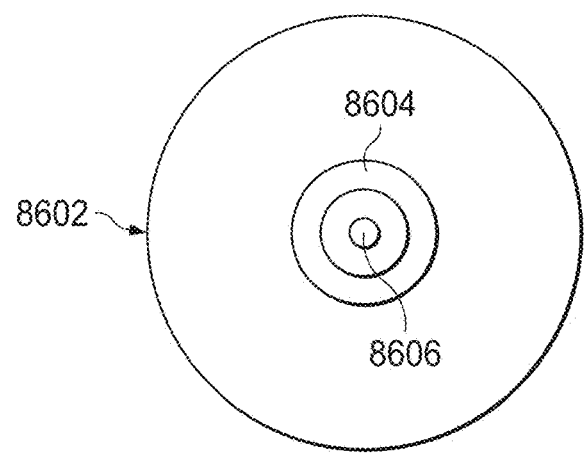
FIG. 86 illustrates a vortex fiber.

A key challenge for OAM multiplexing in conventional fibers is that different OAM modes tend to couple to each other during the transmission. The major reason for this is that in a conventional fiber OAM modes have a relatively small effective refractive index difference ($\Delta n_{eff}$). Stably transmitting an OAM mode in fiber requires some modifications of the fiber. One manner for stably transmitting OAM modes uses a vortex fiber such as that illustrated in FIG. 86. A vortex fiber 8602 is a specially designed a few mode fiber including an additional high index ring 8604 around the fiber core 8606. The design increases the effective index differences of modes and therefore reduces the mutual mode coupling.

Using this vortex fiber 8602, two OAM modes with $\ell=+1$ and $-1$ and two polarizations multiplexed fundamental modes were transmitted together for 1.1 km. The measured mode cross talk between two OAM modes was approximately $-20$ dB. These four distinct modes were used to each carried a 100 Gbuad QPSK signal at the same wavelength and simultaneously propagate in the vortex fiber. After the mode demultiplexing, all data was recovered with a power penalty of approximately 4.1 dB, which could be attributed to the multipath effects and mode cross talk. In a further example, WDM was added to further extend the capacity of a vortex fiber transmission system. A 20 channel fiber link using to OAM modes and 10 WDM channels (from 1546.642 nm to 1553.88 nm), each channel sending 80 Gb/s 16-QAM signal was demonstrated, resulting in a total transmission capacity of 1.2 Tb/s under the FEC limit.

There are additional innovative efforts being made to design and fabricate fibers that are more suitable for OAM multiplexing. A recently reported air-core fiber has been demonstrated to further increase the refractive index difference of eigenmodes such that the fiber is able to stably transmit 12 OAM states ($\ell=\pm7$, $\pm8$ and $\pm9$, each with two orthogonal polarizations) for 2 m. A few mode fibers having an inverse parabolic graded index profile in which propagating 8 OAM orders ($\ell=\pm1$ and $\pm2$, each with two orthogonal polarizations) has been demonstrated over 1.1 km. The same group recently presented a newer version of an air core fiber, whereby the supported OAM states was increased to 16. One possible design that can further increase the supported OAM modes and a fiber is to use multiple high contrast indexed ring core structure which is indicated a good potential for OAM multiplexing for fiber communications.

RF Communications with OAM

As a general property of electromagnetic waves, OAM can also be carried on other ways with either a shorter wavelength (e.g., x-ray), or a longer wavelength (millimeter waves and terahertz waves) than an optical beam. Focusing on the RF waves, OAM beams at 90 GHz were initially generated using a spiral phase plate made of Teflon. Different approaches, such as a phase array antenna and a helicoidal parabolic antenna have also been proposed. RF OAM beams have been used as data carriers for RF communications. A Gaussian beam and an OAM beam with $\ell=+1$ at approximately 2.4 GHz have been transmitted by a Yagi-Uda antenna and a spiral parabolic antenna, respectively, which are placed in parallel. These two beams were distinguished by the differential output of a pair of antennas at the receiver side. The number of channels was increased to three (carried on OAM beams with $\ell=-1$, 0 and $+1$) using a similar apparatus to send approximately 11 Mb/s signal at approximately 17 GHz carrier. Note that in these two demonstrations different OAM beams propagate along different spatial axes. There are some potential benefits if all of the OAM beams are actually multiplexed and propagated through the same aperture. In a recent demonstration eight polarization multiplexed (pol-muxed) RF OAM beams (for OAM beams on each of two orthogonal polarizations) our coaxially propagated through a 2.5 m link.

The herein described RF techniques have application in a wide variety of RF environments. These include RF Point to Point/Multipoint applications, RF Point to Point Backhaul applications, RF Point to Point Fronthaul applications (these provide higher throughput CPRI interface for cloudification and virtualization of RAN and future cloudified HetNet), RF Satellite applications, RF Wifi (LAN) applications, RF Bluetooth (PAN) applications, RF personal device cable replacement applications, RF Radar applications and RF electromagnet tag applications. The techniques could also be used in a RF and FSO hybrid system that can provide communications in an RF mode or an FSO mode depending on which mode of operation is providing the most optimal or cost effective communications link at a particular point in time.

The four different OAM beams with $\ell = -3, -1, +1$ and $+3$ on each of 2 orthogonal polarizations are generated using customized spiral phase plates specifically for millimeter wave at 28 GHz. The observed intensity profile for each of the beams and their interferograms are shown in FIG. 87. These OAM beams were coaxially multiplexed using designed beam splitters. After propagation, the OAM channels were multiplexed using an inverse spiral phase plate and a spatial filter (the receiver antenna). The measured crosstalk it 28 GHz for each of the demultiplexed channels is shown in Table 8. It can be seen that the cross talk is low enough for 16-QAM data transmission without the assistance of extra DSPs to reduce the channel interference.

TABLE 8

Crosstalk of the OAM channels measured at f = 28 GHz (CW)

| | $\ell = -3$ | $\ell = -1$ | $\ell = +1$ | $\ell = +3$ |
|---|---|---|---|---|
| Single-pol (Y-pol) | −25 dB | −23 dB | −25 dB | −26 dB |
| Dual-pol (X-pol) | −17 dB | −16.5 dB | −18.1 dB | −19 dB |
| Dual-pol (Y-pol) | −18 dB | −16.5 dB | −16.5 dB | −24 dB |

Considering that each beam carries a 1 Gbaud 16-QAM signal, a total link capacity of 32 Gb/s at a single carrier frequency of 28 GHz and a spectral efficiency of 16 Gb/s/Hz may be achieved. In addition, an RF OAM beam demultiplexer ("mode sorter") was also customize for a 28 GHz carrier and is implemented in such a link to simultaneously separate multiple OAM beams. Simultaneously demultiplexing for OAM beams at the single polarization has been demonstrated with a cross talk of less than −14 dB. The cross talk is likely to be further reduced by optimizing the design parameters.

Free Space Communications

An additional configuration in which the optical angular momentum processing and multi-layer overlay modulation technique described herein above may prove useful within the optical network framework is use with free-space optics communications. Free-space optics systems provide a number of advantages over traditional UHF RF based systems from improved isolation between the systems, the size and the cost of the receivers/transmitters, lack of RF licensing laws, and by combining space, lighting, and communication into the same system. Referring now to FIG. 88 there is illustrated an example of the operation of a free-space communication system. The free-space communication system utilizes a free-space optics transmitter 8802 that transmits a light beam 8804 to a free-space optics receiver 8806. The major difference between a fiber-optic network and a free-space optic network is that the information beam is transmitted through free space rather than over a fiber-optic cable. This causes a number of link difficulties, which will be more fully discussed herein below. Free-space optics is a line of sight technology that uses the invisible beams of light to provide optical bandwidth connections that can send and receive up to 2.5 Gbps of data, voice, and video communications between a transmitter 8802 and a receiver 8806. Free-space optics uses the same concepts as fiber-optics, except without the use of a fiber-optic cable. Free-space optics systems provide the light beam 8804 within the infrared (IR) spectrum, which is at the low end of the light spectrum. Specifically, the optical signal is in the range of 300 Gigahertz to 1 Terahertz in terms of wavelength.

Presently existing free-space optics systems can provide data rates of up to 10 Gigabits per second at a distance of up to 2.5 kilometers. In outer space, the communications range of free space optical communications is currently on the order of several thousand kilometers, but has the potential to bridge interplanetary distances of millions of kilometers, using optical telescopes as beam expanders. In January of 2013, NASA used lasers to beam an image of the Mona Lisa to the Lunar Reconnaissance Orbiter roughly 240,000 miles away. To compensate for atmospheric interference, an error correction code algorithm, similar to that used within compact discs, was implemented.

The distance records for optical communications involve detection and emission of laser light by space probes. A two-way distance record for communication was established by the Mercury Laser Altimeter instrument aboard the MESSENGER spacecraft. This infrared diode neodymium laser, designed as a laser altimeter for a Mercury Orbiter mission, was able to communicate across a distance of roughly 15,000,000 miles (24,000,000 kilometers) as the craft neared Earth on a fly by in May of 2005. The previous record had been set with a one-way detection of laser light from Earth by the Galileo Probe as two ground based lasers were seen from 6,000,000 kilometers by the outbound probe in 1992. Researchers used a white LED based space lighting system for indoor local area network communications.

Figure 89:
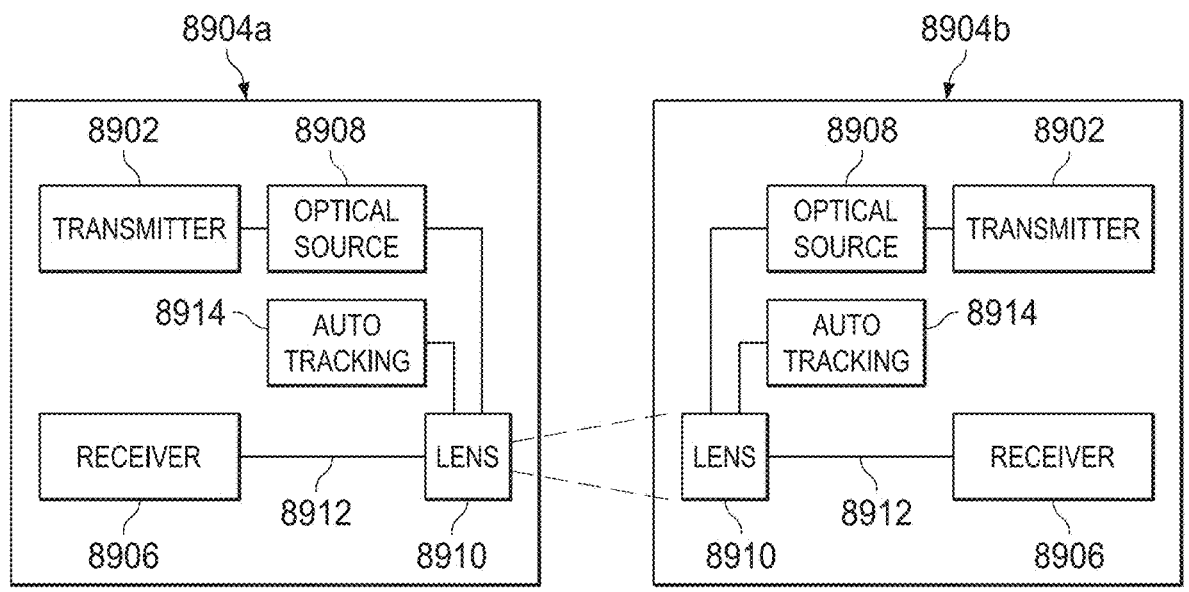
FIG. 89 illustrates a block diagram of a free-space optics system using orbital angular momentum and multi-level overlay modulation.

Referring now to FIG. 89, there is illustrated a block diagram of a free-space optics system using orbital angular momentum and multilevel overlay modulation according to the present disclosure. The OAM twisted signals, in addition to being transmitted over fiber, may also be transmitted using free optics. In this case, the transmission signals are generated within transmission circuitry 8902 at each of the FSO transceivers 8904. Free-space optics technology is based on the connectivity between the FSO based optical wireless units, each consisting of an optical transceiver 8904 with a transmitter 8902 and a receiver 8906 to provide full duplex open pair and bidirectional closed pairing capability. Each optical wireless transceiver unit 8904 additionally includes an optical source 8908 plus a lens or telescope 8910 for transmitting light through the atmosphere to another lens 8910 receiving the information. At this point, the receiving lens or telescope 8910 connects to a high sensitivity receiver 8906 via optical fiber 8912. The transmitting transceiver 8904a and the receiving transceiver 8904b have to have line of sight to each other. Trees, buildings, animals, and atmospheric conditions all can hinder the line of sight needed for this communications medium. Since line of sight is so critical, some systems make use of beam divergence or a diffused beam approach, which involves a large field of view that tolerates substantial line of sight interference without significant impact on overall signal quality. The system may also be equipped with auto tracking mechanism 8914 that maintains a tightly focused beam on the receiving transceiver 3404b, even when the transceivers are mounted on tall buildings or other structures that sway.

The modulated light source used with optical source 8908 is typically a laser or light emitting diode (LED) providing the transmitted optical signal that determines all the transmitter capabilities of the system. Only the detector sensitivity within the receiver 8906 plays an equally important role in total system performance. For telecommunications purposes, only lasers that are capable of being modulated at 20 Megabits per second to 2.5 Gigabits per second can meet current marketplace demands. Additionally, how the device is modulated and how much modulated power is produced are both important to the selection of the device. Lasers in the 780-850 nm and 1520-1600 nm spectral bands meet frequency requirements.

Commercially available FSO systems operate in the near IR wavelength range between 750 and 1600 nm, with one or two systems being developed to operate at the IR wavelength of 10,000 nm. The physics and transmissions properties of optical energy as it travels through the atmosphere are similar throughout the visible and near IR wavelength range, but several factors that influence which wavelengths are chosen for a particular system.

The atmosphere is considered to be highly transparent in the visible and near IR wavelength. However, certain wavelengths or wavelength bands can experience severe absorption. In the near IR wavelength, absorption occurs primarily in response to water particles (i.e., moisture) which are an inherent part of the atmosphere, even under clear weather conditions. There are several transmission windows that are nearly transparent (i.e., have an attenuation of less than 0.2 dB per kilometer) within the 700-10,000 nm wavelength range. These wavelengths are located around specific center wavelengths, with the majority of free-space optics systems designed to operate in the windows of 780-850 nm and 1520-1600 nm.

Wavelengths in the 780-850 nm range are suitable for free-space optics operation and higher power laser sources may operate in this range. At 780 nm, inexpensive CD lasers may be used, but the average lifespan of these lasers can be an issue. These issues may be addressed by running the lasers at a fraction of their maximum rated output power which will greatly increase their lifespan. At around 850 nm, the optical source 8908 may comprise an inexpensive, high performance transmitter and detector components that are readily available and commonly used in network transmission equipment. Highly sensitive silicon (SI) avalanche photodiodes (APD) detector technology and advanced vertical cavity emitting laser may be utilized within the optical source 8908.

VCSEL technology may be used for operation in the 780 to 850 nm range. Possible disadvantage of this technology include beam detection through the use of a night vision scope, although it is still not possible to demodulate a perceived light beam using this technique.

Wavelengths in the 1520-1600 nm range are well-suited for free-space transmission, and high quality transmitter and detector components are readily available for use within the optical source block 8908. The combination of low attenuation and high component availability within this wavelength range makes the development of wavelength division multiplexing (WDM) free-space optics systems feasible. However, components are generally more expensive and detectors are typically less sensitive and have a smaller receive surface area when compared with silicon avalanche photodiode detectors that operator at the 850 nm wavelength. These wavelengths are compatible with erbium-doped fiber amplifier technology, which is important for high power (greater than 500 milliwatt) and high data rate (greater than 2.5 Gigabytes per second) systems. Fifty to 65 times as much power can be transmitted at the 1520-1600 nm wavelength than can be transmitted at the 780-850 nm wavelength for the same eye safety classification. Disadvantages of these wavelengths include the inability to detect a beam with a night vision scope. The night vision scope is one technique that may be used for aligning the beam through the alignment circuitry 8914. Class 1 lasers are safe under reasonably foreseeable operating conditions including the use of optical instruments for intrabeam viewing. Class 1 systems can be installed at any location without restriction.

Another potential optical source 8908 comprised Class 1M lasers. Class 1M laser systems operate in the wavelength range from 302.5 to 4000 nm, which is safe under reasonably foreseeable conditions, but may be hazardous if the user employs optical instruments within some portion of the beam path. As a result, Class 1M systems should only be installed in locations where the unsafe use of optical aids can be prevented. Examples of various characteristics of both Class 1 and Class 1M lasers that may be used for the optical source 4708 are illustrated in Table 9 below.

TABLE 9

| Laser Classification | Power (mW) | Aperture Size (mm) | Distance (m) | Power Density (mW/cm$^2$) |
|---|---|---|---|---|
| 850-nm Wavelength | | | | |
| Class 1 | 0.78 | 7 | 14 | 2.03 |
|  |  | 50 | 2000 | 0.04 |
| Class 1M | 0.78 | 7 | 100 | 2.03 |
|  | 500 | 7 | 14 | 1299.88 |
|  |  | 50 | 2000 | 25.48 |
| 1550-nm Wavelength | | | | |
| Class 1 | 10 | 7 | 14 | 26.00 |
|  |  | 25 | 2000 | 2.04 |
| Class 1M | 10 | 3.5 | 100 | 103.99 |
|  | 500 | 7 | 14 | 1299.88 |
|  |  | 25 | 2000 | 101.91 |

The 10,000 nm wavelength is relatively new to the commercial free space optic arena and is being developed because of better fog transmission capabilities. There is presently considerable debate regarding these characteristics because they are heavily dependent upon fog type and duration. Few components are available at the 10,000 nm wavelength, as it is normally not used within telecommunications equipment. Additionally, 10,000 nm energy does not penetrate glass, so it is ill-suited to behind window deployment.

Within these wavelength windows, FSO systems should have the following characteristics. The system should have the ability to operate at higher power levels, which is important for longer distance FSO system transmissions. The system should have the ability to provide high speed modulation, which is important for high speed FSO systems. The system should provide a small footprint and low power consumption, which is important for overall system design and maintenance. The system should have the ability to operate over a wide temperature range without major performance degradations such that the systems may prove useful for outdoor systems. Additionally, the mean time between failures should exceed 10 years. Presently existing FSO systems generally use VCSELS for operation in the shorter IR wavelength range, and Fabry-Pérot or distributed feedback lasers for operation in the longer IR wavelength range. Several other laser types are suitable for high performance FSO systems.

A free-space optics system using orbital angular momentum processing and multi-layer overlay modulation would provide a number of advantages. The system would be very convenient. Free-space optics provides a wireless solution to a last-mile connection, or a connection between two buildings. There is no necessity to dig or bury fiber cable. Free-space optics also requires no RF license. The system is upgradable and its open interfaces support equipment from a variety of vendors. The system can be deployed behind windows, eliminating the need for costly rooftop right. It is also immune to radiofrequency interference or saturation. The system is also fairly speedy. The system provides 2.5 Gigabits per second of data throughput. This provides ample bandwidth to transfer files between two sites. With the growth in the size of files, free-space optics provides the necessary bandwidth to transfer these files efficiently.

Free-space optics also provides a secure wireless solution. The laser beam cannot be detected with a spectral analyzer or RF meter. The beam is invisible, which makes it difficult to find. The laser beam that is used to transmit and receive the data is very narrow. This means that it is almost impossible to intercept the data being transmitted. One would have to be within the line of sight between the receiver and the transmitter in order to be able to accomplish this feat. If this occurs, this would alert the receiving site that a connection has been lost. Thus, minimal security upgrades would be required for a free-space optics system.

However, there are several weaknesses with free-space optics systems. The distance of a free-space optics system is very limited. Currently operating distances are approximately within 2 kilometers. Although this is a powerful system with great throughput, the limitation of distance is a big deterrent for full-scale implementation. Additionally, all systems require line of sight be maintained at all times during transmission. Any obstacle, be it environmental or animals can hinder the transmission. Free-space optic technology must be designed to combat changes in the atmosphere which can affect free-space optic system performance capacity.

Something that may affect a free-space optics system is fog. Dense fog is a primary challenge to the operation of free-space optics systems. Rain and snow have little effect on free-space optics technology, but fog is different. Fog is a vapor composed of water droplets which are only a few hundred microns in diameter, but can modify light characteristics or completely hinder the passage of light through a combination of absorption, scattering, and reflection. The primary answer to counter fog when deploying free-space optic based wireless products is through a network design that shortens FSO linked distances and adds network redundancies.

Absorption is another problem. Absorption occurs when suspended water molecules in the terrestrial atmosphere extinguish photons. This causes a decrease in the power density (attenuation) of the free space optics beam and directly affects the availability of the system. Absorption occurs more readily at some wavelengths than others. However, the use of appropriate power based on atmospheric conditions and the use of spatial diversity (multiple beams within an FSO based unit), helps maintain the required level of network availability.

Solar interference is also a problem. Free-space optics systems use a high sensitivity receiver in combination with a larger aperture lens. As a result, natural background light can potentially interfere with free-space optics signal reception. This is especially the case with the high levels of background radiation associated with intense sunlight. In some instances, direct sunlight may case link outages for periods of several minutes when the sun is within the receiver's field of vision. However, the times when the receiver is most susceptible to the effects of direct solar illumination can be easily predicted. When direct exposure of the equipment cannot be avoided, the narrowing of receiver field of vision and/or using narrow bandwidth light filters can improve system performance. Interference caused by sunlight reflecting off of a glass surface is also possible.

Scattering issues may also affect connection availability. Scattering is caused when the wavelength collides with the scatterer. The physical size of the scatterer determines the type of scattering. When the scatterer is smaller than the wavelength, this is known as Rayleigh scattering. When a scatterer is of comparable size to the wavelengths, this is known as Mie scattering. When the scattering is much larger than the wavelength, this is known as non-selective scattering. In scattering, unlike absorption, there is no loss of energy, only a directional redistribution of energy that may have significant reduction in beam intensity over longer distances.

Physical obstructions such as flying birds or construction cranes can also temporarily block a single beam free space optics system, but this tends to cause only short interruptions. Transmissions are easily and automatically resumed when the obstacle moves. Optical wireless products use multibeams (spatial diversity) to address temporary abstractions as well as other atmospheric conditions, to provide for greater availability.

The movement of buildings can upset receiver and transmitter alignment. Free-space optics based optical wireless offerings use divergent beams to maintain connectivity. When combined with tracking mechanisms, multiple beam FSO based systems provide even greater performance and enhanced installation simplicity.

Scintillation is caused by heated air rising from the Earth or man-made devices such as heating ducts that create temperature variations among different pockets of air. This can cause fluctuations in signal amplitude, which leads to "image dancing" at the free-space optics based receiver end. The effects of this scintillation are called "refractive turbulence." This causes primarily two effects on the optical beams. Beam wander is caused by the turbulent eddies that are no larger than the beam. Beam spreading is the spread of an optical beam as it propagates through the atmosphere.

Referring now to FIGS. 90A-90D, in order to achieve higher data capacity within optical links, an additional degree of freedom from multiplexing multiple data channels must be exploited. Moreover, the ability to use two different orthogonal multiplexing techniques together has the potential to dramatically enhance system performance and increased bandwidth.

Figure 90A:
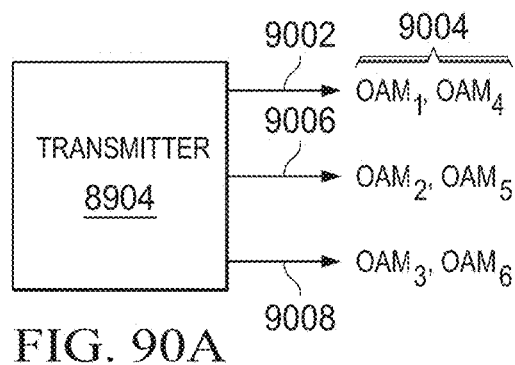
FIGS. 90A-90C illustrate the manner for multiplexing multiple data channels into optical links to achieve higher data capacity.
Figure 90B:
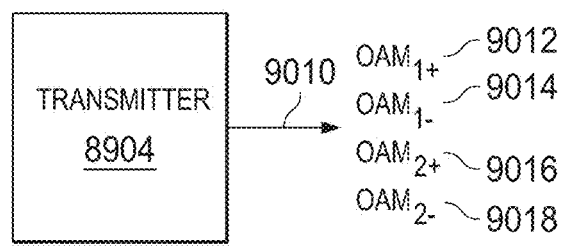

One multiplexing technique which may exploit the possibilities is mode division multiplexing (MDM) using orbital angular momentum (OAM). OAM mode refers to laser beams within a free-space optical system or fiber-optic system that have a phase term of $e^{il\varphi}$ in their wave fronts, in which $\varphi$ is the azimuth angle and l determines the OAM value (topological charge). In general, OAM modes have a "donut-like" ring shaped intensity distribution. Multiple spatial collocated laser beams, which carry different OAM values, are orthogonal to each other and can be used to transmit multiple independent data channels on the same wavelength. Consequently, the system capacity and spectral efficiency in terms of bits/S/Hz can be dramatically increased. Free-space communications links using OAM may support 100 Tbits/capacity. Various techniques for implementing this as illustrated in FIGS. 90A-90D include a combination of multiple beams 9002 having multiple different OAM values 9004 on each wavelength. Thus, beam 9002 includes OAM values, OAM1 and OAM4. Beam 9006 includes OAM value 2 and OAM value 5. Finally, beam 9008 includes OAM3 value and OAM6 value. Referring now to FIG. 90B, there is illustrated a single beam wavelength 9010 using a first group of OAM values 9012 having both a positive OAM value 9012 and a negative OAM value

9014. Similarly, OAM2 value may have a positive value 9016 and a negative value 9018 on the same wavelength 9010. While mode division multiplexing of OAM modes is described above, other orthogonal functions may be used with mode division multiplexing such as Laguerre Gaussian functions, Hermite Gaussian functions, Jacobi functions, Gegenbauer functions, Legendre functions, Chebyshev functions or Ince-Gaussian functions.

Figure 90C:
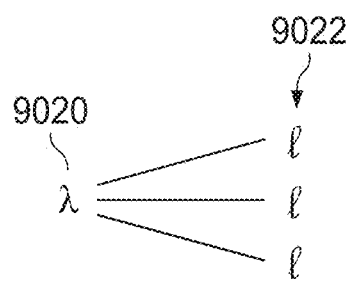
Figure 90D:
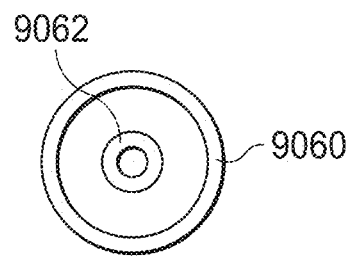
FIG. 90D illustrates groups of concentric rings for a wavelength having multiple OAM valves.

FIG. 90C illustrates the use of a wavelength 9020 having polarization multiplexing of OAM value. The wavelength 9020 can have multiple OAM values 9022 multiplexed thereon. The number of available channels can be further increased by applying left or right handed polarization to the OAM values. Finally, FIG. 90D illustrates two groups of concentric rings 9060, 9062 for a wavelength having multiple OAM values.

Figure 91:
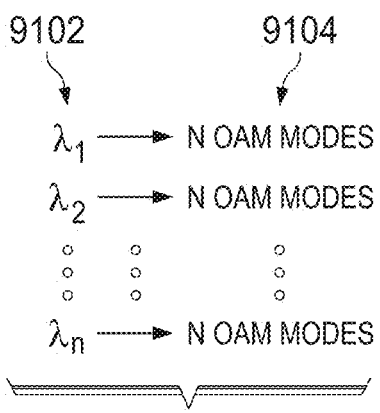
FIG. 91 illustrates a WDM channel containing many orthogonal OAM beams.

Wavelength distribution multiplexing (WDM) has been widely used to improve the optical communication capacity within both fiber-optic systems and free-space communication system. OAM mode/mode division multiplexing and WDM are mutually orthogonal such that they can be combined to achieve a dramatic increase in system capacity. Referring now to FIG. 91, there is illustrated a scenario where each WDM channel 9102 contains many orthogonal OAM beam 9104. Thus, using a combination of orbital angular momentum with wave division multiplexing, a significant enhancement in communication link to capacity may be achieved. By further combining polarization multiplexing with a combination of MDM and WDM even further increased in bandwidth capacity may be achieved from the +/− polarization values being added to the mode and wavelength multiplexing.

Current optical communication architectures have considerable routing challenges. A routing protocol for use with free-space optic system must take into account the line of sight requirements for optical communications within a free-space optics system. Thus, a free-space optics network must be modeled as a directed hierarchical random sector geometric graph in which sensors route their data via multi-hop paths to a base station through a cluster head. This is a new efficient routing algorithm for local neighborhood discovery and a base station uplink and downlink discovery algorithm. The routing protocol requires order Olog(n) storage at each node versus order O(n) used within current techniques and architectures.

Current routing protocols are based on link state, distance vectors, path vectors, or source routing, and they differ from the new routing technique in significant manners. First, current techniques assume that a fraction of the links are bidirectional. This is not true within a free-space optic network in which all links are unidirectional. Second, many current protocols are designed for ad hoc networks in which the routing protocol is designed to support multi-hop communications between any pair of nodes. The goal of the sensor network is to route sensor readings to the base station. Therefore, the dominant traffic patterns are different from those in an ad hoc network. In a sensor network, node to base stations, base station to nodes, and local neighborhood communication are mostly used.

Figure 92:
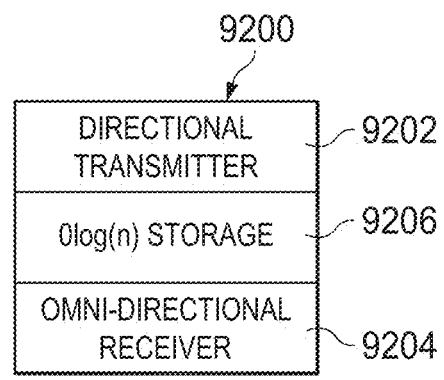
FIG. 92 illustrates a node of a free-space optical system.

Recent studies have considered the effect of unidirectional links and report that as many as 5 percent to 10 percent of links and wireless ad hoc networks are unidirectional due to various factors. Routing protocols such as DSDV and AODV use a reverse path technique, implicitly ignoring such unidirectional links and are therefore not relevant in this scenario. Other protocols such as DSR, ZRP, or ZRL have been designed or modified to accommodate unidirectionality by detecting unidirectional links and then providing bidirectional abstraction for such links. Referring now to FIG. 92, the simplest and most efficient solution for dealing with unidirectionality is tunneling, in which bidirectionality is emulated for a unidirectional link by using bidirectional links on a reverse back channel to establish the tunnel. Tunneling also prevents implosion of acknowledgement packets and looping by simply pressing link layer acknowledgements for tunneled packets received on a unidirectional link. Tunneling, however, works well in mostly bidirectional networks with few unidirectional links.

Figure 93:
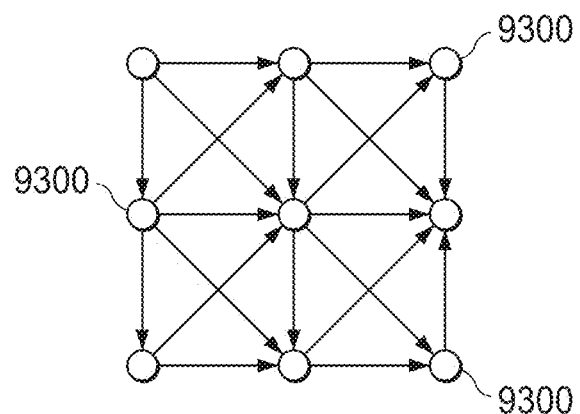
FIG. 93 illustrates a network of nodes within a free-space optical system.

Within a network using only unidirectional links such as a free-space optical network, systems such as that illustrated in FIGS. 92 and 93 would be more applicable. Nodes within a unidirectional network utilize a directional transmit 9202 transmitting from the node 9200 in a single, defined direction. Additionally, each node 9200 includes an omnidirectional receiver 9204 which can receive a signal coming to the node in any direction. Also, as discussed here and above, the node 9200 would also include a 0 log(n) storage 9206. Thus, each node 9200 provide only unidirectional communications links. Thus, a series of nodes 9200 as illustrated in FIG. 93 may unidirectionally communicate with any other node 9200 and forward communication from one desk location to another through a sequence of interconnected nodes.

Topological charge may be multiplexed to the wave length for either linear or circular polarization. In the case of linear polarizations, topological charge would be multiplexed on vertical and horizontal polarization. In case of circular polarization, topological charge would be multiplexed on left hand and right hand circular polarizations.

The topological charges can be created using Spiral Phase Plates (SPPs) such as that illustrated in FIG. 12E, phase mask holograms or a Spatial Light Modulator (SLM) by adjusting the voltages on SLM which creates properly varying index of refraction resulting in twisting of the beam with a specific topological charge. Different topological charges can be created and muxed together and de-muxed to separate charges.

As Spiral Phase plates can transform a plane wave (l=0) to a twisted wave of a specific helicity (i.e. l=+1), Quarter Wave Plates (QWP) can transform a linear polarization (s=0) to circular polarization (i.e. s=+1).

Cross talk and multipath interference can be reduced using Multiple-Input-Multiple-Output (MIMO).

Most of the channel impairments can be detected using a control or pilot channel and be corrected using algorithmic techniques (closed loop control system).

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Figure 94:
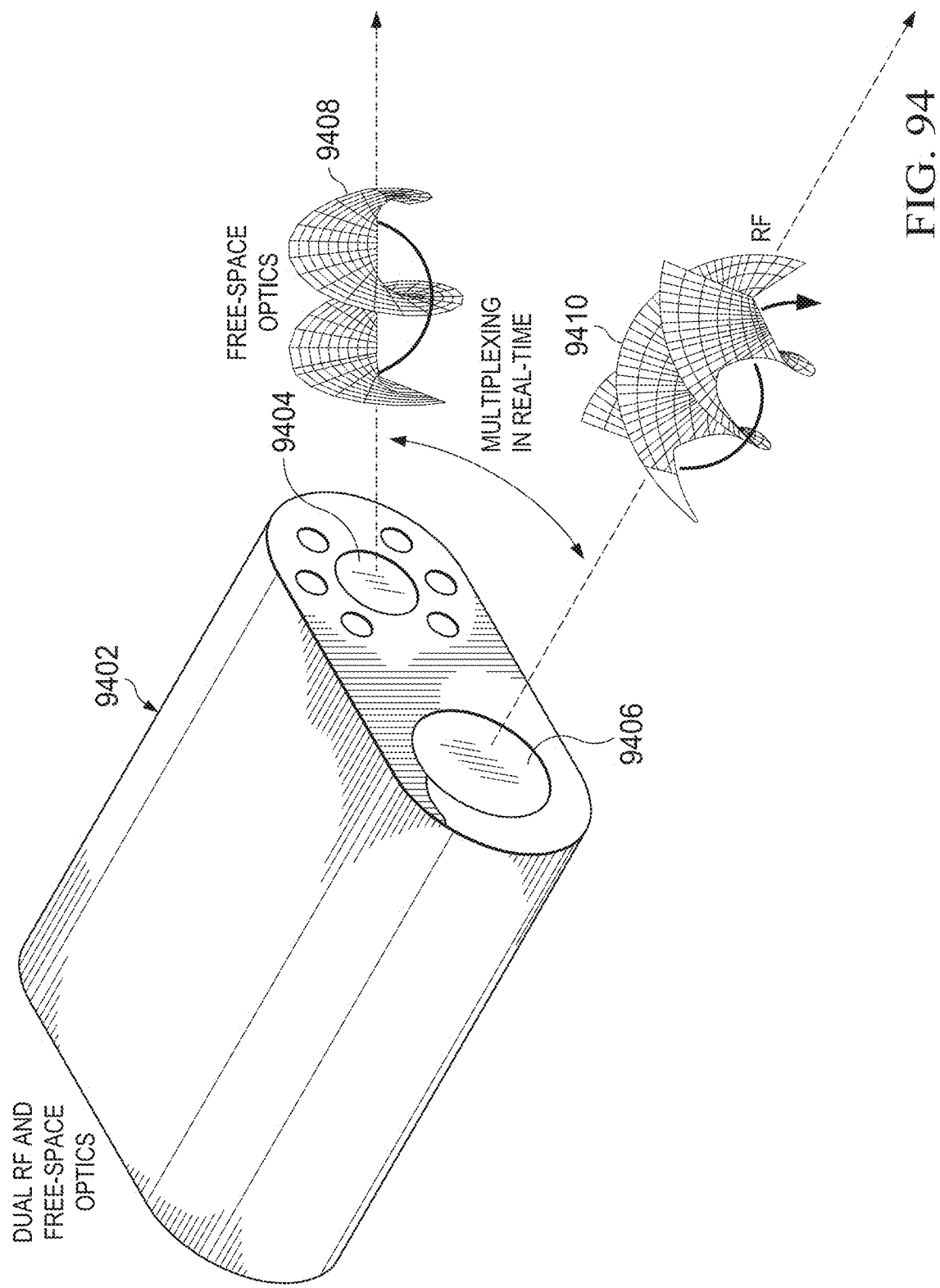
FIG. 94 illustrates a system for multiplexing between a free space signal and an RF signal.

In a further embodiment illustrated in FIG. 94, both RF signals and free space optics may be implemented within a dual RF and free space optics mechanism 9402. The dual RF and free space optics mechanism 9402 include a free space optics projection portion 9404 that transmits a light wave having an orbital angular momentum applied thereto with multilevel overlay modulation and a RF portion 9406 including circuitry necessary for transmitting information with orbital angular momentum and multilayer overlay on an RF signal 9410. The dual RF and free space optics mechanism 9402 may be multiplexed in real time between the free space optics signal 9408 and the RF signal 9410 depending upon operating conditions. In some situations, the free space optics signal 9408 would be most appropriate for transmitting the data. In other situations, the free space optics signal 9408 would not be available and the RF signal 9410 would be most appropriate for transmitting data. The dual RF and free space optics mechanism 9402 may multiplex in real time between these two signals based upon the available operating conditions.

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Quantum Communication Using OAM

OAM has also received increasing interest for its potential role in the development of secure quantum communications that are based on the fundamental laws of quantum mechanics (i.e., quantum no cloning theorem). One of the examples is high dimensional quantum key distribution (QKD) QKD systems have conventionally utilized the polarization or phase of light for encoding. The original proposal for QKD (i.e., the BB 84 protocol of Bennett and Brassard) encodes information on the polarization states and so only allow one bit of information to be impressed onto each photon. The benefit of using OAM is that OAM states reside in an infinite dimensional Hilbert space, implying the possibility of encoding multiple bits of information on an individual photon. Similar to the use of OAM multiplexing in classical optical communications, the secure key rate can be further increased simultaneous encoding of information in different domains is implemented through making use of high dimensional entanglement. The addition to the advantages of a large alphabet for information encoding, the security of keys generated by an OAM-based QKD system have been shown to be improved due to the use of a large Hilbert space, which indicates increase robustness of the QKD system against eavesdropping.

Figure 95:
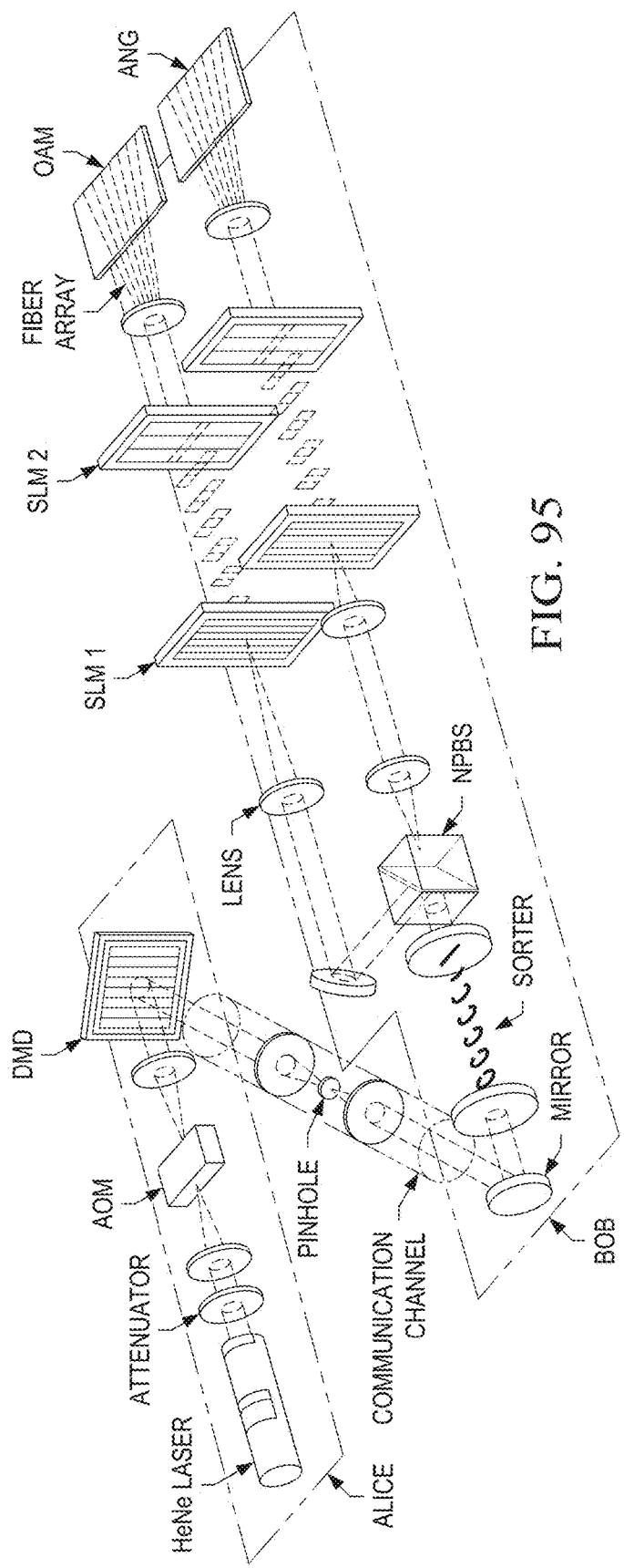
FIG. 95 illustrates a seven dimensional QKD link based on OAM encoding.
Figure 96:
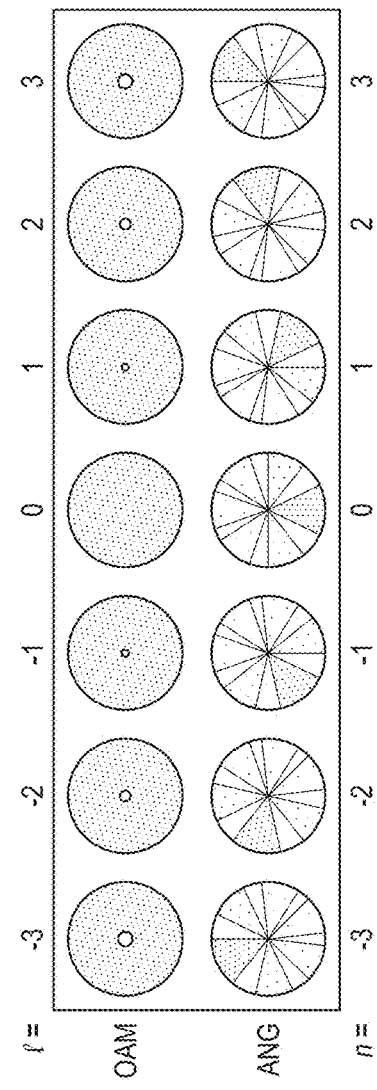

FIG. 95 illustrates a seven dimensional QKD link based on OAM encoding. FIG. 96 shows the two complementary seven dimensional bases used for information encoding. Recent QKD systems have been demonstrated to operate at a secure key rate of up to 1 Mb/s. However, in order to support an OAM-based QKD system with a higher secure key rate, the development of a OAM generation methods with speeds higher than MHz would be required. Another challenge arises from the efficiency inch sorting single photons in the OAM basis, although the current OAM sorting approach allows an OAM separation efficiency of greater than 92%. Additionally, adverse channel conditions pose a critical challenge. For a free space QKD system employing OAM states, atmospheric turbulence that distorts the phase front of an OAM state may significantly degrade the information content of the transmitted OAM light field.

Quantum Key Distribution

Figure 97:
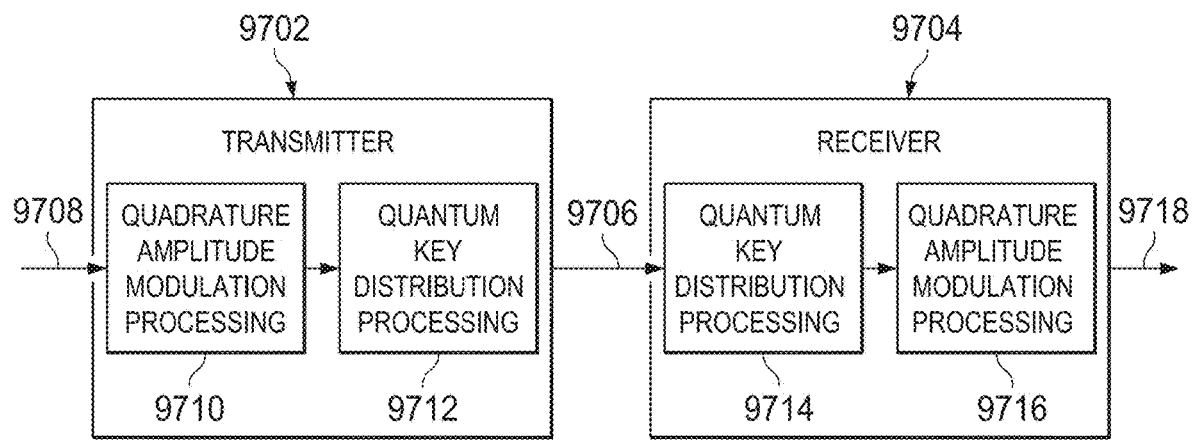

Referring now to FIG. 97, there is illustrated a further improvement of a system utilizing orbital angular momentum processing, Laguerre Gaussian processing, Hermite Gaussian processing or processing using any orthogonal functions. In the illustration of FIG. 97, a transmitter 9702 and receiver 9704 are interconnected over an optical link 9706. The optical link 9706 may comprise a fiber-optic link or a free-space optic link as described herein above. The transmitter receives a data stream 9708 that is processed via orbital angular momentum processing circuitry 9710. The orbital angular momentum processing circuitry 9710 provide orbital angular momentum twist to various signals on separate channels as described herein above. In some embodiments, the orbital angular momentum processing circuitry may further provide multi-layer overlay modulation to the signal channels in order to further increase system bandwidth.

The OAM processed signals are provided to quantum key distribution processing circuitry 9712. The quantum key distribution processing circuitry 9712 utilizes the principals of quantum key distribution as will be more fully described herein below to enable encryption of the signal being transmitted over the optical link 9706 to the receiver 9704. The received signals are processed within the receiver 9704 using the quantum key distribution processing circuitry 9714. The quantum key distribution processing circuitry 9714 decrypts the received signals using the quantum key distribution processing as will be more fully described herein below. The decrypted signals are provided to orbital angular momentum processing circuitry 9716 which removes any orbital angular momentum twist from the signals to generate the plurality of output signals 9718. As mentioned previously, the orbital angular momentum processing circuitry 9716 may also demodulate the signals using multilayer overlay modulation included within the received signals.

Orbital angular momentum in combination with optical polarization is exploited within the circuit of FIG. 97 in order to encode information in rotation invariant photonic states, so as to guarantee full independence of the communication from the local reference frames of the transmitting unit 9702 and the receiving unit 9704. There are various ways to implement quantum key distribution (QKD), a protocol that exploits the features of quantum mechanics to guarantee unconditional security in cryptographic communications with error rate performances that are fully compatible with real world application environments.

Encrypted communication requires the exchange of keys in a protected manner. This key exchanged is often done through a trusted authority. Quantum key distribution is an alternative solution to the key establishment problem. In contrast to, for example, public key cryptography, quantum key distribution has been proven to be unconditionally secure, i.e., secure against any attack, even in the future, irrespective of the computing power or in any other resources that may be used. Quantum key distribution security relies on the laws of quantum mechanics, and more specifically on the fact that it is impossible to gain information about non-orthogonal quantum states without perturbing these states. This property can be used to establish random keys between a transmitter and receiver, and guarantee that the key is perfectly secret from any third party eavesdropping on the line.

Figure 98:
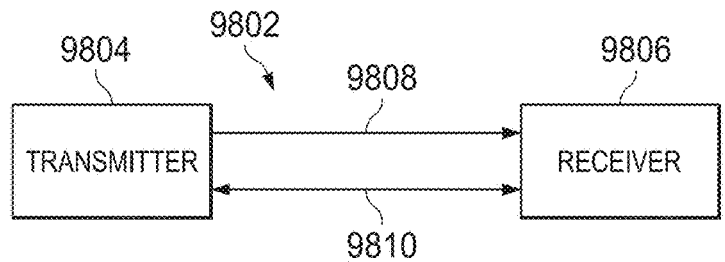

In parallel to the "full quantum proofs" mentioned above, the security of QKD systems has been put on stable information theoretic footing, thanks to the work on secret key agreements done in the framework of information theoretic cryptography and to its extensions, triggered by the new possibilities offered by quantum information. Referring now to FIG. 98, within a basic QKD system, a QKD link 9802 is a point to point connection between a transmitter 9804 and a receiver 9806 that want to share secret keys. The QKD link 9802 is constituted by the combination of a quantum channel 9808 and a classic channel 9810. The transmitter 9804 generates a random stream of classical bits and encodes them into a sequence of non-orthogonal states of light that are transmitted over the quantum channel 9808. Upon reception of these quantum states, the receiver 9806 performs some appropriate measurements leading the receiver to share some classical data over the classical link 9810 correlated with the transmitter bit stream. The classical channel 9810 is used to test these correlations.

If the correlations are high enough, this statistically implies that no significant eavesdropping has occurred on the quantum channel 9808 and thus, that has a very high probability, a perfectly secure, symmetric key can be distilled from the correlated data shared by the transmitter 9804 and the receiver 9806. In the opposite case, the key generation process has to be aborted and started again. The quantum key distribution is a symmetric key distribution technique. Quantum key distribution requires, for authentication purposes, that the transmitter 9804 and receiver 9806 share in advance a short key whose length scales only logarithmically in the length of the secret key generated by an OKD session.

Quantum key distribution on a regional scale has already been demonstrated in a number of countries. However, free-space optical links are required for long distance communication among areas which are not suitable for fiber installation or for moving terminals, including the important case of satellite based links. The present approach exploits spatial transverse modes of the optical beam, in particular of the OAM degree of freedom, in order to acquire a significant technical advantage that is the insensitivity of the communication to relevant alignment of the user's reference frames. This advantage may be very relevant for quantum key distribution implementation to be upgraded from the regional scale to a national or continental one, or for links crossing hostile ground, and even for envisioning a quantum key distribution on a global scale by exploiting orbiting terminals on a network of satellites.

The OAM Eigen modes are characterized by a twisted wavefront composed of "$l$" intertwined helices, where "$l$" is an integer, and by photons carrying "$\pm l\hbar$" of (orbital) angular momentum, in addition to the more usual spin angular momentum (SAM) associated with polarization. The potentially unlimited value of "$l$" opens the possibility to exploit OAM also for increasing the capacity of communication systems (although at the expense of increasing also the channel cross-section size), and terabit classical data transmission based on OAM multiplexing can be demonstrated both in free-space and optical fibers. Such a feature can also be exploited in the quantum domain, for example to expand the number of qubits per photon, or to achieve new functions, such as the rotational invariance of the qubits.

In a free-space QKD, two users (Alice and Bob) must establish a shared reference frame (SRF) in order to communicate with good fidelity. Indeed the lack of a SRF is equivalent to an unknown relative rotation which introduces noise into the quantum channel, disrupting the communication. When the information is encoded in photon polarization, such a reference frame can be defined by the orientations of Alice's and Bob's "horizontal" linear polarization directions. The alignment of these directions needs extra resources and can impose serious obstacles in long distance free space QKD and/or when the misalignment varies in time. As indicated, we can solve this by using rotation invariant states, which remove altogether the need for establishing a SRF. Such states are obtained as a particular combination of OAM and polarization modes (hybrid states), for which the transformation induced by the misalignment on polarization is exactly balanced by the effect of the same misalignment on spatial modes. These states exhibit a global symmetry under rotations of the beam around its axis and can be visualized as space-variant polarization states, generalizing the well-known azimuthal and radial vector beams, and forming a two-dimensional Hilbert space. Moreover, this rotation-invariant hybrid space can be also regarded as a decoherence-free subspace of the four-dimensional OAM-polarization product Hilbert space, insensitive to the noise associated with random rotations.

The hybrid states can be generated by a particular space-variant birefringent plate having topological charge at its center, named "q-plate". In particular, a polarized Gaussian beam (having zero OAM) passing through a q-plate with $q=\frac{1}{2}$ will undergo the following transformation:

$$(\alpha|R\rangle + \beta|R\rangle)_\pi \otimes |O\rangle_O \rightarrow \alpha|L\rangle_\pi \otimes |r\rangle_O + \beta|R\rangle_\pi \otimes |l\rangle_O$$

$|L\rangle_{\pi_-}$ and $|R\rangle_{\pi_-}$ denote the left and right circular polarization states (eigenstates of SAM with eigenvalues "$\pm\hbar$"), $|0\rangle_O$ represents the transverse Gaussian mode with zero OAM and the $|L\rangle_O$ and $|R\rangle_O$ eigenstates of OAM with $|l|=1$ and with eigenvalues "$\pm l\hbar$"). The states appearing on the right hand side of equation are rotation-invariant states. The reverse operation to this can be realized by a second q-plate with the same q. In practice, the q-plate operates as an interface between the polarization space and the hybrid one, converting qubits from one space to the other and vice versa in a universal (qubit invariant) way. This in turn means that the initial encoding and final decoding of information in our QKD implementation protocol can be conveniently performed in the polarization space, while the transmission is done in the rotation-invariant hybrid space.

OAM is a conserved quantity for light propagation in vacuum, which is obviously important for communication applications. However, OAM is also highly sensitive to atmospheric turbulence, a feature which limits its potential usefulness in many practical cases unless new techniques are developed to deal with such issues.

Quantum cryptography describes the use of quantum mechanical effects (in particular quantum communication and quantum computation) to perform cryptographic tasks or to break cryptographic systems. Well-known examples of quantum cryptography are the use of quantum communication to exchange a key securely (quantum key distribution) and the hypothetical use of quantum computers that would allow the breaking of various popular public-key encryption and signature schemes (e.g., RSA).

The advantage of quantum cryptography lies in the fact that it allows the completion of various cryptographic tasks that are proven to be impossible using only classical (i.e. non-quantum) communication. For example, quantum mechanics guarantees that measuring quantum data disturbs that data; this can be used to detect eavesdropping in quantum key distribution.

Quantum key distribution (QKD) uses quantum mechanics to guarantee secure communication. It enables two parties to produce a shared random secret key known only to them, which can then be used to encrypt and decrypt messages.

An important and unique property of quantum distribution is the ability of the two communicating users to detect the presence of any third party trying to gain knowledge of the key. This results from a fundamental aspect of quantum mechanics: the process of measuring a quantum system in general disturbs the system. A third party trying to eavesdrop on the key must in some way measure it, thus introducing detectable anomalies. By using quantum superposition or quantum entanglement and transmitting information in quantum states, a communication system can be implemented which detects eavesdropping. If the level of eavesdropping is below a certain threshold, a key can be produced that is guaranteed to be secure (i.e. the eavesdropper has no information about it), otherwise no secure key is possible and communication is aborted.

The security of quantum key distribution relies on the foundations of quantum mechanics, in contrast to traditional key distribution protocol which relies on the computational difficulty of certain mathematical functions, and cannot provide any indication of eavesdropping or guarantee of key security.

Quantum key distribution is only used to reduce and distribute a key, not to transmit any message data. This key can then be used with any chosen encryption algorithm to encrypt (and decrypt) a message, which is transmitted over a standard communications channel. The algorithm most commonly associated with QKD is the one-time pad, as it is provably secure when used with a secret, random key.

Quantum communication involves encoding information in quantum states, or qubits, as opposed to classical communication's use of bits. Usually, photons are used for these quantum states and thus is applicable within optical communication systems. Quantum key distribution exploits certain properties of these quantum states to ensure its security. There are several approaches to quantum key distribution, but they can be divided into two main categories, depending on which property they exploit. The first of these are prepare and measure protocol. In contrast to classical physics, the act of measurement is an integral part of quantum mechanics. In general, measuring an unknown quantum state changes that state in some way. This is known as quantum indeterminacy, and underlies results such as the Heisenberg uncertainty principle, information distribution theorem, and no cloning theorem. This can be exploited in order to detect any eavesdropping on communication (which necessarily involves measurement) and, more importantly, to calculate the amount of information that has been intercepted. Thus, by detecting the change within the signal, the amount of eavesdropping or information that has been intercepted may be determined by the receiving party.

The second category involves the use of entanglement based protocols. The quantum states of two or more separate objects can become linked together in such a way that they must be described by a combined quantum state, not as individual objects. This is known as entanglement, and means that, for example, performing a measurement on one object affects the other object. If an entanglement pair of objects is shared between two parties, anyone intercepting either object alters the overall system, revealing the presence of a third party (and the amount of information that they have gained). Thus, again, undesired reception of information may be determined by change in the entangled pair of objects that is shared between the parties when intercepted by an unauthorized third party.

One example of a quantum key distribution (QKD) protocol is the BB84 protocol. The BB84 protocol was originally described using photon polarization states to transmit information. However, any two pairs of conjugate states can be used for the protocol, and optical fiber-based implementations described as BB84 can use phase-encoded states. The transmitter (traditionally referred to as Alice) and the receiver (traditionally referred to as Bob) are connected by a quantum communication channel which allows quantum states to be transmitted. In the case of photons, this channel is generally either an optical fiber, or simply free-space, as described previously with respect to FIG. 97. In addition, the transmitter and receiver communicate via a public classical channel, for example using broadcast radio or the Internet. Neither of these channels needs to be secure. The protocol is designed with the assumption that an eavesdropper (referred to as Eve) can interfere in any way with both the transmitter and receiver.

Figure 99:
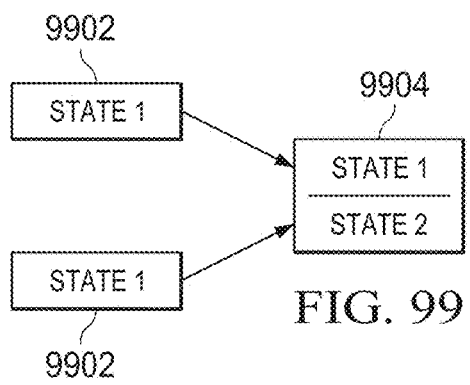
Figure 100:
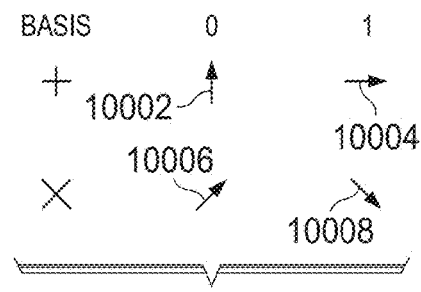

Referring now to FIG. 99, the security of the protocol comes from encoding the information in non-orthogonal states. Quantum indeterminacy means that these states cannot generally be measured without disturbing the original state. BB84 uses two pair of states 9902, each pair conjugate to the other pair to form a conjugate pair 9904. The two states 9902 within a pair 9904 are orthogonal to each other. Pairs of orthogonal states are referred to as a basis. The usual polarization state pairs used are either the rectilinear basis of vertical (0 degrees) and horizontal (90 degrees), the diagonal basis of 45 degrees and 135 degrees, or the circular basis of left handedness and/or right handedness. Any two of these basis are conjugate to each other, and so any two can be used in the protocol. In the example of FIG. 100, rectilinear basis are used at 10002 and 10004, respectively, and diagonal basis are used at 10006 and 10008.

The first step in BB84 protocol is quantum transmission. Referring now to FIG. 101 wherein there is illustrated a flow diagram describing the process, wherein the transmitter creates a random bit (0 or 1) at step 10102, and randomly selects at 10104 one of the two basis, either rectilinear or diagonal, to transmit the random bit. The transmitter prepares at step 10106 a photon polarization state depending both on the bit value and the selected basis, as shown in FIG. 55. So, for example, a 0 is encoded in the rectilinear basis (+) as a vertical polarization state and a 1 is encoded in a diagonal basis (X) as a 135 degree state. The transmitter transmits at step 10108 a single proton in the state specified to the receiver using the quantum channel. This process is repeated from the random bit stage at step 10102 with the transmitter recording the state, basis, and time of each photon that is sent over the optical link.

According to quantum mechanics, no possible measurement distinguishes between the four different polarization states 10002 through 10008 of FIG. 100, as they are not all orthogonal. The only possible measurement is between any two orthogonal states (and orthonormal basis). So, for example, measuring in the rectilinear basis gives a result of horizontal or vertical. If the photo was created as horizontal or vertical (as a rectilinear eigenstate), then this measures the correct state, but if it was created as 45 degrees or 135 degrees (diagonal eigenstate), the rectilinear measurement instead returns either horizontal or vertical at random. Furthermore, after this measurement, the proton is polarized in the state it was measured in (horizontal or vertical), with all of the information about its initial polarization lost.

Referring now to FIG. 102, as the receiver does not know the basis the photons were encoded in, the receiver can only select a basis at random to measure in, either rectilinear or diagonal. At step 10202, the transmitter does this for each received photon, recording the time measurement basis used and measurement result at step 10204. At step 10206, a determination is made if there are further protons present and, if so, control passes back to step 10202. Once inquiry step 10206 determines the receiver had measured all of the protons, the transceiver communicates at step 10208 with the transmitter over the public communications channel. The transmitter broadcast the basis for each photon that was sent at step 10210 and the receiver broadcasts the basis each photon was measured in at step 10212. Each of the transmitter and receiver discard photon measurements where the receiver used a different basis at step 10214 which, on average, is one-half, leaving half of the bits as a shared key, at step 10216. This process is more fully illustrated in FIG. 103.

The transmitter transmits the random bit 01101001. For each of these bits respectively, the transmitter selects the sending basis of rectilinear, rectilinear, diagonal, rectilinear, diagonal, diagonal, diagonal, and rectilinear. Thus, based upon the associated random bits selected and the random sending basis associated with the signal, the polarization indicated in line 10202 is provided. Upon receiving the photon, the receiver selects the random measuring basis as indicated in line 10304. The photon polarization measurements from these basis will then be as indicated in line 10306. A public discussion of the transmitted basis and the measurement basis are discussed at 10308 and the secret key is determined to be 0101 at 10310 based upon the matching bases for transmitted photons 1, 3, 6, and 8.

Referring now to FIG. 104, there is illustrated the process for determining whether to keep or abort the determined key based upon errors detected within the determined bit string. To check for the presence of eavesdropping, the transmitter and receiver compare a certain subset of their remaining bit strings at step 10402. If a third party has gained any information about the photon's polarization, this introduces errors within the receiver's measurements. If more than P bits differ at inquiry step 10404, the key is aborted at step 10406, and the transmitter and receiver try again, possibly with a different quantum channel, as the security of the key cannot be guaranteed. P is chosen so that if the number of bits that is known to the eavesdropper is less than this, privacy amplification can be used to reduce the eavesdropper's knowledge of the key to an arbitrarily small amount by reducing the length of the key. If inquiry step 10404 determines that the number of bits is not greater than P, then the key may be used at step 10408.

The E91 protocol comprises another quantum key distribution scheme that uses entangled pairs of protons. This protocol may also be used with entangled pairs of protons using orbital angular momentum processing, Laguerre Gaussian processing, Hermite Gaussian processing or processing using any orthogonal functions for Q-bits. The entangled pairs can be created by the transmitter, by the receiver, or by some other source separate from both of the transmitter and receiver, including an eavesdropper. The photons are distributed so that the transmitter and receiver each end up with one photon from each pair. The scheme relies on two properties of entanglement. First, the entangled states are perfectly correlated in the sense that if the transmitter and receiver both measure whether their particles have vertical or horizontal polarizations, they always get the same answer with 100 percent probability. The same is true if they both measure any other pair of complementary (orthogonal) polarizations. However, the particular results are not completely random. It is impossible for the transmitter to predict if the transmitter, and thus the receiver, will get vertical polarizations or horizontal polarizations. Second, any attempt at eavesdropping by a third party destroys these correlations in a way that the transmitter and receiver can detect. The original Ekert protocol (E91) consists of three possible states and testing Bell inequality violation for detecting eavesdropping.

Presently, the highest bit rate systems currently using quantum key distribution demonstrate the exchange of secure keys at 1 Megabit per second over a 20 kilometer optical fiber and 10 Kilobits per second over a 100 kilometer fiber.

The longest distance over which quantum key distribution has been demonstrated using optical fiber is 148 kilometers. The distance is long enough for almost all of the spans found in today's fiber-optic networks. The distance record for free-space quantum key distribution is 144 kilometers using BB84 enhanced with decoy states.

Referring now to FIG. 105, there is illustrated a functional block diagram of a transmitter 10502 and receiver 10504 that can implement alignment of free-space quantum key distribution. The system can implement the BB84 protocol with decoy states. The controller 10506 enables the bits to be encoded in two mutually unbiased bases $Z=\{|0\rangle, |1\rangle\}$ and $X=\{|+\rangle, |-\rangle\}$, where $|0\rangle$ and $|1\rangle$ are two orthogonal states spanning the qubit space and $|\pm\rangle=1/\sqrt{2}(|0\rangle\pm|1\rangle)$. The transmitter controller 10506 randomly chooses between the Z and X basis to send the classical bits 0 and 1. Within hybrid encoding, the Z basis corresponds to $\{|L\rangle_\pi\otimes|r\rangle_O, |R\rangle_\pi\otimes|l\rangle_O\}$ while the X basis states correspond to $1/\sqrt{2}(|L\rangle_\pi\otimes|r\rangle_O\pm|R\rangle_\pi\otimes|l\rangle_O)$. The transmitter 10502 uses four different polarized attenuated lasers 10508 to generate quantum bits through the quantum bit generator 10510. Photons from the quantum bit generator 41050 are delivered via a single mode fiber 10512 to a telescope 10514. Polarization states $|H\rangle$, $|V\rangle$, $|R\rangle$, $|L\rangle$ are transformed into rotation invariant hybrid states by means of a q-plate 10516 with $q=\frac{1}{2}$. The photons can then be transmitted to the receiving station 10504 where a second q-plate transform 10518 transforms the signals back into the original polarization states $|H\rangle$, $|V\rangle$, $|R\rangle$, $|L\rangle$, as defined by the receiver reference frame. Qubits can then be analyzed by polarizers 10520 and single photon detectors 10522. The information from the polarizers 10520 and photo detectors 10522 may then be provided to the receiver controller 10524 such that the shifted keys can be obtained by keeping only the bits corresponding to the same basis on the transmitter and receiver side as determined by communications over a classic channel between the transceivers 10526, 10528 in the transmitter 10502 and receiver 10504.

Referring now to FIG. 106, there is illustrated a network cloud based quantum key distribution system including a central server 10602 and various attached nodes 10604 in a hub and spoke configuration. Trends in networking are presenting new security concerns that are challenging to meet with conventional cryptography, owing to constrained computational resources or the difficulty of providing suitable key management. In principle, quantum cryptography, with its forward security and lightweight computational footprint, could meet these challenges, provided it could evolve from the current point to point architecture to a form compatible with multimode network architecture. Trusted quantum key distribution networks based on a mesh of point to point links lacks scalability, require dedicated optical fibers, are expensive and not amenable to mass production since they only provide one of the cryptographic functions, namely key distribution needed for secure communications. Thus, they have limited practical interest.

A new, scalable approach such as that illustrated in FIG. 106 provides quantum information assurance that is network based quantum communications which can solve new network security challenges. In this approach, a BB84 type quantum communication between each of N client nodes 10604 and a central sever 10602 at the physical layer support a quantum key management layer, which in turn enables secure communication functions (confidentiality, authentication, and nonrepudiation) at the application layer between approximately N2 client pairs. This network based communication "hub and spoke" topology can be implemented in a network setting, and permits a hierarchical trust architecture that allows the server 10602 to act as a trusted authority in cryptographic protocols for quantum authenticated key establishment. This avoids the poor scaling of previous approaches that required a pre-existing trust relationship between every pair of nodes. By making a server 10602, a single multiplex QC (quantum communications) receiver and the client nodes 10604 QC transmitters, this network can simplify complexity across multiple network nodes. In this way, the network based quantum key distribution architecture is scalable in terms of both quantum physical resources and trust. One can at time multiplex the server 10602 with three transmitters 10604 over a single mode fiber, larger number of clients could be accommodated with a combination of temporal and wavelength multiplexing as well as orbital angular momentum multiplexed with wave division multiplexing to support much higher clients.

Referring now to FIGS. 107 and 108, there are illustrated various components of multi-user orbital angular momentum based quantum key distribution multi-access network. FIG. 107 illustrates a high speed single photon detector 10702 positioned at a network node that can be shared between multiple users 10704 using conventional network architectures, thereby significantly reducing the hardware requirements for each user added to the network. In an embodiment, the single photon detector 10702 may share up to 64 users. This shared receiver architecture removes one of the main obstacles restricting the widespread application of quantum key distribution. The embodiment presents a viable method for realizing multi-user quantum key distribution networks with resource efficiency.

Referring now also to FIG. 108, in a nodal quantum key distribution network, multiple trusted repeaters 10802 are connected via point to point links 10804 between node 10806. The repeaters are connected via point to point links between a quantum transmitter and a quantum receiver. These point to point links 10804 can be realized using long distance optical fiber lengths and may even utilize ground to satellite quantum key distribution communication. While point to point connections 10804 are suitable to form a backbone quantum core network, they are less suitable to provide the last-mile service needed to give a multitude of users access to the quantum key distribution infrastructure. Reconfigurable optical networks based on optical switches or wavelength division multiplexing may achieve more flexible network structures, however, they also require the installation of a full quantum key distribution system per user which is prohibitively expensive for many applications.

The quantum key signals used in quantum key distribution need only travel in one direction along a fiber to establish a secure key between the transmitter and the receiver. Single photon quantum key distribution with the sender positioned at the network node 10806 and the receiver at the user premises therefore lends itself to a passive multi-user network approach. However, this downstream implementation has two major shortcomings. Firstly, every user in the network requires a single photon detector, which is often expensive and difficult to operate. Additionally, it is not possible to deterministically address a user. All detectors, therefore, have to operate at the same speed as a transmitter in order not to miss photons, which means that most of the detector bandwidth is unused.

Most systems associated with a downstream implementation can be overcome. The most valuable resource should be shared by all users and should operate at full capacity. One can build an upstream quantum access network in which the transmitters are placed at the end user location and a common receiver is placed at the network node. This way, an operation with up to 64 users is feasible, which can be done with multi-user quantum key distribution over a 1×64 passive optical splitter.

The above described QKD scheme is applicable to twisted pair, coaxial cable, fiber optic, RF satellite, RF broadcast, RF point-to point, RF point-to-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE. The techniques would be useful for combating denial of service attacks by routing communications via alternate links in case of disruption, as a technique to combat Trojan Horse attacks which does not require physical access to the endpoints and as a technique to combat faked-state attacks, phase remapping attacks and time-shift attacks.

Thus, using various configurations of the above described orbital angular momentum processing, multi-layer overlay modulation, and quantum key distribution within various types of communication networks and more particularly optical fiber networks and free-space optic communication network, a variety of benefits and improvements in system bandwidth and capacity may be achieved.

OAM Based Networking Functions

In addition to the potential applications for static point to point data transmission, the unique way front structure of OAM beams may also enable some networking functions by manipulating the phase using reconfigurable spatial light modulators (SLMs) or other light projecting technologies.

Data Swapping

Data exchange is a useful function in an OAM-based communication system. A pair of data channels on different OAM states can exchange their data in a simple manner with the assistance of a reflective phase hologram as illustrated in FIG. 109. If two OAM beams 10902, 10904, e.g., OAM beams with $\ell = +L_1$ and $+L_2$, which carry two independent data streams 10906, 10908, are launched onto a reflective SLM 10910 loaded with a spiral phase pattern with an order of $-(L1+L2)$, the data streams will swap between the two OAM channels. The phase profile of the SLM will change these two OAM beams to $\ell = -\ell_2$ and $\ell = -\ell_1$, respectively. In addition, each OAM beam will change to its opposite charge under the reflection effect. As a result, the channel on $\ell = +\ell_1$ is switched to $\ell = +\ell_2$ and vice versa, which indicates that the data on the two OAM channels is exchanged. FIG. 109 shows the data exchange between $\ell = +6$ 10912 and $\ell = -8$ 10914 using a phase pattern on the order of $\ell = -14$ on a reflective SLM 10910. A power penalty of approximately 0.9 dB is observed when demonstrating this in the experiment.

An experiment further demonstrated that the selected data swapping function can handle more than two channels. Among multiple multiplexed OAM beams, any two OAM beams can be selected to swap their data without affecting the other channels. In general, reconfigurable optical add/drop multiplexers (ROADM) are important function blocks in WDM networks. A WDM RODAM is able to selectively drop a given wavelength channel and add in a different channel at the same wavelength without having to detect all pass-through channels. A similar scheme can be implemented in an OAM multiplexed system to selectively drop and add a data channel carried on a given OAM beam. One approach to achieve this function is based on the fact that OAM beams generally have a distinct intensity profile when compared to a fundamental Gaussian beam.

Referring now to FIGS. 110 and 111 there is illustrated the manner for using a ROADM for exchanging data channels. The example of FIG. 111 illustrates SLM's and spatial filters. The principle of an OAM-based ROADM uses three stages: down conversion, add/drop and up conversion. The down conversion stage transforms at step 11002 the input multiplexed OAM modes 11102 (donut like transverse intensity profiles 11104) into a Gaussian light beam with $\ell=0$ (a spotlight transverse intensity profile 11106). After the down conversion at step 11002, the selected OAM beam becomes a Gaussian beam while the other beams remain OAM but have a different $\ell$ state. The down converted beams 11106 are reflected at step 11004 by a specially designed phase pattern 11108 that has different gratings in the center and in the outer ring region. The central and outer regions are used to redirect the Gaussian beam 11106 in the center (containing the drop channel 11110) and the OAM beams with a ring-shaped (containing the pass-through channels) in different directions. Meanwhile, another Gaussian beam 11112 carrying a new data stream can be added to the pass-through OAM beams (i.e., add channel). Following the selective manipulation, an up conversion process is used at step 11006 for transforming the Gaussian beam back to an OAM beam. This process recovers the $\ell$ states of all of the beams. FIG. 92 illustrates the images of each step in the add/drop of a channel carried by an OAM beam with $\ell=+2$. Some other networking functions in OAM based systems have also been demonstrated including multicasting, 2 by 2 switching, polarization switching and mode filtering.

In its fundamental form, a beam carrying OAM has a helical phase front that creates orthogonality and hence is distinguishable from other OAM states. Although other mode groups (e.g., Hermite-Gaussian modes, etc.) also have orthogonality and can be used for mode multiplexing, OAM has the convenient advantage of its circular symmetry which is matched to the geometry of most optical systems. Indeed, many free-space data link demonstrations attempt to use OAM-carrying modes since such modes have circular symmetry and tend to be compatible with commercially available optical components. Therefore, one can consider that OAM is used more as a technical convenience for efficient multiplexing than as a necessarily "better" type of modal set.

The use of OAM multiplexing in fiber is potentially attractive. In a regular few mode fiber, hybrid polarized OAM modes can be considered as fiber eigenmodes. Therefore, OAM modes normally have less temporal spreading as compared to LP mode basis, which comprise two eigenmode components each with a different propagation constant. As for the specially designed novel fiber that can stably propagate multiple OAM states, potential benefits could include lower receiver complexity since the MIMO DSP is not required. Progress can be found in developing various types of fiber that are suitable for OAM mode transmission. Recently demonstrated novel fibers can support up to 16 OAM states. Although they are still in the early stages, there is the possibility that further improvement of performance (i.e., larger number of "maintained" modes and lower power loss) will be achieved.

OAM multiplexing can be useful for communications in RF communications in a different way than the traditional spatial multiplexing. For a traditional spatial multiplexing system, multiple spatially separated transmitter and receiver aperture pairs are adopted for the transmission of multiple data streams. As each of the antenna elements receives a different superposition of the different transmitted signals, each of the original channels can be demultiplexed through the use of electronic digital signal processing. The distinction of each channel relies on the spatial position of each antenna pair. However, OAM multiplexing is implemented such that the multiplexed beams are completely coaxial throughout the transmission medium, and only one transmitter and receiver aperture (although with certain minimum aperture sizes) is used. Due to the OAM beam orthogonality provided by the helical phase front, efficient demultiplexing can be achieved without the assist of further digital signal post-processing to cancel channel interference.

Many of the demonstrated communication systems with OAM multiplexing use bulky and expensive components that are not necessarily optimized for OAM operation. As was the case for many previous advances in optical communications, the future of OAM would greatly benefit from advances in the enabling devices and subsystems (e.g., transmitters, (de)multiplexers and receivers). Particularly with regard to integration, this represents significant opportunity to reduce cost and size and to also increase performance.

Orthogonal beams using for example OAM, Hermite Gaussian, Laguerre Gaussian, spatial Bessel, Prolate spheroidal or other types of orthogonal functions may be multiplexed together to increase the amount of information transmitted over a single communications link. The structure for multiplexing the beams together may use a number of different components. Examples of these include spatial light modulators (SLMs); micro electromechanical systems (MEMs); digital light processors (DLPs); amplitude masks; phase masks; spiral phase plates; Fresnel zone plates; spiral zone plates; spiral phase plates and phase plates.

Multiplexing Using Holograms

Referring now to FIG. 113, there is illustrated a configuration of generation circuitry for the generation of an OAM twisted beam using a hologram within a micro-electrical mechanical device. Configurations such as this may be used for multiplexing multiple OAM twisted beams together. A laser 11302 generates a beam having a wavelength of approximately 543 nm. This beam is focused through a telescope 11304 and lens 11306 onto a mirror/system of mirrors 11308. The beam is reflected from the mirrors 11308 into a DMD 11310. The DMD 11310 has programmed in to its memory a one or more forked holograms 11312 that generate a desired OAM twisted beam 11313 having any desired information encoded into the OAM modes of the beam that is detected by a CCD 11314. The holograms 11312 are loaded into the memory of the DMD 11310 and displayed as a static image. In the case of 1024×768 DMD array, the images must comprise 1024 by 768 images. The control software of the DMD 11310 converts the holograms into .bmp files. The holograms may be displayed singly or as multiple holograms displayed together in order to multiplex particular OAM modes onto a single beam. The manner of generating the hologram 11312 within the DMD 11310 may be implemented in a number of fashions that provide qualitative differences between the generated OAM beam 11313. Phase and amplitude information may be encoded into a beam by modulating the position and width of a binary amplitude grating used as a hologram. By realizing such holograms on a DMD the creation of HG modes, LG modes, OAM vortex mode or any angular mode may be realized. Furthermore, by performing switching of the generated modes at a very high speed, information may be encoded within the helicity's that are dynamically changing to provide a new type of helicity modulation. Spatial modes may be generated by loading computer-generated holograms onto a DMD. These holograms can be created by modulating a grating function with 20 micro mirrors per each period.

Rather than just generating an OAM beam 11313 having only a single OAM value included therein, multiple OAM values may be multiplexed into the OAM beam in a variety of manners as described herein below. The use of multiple OAM values allows for the incorporation of different information into the light beam. Programmable structured light provided by the DLP allows for the projection of custom and adaptable patterns. These patterns may be programmed into the memory of the DLP and used for imparting different information through the light beam. Furthermore, if these patterns are clocked dynamically a modulation scheme may be created where the information is encoded in the helicities of the structured beams.

Referring now to FIG. 114, rather than just having the laser beam 11402 shine on a single hologram multiple holograms 11404 may be generated by the DMD 4410. FIG. 114 illustrates an implementation wherein a 4×3 array of holograms 11404 are generated by the DMD 4410. The holograms 11404 are square and each edge of a hologram lines up with an edge of an adjacent hologram to create the 4×3 array. The OAM values provided by each of the holograms 11404 are multiplexed together by shining the beam 11402 onto the array of holograms 11404. Several configurations of the holograms 11404 may be used in order to provide differing qualities of the OAM beam 11313 and associated modes generated by passing a light beam through the array of holograms 11404.

Referring now to FIG. 115 there is illustrated an alternative way of multiplexing various OAM modes together. An X by Y array of holograms 11502 has each of the hologram 11502 placed upon a black (dark) background 11504 in order to segregate the various modes from each other. In another configuration illustrated in FIG. 116, the holograms 11602 are placed in a hexagonal configuration with the background in the off (black) state in order to better segregate the modes.

FIG. 117 illustrates yet another technique for multiplexing multiple OAM modes together wherein the holograms 11702 are cycled through in a loop sequence by the DMD 11310. In this example modes $T_0$-$T_{11}$ are cycled through and the process repeats by returning back to mode $T_0$. This process repeats in a continuous loop in order to provide an OAM twisted beam with each of the modes multiplex therein.

In addition to providing integer OAM modes using holograms within the DMD, fractional OAM modes may also be presented by the DMD using fractional binary forks as illustrated in FIG. 118. FIG. 118 illustrates fractional binary forks for generating fractional OAM modes of 0.25, 0.50, 0.75, 1.25, 1.50 and 1.75 with a light beam.

Referring now to FIG. 119-132, there are illustrated the results achieved from various configurations of holograms program within the memory of a DMD. FIG. 119 illustrates the configuration at 11902 having no hologram separation on a white background producing the OAM mode image 11904. FIG. 120 uses a configuration 12002 consisting of circular holograms 11904 having separation on a white background. The OAM mode image 11906 that is provided therefrom is also illustrated. Bright mode separation yields less light and better mode separation.

FIG. 121 illustrates a configuration 12102 having square holograms with no separation on a black background. The configuration 12102 generates the OAM mode image 12104. FIG. 122 illustrates the configuration of circular holograms (radius ~256 pixels) that are separated on a black background. This yields the OAM mode image 12204. Dark mode separation yields more light in the OAM image 12204 and has slightly better mode separation.

FIG. 123 illustrates a configuration 12302 having a bright background and circular hologram (radius ~256 pixels) separation yielding an OAM mode image 12304. FIG. 124 illustrates a configuration 12402 using circular holograms (radius ~256 pixels) having separation on a black background to yield the OAM mode image 12404. The dark mode separation yields more light and has a slightly worse mode separation within the OAM mode images.

FIG. 125 illustrates a configuration 12502 including circular holograms (radius ~256 pixels) in a hexagonal distribution on a bright background yielding an OAM mode image 12504. FIG. 126 illustrates at 12602 small circular holograms (radius ~256 pixels) in a hexagonal distribution on a bright background that yields and OAM mode image 12604. The larger holograms with brighter backgrounds yield better OAM mode separation images.

Referring now to FIG. 127, there is illustrated a configuration 12702 of circular holograms (radius ~256 pixels) in a hexagonal distribution on a dark background with each of the holograms having a radius of approximately 256 pixels. This configuration 12702 yields the OAM mode image 12704. FIG. 128 illustrates the use of small holograms (radius ~256 pixels) having a radius of approximately 190 pixels arranged in a hexagonal distribution on a black background that yields the OAM mode image 12804. Larger holograms (radius of approximately 256 pixels) having a dark background yields worse OAM mode separation within the OAM mode images.

FIG. 129 illustrates a configuration 12902 of small holograms (radius of approximately 190 pixels) in a hexagonal separated distribution on a dark background that yields the OAM mode image 12904. FIG. 130 illustrates a configuration 13002 of small holograms (radius ~256 pixels) in a hexagonal distribution that are close together on a dark background that yields the OAM mode image 13004. The larger dark boundaries (FIG. 129) yield worse OAM mode image separation than a smaller dark boundary.

FIG. 131 illustrates a configuration 13102 of small holograms (radius ~256 pixels) in a separated hexagonal configuration on a bright background yielding OAM mode image 13104. FIG. 63 illustrates a configuration 6302 of small holograms (radius ~256 pixels) more closely spaced in a hexagonal configuration on a bright background yielding OAM mode image 6304. The larger bright boundaries (FIG. 131) yield a better OAM mode separation.

Additional illustrations of holograms, namely reduced binary holograms are illustrated in FIGS. 133-136. FIG. 133 illustrates reduced binary holograms having a radius equal to 100 micro mirrors and a period of 50 for various OAM modes. Similarly, OAM modes are illustrated for reduced binary for holograms having a radius of 50 micro mirrors and a period of 50 (FIG. 134); a radius of 100 micro mirrors and a period of 100 (FIG. 135) and a radius of 50 micro mirrors and a period of 50 (FIG. 136).

The illustrated data with respect to the holograms of FIGS. 119-136 demonstrates that full forked gratings yield a great deal of scattered light. Finer forked gratings yield better define modes within OAM images. By removing unnecessary light from the hologram (white regions) there is a reduction in scatter. Holograms that are larger and have fewer features (more dark zones) having a hologram diameter of 200 micro mirrors provide overlapping modes and strong intensity. Similar configurations using 100 micro mirrors also demonstrate overlapping modes and strong intensity. Smaller holograms having smaller radii between 100-200 micro mirrors and periods between 50 and 100 generated by a DLP produce better defined modes and have stronger intensity than larger holograms with larger radii in periods. Smaller holograms having more features (dark zones with hologram diameters of 200 micro mirrors provide well-defined modes with strong intensity. However, hundred micro mirror diameter holograms while providing well-defined modes provide weaker intensity. Thus, good, compact hologram sizes are between 100-200 micro mirrors with zone periods of between 50 and 100. Larger holograms have been shown to provide a richer OAM topology.

Referring now to FIGS. 139 and 140, there are illustrated a block diagram of a circuit for generating a muxed and multiplexed data stream containing multiple new Eigen channels (FIG. 139) for transmission over a communications link (free space, fiber, RF, etc.), and a flow diagram of the operation of the circuit (FIG. 140). Multiple data streams 13902 are received at step 14002 and input to a modulator circuit 13904. The modulator circuit 13904 modulates a signal with the data stream at step 14004 and outputs these signals to the orthogonal function circuit 13906. The orthogonal function circuit 13906 applies a different orthogonal function to each of the data streams at step 14006. These orthogonal functions may comprise orbital angular momentum functions, Hermite Gaussian functions, Laguerre Gaussian functions, prolate spheroidal functions, Bessel functions or any other types of orthogonal functions. Each of the data streams having an orthogonal function applied thereto are applied to the mux circuit 13098. The mux circuit 13098 performs a spatial combination of multiple orthogonal signals onto a same physical bandwidth at step 14008. Thus, a single signal will include multiple orthogonal data streams that are all located within the same physical bandwidth. A plurality of these muxed signals are applied to the multiplexing circuit 13910. The multiplexing circuit 13910 multiplexes multiple muxed signals onto a same frequency or wavelength at step 14010. Thus, the multiplexing circuit 13910 temporally multiplexes multiple signals onto the same frequency or wavelength. The muxed and multiplexed signal is provided to a transmitter 13912 such that the signal 13914 may be transmitted at step 14012 over a communications link (Fiber, FSO, RF, etc.).

Referring now to FIGS. 141 and 142, there is illustrated a block diagram (FIG. 141) of the receiver side circuitry and a flow diagram (FIG. 142) of the operation of the receiver side circuitry associated with the circuit of FIG. 139. A received signal 14102 is input to the receiver 14104 at step 14202. The receiver 14014 provides the received signal 14102 to the de-multiplexer circuit 14106. The de-multiplexer circuit 14106 separates the temporally multiplexed received signal 14102 into multiple muxed signals at step 14204 and provides them to the de-mux circuit 14108. As discussed previously with respect to FIGS. 139 and 140, the de-multiplexer circuit 14106 separates the muxed signals that are temporally multiplexed onto a same frequency or wavelength. The de-mux circuit 14108 separates (de-muxes) the multiple orthogonal data streams at step 14206 from the same physical bandwidth. The multiple orthogonal data streams are provided to the orthogonal function circuit 14110 that removes the orthogonal function at step 14208. The individual data streams may then be demodulated within the demodulator circuit 14112 at step 14210 and the multiple data streams 14114 provided for use.

MIMO+MDM

A further manner for increasing data transmission bandwidth is the combination of multiple-input multiple-output (MIMO)-based spatial multiplexing and Mode Division Multiplexing (MDM) using Hermite-Gaussian (HG), Laguerre-Gaussian (LG) or other orthogonal function processed beams. The LG beams carry orbital angular momentum (OAM) and therefore such multiplexing technique can also be called OAM multiplexing. Such a combined MIMO+MDM multiplexing can enhance the performance of free-space Point-to-Point communications systems by fully exploiting the advantages of each multiplexing technique. This can be done at both RF as well as optical frequencies. Inter-channel crosstalk effects can be minimized by the OAM beams' inherent orthogonality and by the use of MIMO signal processing. OAM and MIMO-based spatial multiplexing can be compatible with and complement each other, thereby providing potential for a dense or super massive compactified MIMO system.

When multiple input/multiple output (MIMO) systems were described in the mid-to-late 1990s by Dr. G. Foschini and Dr. A. Paulraj, the astonishing bandwidth efficiency of such techniques seemed to be in violation of the Shannon limit. But, there is no violation of the Shannon limit because the diversity and signal processing employed with MIMO transforms a point-to-point single channel into multiple parallel or matrix channels, hence in effect multiplying the capacity. MIMO offers higher data rates as well as spectral efficiency. This is more particularly So illustrated in FIG. 143 wherein a single transmitting antenna 14302 transmits to a single receiving antenna 14304 using a total power signal $P_{total}$. The MIMO system illustrated in FIG. 144 provides the same total power signal $P_{total}$ to a multi-input transmitter consisting of a plurality of antennas 14402. The receiver includes a plurality of antennas 14404 for receiving the transmitted signal. Many standards have already incorporated MIMO. ITU uses MIMO in the High Speed Downlink Packet Access (HSPDA), part of the UMTS standard. MIMO is also part of the 802.11n standard used by wireless routers as well as 802.16 for Mobile WiMax, LTE, LTE Advanced and future 5G standards.

A traditional communications link, which is called a single-in-single-out (SISO) channel as shown in FIG. 143, has one transmitter 14302 and one receiver 14304. But instead of a single transmitter and a single receiver several transmitters 14402 and receivers 14404 may be used as shown in FIG. 144. The SISO channel thus becomes a multiple-in-multiple-out, or a MIMO channel; i.e. a channel that has multiple transmitters and multiple receivers.

What does MIMO offer over a traditional SISO channel? To examine this question, we will first look at the capacity of a SISO link, which is specified in the number of bits that can be transmitted over it as measured by the very important metric, (b/s/Hz).

The capacity of a SISO link is a function simply of the channel SNR as given by the Equation: $C=\log_2(1+SNR)$. This capacity relationship was of course established by Shannon and is also called the information-theoretic capacity. The SNR in this equation is defined as the total power divided by the noise power. The capacity is increasing as a log function of the SNR, which is a slow increase. Clearly increasing the capacity by any significant factor takes an enormous amount of power in a SISO channel. It is possible to increase the capacity instead by a linear function of power with MIMO.

With MIMO, there is a different paradigm of channel capacity. If six antennas are added on both transmit and receive side, the same capacity can be achieved as using 100 times more power than in the SISO case. The transmitter and receiver are more complex but have no increase in power at all. The same performance is achieved in the MIMO system as is achieved by increasing the power 100 times in a SISO system.

In FIG. 145, the comparison of SISO and MIMO systems using the same power. MIMO capacity 14502 increases linearly with the number of antennas, where SISO/SIMO/MISO systems 14504 all increase only logarithmically.

At conceptual level, MIMO enhances the dimensions of communication. However, MIMO is not Multiple Access. It is not like FDMA because all "channels" use the same frequency, and it is not TDMA because all channels operate simultaneously. There is no way to separate the channels in MIMO by code, as is done in CDMA and there are no steerable beams or smart antennas as in SDMA. MIMO exploits an entirely different dimension.

A MIMO system provides not one channel but multiple channels, $N_R \times N_T$, where $N_T$ is the number of antennas on the transmit side and $N_R$, on the receive side. Somewhat like the idea of OFDM, the signal travels over multiple paths and is recombined in a smart way to obtain these gains.

In FIG. 146 there is illustrated a comparison of a SISO channel 14602 with 2 MIMO channels 14604, 14606, (2×2) and (4×4). At SNR of 10 dB, a 2×2 MIMO system 14604 offers 5.5 b/s/Hz and whereas a 4×4 MIMO link offers over 10 b/s/Hz. This is an amazing increase in capacity without any increase in transmit power caused only by increasing the number of transceivers. Not only that, this superb performance comes in when there are channel impairments, those that have fading and Doppler.

Extending the single link (SISO) paradigm, it is clear that to increase capacity, a link can be replicated N times. By using N links, the capacity is increased by a factor of N. But this scheme also uses N times the power. Since links are often power-limited, the idea of N link to get N times capacity is not much of a trick. Can the number of links be increased but not require extra power? How about if two antennas are used but each gets only half the power? This is what is done in MIMO, more transmit antennas but the total power is not increased. The question is how does this result in increased capacity?

The information-theoretic capacity increase under a MIMO system is quite large and easily justifies the increase in complexity as illustrated in FIG. 147. First and second transmitters 14702 transmit to a pair of receivers 14704. Each of the transmitters 14702 has a transmission link 14706 to an antenna of a receiver 14704. Transmitter TX#1 transmits on link h11 and h21. Transmitter TX#2 transmits on links h12 and h22. This provides a matrix of transmission capacities according to the matrix:

$$H = \begin{bmatrix} h_{11} & h_{12} \\ h_{21} & h_{22} \end{bmatrix}$$

And a total transmission capacity of according to the equation:

$$C = \max_{tr(R_{xx})=P_T} \log \det \left\{ I_N + \frac{I}{\sigma_n^2} H R_{xx} H^H \right\}$$

In simple language, MIMO is any link that has multiple transmit and receive antennas. The transmit antennas are co-located, at a little less than half a wavelength apart or more. This figure of the antenna separation is determined by mutual correlation function of the antennas using Jakes Model. (See FIG. _____). The receive antennas 14704 are also part of one unit. Just as in SISO links, the communication is assumed to be between one sender and one receiver. MIMO is also used in a multi-user scenario, similar to the way OFDM can be used for one or multiple users. The input/output relationship of a SISO channel is defined as:

$$r = hs + n$$

where r is the received signal, s is the sent signal and h, the impulse response of the channel is n, the noise. The term h, the impulse response of the channel, can be a gain or a loss, it can be phase shift or it can be time delay, or all of these together. The quantity h can be considered an enhancing or distorting agent for the signal SNR.

Referring now to FIG. 148 there are illustrated various types of multiple input and multiple output transmission systems. System 14802 illustrates a single input single output SISO system. System 14804 illustrates a single input multiple output receiver SIMO system. System 14806 illustrates a multiple input single output MISO system. Finally, a multiple input multiple output MIMO system is illustrated at 14810. The channels of the MIMO system 14810 can be thought of as a matrix channel.

Using the same model a SISO, MIMO channel can now be described as:

$$R = HS + N$$

In this formulation, both transmit and receive signals are vectors. The channel impulse response h, is now a matrix, H. This channel matrix H is called Channel Information. The channel matrix H can be created using a pilot signal over a pilot channel in the manner described herein above. The signals on the pilot channel may be sent in a number of different forms such as HG beams, LG beams or other orthogonal beams of any order.

Dimensionality of Gains in MIMO

The MIMO design of a communications link can be classified in these two ways.

MIMO using diversity techniques

MIMO using spatial-multiplexing techniques

Both of these techniques are used together in MIMO systems. With first form, Diversity technique, same data is transmitted on multiple transmit antennas and hence this increases the diversity of the system.

Diversity means that the same data has traveled through diverse paths to get to the receiver. Diversity increases the reliability of communications. If one path is weak, then a copy of the data received on another path may be just fine.

FIG. 149 illustrates a source 14902 with data sequence 101 to be sent over a MIMO system with three transmitters. In the diversity form 14904 of MIMO, same data, 101 is sent over three different transmitters. If each path is subject to different fading, the likelihood is high that one of these paths will lead to successful reception. This is what is meant by diversity or diversity systems. This system has a diversity gain of 3.

The second form uses spatial-multiplexing techniques. In a diversity system 14904, the same data is sent over each path. In a spatial-multiplexing system 14906, the data 1,0,1 is multiplexed on the three channels. Each channel carries different data, similar to the idea of an OFDM signal. Clearly, by multiplexing the data, the data throughput or the capacity of the channel is increased, but the diversity gain is lost. The multiplexing has tripled the data rate, so the multiplexing gain is 3 but diversity gain is now 1. Whereas in a diversity system 14904 the gain comes in form of increased reliability, in a spatial-multiplexing system 14906, the gain comes in the form of an increased data rate.

Characterizing a MIMO Channel

When a channel uses multiple receive antennas, $N_R$, and multiple transmit antennas, $N_T$, the system is called a multiple-input, multiple output (MIMO) system.
When $N_T=N_R=1$, a SISO system.
When $N_T>1$ and $N_R=1$, called a MISO system,
When $N_T=1$ and $N_R>1$, called a SIMO system.
When $N_T>1$ and $N_R>1$, is a MIMO system.

In a typical SISO channel, the data is transmitted and reception is assumed. As long as the SNR is not changing dramatically, no questions are asked regarding any information about the channel on a bit by bit basis. This is referred to as a stable channel. Channel knowledge of a SISO channel is characterized only by its steady-state SNR.

What is meant by channel knowledge for a MIMO channel? Assume a link with two transmitters and two receivers on each side. The same symbol is transmitted from each antenna at the same frequency, which is received by two receivers. There are four possible paths as shown in FIG. 147. Each path from a transmitter to a receiver has some loss/gain associated with it and a channel can be characterized by this loss. A path may actually be sum of many multipath components but it is characterized only by the start and the end points. Since all four channels are carrying the same symbol, this provides diversity by making up for a weak channel, if any. In FIG. 150 there is illustrated how each channel may be fading from one moment to the next. At time 32, for example, the fade in channel $h_{21}$ is much higher than the other three channels.

As the number of antennas and hence the number of paths increase in a MIMO system, there is an associated increase in diversity. Therefore with t h e increasing numbers of transmitters, all fades can probably be compensated for. With increasing diversity, the fading channel starts to look like a Gaussian channel, which is a welcome outcome.

The relationship between the received signal in a MIMO system and the transmitted signal can be represented in a matrix form with the H matrix representing the low-pass channel response $h_{ij}$, which is the channel response from the $j_{th}$ antenna to the $i_{th}$ receiver. The matrix H of size ($N_R$, $N_T$) has $N_R$ rows, representing $N_R$ received signals, each of which is composed of $N_T$ components from $N_T$ transmitters. Each column of the H matrix represents the components arriving from one transmitter to $N_R$ receivers.

The H matrix is called the channel information. Each of the matrix entries is a distortion coefficient acting on the transmitted signal amplitude and phase in time-domain. To develop the channel information, a symbol is sent from the first antenna, and a response is noted by all three receivers. Then the other two antennas do the same thing and a new column is developed by the three new responses.

The H matrix is developed by the receiver. The transmitter typically does not have any idea what the channel looks like and is transmitting blindly. If the receiver then turns around and transmits this matrix back to the transmitter, then the transmitter would be able to see how the signals are faring and might want to make adjustments in the powers allocated to its antennas. Perhaps a smart computer at the transmitter will decide to not transmit on one antenna, if the received signals are so much smaller (in amplitude) than the other two antennas. Maybe the power should be split between antenna 2 and 3 and turn off antenna 1 until the channel improves.

Modeling a MIMO Channel

Starting with a general channel which has both multipath and Doppler (the conditions facing a mobile in case of a cell phone system), the channel matrix H for this channel takes this form.

$$H(\tau, t) = \begin{bmatrix} h_{11}(\tau, t) & h_{11}(\tau, t) & \cdots & h_{1N_T}(\tau, t) \\ h_{21}(\tau, t) & h_{22}(\tau, t) & \cdots & h_{2N_T}(\tau, t) \\ \vdots & \vdots & \ddots & \vdots \\ h_{N_R,1}(\tau, t) & h_{N_R,2}(\tau, t) & \ldots & h_{N_R,N_T}(\tau, t) \end{bmatrix}$$

Each path coefficient is a function of not only time t because the transmitter is moving but also a time delay relative to other paths. The variable $\tau$ indicates relative delays between each component caused by frequency shifts. The time variable t represents the time-varying nature of the channel such as one that has Doppler or other time variations.

If the transmitted signal is $s_j(t)$, and the received signal is $r_i(t)$, the input-output relationship of a general MIMO channel is defined as:

$$r_i(t) = \sum_{j=1}^{N_T} \int_{-\infty}^{\infty} h_{ij}(\tau, t) \, S_j(t-\tau) dt$$
$$= \sum_{j=1}^{N_T} h_{ij}(\tau, t) * S_j(\tau) \; i = 1, 2 \ldots N_R$$

The channel equation for the received signal $r_i(t)$ is expressed as a convolution of the channel matrix H and the transmitted signals because of the delay variable $\tau$. This relationship can be defined in matrix form as:

$r(t)=H(\tau,t)*s(t)$

If the channel is assumed to be flat (non-frequency selective), but is time-varying, i.e. has Doppler, the relationship is written without the convolution as:

$r(t)=H(t)s(t)$

In this case, the H matrix changes randomly with time. If the time variations are very slow (non-moving receiver and transmitter) such that during a block of transmission longer than the several symbols, the channel can be assumed to be non-varying, or static. A fixed realization of the H matrix for a fixed Point-to-Point scenario can be written as:

$r(t)=H(t)s(t)$

The individual entries can be either scalar or complex.

For analysis purposes, important assumptions can be made about the H matrix. We can assume that it is fixed for a period of one or more symbols and then changes randomly. This is a fast change and causes the SNR of the received signal to change very rapidly. Or we can assume that it is fixed for a block of time, such as over a full code sequence, which makes decoding easier because the decoder does not have to deal with a variable SNR over a block. Or we can assume that the channel is semi-static such as in a TDMA system, and its behavior is static over a burst or more. Each version of the H matrix seen is a realization. How fast these realizations change depends on the channel type.

$$H = \begin{bmatrix} h_{11} & h_{12} & \cdots & h_{1N_T} \\ h_{21} & h_{22} & \cdots & h_{2N_T} \\ \vdots & \vdots & \ddots & \vdots \\ h_{N_R,1} & h_{N_R,2} & \cdots & h_{N_R,1} \end{bmatrix}$$

For a fixed random realization of the H matrix, the input-output relationship can be written without the convolution as:

$r(t)=H\ s(t)$

In this channel model, the H matrix is assumed to be fixed. An example of this type of situation where the H matrix may remain fixed for a long period would be a Point-to-Point system where we have fixed transmitter and receiver. In most cases, the channel can be considered to be static. This allows us to treat the channel as deterministic over that period and amenable to analysis. In a point-to-point system, the channel is semi-static and it behavior is static over a burst or more. Each version of the H matrix is a realization.

The power received at all receive antennas is equal to the sum of the total transmit power, assuming channel offers no gain or loss. Each entry $h_{ij}$ comprises an amplitude and phase term. Squaring the entry $h_{ij}$ give the power for that path. There are $N_T$ paths to each receiver, so the sum of j terms, provides the total transmit power. Each receiver receives the total transmit power. For this relation, the transmit power of each transmitter is assumed to be 1.

$$\sum_{j=1}^{N_T} (h_{ij})^2 = N_T \quad (1) = N_T$$

The H matrix is a very important construct in understanding MIMO capacity and performance. How a MIMO system performs depends on the condition of the channel matrix H and its properties. The H matrix can be thought of as a set of simultaneous equations. Each equation represents a received signal which is a composite of unique set of channel coefficients applied to the transmitted signal.

$r_1 = h_{11}s + h_{12}s \cdots + h_{1N_2}s$

If the number of transmitters is equal to the number of receivers, there exists a unique solution to these equations. If the number of equations is larger than the number of unknowns (i.e. $N_R > N_T$), the solution can be found using a zero-forcing algorithm. When $N_T = N_R$, (the number of transmitters and receivers are the same), the solution can be found by (ignoring noise) inverting the H matrix as in:

$\hat{s}(t) = H^{-1} r(t)$

The system performs best when the H matrix is full rank, with each row/column meeting conditions of independence. What this means is that best performance is achieved only when each path is fully independent of all others. This can happen only in an environment that offers rich scattering, fading and multipath, which seems like a counter-intuitive statement. Looking at the equation above, the only way to extract the transmitted information is when the H matrix is invertible. And the only way it is invertible is if all its rows and columns are uncorrelated. And the only way this can occur is if the scattering, fading and all other effects cause the channels to be completely uncorrelated.

Diversity Domains and MIMO Systems

In order to provide a fixed quality of service, a large amount of transmit power is required in a Rayleigh or Rican fading environment to assure that no matter what the fade level, adequate power is still available to decode the signal. Diversity techniques that mitigate multipath fading, both slow and fast are called Micro-diversity, whereas those resulting from path loss, from shadowing due to buildings etc. are an order of magnitude slower than multipath, are called Macro-diversity techniques. MIMO design issues are limited only to micro-diversity. Macro-diversity is usually handled by providing overlapping base station coverage and handover algorithms and is a separate independent operational issue.

In time domain, repeating a symbol N times is the simplest example of increasing diversity. Interleaving is another example of time diversity where symbols are artificially separated in time so as to create time-separated and hence independent fading channels for adjacent symbols. Error correction coding also accomplishes time-domain diversity by spreading the symbols in time. Such time domain diversity methods are termed here as Temporal diversity.

Frequency diversity can be provided by spreading the data over frequency, such as is done by spread spectrum systems. In OFDM frequency diversity is provided by sending each symbol over a different frequency. In all such frequency diversity systems, the frequency separation must be greater than the coherence bandwidth of the channel in order to assure independence.

The type of diversity exploited in MIMO is called Spatial diversity. The receive side diversity, is the use of more than one receive antenna. SNR gain is realized from the multiple copies received (because the SNR is additive). Various types of linear combining techniques can take the received signals and use special combining techniques such are Maximal Ratio Combining, Threshold Combing etc. The SNR increase is possible via combining results in a power gain. The SNR gain is called the array gain.

Transmit side diversity similarly means having multiple transmit antennas on the transmit side which create multiple paths and potential for angular diversity. Angular diversity can be understood as beam-forming. If the transmitter has information about the channel, as to where the fading is and which paths (hence direction) is best, then it can concentrate its power in a particular direction. This is an additional form of gain possible with MIMO.

Another form of diversity is Polarization diversity such as used in satellite communications, where independent signals are transmitted on each polarization (horizontal vs. vertical). The channels, although at the same frequency, contain independent data on the two polarized hence orthogonal paths. This is also a form of MIMO where the two independent channels create data rate enhancement instead of diversity. So satellite communications is a form of a (2, 2) MIMO link.

Related to MIMO but not MIMO

There are some items that need be explored as they relate to MIMO but are usually not part of it. First are the smart antennas used in set-top boxes. Smart antennas are a way to enhance the receive gain of a SISO channel but are different in concept than MIMO. Smart antennas use phased-arrays to track the signal. They are capable of determining the direction of arrival of the signal and use special algorithms such as MUSIC and MATRIX to calculate weights for its phased arrays. They are performing receive side processing only, using linear or non-linear combining.

Rake receivers are a similar idea, used for multipath channels. They are a SISO channel application designed to enhance the received SNR by processing the received signal along several "fingers" or correlators pointed at particular multipath. This can often enhance the received signal SNR and improve decoding. In MIMO systems Rake receivers are not necessary because MIMO can actually simplify receiver signal processing.

Beamforming is used in MIMO but is not the whole picture of MIMO. It is a method of creating a custom radiation pattern based on channel knowledge that provides antenna gains in a specific direction. Beam forming can be used in MIMO to provide further gains when the transmitter has information about the channel and receiver locations.

Importance of Channel State Information

Dealing with Channel matrix H is at the heart of how MIMO works. In general, the receiver is assumed to be able to get the channel information easily and continuously. It is not equally feasible for the transmitter to obtain a fresh version of the channel state information, because the information has gotten impaired on the way back. However, as long as the transit delay is less than channel coherence time, the information sent back by the receiver to the transmitter retains its freshness and usefulness to the transmitter in managing its power. At the receiver, we refer to channel information as Channel State (or side) Information at the Receiver, CSIR. Similarly when channel information is available at the transmitter, it is called CSIT. CSI, the channel matrix can be assumed to be known instantaneously at the receiver or the transmitter or both. Although in short term the channel can have a non-zero mean, it is assumed to be zero-mean and uncorrelated on all paths. When the paths are correlated, then clearly, less information is available to exploit. But the channel can still be made to work.

Channel information can be extracted by monitoring the received gains of a known sequence. In Time Division Duplex (TDD) communications where both transmitter and the receiver are on the same frequency, the channel condition is readily available to the transmitter. In Frequency Division Duplex (FDD) communications, since the forward and reverse links are at different frequencies, this requires a special feedback link from the receiver to the transmitter. In fact receive diversity alone is very effective but it places greater burden on the smaller receivers, requiring larger weight, size and complex signal processing hence increasing cost.

Transmit diversity is easier to implement in a cellular system from a system point of view because the base station towers in a cell system are not limited by power or weight. In addition to adding more transmit antennas on the base station towers, space-time coding is also used by the transmitters. This makes the signal processing required at the receiver simpler.

MIMO Gains

Our goal is to transmit and receive data over several independently fading channels such that the composite performance mitigates deep fades on any of the channels. To see how MIMO enhances performance in a fading or multipath channel, the BER for a BPSK signal is examined as a function of the receive SNR.

$$P_e \approx Q(\sqrt{2\|h\|^2 \text{SNR}})$$

The quantity ($h^2 \times$SNR) is the instantaneous SNR.

Now assume that there are L possible paths, where $L = N_R \times N_T$, with $N_T =$ number of transmitter and $N_R =$ number of receive antennas. Since there are several paths, the average BER can be expressed as a function of the average channel gain over all these paths. This quantity is the average gain over all channels, L.

$$\|h\|^2 = \text{Avg}[|h_1|^2] = \sum_{i=1}^{L} |h_1|^2$$

The average SNR can be rewritten as a product of two terms.

$$\|h\|^2 \text{SNR} = L \times \text{SNR} \cdot \frac{1}{L} \|h\|^2$$

The first part (L×SNR) is a linear increase in SNR due to the L paths. This term is called by various names, including power gain, rate gain or array gain. This term can also include beamforming gain. Hence increasing the number of antennas increases the array gain directly by the factor L. The second term is called diversity gain. This is the average gain over L different paths.

It seems intuitive that if one of the paths exhibits deep fading then, when averaged over a number of independent paths, the deep fades can be averaged out. (We use the term channel to mean the composite of all paths.) Hence on the average we would experience a diversity gain as long as the path gains across the channels are not correlated. If the gains are correlated, such as if all paths are mostly line-of-sight, we would obtain only an array gain and very little diversity gain. This is intuitive because a diversity gain can come only if the paths are diverse, or in other words uncorrelated.

MIMO Advantages

Operating in Fading Channels

The most challenging issue in communications signal design is how to mitigate the effects of fading channels on the signal BER. A fading channel is one where channel gain is changing dramatically, even at high SNR, and as such it results in poor BER performance as compared to an AWGN channel. For communications in a fading channel, a way to convert the highly variable fading channel to a stable AWGN-like channel is needed.

Multipath fading is a phenomenon that occurs due to reflectors and scatters in the transmission path. The measure of multipath is Delay Spread, which is the RMS time delay as a function of the power of the multipath. This delay is converted to a Coherence Bandwidth (CB), a metric of multipath. A time delay is equivalent to a frequency shift in the frequency domain. So any distortion that delays a signal, changes its frequency. Thus, delay spread >bandwidth distortion.

Whether a signal is going through a flat or a frequency-selective fading at any particular time is a function of coherence bandwidth of the channel as compared with its bandwidth as shown in Table I. If the Coherence bandwidth of the channel is larger than the signal bandwidth, then we have a flat or a non-frequency selective channel. What coherence means is that all the frequencies in the signal respond similarly or are subject to the same amplitude distortion. This means that fading does not affect frequencies differentially, which is a good thing. Differential distortion is hard to deal with. So of all types of fading, flat fading is the least problematic.

The next source of distortion is Doppler. Doppler results in different distortions to the frequency band of the signal. The measure of Doppler spread is called Coherence Time (CT) (no relationship to Coherence Bandwidth from the flat-fading case). The comparison of the CT with the symbol time determines the speed of fading. So if the coherence time is very small, compared to the symbol time, that's not good.

The idea of Coherence Time and Coherence Bandwidth is often confused. Flatness refers to frequency response and not to time. So Coherence Bandwidth determines whether a channel is considered flat or not.

Coherence Time, on the other hand has to do with changes over time, which is related to motion. Coherence Time is the duration during which a channel appears to be unchanging. One can think about Coherence Time when Doppler or motion is present. When Coherence Time is longer than symbol time, then a slow fading channel is provided and when symbol time is longer than Coherence time, a fast fading channel is provided. So slowness and fastness mean time based fading.

TABLE I

MIMO channel Types and their Measures

| Channel Spread | Channel Selectivity | Type | Measure |
|---|---|---|---|
| Delay Spread | Frequency | Non-selective | Coherence Bandwidth > Signal Bandwidth |
| | Frequency | Selective | Signal Bandwidth > Coherence Bandwidth |
| Doppler Spread | Time | Slow-fading | Coherence Time > Symbol Time |
| | | Fast-fast fading | Symbol Time > Coherence Time |
| Angle Spread | Beam pattern | — | Coherence Distance |

In addition to these fast channel effects, there are mean path losses as well as rain losses, which are considered order-of-magnitude slower effects and are managed operationally and so will not be part of the advantages of MIMO.

How MIMO Creates Performance Gains in a Fading Channel

Shannon defines capacity of a channel as a function of its SNR. Underlying this is the assumption that the SNR is invariant. For such a system, Shannon capacity is called its ergodic capacity. Since SNR is related to BER, the capacity of a channel is directly related to how fast the BER declines with SNR. The BER needs to decrease quickly with increasing power.

The Rayleigh channel BER when compared to an AWGN channel for the same SNR is considerably bigger and hence the capacity of a Rayleigh channel which is the converse of its BER, is much lower. Using the BER of a BPSK signal as a benchmark, one can examine the shortfall of a Rayleigh channel and see how MIMO can help to mitigate this loss.

For a BPSK signal, the BER in an AWGN channel is given by setting $\|h^2\|=1$.

$$P_e \approx Q(\sqrt{2SNR})$$

The BER of the same channel in a Rayleigh channel is given by $$P_e = \frac{1}{2}\left(1 - \sqrt{\frac{SNR}{1+SNR}}\right) \approx \frac{1}{2SNR}$$

FIG. 151 shows the BER of an AWGN and a Rayleigh channel as a function of the SNR.

The AWGN BER 15102 varies by the inverse of the square of the SNR, $SNR^{-2}$ and declines much faster than the Rayleigh channel 15104 which declines instead by $SNR^{-1}$. Hence an increase in SNR helps the Rayleigh channel 15104 much less than it does an AWGN channel 15102. The Rayleigh channel 15104 improves much more slowly as more power is added.

FIG. 151 illustrates that for a BER of $10^{-3}$, an additional 17 dB of power is required in a Rayleigh channel 15104. This is a very large differential, nearly 50 times larger than AWGN 15102. One way to bring the Rayleigh curve 15104 closer to the AWGN curve 15102 (which forms a limit of performance) is to add more antennas on the receive or the transmit-side hence making SISO into a MIMO system.

Starting with just one antenna, the number of receive antennas is increased to $N_R$, while keeping one transmitter, making it a SIMO system. By looking at the asymptotic BER at large SNR (large SNR has no formal definition, anything over 15 dB can be considered large), a determination can be made of the gain caused by adding just one more antenna to the N antennas. The ratio of the BER to the BER due to one more antenna may then be determined.

$$\frac{BER(N, SNR)}{BER(N+1, SNR)} = SNR\left(1 + \frac{1}{2N+1}\right)$$

The gain from adding one more antenna is equal to SNR multiplied by a delta increase in SNR. The delta increase diminishes as more and more antennas are added. The largest gain is seen when going from a single antenna to two antennas, (1.5 for going from 1 to 2 vs. 1.1 for going from 4 to 5 antennas). This delta increase is similar in magnitude to the slope of the BER curve at large SNR.

Formally, a parameter called Diversity order d, is defined as the slope of the BER curve as a function of SNR in the region of high SNR.

$$d = -\lim_{SNR \to \infty} \log \frac{BER(SNR)}{SNR}$$

FIG. 152 shows the gains possible with MIMO as more receive antennas are added. As more and more antennas are added, a Rayleigh channel approaches the AWGN channel. Can one keep on increasing the number of antennas indefinitely? No, beyond a certain number, increase in number of paths L does not lead to significant gains. When complexity is taken into account, a small number of antennas is enough for satisfactory performance.

Capacity of MIMO Channels

Capacity of a SISO Channel

All system designs strive for a target capacity of throughput. For SISO channels, the capacity is calculated using the well-known Shannon equation. Shannon defines capacity for an ergodic channel that data rate which can be transmitted with asymptotically small probability of error. The capacity of such a channel is given in terms of bits/sec or by normalizing with bandwidth by bits/sec/Hz. The second formulation allows easier comparison and is the one used more often. It is also bandwidth independent.

$$C = W\log_2\left(1 + \frac{P}{N_oW}\right) b/s$$

$$\frac{C}{W} = \log_2(1 + SNR) \; b/s/H_z$$

At high SNRs, ignoring the addition of 1 to SNR, the capacity is a direct function of SNR.

$$\frac{C}{W} \approx \log_2(SNR) \; b/s/H_z$$

This capacity is based on a constant data rate and is not a function of whether channel state information is available to the receiver or the transmitter. This result is applicable only to ergodic channels, ones where the data rate is fixed and SNR is stable.

Capacity of MIMO Channels

Shannon's equation illustrates that a particular SNR can give only a fixed maximum capacity. If SNR goes down, so will the ability of the channel to pass data. In a fading channel, the SNR is constantly changing. As the rate of fade changes, the capacity changes with it.

A fixed H matrix can be used as a benchmark of performance where the basic assumption is that, for that one realization, the channel is fixed and hence has an ergodic channel capacity. In other words, for just that little time period, the channel is behaving like an AWGN channel. By breaking a channel into portions of either time or frequency so that in small segments, even in a frequency-selective channel with Doppler, channel can be treated as having a fixed realization of the H matrix, i.e. allowing us to think of it instantaneously as a AWGN channel. The capacity calculations are preformed over several realizations of H matrix and then compute average capacity over these. In flat fading channels the channel matrix may remain constant and or may change very slowly. However, with user motion, this assumption does not hold.

Decomposing a MIMO Channel into Parallel Independent Channels

Conceptually MIMO may be thought of as the transmission of same data over multiple antennas, hence it is a matrix channel. But there is a mathematical trick that lets us decompose the MIMO channel into several independent parallel channels each of which can be thought of as a SISO channel. To look at a MIMO channel as a set of independent channels, an algorithm called Singular Value Decomposition (SVD) is used. The process requires pre-coding at the transmitter and receiver shaping at the receiver.

Input and Output Auto-Correlation

Assuming that a MIMO channel has N transmitters and M receivers, the transmitted vector across NT antennas is given by $x_1, x_2, x_3, \ldots x_{NT}$. Individual transmit signals consist of symbols that are zero mean circular-symmetric complex Gaussian variables. (A vector x is said to be circular-symmetric if $e^{j\Theta}x$ has same distribution for all $\Theta$.) The covariance matrix for the transmitted symbols is written as:

$$R_{xx} = E\{xx^H\}$$

Where symbol H stands for the transpose and component-wise complex conjugate of the matrix (also called Hermi-tian) and not the channel matrix. This relationship gives us a measure of correlated-ness of the transmitted signal amplitudes.

When the powers of the transmitted symbols are the same, a scaled identity matrix is provided. For a (3×3) MIMO system of total power of $P_T$, equally distributed this matrix is written as:

$$R_{xx} = P_T \begin{bmatrix} 1 & 0 & 0 \\ 0 & 1 & 0 \\ 0 & 0 & 1 \end{bmatrix}$$

If the same system distributes the power differently say in ratio of 1:2:3, then the covariance matrix would be:

$$R_{xx} = P_T \begin{bmatrix} 1 & 0 & 0 \\ 0 & 2 & 0 \\ 0 & 0 & 3 \end{bmatrix}$$

If the total transmitted power is $P_T$ and is equal to trace of the Input covariance matrix, the total power of the transmitted signal can be written as the trace of the covariance matrix.

$$P = tr\{R_{xx}\}$$

The received signal is given by:

$$r = Hx + n$$

The noise matrix (N×1) components are assumed to be ZMGV (zero-mean Gaussian variable) of equal variance. We can write the covariance matrix of the noise process similar to the transmit symbols as:

$$R_{nn} = E\{nn^H\}$$

And since there is no correlation between its rows, this can be written as:

$$R_{nn} = \sigma^2 1_M$$

Which says that each of the M received noise signals is an independent signal of noise variance, $\sigma^2$.

Each receiver receives a complex signal consisting of the sum of the replicas from N transmit antennas and an independent noise signal. Assuming that the power received at each receiver is not the same, the SNR of the $m_{th}$ receiver may be written as:

$$\gamma_m = \frac{P_m}{\sigma^2}$$

where $P_m$ is some part of the total power. However the average SNR for all receive antennas would still be equal to $P_T/\sigma^2$, where $P_T$ is total power because $$P_T = \sum_{m=1}^{N_T} P_m$$

Now we write the covariance matrix of the receive signal using as:

$$R_{rr} = HR_{xx}H^H + R_{nn}$$

where $R_{xx}$ is the covariance matrix of the transmitted signal. The total receive power is equal to the trace of the matrix $R_{rr}$.

Singular Value Decomposition (SVD)

Referring now to FIG. 153 there is illustrated a modal decomposition of a MIMO channel with full CSI. SVD is a mathematical application that lets us create an alternate structure of the MIMO signal. In particular, the MIMO signal is examined by looking at the eigenvalues of the H matrix. The H matrix can be written in Singular Value Decomposition (SVD) form as:

$$H = U\Sigma V^H$$

where U and V are unitary matrices ($U^H U = I_{N_R}$, and $V^H V = I_{N_T}$) and $\Sigma$ is a $N_R \times N_T$ diagonal matrix of singular values ($\sigma_i$) of H matrix. If H is a full Rank matrix then we have a min ($N_R$, $N_T$) of non-zero singular values, hence the same number of independent channels. The parallel decomposition is essentially a linear mapping function performed by pre-coding the input signal by multiplying it with matrix V.

$$x = V\tilde{x}$$

The received signal y is given by multiplying it with $U^H$, $$\tilde{y} = U^H(Hx+n)$$

Now multiplying it out, and setting value of H, to get:

$$\tilde{y} = U^H(U\Sigma V^H x + n)$$

Now substitute:

$$x = V\tilde{x}$$

To obtain:

$$\begin{aligned}\tilde{y} &= U^H\ (\underline{U\Sigma V^H}x+n) \\ &= U^H\ (U\Sigma V^\dagger V\tilde{x}+n) \\ &= U^H\ U\Sigma V^\dagger V\tilde{x}+U^H\ n \\ &= \Sigma\tilde{x}+\tilde{n}\end{aligned}$$

In the last result, the output signal is in form of a pre-coded input signal times the singular value matrix, $\Sigma$. Note that the multiplication of noise n, by the unitary matrix $U^H$ does not change the noise distribution. Note that the only way SVD can be used is if the transmitter knows what pre-coding to apply, which of course requires knowledge of the channel by the transmitter. As shown in FIG. 154, SVD is used for decomposing a matrix channel is decomposed into parallel equivalent channels.

Since SVD entails greater complexity, not the least of which is feeding back CSI to the transmitter, with the same results, why should we consider the SVD approach? The answer is that the SVD approach allows the transmitter to optimize its distribution of transmitted power, thereby providing a further benefit of transmit array gain.

The channel eigenmodes (or principle components) can be viewed as individual channels characterized by coefficients (eigenvalues). The number of significant eigenvalues specifies the maximum degree of diversity. The larger a particular eigenvalue, the more reliable is that channel. The principle eigenvalue specifies the maximum possible beamforming gain. The most important benefit of the SVD approach is that it allows for enhanced array gain—the transmitter can send more power over the better channels, and less (or no) power over the worst ones. The number of principle components is a measure of the maximum degree of diversity that can be realized in this way.

Channel Capacity of a SIMO, MISO Channel

Before discussing the capacity of a MIMO channel, let's examine the capacity of a channel that has multiple receivers or transmitters but not both. We modify the SNR of a SISO channel by the gain factor obtained from having multiple receivers.

$$C_{SIMO} = \log_2(1+\|h\|^2 SNR) \text{ bits/s/Hz}$$

The channel consists of only $N_R$ paths and hence the channel gain is constrained by:

$$\|h\|^2 = N_R$$

This gives the ergodic capacity of the SIMO channel as:

$$C_{SIMO} = \log_2(1+N_R SNR) \text{ bits/s/Hz}$$

So the SNR is increasing by a factor of $N_R$. This is a logarithmic gain. Note that we are assuming that the transmitter has no knowledge of the channel.

Next consider a MISO channel, with multiple transmitters but one receiver. The channel capacity of a MISO channel is given by:

$$C_{MISO} = \log_2\left(1+\frac{\|h\|^2\ SNR}{N_T}\right) \text{ bits/s/Hz}$$

Why divide by $N_T$? Compared to the SIMO case, where each path has SNR based on total power, in this case, total power is divided by the number of transmitters. So the SNR at the one receiver keeps getting smaller as more and more transmitters are added. For a two receiver case, each path has a half of the total power. But since there is only one receiver, this is being divided by the total noise power at the receiver, so the SNR is effectively cut in half Again if the transmitter has no knowledge of the channel, the equation devolves in to a SISO channel:

$$C_{MISO} = \log_2(1+SNR) \text{ bits/s/Hz}$$

The capacity of a MISO channel is less than a SIMO channel when the channel in unknown at the transmitter. However, if the channel is known to the transmitter, then it can concentrate its power into one channel and the capacity of SIMO and MISO channel becomes equal under this condition.

Both SIMO and MISO can achieve diversity but they cannot achieve any multiplexing gains. This is obvious for the case of one transmitter, (SIMO). In a MISO system all transmitters would need to send the same symbol because a single receiver would have no way of separating the different symbols from the multiple transmitters. The capacity still increases only logarithmically with each increase in the number of the transmitters or the receivers. The capacity for the SIMO and MISO are the same. Both channels experience array gain of the same amount but fall short of the MIMO gains.

Assuming a discrete MIMO channel model as shown in FIG. 155. The channel gain may be time-varying but assumed to be fixed for a block of time and random. Assume that total transmit power is P, bandwidth is B and the PSD of noise process is $N_0/2$.

Assume that total power is limited by the relationship:

$$E(x^H x) = \sum_{i=1}^{N_T} E\{|x_i|^2\} = N_T$$

We write The input covariance matrix may be written as $R_{xx}$ $$R_{xx} = E\{xx^H\}$$

The trace of this matrix is equal to:

$$\rho = \frac{P}{\#paths} = tr\{R_{xx}\}$$

or the power per path. When the powers are uniformly distributed (equal) then this is equal to a unity matrix. The covariance matrix of the output signal would not be unity as it is a function of the H matrix.

Now the capacity expression for a MIMO matrix channel using a fixed but random realization the H matrix can be developed. Assuming availability of CSIR, the capacity of a deterministic channel is defined by Shannon as:

$$C = \max_{f(x)} I(x; y)$$

I(x;y) is called the mutual information of x and y. It is the capacity of the channel is the maximum information that can be transmitted from x to y by varying the channel PDF. The value f(x) is the probability density function of the transmit signal x. From information theory, the relationship of mutual information between two random variables as a function of their differential entropy may be obtained.

$$I(x;y) = \varepsilon_{(y)} - \varepsilon_{(y|x)}$$

The second term is constant for a deterministic channel because it is function only of the noise. So mutual information is maximum only when the term H(y), called differential entropy is maximum.

The differential entropy H(y) is maximized when both x and y are zero-mean, Circular-Symmetric Complex Gaussian (ZMCSCG) random variable. Also from information theory, the following relationships are provided:

$$\varepsilon_{(y)} = \log_2\{det(\pi e R_{yy})\}$$

$$\varepsilon_{(y|x)} = \log_2\{det(\pi e N_O I_{N_R})\}$$

Now we write the signal y as:

$$y = \sqrt{\gamma} H x + z$$

Here γ is instantaneous SNR. The auto-correlation of the output signal y which we need for (27.48) is given by $$\begin{aligned}R_{yy} &= E\{yy^H\}\\&= E\{(\sqrt{\gamma} Hx + z)(\sqrt{\gamma} x^H H^H + z^H)\}\\&= E\{(\gamma H x x^H H^H + zz^H)\}\\&= \gamma H E\{xx^H\} H^H + E\{zz^H\}\end{aligned}$$

$$R_{yy} = \gamma H R_{xx} H^H + N_o I_{N_R}$$

From here we can write the expression for capacity as $$C = \log_2 \det\left(I_{N_R} + \frac{SNR}{N_T} HH^H\right)$$

When CSIT is not available, we can assume equal power distribution among the transmitters, in which case $R_{xx}$ is an identity matrix and the equation becomes $$C = \log_2 \det\left(I_{N_R} + \frac{SNR}{N_T} HH^H\right)$$

This is the capacity equation for MIMO channels with equal power. The optimization of this expression depends on whether or not the CSI (H matrix) is known to the transmitter.

Now note that as the number of antennas increases, we get $$\lim_{N \to \infty} \frac{1}{M} HH^H = I_N$$

This means that as the number of paths goes to infinity, the power that reaches each of the infinite number of receivers becomes equal and the channel now approaches an AWGN channel.

This gives us an expression about the capacity limit of a $N_T \times N_R$ MIMO system.

$$C = M \log_2 \det(I_{N_R} + SNR)$$

where M is the minimum of $N_T$ and $N_R$, the number of the antennas. Thus, the capacity increases linearly with M, the minimum of ($N_T$, $N_R$). If a system has (4, 6) antennas, the maximum diversity that can be obtained is of order 4, the small number of the two system parameters.

Channel Known at Transmitter

The SVD results can be used to determine how to allocate powers across the transmitters to get maximum capacity. By allocating the power non-equally, the capacity can be increased. In general, channels with high SNR (high $\sigma_i$), should get more power than those with lower SNR.

There is a solution to the power allocation problem at the transmitter called the water-filling algorithm. This solution is given by:

$$\frac{P_i}{P} = \begin{cases}\left(\frac{1}{\gamma_o} - \frac{1}{\gamma_i}\right) & \gamma_i > \gamma_o \\ 0 & \gamma_i \leq \gamma_o\end{cases}$$

Where $\gamma_0$ is a threshold constant. Here $\gamma_I$ is the SNR of the $i_{th}$ channel.

When comparing the inverse of the threshold with the inverse of the channel SNR and the inverse difference is less than the threshold, no power is allocated to the $i_{th}$ channel. If the difference is positive then more power may be added to see if it helps the overall performance.

The capacity using the water-filling algorithm is given by:

$$C = \sum_{i: \gamma_i > \gamma_o} B \log_2 \left(\frac{\gamma_i}{\gamma_o}\right)$$

The thing about the water-filling algorithm is that it is much easier to comprehend then is it to describe using equations. Think of it as a boat sinking in the water. Where would a person sit on the boat while waiting for rescue, clearly the part that is sticking above the water, right? The analogous part to the boat above the surface are the channels that can overcome fading. Some of the channels reach the receiver with enough SNR for decoding. So the data/power should go to these channels and not to the ones that are under water. So basically, power is allocated to those channels that are strongest or above a pre-set threshold.

Channel Capacity in Outage

The Rayleigh channels go through such extremes of SNR fades that the average SNR cannot be maintained from one time block to the next. Due to this, they are unable to support a constant data rate. A Rayleigh channel can be characterized as a binary state channel; an ergodic channel but with an outage probability. When it has a SNR that is above a minimum threshold, it can be treated as ON and capacity can be calculated using the information-theoretic rate. But when the SNR is below the threshold, the capacity of the channel is zero. The channel is said to be in outage.

Although ergodic capacity can be useful in characterizing a fast-fading channel, it is not very useful for slow-fading, where there can be outages for significant time intervals. When there is an outage, the channel is so poor that there is no scheme able to communicate reliably at a certain fixed data rate.

The outage capacity is the capacity that is guaranteed with a certain level of reliability. The outage capacity is defined as the information rate that is guaranteed for (100−p) % of the channel realizations. A 1% outage probability means that 99% of the time the channel is above a threshold of SNR and can transmit data. For real systems, outage capacity is the most useful measure of throughput capability.

Question: which would have higher capacity, a system with 1% outage or 10% outage? The high probability of outage means that the threshold can be set lower, which also means that system will have higher capacity, of course only while it is working which is 90% of the time.

The capacity equation of a Rayleigh channel with outage probability ε, can be written as:

$$C_{out=(1-P_{out})B\log\,2(1+\gamma_{min})}$$

The probability of obtaining a minimum threshold value of the SNR, assuming it has a Rayleigh distribution, can be calculated. The capacity of channel under outage probability ε is given by:

$$C_\varepsilon = \log_2 \left(1 + SNR \cdot \ln\left(\frac{1}{1-\varepsilon}\right)\right)$$

The Shannon's equation has been modified by the outage probability.

Capacity Under a Correlated Channel

MIMO gains come from the independence of the channels. The development of ergodic capacity assumes that channels created by MIMO are independent. But what happens if there is some correlation among the channels which is what happens in reality due to reflectors located near the base station or the towers. Usually in cell phone systems, the transmitters (on account on being located high on towers) are less subject to correlation than are the receivers (the cell phones).

The signal correlation, r, between two antennas located a distance d apart, transmitting at the same frequency, is given by zero order Bessel function defined as:

$$r = J_o^2 \left(\frac{2\pi d}{\lambda}\right)$$

where $J_0(x)$ is the zero-th order Bessel function. FIG. 156 shows the correlation coefficient r, plotted between receive antennas vs. d/λ, using the Jakes model.

An antenna that is approximately half a wavelength away experiences only 10% correlation with the first. To examine the effect that correlation has on system capacity, the channel mat channel matrix H is replaced in the ergodic equation as follows:

$$C = \log_2 \det \left(I_{N_R} + \frac{SNR}{N_T} HH^H\right)$$

Assuming equal transmit powers, with a correlation matrix, assuming that the following normalization holds. This normalization allows the correlation matrix, rather than covariance.

$$\sum_{i,j=1}^{N_T,N_R} |h_{i,j}|^2 = 1$$

Now we write the capacity equation instead as $$C = \log_2 M \det \left(I + \frac{SNR}{M} \cdot R\right)$$

where R is the normalized correlation matrix, such that its components $$r_{ij} = \frac{1}{\sqrt{\sigma_i \sigma_j}} \sum_K h_{ik} h_{jk}^* = \sum_K h_{ik} h_{jk}^*$$

We can write the capacity equation as:

$$C = M \cdot \log_2 det(1+SNR) + \log_2 det(R)$$

The first underlined part of the expression is the capacity of M independent channels and the second is the contribution due to correlation. Since the determinant R is always <=1, then correlation always results in degradation to the ergodic capacity.

An often used channel model for M=2, and 4 called the Kronecker Delta model takes this concept further by separating the correlation into two parts, one near the transmitter and the other near the receiver. The model assumes each part to be independent of the other. Two correlation matrices are defined, one for transmit, $R_T$ and one for receiver $R_R$. The complete channel correlation is assumed to be equal to the Kronecker product of these two smaller matrices.

$$R_{MIMO}=R_R \otimes R_T$$

The correlation among the columns of the H matrix represents the correlation between the transmitter and correlation between rows in receivers. We can write These two one-sided matrices can be written as:

$$R_R = \frac{1}{\beta} E\{HH^H\}$$

$$R_T = \frac{1}{\alpha} E\{H^H H\}^T$$

The constant parameters (the correlation coefficients for each side) satisfy the relationship:

$$\alpha\beta = Tr(R_{MIMO})$$

Now to see how correlation at the two ends affects the capacity, the random channel H matrix is multiplied with the two correlation matrices as follows. The matrices can be produced in a number of fashions. In some cases, test data is available which can be used in the matrix, in others, a generic form based on Bessel coefficients is used. If the correlation coefficient on each side as a parameter is used, each correlation matrix can be written as:

$$R_R = \begin{bmatrix} 1 & \sigma & \sigma^2 \\ \sigma & 1 & \sigma \\ \sigma^2 & \sigma & 1 \end{bmatrix} \text{ and } R_R = \begin{bmatrix} 1 & \beta & \beta^2 \\ \beta & 1 & \beta \\ \beta^2 & \beta & 1 \end{bmatrix}$$

Now write the correlated channel matrix in a Cholesky form as $$H = \sqrt{R_T} H_w \sqrt{R_T}$$

where $H_w$ is the i.i.d random H matrix, that is now subject to correlation effects.

The correlation at the transmitter is mathematically seen as correlation between the columns of the H matrix and can written as $R_T$. The correlation at the receiver is seen as the correlation between the rows of the H matrix, $R_R$. Clearly if the columns are similar, each antenna is seeing a similar channel. When the received amplitudes are similar at each receiver, correlation at the receiver is seen. The H matrix under correlation is ill conditioned, and small changes lead to large changes in the received signal, clearly not a helpful situation.

The capacity of a channel with correlation can be written as:

$$C = \log_2 \det \left(1_{NR} + \frac{SNR}{N_T} R_r^{1/2} H^H R_t^{H1/2}\right)$$

When $N_T = N_R$ and SNR is high, this expression can be approximated as:

$$C = \log_2 \det \left(1_{NR} + \frac{SNR}{N_T} H_u H_u^H\right) + \log_2 \det(R_r) + \log_2 \det(R_t)$$

The last two terms are always negative since det(R) ≤0. That implies that correlation leads to reduction in capacity in frequency selective channels as shown in FIG. 157.

Here it is assumed that the frequency response is flat for the duration of the single realization of the H matrix. In FIG. 158 shows a channel 15802 that is not flat. Its response is changing with frequency. The H matrix now changes within each sub-frequency of the signal. Note that this is not time, but frequency. The H matrix is written as a super matrix of sub-matrices for each frequency.

Assume we can characterize the channel in N frequency sub-bands. The H matrix can now be written as a $[(N \times N_R), (N \times N_T)]$ matrix. A [3×3] H matrix is subdivided into N frequency and is written as an [18×18] matrix, with [3×3] matrices on the diagonal.

Spatial Multiplexing and how it Works

Each of the links in a MIMO system is assumed to transmit the same information. This is an implicit assumption of obtaining diversity gain. Multicasting provides diversity gain but no data rate improvement. If independent information could be sent across the antennas, then there is an opportunity to increase the data rate as well as keep some diversity gain. The data rate improvement in a MIMO system is called Spatial Multiplexing Gain (SMG).

The data rate improvement is related to the number of pairs of the RCV/XMT (receive/transmit) antennas, and when these numbers are unequal, it is proportional to smaller of the two numbers, $N_T$, $N_R$. This is easy to see; the system can only transmit as many different symbols as there are transmit antennas. This number is limited by the number of receive antennas, if the number of receive antennas is less than the number of transmit antennas.

Spatial multiplexing means the ability to transmit higher bit rate when compared to a system where we only get diversity gains because of transmissions of the same symbol from each transmitter. Therefore:

$$d = -\lim_{SNR \to \infty} \log \frac{BER(SNR)}{SNR} \text{ Diversity Gain}$$

$$s = \lim_{SNR \to \infty} \frac{\text{Data Rate}(SNR)}{\log(SNR)} \text{ Spatial Multiplexing Gain}$$

Should the diversity gain or multiplexing gain or maybe a little of both be used? The answer is that a little bit of both may be used.

One way to increase the number of independent Eigen channels is to use a set of orthogonal modes. Such a system transmits multiple coaxially-propagating spatial modes each carrying an independent data stream through a single aperture pair. Therefore, the total capacity of the communication system can be increased by a factor equal to the number of transmitted modes. An orthogonal spatial modal basis set that has gained interest recently is orbital angular momentum (OAM). An electromagnetic beam with a helical wavefront carries an OAM corresponding to l$\hbar$per photon, where $\hbar$ is the reduced Planck constant and l is an unbounded integer. Importantly, OAM modes with different l values are mutually orthogonal, which allows them to be efficiently (de)multiplexed with low inter-modal crosstalk, thereby avoiding the use of multiple-input multiple-output (MIMO) processing.

Another approach for simultaneously transmitting multiple independent data streams is to use MIMO-based spatial multiplexing, for which multiple aperture elements are employed at transmitter/receiver. As a well-established technique in wireless systems, this approach could provide capacity gains relative to single aperture systems and increase link robustness for point-to-point (P2P) communications. In such a system, each data-carrying beam is received by multiple spatially separated receivers and MIMO signal processing is critical for reducing the crosstalk among channels and thus allows data recovery.

However, MIMO signal processing becomes more onerous for MIMO-based spatial multiplexing as the number of aperture elements increases. In addition, for OAM multiplexed systems, the detection of high-order OAM modes presents a challenge for the receiver because OAM beams with larger l values diverge more during propagation. Therefore, the achievable number of data channels for each type of multiplexing technique might be limited, and achieving a larger number of channels by using any one approach would be significantly more difficult. Similar to the multiplexing in few-mode and multi-core fibers, these two forms of spatial multiplexing might be compatible with each other. The combination of them by fully exploiting the advantages of each technique, such that they complement each other, might enable a dense spatial multiplexed FSO system.

Antenna Placements in MIMO

FIGS. 159 and 160 illustrates the placement of antennas in a MIMO system. FIG. 159 illustrates antennas $Tx_0$ through $Tx_{n-1}$ and receivers $Rx_0$ through $Rx_{n-1}$. FIG. 160 illustrates the transmission paths between transmitters $Tx_0$ and $Tx_1$ and receiver $Rx$.

The vectors describing the antenna placements are given by:

$$a_n^t = nd_t \sin(\theta_t)n_x + nd_t \cos(\theta_t)n_z$$

$$a_m^r = [D + md_r \sin(\theta_r)\cos(\phi_r)]n_x + md_r \cos(\theta_r)n_z + md_r \sin(\theta_r)\sin(\phi_r)n_y$$

The Euclidean distance between the antennas is:

$$d_{nm} = |a_m^r - a_n^t| = [(D + md_r \sin(\theta_r)\cos(\phi_r) - nd_t\sin(\theta_t))^2 + (md_r\sin(\theta_r)\sin(\phi_t))^2 + (md_r\cos(\theta_r) - nd_t\cos(\theta_t))^2]$$

Since distance D is much larger than the antenna spacing, then:

$$d_{nm} \approx D + md_r\sin\theta_r\cos\phi_r - nd_t\sin\theta_t + \frac{1}{2D}[(md_r\cos\theta_r - nd_t\cos\theta_t)^2 + (md_r\sin\theta_r\sin\phi_r)^2] =$$

$$D + md_r\sin\theta_r\cos\phi_r - nd_t\sin\theta_t + \frac{1}{2D}[m^2d_r^2\cos^2\theta_r + n^2d_t^2\cos^2\theta_t - 2mnd_td_r\cos\theta_t\cos\theta_r + m^2d_r^2\sin^2\theta_r\sin^2\phi_r]$$

Now criteria for the optimal antenna separation can be found. This is achieved by maximizing the capacity as a function of antenna separation. That is to maximize the product of the eigenvalues.

$$W = \begin{cases} HH^H, & N \leq M \\ H^H H, & N > M \end{cases}$$

This is obtained if H has orthogonal rows for $N \leq M$ or orthogonal columns for $N > M$. Defining the rows of $H_{LOS}$ as $h_n$ the orthogonality between them can be expressed as:

$$\langle h_n, h_i \rangle_{n \neq i} = \sum_{m=0}^{M-1} \exp(jk(d_{nm} - d_{im}))$$

$$= \sum_{m=0}^{M-1} \exp\left(j2\pi \frac{d_t d_r \cos(\theta_r)\cos(\theta_t)}{\lambda D}(i - n)m\right) \cdot$$

$$\exp\left(jk\left[(i - n)d_t\sin(\theta_t) + \frac{1}{2D}(i - n)^2 d_t^2\cos^2(\theta_t)\right]\right) = 0$$

$$\Rightarrow \frac{\sin(kd_t d_r \cos(\theta_r)\cos(\theta_t)(i-n)M/2D)}{\sin(kd_t d_r \cos(\theta_r)\cos(\theta_t)(i-n)/2D)} = 0$$

$$\Rightarrow d_t d_r = \frac{\lambda D}{M\cos(\theta_t)\cos(\theta_r)} K$$

where K is a positive odd number usually chosen to be 1 since that gives the smallest optimal antenna separation. Doing a similar derivation for the case N >M would give the same expression only with M instead of N. Defining V=min (M,N), the general expression for antenna separation is:

$$d_t d_r = \frac{\lambda D}{V\cos(\theta_t)\cos(\theta_r)} K$$

That is the separation increases by distance D and decreases as frequency increases.

Defining a new parameter η as:

$$\eta = \sqrt{\frac{d_t d_r}{(d_t d_r)_{opt}}}$$

To quantify the deviation from optimality. Choosing $d_t = d_r = d$ Then this reduces to $\eta = d/d_{opt}$ Then the condition number for 2×2 MIMO will be $$\kappa = \sqrt{\frac{2 + [2 + 2\cos(\pi\eta^2)]^{1/2}}{2 - [2 + 2\cos(\pi\eta^2)]^{1/2}}}$$

Calculating the distance $d_1$ and $d_2$ we have:

$$d_1^2 = d_r^2/4 + D^2 - d_r D \cos(\phi)$$

$$d_2^2 = d_r^2/4 + D^2 + d_r D \cos(\phi)$$

The gain relative to single RX antenna can be expressed as:

$$G(\phi, \alpha) = \frac{1}{T_{sc}} \int_0^{T_{sc}} (\sin(\omega t + d_1 k) + \sin(\omega t + d_2 k + \alpha))^2 dt = \cos(d_1 k - d_2 k - \alpha) + 1 = \cos(k\Delta d + \alpha) + 1$$

Where:

$$\Delta d = d_2 - d_1.$$

But:

$$(d_2 - d_1)^2 = (d_1^2 + d_2^2 - 2d_1 d_2) = \frac{d_t^2}{2} + 2D^2 -$$

$$\sqrt{\frac{d_t^4}{4} + 4D^4 + 2d_t^2 D^2 - 4d_t^2 D^2 \cos^2(\phi)}$$

$$\approx \frac{d_t^2}{2} + 2D^2 - 2D^2 -$$

$$\frac{d_t^4/4 + 2d_t^2 D^2 - 4d_t^2 D^2 \cos^2(\phi)}{2D^2} = d_t^2 \cos^2(\phi) - \frac{d_t^4}{16D^2}$$

For $D \gg d_t^2$:

$$\Delta d \approx d_t \cos(\phi)$$

Therefore:

$$G(\phi, \alpha) = \cos(k\Delta d + \alpha) + 1 \approx \cos\left(\frac{2\pi}{\lambda} d_t \cos(\phi) + \alpha\right) + 1$$

Wideband MIMO Model

For a narrowband MIMO we had $r=sH+n$ which can be expressed as:

$$r_m[j] = \sum_{n=1}^{N} h_{nm} s_n[j]$$

Where j is the discrete symbol timing.

Now a wideband channel will act as a filter so that the gains need be replaced by filters as:

$$r_m[j] = \sum_{n=1}^{N} \sum_{i=-L_t}^{L_t} h_{nm}[i,j] s_n[j-i] \Leftrightarrow r_m = \sum_{n=1}^{N} h_{nm} * s_n$$

Transmitting $L_B$ symbols (block length) the channel matrix can be expressed as:

$$\Psi_{nm} = \begin{bmatrix} h_{nm}[0] & \cdots & h_{nm}[-L_t] & 0 & \cdots & 0 \\ h_{nm}[1] & h_{nm}[0] & \cdots & h_{nm}[-L_t] & \ddots & 0 \\ \vdots & \ddots & \ddots & \ddots & \ddots & \vdots \\ 0 & \cdots & 0 & h_{nm}[L_t] & \cdots & h_{nm}[0] \end{bmatrix}^T$$

Or $$= \begin{bmatrix} \Psi_{11} & \cdots & \Psi_{1M} \\ \vdots & \ddots & \vdots \\ \Psi_{N1} & \cdots & \Psi_{NM} \end{bmatrix}$$

Defining signal matrix as:

$$s=[s_1, \ldots, s_N]$$

$$s_n s_n[1], \ldots, s_n[L_B]]$$

Then the noise free received signal can be expressed as:

$$r = s\Psi$$

For frequency selective channel, the capacity becomes frequency dependent. For a SISO channel, the capacity becomes:

$$C = \int_{-\infty}^{\infty} \log_2(1+\gamma|H(f)|^2) df$$

And therefore for a MIMO channel the capacity becomes $$C = \sum_{i=1}^{min(N,M)} \int_{-\infty}^{\infty} \log_2(1 + \gamma \lambda_i(f)) df$$

Line of Sight MIMO Channel

In LOS-MIMO there is one dominating path so that the incoming phases are dominated by the geometry of the channel and not scattering. Other than the LOS-path, there can be secondary paths caused by atmospheric scintillation or a reflection off the ground. This results in a frequency selective channel. The common model to use is a plane earth model with one reflection from ground. The two paths have some delay difference $\tau$ which is typically set to 6.3 nsec in Rummler's model. The impulse response of such a channel is:

$$h(t) = \delta(t) + b\delta(t-\tau)e^{j\phi} \Leftrightarrow H(s) = L\{h(t)\} = 1 + be^{-\tau s + j\phi}$$

that is the channel introduces periodic notches in frequency spectrum. If one of the notches happen to be within the bandwidth, the channel will suffer from sever fading and ISI.

Dual Polarized MIMO

For a 4×4 Dual polarized MIMO, one can achieve four fold capacity compared to SISO. The narrowband channel matrix can be written as:

$$H = \begin{bmatrix} h_{1V,1V} & h_{1V,1H} & h_{1V,2V} & h_{1V,2H} \\ h_{1H,1V} & h_{1H,1H} & h_{1H,2V} & h_{1H,2H} \\ h_{2V,1V} & h_{2V,1H} & h_{2V,2V} & h_{2V,2H} \\ h_{2H,1V} & h_{2H,1H} & h_{2H,2V} & h_{2H,2H} \end{bmatrix} = \begin{bmatrix} H_{11} & H_{12} \\ H_{21} & H_{22} \end{bmatrix} =$$

$$\begin{bmatrix} \sqrt{1-\alpha}\,e^{jkd_{11}} & \sqrt{\alpha}\,e^{jkd_{11}} & \sqrt{1-\alpha}\,e^{jkd_{12}} & \sqrt{\alpha}\,e^{jkd_{12}} \\ \alpha e^{jkd_{11}} & \sqrt{1-\alpha}\,e^{jkd_{11}} & \sqrt{\alpha}\,e^{jkd_{12}} & \sqrt{1-\alpha}\,e^{jkd_{12}} \\ \sqrt{1-\alpha}\,e^{jkd_{21}} & \sqrt{\alpha}\,e^{jkd_{21}} & \sqrt{1-\alpha}\,e^{jkd_{22}} & \sqrt{\alpha}\,e^{jkd_{22}} \\ \alpha e^{jkd_{21}} & \sqrt{1-\alpha}\,e^{jkd_{21}} & \sqrt{\alpha}\,e^{jkd_{22}} & \sqrt{1-\alpha}\,e^{jkd_{22}} \end{bmatrix}$$

Where:

$$H = H_{LoS} \otimes W_{XPD} = \begin{bmatrix} e^{jkd_{11}} & e^{jkd_{12}} \\ e^{jkd_{21}} & e^{jkd_{22}} \end{bmatrix} \otimes \begin{bmatrix} \sqrt{1-\alpha} & \sqrt{\alpha} \\ \sqrt{\alpha} & \sqrt{1-\alpha} \end{bmatrix}$$

Here $\alpha$ measures the ratio of the power for one polarization that is transferred to the other polarization. Then:

$$\alpha = \frac{1}{XPD+1}$$

And condition numbers can be calculated as:

$$c_1 = (2 - f_a(a))[1 - \cos(\pi\eta^2/2)]$$

$$c_2 = (2 - f_a(a))[\cos(\pi\eta^2/2) + 1]$$

$$c_3 = (2 + f_a(a))[\cos(\pi\eta^2/2) + 1]$$

$$c_4 = (2 + f_a(a))[1 - \cos(\pi\eta^2/2)]$$

Where $$\kappa = \sqrt{\frac{\max(c_1, c_2, c_3, c_4)}{\min(c_1, c_2, c_3, c_4)}}$$

For SISO, assuming Gray coding and square QAM-M, the BER can be calculated as $$P_b = \left(1 - \frac{1}{\sqrt{M}}\right) Q\left(\sqrt{\frac{3k}{M-1}\frac{E_b}{N_0}}\right)$$

Therefore, the BER for a MIMO system using SVD can be expressed as:

$$P_b = \frac{1}{R_H} \sum_{i=1}^{R_H} \left(1 - \frac{1}{\sqrt{M}}\right) Q\left(\sqrt{\frac{3k}{M-1}\frac{E_b}{N_0}\sigma_i^2}\right)$$

Referring now to FIG. 161 by combining mode division multiplexing techniques one 6102 such as those described previously for combining multiple input signals onto a single carrier signal by applying a different orthogonal functions, such as Hermite Gaussian functions and Laguerre Gaussian functions, to each of the multiple input signals, with multiple input multiple output (MIMO) techniques 16102 increased bandwidth 16106 may be achieved for free space communications. Thus, as illustrated in FIG. 162, multiple input signals 16202 are applied to MDM processing circuitry 16204. The MDM processing circuitry 16204 uses Hermite Gaussian functions, Laguerre Gaussian functions or other orthogonal functions to generate an HG, LG or orthogonal transmission beam. The MDM processed beam from the MDM processing circuit 16204 is provided to a MIMO transmitter 16206 for transmission of an output signal. The combined MIMO+MDM multiplexing enhances the performance of free space point to point communication systems by fully exploiting the advantages of each multiplexing technique.

The transmission 16208 from the MIMO transmitter 16206 to a MIMO receiver 16210 can be done at both RF as well as optical frequencies. The MIMO transmitter 16206 and the MIMO receiver 16210 each include multiple antennas associated with each of the transmission channels. There is an optimal way to place each element of the antenna array on both the transmitter and receiver sides to maximize capacity and minimize correlations. Also, game theoretical algorithms such as water filling algorithms can be used to find the optimum distribution of power in each of the radio paths in the channel matrix between the transmitter and the receiver. The received signals are separated as discussed hereinabove at the MIMO receiver 16210 and the received signals are then multiplexed using MDM processing circuitry 16212 at the receiver side. This ultimately receives the originally received multiple input signals as multiple output signals 16214. Interchannel crosstalk's effects are minimized by the OAM beams inherent orthogonality provided by the MDM processing circuitry 16204 and by the MIMO signal processing. The OAM and MIMO-based spatial multiplexing can be compatible with and complement each other thereby providing for a dense or super massive compactified MIMO system.

Further improvements in signal to noise ratio and a creation of a denser, super compactified MIMO system may be achieved, as illustrated in FIG. 163. Multiple input signals 16302 are applied to MDM processing circuitry 16304. The MDM processing circuitry 16204 uses Hermite Gaussian functions, Laguerre Gaussian functions or other orthogonal functions to generate an HG, LG or orthogonal transmission beam. The MDM processed beam from the MDM processing circuit 16304 is provided to a maximum ratio combining circuit that processes the signal as described in the attached appendix. The MRC processed signal is provided to a MIMO transmitter 16306 for transmission of an output signal. The combined MIMO+MRC+MDM multiplexing enhances the performance of free space point to point communication systems by fully exploiting the advantages of each multiplexing technique and creates a super dense data transmission signal.

The transmission 16308 from the MIMO transmitter 16306 to a MIMO receiver 16310 can be done at both RF as well as optical frequencies. The received signals are processed by an MRC circuit 16311 and separated as discussed hereinabove at the MIMO receiver 16310. The received signals are then multiplexed using MDM processing circuitry 16212 at the receiver side. This ultimately receives the originally received multiple input signals as multiple output signals 16214. Interchannel crosstalk's effects are minimized by the beams inherent orthogonality provided by the MDM processing circuitry 16204 and by the MIMO signal processing. The Orthogonal signal, MRC and MIMO-based spatial multiplexing can be compatible with and complement each other thereby providing for a dense or super massive compactified MIMO system.

The MIMO+MDM+MRC combination can work in both time, frequency, space angular and polarization diversity with beamforming and null stearing. The combination of MIMO+MDM+MRC can also be configured to provide array gain based on the configuration of the transmit and receive arrays. The combined MIMO+MDM+MRC channel can be decomposed into several independent parallel channels each of which can be thought of as an SISO channel. Singular value decomposition (SVD) techniques can be used to decomposed the combined MIMO+MDM+MRC channel matrix. The combined MIMO+MDM+MRC channel requires the use of pre-coding at the transmitter 16306 and receiver shaping at the receiver 16310. MMSE techniques can be used for combined MIMO+MDM+MRC systems which can be like a CF receiver at high SNR and an MRC receiver at low SNR. Additionally, a space time Alamuti-type technique can be applied to the combined MIMO+MDM+MRC channel. Existing manufacturer chipsets for example, Qualcomm or Broadcom, can be used for all capacity enhancements using MIMO. However, the SNR of each input to the chipsets may be increased using RF front end that performs MRC by considering additional antennas at each port. One can further perform carrier aggregation using carrier aggregation techniques in LTE-advanced or chipsets such as Qualcomm's multi-fire chipset that perform carrier aggregation without and LTE anchor channel. This can prove to be beneficial when combined with MIMO+MDM+MRC techniques or any combination of techniques.

Referring now also to FIG. 164, the multiple input signals 16402 are applied to MRC processing circuitry 16404. The MRC processing circuitry 16404 processes the signals as discussed in the appendix. The MRC processing circuitry improves the signal to noise ratio. The MRC processed beam from the MRC processing circuit 16404 is provided to a maximum ratio combining circuit that processes the signal as described in the attached appendix. The MRC processed signal is provided to a MIMO transmitter 16406 for transmission of an output signal. The combined MIMO+MRC enhances the performance of free space point to point communication systems by fully exploiting the advantages of each multiplexing technique and creates a super dense data transmission signal.

The transmission 16408 from the MIMO transmitter 16406 to a MIMO receiver 16410 can be done at both RF as well as optical frequencies. The received signals are processed by an MRC circuit 16411. This ultimately provides the originally received multiple input signals as multiple output signals 16414. The MRC and MIMO-based spatial multiplexing can be compatible with and complement each other thereby providing for a dense or super massive compactified MIMO system.

It will be appreciated by those skilled in the art having the benefit of this disclosure that this system and method for communication using orbital angular momentum with multiple layer overlay modulation provides improved bandwidth and data transmission capability. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

APPENDIX $$\begin{bmatrix} y_1 \\ y_2 \\ \vdots \\ y_r \end{bmatrix} = \begin{bmatrix} h_{11} & h_{12} & \cdots & h_{1t} \\ h_{21} & h_{22} & & \\ h_{31} & & \ddots & \\ \vdots & & & \ddots \\ h_{r1} & & & h_{rt} \end{bmatrix} \begin{bmatrix} x_1 \\ x_2 \\ \vdots \\ x_t \end{bmatrix} + \begin{bmatrix} n_1 \\ n_2 \\ \vdots \\ n_r \end{bmatrix}$$

receive channel matrix transmit noise $$\vec{y} = H\vec{x} + \vec{n}$$

Spatially uncorrelated noise (Isotropic—equally distributed uniformly in all directions)

$$R_n = E(nn^H) = \overline{\vec{n}\vec{n}^H} = \begin{bmatrix} \sigma_n^2 & 0 & 0 \\ 0 & \ddots & 0 \\ 0 & 0 & \sigma_n^2 \end{bmatrix} = \sigma_n^2 \begin{bmatrix} 1 & 0 & 0 \\ 0 & \ddots & 0 \\ 0 & 0 & 1 \end{bmatrix} = \sigma_n^2 1$$

MIMO Receiver: Linear Receiver $$H^{-1}[\vec{y}] = H^{-1}H\vec{x} + H^{-1}\vec{n}$$

$$H^{-1}\vec{y} = \vec{x} + H^{-1}\vec{n}$$

1. Inverse only exists for square matrices r=t
2. Inverse only exists if the matrix has full rank (independent rows)

To define a generalized inverse r ≥ t $$\begin{bmatrix} y_1 \\ y_2 \\ \vdots \\ y_r \end{bmatrix} = \begin{bmatrix} h_{11} & \cdots & h_{1t} \\ \vdots & \ddots & \\ h_{r1} & & \ddots \end{bmatrix} \begin{bmatrix} x_1 \\ \vdots \\ x_t \end{bmatrix} + \vec{n}$$

Thin matrix:

$$[\;]$$

more rows than columns, more equations than unknown
When r ≥ t there are more equations than unknowns
equations are r – measurements
unknown are t – transmitters
hence, there might not be an exact solution and therefore the solutions can approximate with some error
Amongst all possible tx vectors $\vec{x}$, choose the minimum error vector $\text{error} = \|\vec{y} - H\vec{x}\|^2$ least-squares solution measurement unknown vector choose an $\vec{x}$ that minimizes the norm
Vector Differentiation Given $f(\vec{x})$ $$\frac{df(\vec{x})}{d\vec{x}} = \vec{x} = \begin{bmatrix} x_1 \\ x_2 \\ \vdots \\ x_t \end{bmatrix} \Rightarrow \frac{df}{d\vec{x}} = \begin{bmatrix} \frac{df}{dx_1} \\ \vdots \\ \frac{df}{dx_t} \end{bmatrix}$$

$$f(\vec{x}) = c^T(\vec{x}) = c_1 x_1 + c_2 x_2 + \ldots c_t x_t = \vec{x}^T \vec{c} = \vec{c}^T \vec{x}$$

$$\frac{d(c^T \vec{x})}{d\vec{x}} = \frac{d(\vec{x}^T \vec{c})}{d\vec{x}} = \begin{bmatrix} c_1 \\ c_2 \\ \vdots \\ c_t \end{bmatrix} = \vec{c}$$

$$\frac{d(\vec{x}^H \vec{c})}{d\vec{x}^H} = \vec{c}$$

minimize $\|\vec{y} - H\vec{x}\|^2$
For real matrices $$\|\vec{y} - H\vec{x}\|^2 = (\vec{y} - H\vec{x})^T (\vec{y} - H\vec{x})$$
$$= \vec{y}^T \vec{y} - \vec{y}^T H\vec{x} - \vec{x}^T H^T \vec{y} + \vec{x}^T H^T H\vec{x}$$

differentiate this with respect to $\vec{x}$ and set the derivative equal to zero $$\frac{d(\|\vec{y} - H\vec{x}\|^2)}{d\vec{x}} = -2H^T \vec{y} + 2H^T H\vec{x} = 0$$

$$(H^T H)\vec{x} = H^T \vec{y}$$

$$\vec{x} = (H^T H)^{-1} H^T \vec{y}$$

approximate solution that minimizes error
zero-forcing RX
For complex channel matrices, use the Tranpose Conjugate $$\vec{x} = (H^H H)^{-1} H^H \vec{y} \quad \text{pseudo-inverse } H^\dagger$$

$H^\dagger = (H^H H)^{-1} H^H$     (pseudo-inverse) (left-inverse) $H^\dagger \vec{y} = \vec{x}$ $H^\dagger H = (H^H H)^{-1} H^H H = 1$    if $H^{-1}$ does not exist then this is more general inverse (pseudo inverse).

$B = A^{-1}$ $BA = 1$ $AB = 1$

Inverse is unique, however the pseudo-inverse is not.
If $H^{-1}$ exists then $(H^H H)^{-1} H^H = H^{-1} H^{-H} \cdot H^H = H^{-1}$
Then $$\boxed{\text{pseudo} - \text{inverse} = \text{inverse}}$$

Diversity order of ZF-receiver $$\boxed{\text{diversity} = r - t + 1} \quad \text{if } r = 4 \; t = 2$$
$$\text{diversity} = 4 - 2 + 1 = 3$$

if r=t diversity=1 low because of noise amplification
For SISO y=hx+n if h=small, this goes to infinity $$h^{-1} y = \frac{x}{h} + \frac{n}{h}$$

$\frac{n}{h} \to$ noise amplification

Disadvantages of ZF receiver is that it results in noise amplification.
Therefore, look for a better receiver algorithm for MIMO called Minimum Mean Square Error (MMSE) Receiver
Estimate x given $$\begin{bmatrix} y_1 \\ y_2 \\ \vdots \\ y_r \end{bmatrix}$$

r-measurements to find $\vec{x}$
Let's find a Linear Estimator to estimate $\vec{x}$ $c^T \vec{y}$ choose $\vec{c}$ such so that $E\{\|\hat{x} - x\|^2\} \Longrightarrow$ minimum $E\{\|c^T \vec{y} - \vec{x}\|^2\} \Longrightarrow$ minimum -continued $E\{\|c^T \vec{y} - \vec{x}\|^2\} = E\{(c^T \vec{y} - \vec{x})^T (c^T \vec{y} - \vec{x})\}$
$= E\{c^T \vec{y} \vec{y}^T \vec{c} - \vec{x} \vec{y}^T \vec{c} - \vec{c}^T \vec{y} \vec{x}^T + \vec{x} \vec{x}^T\}$ Define: $E(\vec{y} \vec{y}^H) = R_{yy}$ $E(\vec{x} \vec{y}^H) = R_{xy}$ $E(\vec{y} \vec{x}^H) = R_{yx} = R_{xy}^T$ $E(\vec{x} \vec{x}^H) = R_{xx}$ $E\{\|\hat{x} - x\|^2\} = c^T R_{yy} c - R_{xy} c - c^T R_{yx} + R_{xx} \Longrightarrow$ minimize
$= c^T R_{yy} c - 2c^T R_{yx} + R_{xx} \Longrightarrow$ minimize $f(c)$ Take derivative with respect to $\vec{c}$ and set to zero.

$= 2 R_{yy} c - 2 R_{yx} = 0$ $R_{yy} c = R_{yx}$    $\boxed{\vec{c} = R_{yy}^{-1} R_{yx}}$ linear *MMSE* estimator $\boxed{\hat{\vec{x}} = c^T \vec{y}}$ $\boxed{\hat{\vec{x}} = c^H \vec{y}}$     for complex (more general)

$\boxed{\hat{\vec{x}} = (R_{yy}^{-1} R_{yx})^H \vec{y} = R_{xy} R_{yy}^{-1} \vec{y}}$ $\vec{y} = H\vec{x} + \vec{n}$        TX $E(xx^H) = E(\vec{x} \vec{x}^H) = \text{covariance} = E\left\{ \begin{bmatrix} x_1 \\ x_2 \\ \vdots \\ x_t \end{bmatrix} [x_1^* \; x_2^* \; \ldots \; x_t^*] \right\} =$ -continued $$R_{xx} = E\left\{\begin{bmatrix} |x_1|^2 & x_1 x_2^* & \cdots \\ x_2 x_1^* & |x_2|^2 & \\ \vdots & & |x_t|^2 \end{bmatrix}\right\} = \begin{bmatrix} P_d & 0 & 0 \\ 0 & \ddots & 0 \\ 0 & 0 & P_d \end{bmatrix} = P_d 1$$

Correlation between symbols $x_2 x_1^* \ldots \to$ all zero.

$|x_1|^2 =$ tx power $= P_d$

Tx cov $=[R_{xx}]=P_d 1_t$ $$R_{yy} = E\{yy^H\} = E\{(H\vec{x}+\vec{n})(H\vec{x}+\vec{n})^H\}$$
$$= E\{H\vec{x}\vec{x}^H H^H + \vec{n}\vec{x}^H H^H + H\vec{x}\vec{n}^H + \vec{n}\vec{n}^H\}$$

no correlation between noise & transit $\vec{n}\vec{x}^H = 0$ and $\vec{x}\vec{n}^H = 0$ $= H R_{xx} H^H + \sigma_n^2 1$ $\boxed{R_{yy} = P_d H H^H + \sigma_n^2 1}$ covariance matrix of received symbol vectors $\hat{\vec{x}} = c^H \vec{y}$ $\hat{\vec{x}} = R_{xy} R_{yy}^{-1} \vec{y}$ $$R_{yx} = E\{\vec{y}\vec{x}^H\}$$
$$= E\{(H\vec{x}+\vec{n})\vec{x}^H\}$$
$$= E\{H\vec{x}\vec{x}^H + \vec{n}\vec{x}^H\} = H R_{xx} = H[P_d 1] = P_d H$$

$\vec{c} = R_{yy}^{-1} R_{yx} = (P_d H H^H + \sigma_n^2 1)^{-1}(P_d H)$ $\vec{c} = P_d (H H^H + \sigma^2 1)^{-1} H$ (MMSE estimator)

$\hat{\vec{x}} = \vec{c}^H \vec{y}$ $\vec{\hat{x}} = P_d H^H (H H^H + \sigma^2 1)^{-1} \vec{y}$ (linear minimum mean square estimator for MIMO)

$H^H (P_d H H^H + \sigma_n^2 1)^{-1} = (P_d H^H H + \sigma_n^2 1)^{-1} H^H \to$ (easier to invert or work with)

$(P_d H^H H + \sigma_n^2 1) H^H = H^H (P_d H H^H + \sigma_n^2 1)$ $P_d H^H H H^H + \sigma_n^2 H^H = P_d H^H H H^H + \sigma_n^2 H^H$ then $\boxed{\vec{\hat{x}} = P_d (P_d H^H H + \sigma_n^2 1)^{-1} H^H \vec{y}}$ Consider $H = h$ for a SISO $\hat{x} = P_d \left(\frac{h^*}{P_d |h|^2 + \sigma_n^2}\right) \vec{y}$ $\hat{x} = \frac{P_d h^*}{\sigma_n^2} \vec{y}$ (if $h \to$ small, this does not blow up)

MIMO MMSE is more general and does not result in noise amplification when $h \to$ small $\hat{x} = P_d (P_d H^H H + \sigma_n^2 1)^{-1} H^H \vec{y}$ at high SNR $P_d =$ large
then $\vec{\hat{x}} \approx P_d (P_d H^H H)^{-1} H^H \vec{y}$ $\approx (H^H H)^{-1} H^H \vec{y} \to$ ZF receiver at low SNR $P_d =$ small $\vec{\hat{x}} = P_d (P_d H^H H + \sigma_n^2 1)^{-1} H^H \vec{y}$ $= P_d (\sigma_n^2 1)^{-1} H^H \vec{y}$ $= \frac{P_d}{\sigma_n^2} H^H \vec{y} \to$ maximum ratio combining (MRC) receiver matched filter results in maximizing signal to noise ratio.

High $_{SNR}$   ZF RX

MMSE

Low $_{SNR}$

MRC RX

Decomposition of MIMO Channel H
Singular Value Decomposition (SVD)

$|H| = U \Sigma V^H$ $$= \begin{bmatrix} u_1 & u_2 & \cdots & u_t \end{bmatrix} \begin{bmatrix} \sigma_1 & & \\ & \ddots & \\ & & \sigma_t \end{bmatrix} \begin{bmatrix} v_1^H \\ v_2^H \\ \vdots \\ v_t^H \end{bmatrix}$$

$\|u_i\|^2 = 1$ orthonormal $u_i^H u_j = 0$ if $i \neq j$
$\|v_i\|^2 = 1$ orthonormal $v_i^H v_j = 0$ if $i \neq j$
$v^H v = v v^H = 1$ unitary matrix
$u^H = 1$ $u u^H \neq 1$ in general $u u^H = 1$ only if $r = t$ generally $r > t$
$\Sigma$ is a diagonal matrix
$\sigma_1, \sigma_2, \sigma_3 \ldots \sigma_t$ are all singular values of
$\sigma_1 > \sigma_2 > \sigma_3 \ldots \sigma_t \geq 0$ all positive and ordered
Eigen value decomposition only works for square matrices, but SVD works for matrices of all non-square sizes.

Number of singular values=rank of the matrix
SVD $$H = U\Sigma V^H$$

$$\vec{y} = H\vec{x} + \vec{n}$$

$$\vec{y} = U\Sigma V^H \vec{x} + \vec{n}$$

at receiver, multiply $\vec{y}$ by $U^H$ $$U^H \vec{y} = U^H U\Sigma V^H \vec{x} + U^H \vec{n}$$

$$\tilde{\vec{y}} = \Sigma V^H \vec{x} + U^H \vec{n}$$

Now, let's do some pre-coding at TX $$\vec{x} = V\tilde{\vec{x}}$$

$$\tilde{\vec{y}} = \Sigma V^H V \tilde{\vec{x}} + \tilde{\vec{n}}$$

$$\tilde{\vec{y}} = \Sigma \tilde{\vec{x}} + \tilde{\vec{n}}$$

$$\begin{bmatrix} \tilde{y_1} \\ \tilde{y_2} \\ \vdots \\ \tilde{y_t} \end{bmatrix} = \begin{bmatrix} \sigma_1 & 0 & 0 \\ 0 & \ddots & 0 \\ 0 & 0 & \sigma_t \end{bmatrix} \begin{bmatrix} \tilde{x_1} \\ \tilde{x_2} \\ \vdots \\ \tilde{x_t} \end{bmatrix} + \begin{bmatrix} \tilde{n_1} \\ \tilde{n_2} \\ \vdots \\ \tilde{n_t} \end{bmatrix}$$

decoupling or parallelization of MIMO channel
All TX symbols are now decoupled and paralelized $$\left. \begin{array}{l} \tilde{y} = \sigma_1 \tilde{x}_1 + \tilde{n}_1 \\ \tilde{y} = \sigma_2 \tilde{x}_2 + \tilde{n}_2 \\ \vdots \quad \vdots \quad \vdots \\ \tilde{y}_t = \sigma_t \tilde{x}_t + \tilde{n}_t \end{array} \right\} \text{Collection of } t\text{-parallel channels. Transmitting}$$

$t$-information symbols in parallel Spatial multiplexity $$\tilde{\vec{n}} = U^H \vec{n}$$

noise
covariance $= E\{\tilde{n}\tilde{n}^H\} = E\{U^H n n^H U\} = U^H \sigma_n^2 1 U = \sigma_n^2 U^H U = \sigma_n^2 1$
Noise is uncorrelated from different paths. That is the power of the noise before and after beam forming is the same.

$$\sigma_{\tilde{n}}^2 = \sigma_n^2 \quad SNR \text{ of } i^{th} \text{ parallel} = \frac{\sigma_i^2 P_i}{\sigma_n^2} \text{ channel}$$

$P_1 \sigma_i$(gain)$\tilde{n}_i$(noise)

$\tilde{x}_1 \rightarrow \otimes \rightarrow \oplus \rightarrow \tilde{y}_1$ $\tilde{x}_2 \rightarrow \otimes \rightarrow \oplus \rightarrow \tilde{y}_2$ $t$-parallel channels $\tilde{x}_t \rightarrow \otimes \rightarrow \oplus \rightarrow \tilde{y}_t$ spatial multiplexing $$SNR \text{ of the } i^{th} \text{ stream} = \frac{P_i \sigma_i^2}{\sigma_n^2}$$

-continued $$\frac{\text{maximum rate}}{\text{Bandwidth}} = \frac{\text{Shannon capacity}}{\text{Bandwidth}} = \log_2(1 + SNR)$$

$$\text{capacity of } i^{th} \text{ parallel channel} = \log_2\left(1 + \frac{P_i \sigma_i^2}{\sigma_n^2}\right)$$

capacity of paths $$c_1 = \log_2\left(1 + \frac{P_1 \sigma_1^2}{\sigma_n^2}\right)$$

$$c_2 = \log_2\left(1 + \frac{P_2 \sigma_2^2}{\sigma_n^2}\right)$$

$$c_t = \log_2\left(1 + \frac{P_t \sigma_t^2}{\sigma_n^2}\right)$$

Total MIMO Capacity $= \Sigma c_i$ $$\boxed{c_{total} = \sum_{i=1}^{t} \log_2\left(1 + \frac{P_i \sigma_i^2}{\sigma_n^2}\right)}$$

sum of individual capacities of each parallel stream (t-information stream)
Allocation of Power Optimally to Maximize Capacity
Given a transmit power $P_0$, how to optimally allocate $P_i$ to all transmitters.

$$P_0 \geq \Sigma_i P_i$$

maximize capacity $$\text{Max } c = \text{Max}\left[\sum_{i}^{t} \log_2\left(1 + \frac{P_i \sigma_i^2}{\sigma_n^2}\right)\right]$$

$$\text{subject to } \sum_{i=1}^{t} P_i = P_0$$

Constraint Maximization problem (Lagrange multiplier)

$$F = \sum_{i=1}^{t} \log_2\left(1 + \frac{P_i \sigma_i^2}{\sigma_n^2}\right) + \lambda(P_0 - \Sigma P_i)$$

$$\frac{dF}{dP_i} = 0 \quad \boxed{P_i = \frac{1}{\lambda} - \frac{\sigma_n^2}{\sigma_i^2}}$$

$$\frac{\sigma_1^2 / \sigma_n^2}{1 + \frac{P_1 \sigma_1^2}{\sigma_n^2}} + \lambda(-1) = 0$$

$$\frac{\sigma_1^2 / \sigma_n^2}{1 + \frac{\sigma_1^2}{\sigma_n^2}} = \lambda \quad P_1 \frac{\sigma_1^2}{\sigma_n^2} \frac{1}{\lambda} = 1 + \frac{\sigma_1^2}{\sigma}$$

$$\boxed{P_1 = \frac{1}{\lambda} - \frac{\sigma_n^2}{\sigma_1^2}} \quad \frac{1}{\lambda} = \frac{\sigma_n^2}{\sigma_1^2} + P_1$$

$$P_1 = \left(\frac{1}{\lambda} - \frac{\sigma_n^2}{\sigma_1^2}\right)^+$$

$$P_2 = \left(\frac{1}{\lambda} - \frac{\sigma_n^2}{\sigma_2^2}\right)^+$$

$$\vdots$$

$$P_t = \left(\frac{1}{\lambda} - \frac{\sigma_n^2}{\sigma_t^2}\right)^+$$

power can only be positive (+)

$x^+x$ if $x \geq 0$  0 if $x < 0$ $$\sum_{i=1}^{t} P_i = P_0$$

$$\boxed{\sum_{i=1}^{t}\left(\frac{1}{\lambda} - \frac{\sigma_n^2}{\sigma_i^2}\right)^+ = P_0}$$

water filling $$P_i = \frac{1}{\lambda} - \frac{\sigma_n^2}{\sigma_i^2} \quad \sigma_1 = \text{largest}$$

Computational Method

Assume all N=t channels have non-zero or positive power $$\frac{1}{\lambda} \geq \frac{\sigma_n^2}{\sigma_i^2} \quad f \text{ for all } i = 1, 2, \ldots N$$

$$\sum_{i=1}^{t}\left(\frac{1}{\lambda} - \frac{\sigma_n^2}{\sigma_i^2}\right) = P_0$$

$$\sigma_1 > \sigma_2 > \sigma_3 \ldots > 0$$

check $$P_N = \frac{1}{\lambda} - \frac{\sigma_n^2}{\sigma_N^2}$$

if $P_N > 0$ then procedure terminates

Asymptotic Capacity $$c = \log_2\left|1 + \frac{1}{\sigma_n^2} H R_{xx} H^H\right|$$

$$R_{xx} = E[xx^H]$$

$$R_{xx} = \frac{P_0}{t} 1$$

$$c = \log_2\left|1 + \frac{P_0}{t\sigma_n^2} HH^H\right|$$

assume $t \gg r$ more columns than rows $$HH^H = \begin{bmatrix} h_1^H \\ h_2^H \\ \vdots \\ h_t^H \end{bmatrix}[h_1 \ h_2 \ \ldots \ h_r] = \begin{bmatrix} h_1^H h_1 & h_1^H h_2 & \ldots \\ h_2^H h_1 & \ddots & \\ \vdots & & h_r^H h_r \end{bmatrix}$$

$$c = \log_2\left|1 + \frac{1}{\sigma_n^2} H R_{xx} H^H\right|$$

$$R_{xx} = E[xx^H]$$

$$R_{xx} = \frac{P_0}{t} 1$$

$$c = \log_2\left|1 + \frac{P_0}{t\sigma_n^2} HH^H\right|$$

$$h_i^H h_i = \|h_i\|^2 \to t$$

$$h_i^H h_j \to 0 \text{ when } i \neq j$$

$$HH^H \to \begin{bmatrix} t & 0 & \ldots & 0 \\ 0 & t & & \\ \vdots & & \ddots & \\ & & & t \end{bmatrix} = t 1_r$$

$$c = \log_2\left|1 + \frac{P_0}{t\sigma_n^2} t 1\right| = \log_2\left\|1 + \frac{P_0}{\sigma_n^2} 1\right\| = \log_2\left\|1 + \frac{P_0}{\sigma_n^2} 1\right\| =$$

$$\log_2 \begin{vmatrix} 1 + \frac{P_0}{\sigma_n^2} & 0 & 0 \\ 0 & \ddots & 0 \\ 0 & 0 & 1 + \frac{P_0}{\sigma_n^2} \end{vmatrix} = \log_2\left(1 + \frac{P_0}{\sigma_n^2}\right)^r$$

$$\boxed{c_{asymptotic} = r \log_2\left(1 + \frac{P_0}{\sigma_n^2}\right)} \text{ constant } TX \text{ Power}$$

$c_{asymptotic} \propto f(r)$ linear function of receivers $$\boxed{c_{asymptotic} = \min(r, t)\log_2\left(1 + \frac{P_0}{\sigma_n^2}\right)}$$

Space-time Alamouti code:

$1_{RX} \times 2_{tx}$ system $2tx$ $1RX$ $$H = [h_1 \ h_2]$$

$$y = [h_1 \ h_2]\begin{bmatrix} x_1 \\ x_2 \end{bmatrix} + \vec{n}$$

pre-code $x_1 = \frac{h_1^*}{\|h\|} x$ $$x_2 = \frac{h_2^*}{\|h\|} x$$

$$\begin{bmatrix} x_1 \\ x_2 \end{bmatrix} = \begin{bmatrix} \frac{h_1^*}{\|h\|} \\ \frac{h_2^*}{\|h\|} \end{bmatrix} x$$

$$y = [h_1 \ h_2]\begin{bmatrix} \frac{h_1^*}{\|h\|} \\ \frac{h_2^*}{\|h\|} \end{bmatrix} x + \vec{n}$$

$$y = \|h\| x + \vec{n}$$

$$SNR = \frac{\|h\|^2 P_0}{\sigma_n^2} \to \text{exactly the same as } MRC \text{ similar to } RX \text{ diversity}$$

Transmit vector $$= \begin{bmatrix} \frac{h_1^*}{\|h\|} \\ \frac{h_2^*}{\|h\|} \end{bmatrix} x \text{ can this be done at } TX?$$

We need knowledge of h1 and h2 at TX
  Channel State Information (CSI)
Therefore TX-beam forming is only possible when channel state information is available at TX!
Not always possible. Hence, obtaining TX diversity is challenging compared to obtaining RX diversity.
⇓
Alamouti-code
⇓
1. Space-time code for $1_{RX} \times 2_{tx}$
2. Achieves a diversity of order 2 without CSI at TX
Orthogonal Space-Time Block Codes (OSTBC)
Alamouti Code:
  $1_{RX} \times 2_{TX}$ we do not know h1, h2
Consider 2 symbols $$\begin{bmatrix} x_1 \\ x_2 \end{bmatrix}$$

From TX1
First time instant symbols transmit $$\begin{bmatrix} x_1 \\ x_2 \end{bmatrix}$$

From TX2

$$y(1) = [h_1 \ h_2] \begin{bmatrix} x_1 \\ x_2 \end{bmatrix} + n(1)$$

first TX incident
second time transmit instant
transmit $$\begin{bmatrix} -x_2^* \\ x_1^* \end{bmatrix}$$

$$y(2) = [h_1 \ h_2] \begin{bmatrix} -x_2^* \\ x_1^* \end{bmatrix} + n(2)$$

$$y^*(2) = [h_1^* \ h_2^*] \begin{bmatrix} -x_2 \\ x_1 \end{bmatrix} + n^*(2)$$

$$y^*(2) = [-h_1^* \ h_2^*] \begin{bmatrix} x_2 \\ x_1 \end{bmatrix} + n^*(2)$$

$$y^*(2) = [h_2^* \ -h_1^*] \begin{bmatrix} x_1 \\ x_2 \end{bmatrix} + n^*(2)$$

Now stack y(1) and y*(2)

$$\begin{bmatrix} y_1(1) \\ y_2^*(2) \end{bmatrix} = \begin{bmatrix} h_1 & h_2 \\ h_2^* & -h_1^* \end{bmatrix} \begin{bmatrix} x_1 \\ x_2 \end{bmatrix} + \begin{bmatrix} n_1 \\ n_2 \end{bmatrix}$$

converted this to a MIMO system 2×2

1×2⇒2×2

$c_1^H c_2 = h_1^* h_2 - h_2 h_1^* = 0$ c1,c2 column 1 and column 2 are orthogonal Now what we do at receiver $$\frac{c_1}{\|c_1\|} = w_1 = \begin{bmatrix} \frac{h_1}{\|h\|} \\ \frac{h_2^*}{\|h\|} \end{bmatrix} = \frac{1}{\|h\|} \begin{bmatrix} h_1 \\ h_2^* \end{bmatrix}$$

employ this as RX-beam forming $$\frac{c_1}{\|c_1\|}$$

$$w_1^H \vec{y} = \begin{bmatrix} \frac{h_1^*}{\|h\|} & \frac{h_2}{\|h\|} \end{bmatrix} \begin{bmatrix} h_1 & h_2 \\ h_2^* & -h_1^* \end{bmatrix} \begin{bmatrix} x_1 \\ x_2 \end{bmatrix} + w_1^H n$$

$$= [\|h\| \ 0] \begin{bmatrix} x_1 \\ x_2 \end{bmatrix} + \tilde{n}$$

$$= \|h\| x_1 + \tilde{n}_1$$

$$SNR = \frac{\|h\|^2 P_1}{\sigma_n^2}$$

diversity order 2 $\|h\|^2 = \sqrt{|h_1|^2 + |h_2|^2}$
similarly to decode x2, the beamformer w2 is $$w_2 = \frac{c_2}{\|c_2\|} = \frac{1}{\|h\|} \begin{bmatrix} h_2 \\ -h_1^* \end{bmatrix}$$

total TX P is fixed P0

$$TX \text{ vector} = \begin{bmatrix} x_1 \\ x_2 \end{bmatrix}$$

$$P_1 = P_2 = \frac{P_0}{2}$$

power is divided between 2 TXs $$SNR = \frac{P_0}{2} \frac{\|h\|^2}{\sigma_n^2} = \frac{1}{2} \frac{\|h\|^2 P}{\sigma_n^2}$$

3 dB loss in SNR
Alamouti diversity gain sacrifices 3 dB to SNR, but it does not require knowledge of the channel.

Alamouti belongs to orthogonal space-time block code (OSTBC)

$$\text{space} \downarrow \begin{matrix} x_1 & -x_2^* \\ x_2 & x_1^* \end{matrix} \atop \text{time} \rightarrow$$

hence it transmits 2 symbols $x_1$, $x_2$ in 2 time instants. It effectively transmits 1 symbol/time instant. Therefore, it is a Rate R=1 code or Full Rate Code.

Another OSTBC:

$1_{RX} \times 3_{TX}$ MIMO or MISO channel matrix $[h_1 \ h_2 \ h_3] \ x_1 \ x_2 \ x_3 \ x_4$ $1^{st}$ to $8^{th}$ time instants $$\begin{bmatrix} x_1 \\ x_2 \\ x_3 \end{bmatrix} \begin{matrix} -x_2 & -x_3 & -x_4 & x_1^* & -x_2^* & -x_3^* & -x_4^* \\ x_1 & x_4 & -x_3 & x_2^* & x_1^* & x_4^* & -x_3^* \\ x_4 & x_1 & x_2 & x_3^* & -x_4^* & x_1^* & x_2 \end{matrix}$$

4 symbols over 8 time instants $$\text{rate} = \frac{4}{8} = \frac{1}{2} \quad R = \frac{1}{2} \text{code}$$

$$y(1) = [h_1 \ h_2 \ h_3] \begin{bmatrix} x_1 \\ x_2 \\ x_3 \end{bmatrix} = [h_1 \ h_2 \ h_3 \ h_4] \begin{bmatrix} x_1 \\ x_2 \\ x_3 \\ 0 \end{bmatrix}$$

$h_1 x_1 + h_2 x_2 + h_3 x_4 + 0 x_4$ $$y(2) = [h_1 \ h_2 \ h_3] \begin{bmatrix} -x_2 \\ x_1 \\ -x_4 \end{bmatrix}$$

$= -h_1 x_2 + h_2 x_1 - h_3 x_4 + 0 x_3 = h_2 x_1 + (-h_1) x_2 + 0 x_3 - h_3 x_4$ $$= [h_2 \ -h_1 \ 0 \ -h_3] \begin{bmatrix} x_1 \\ x_2 \\ x_3 \\ x_4 \end{bmatrix}$$

$$\begin{bmatrix} y(1) \\ y(2) \\ y(3) \\ y(4) \\ y^*(5) \\ y^*(6) \\ y^*(7) \\ y^*(8) \end{bmatrix} = \begin{bmatrix} h_1 & h_2 & h_3 & 0 \\ h_2 & -h_1 & 0 & -h_3 \\ h_3 & 0 & -h_1 & h_2 \\ 0 & h_3 & -h_2 & -h_1 \\ h_1^* & h_2^* & h_3^* & 0 \\ h_2^* & -h_1^* & 0 & -h_3^* \\ h_3^* & 0 & -h_1^* & h_2^* \\ 0 & h_3^* & -h_2^* & h_1^* \end{bmatrix} \begin{bmatrix} x_1 \\ x_2 \\ x_3 \\ x_4 \end{bmatrix}$$

$$c_1^H c_2 = [h_1^* \ h_2^* \ h_3^* \ 0 \ h_1 \ h_2 \ h_3 \ 0] \begin{bmatrix} h_2 \\ -h_1 \\ 0 \\ h_3 \\ h_2^* \\ h_1 \\ 0 \\ h_3^* \end{bmatrix} = 0$$

columns are orthogonal (OSTBC

Rate $= \frac{1}{2}$

Non-Linear MIMO Receiver
V-BLAST
Vertical Bell Labs Layered Space Time Architecture
Successive Interference Cancellation (SIC)
Impact of each estimated symbol is cancelled. Further, because it employs SIC, it is non-linear $$\vec{y} = H\vec{x} + n \quad r \geq t$$

$$= [h_1 \ \ldots \ h_t] \begin{bmatrix} x_1 \\ \vdots \\ x_t \end{bmatrix} + \vec{n}$$

$\vec{y} = h_1 x_1 + h_2 x_2 + h_3 x_3 + \ldots h_t x_t + n_1 + n_2 + \ldots n_t$ consider pseudo-inverse or left-inverse of H $$Q = H^\dagger = \begin{bmatrix} q_1^H \\ q_2^H \\ \vdots \\ q_t^H \end{bmatrix} \quad QH = 1 \ H^\dagger H = 1$$

$QH =$ $$1 = \begin{bmatrix} q_1^H \\ q_2^H \\ \vdots \\ q_t^H \end{bmatrix} [h_1 \ h_2 \ \ldots \ h_t] = 1_t = \begin{bmatrix} q_1^H h_1 & q_1^H h_2 & \ldots & q \\ q_2^H h_1 & q_2^H h_2 & \ldots & \\ \vdots & & \ddots & \end{bmatrix} = \begin{bmatrix} 1 & 0 & 0 \\ 0 & 1 & 0 \\ 0 & 0 & \ddots \end{bmatrix}$$

$q_1^H h_1 = q_2^H h_2 = \ldots 1$ diagonal element $q_1^H h_2 = q_2^H h_1 = \ldots = 0$ off diagonal element $$q_i^H h_j = \begin{cases} 1 & i = j \\ 0 & i \neq j \end{cases}$$

$\vec{y} = h_1 x_1 + h_2 x_2 + \ldots + h_t x_t + \vec{n}$ left multiply $\vec{y_1} = q_1^H \vec{y}$ $\vec{y_1} = q_1^H (h_1 x_1 + h_2 x_2 + \ldots + h_t x_t) + q_1^H n$ $\vec{y_1} = x_1 + 0 + \ldots + \vec{n}$ zero-forcing RX $\bar{x}=x_1+\tilde{n}$ now employed to decode $x_1$
Now remove the effect of $x_1$ from receiver
Subtract $$\vec{y} - h_1 x_1 = (h_1 x_1 + h_2 x_2 + \ldots h_t x_t) + \tilde{n} - h_1 x_1$$

$$\vec{y_2} = h_2 x_2 + \ldots + h_t x_t = [h_2 \quad h_3 \quad \ldots \quad h_t] \begin{bmatrix} x_2 \\ x_3 \\ \vdots \\ x_t \end{bmatrix} + \vec{n}$$

$r \times (t-1)$ matrix

By cancelling $x_1$, this is effectively reduced to a $rx(t-1)$ MIMO system.

$$y_2 = H^1 \begin{bmatrix} x_2 \\ \vdots \\ x_t \end{bmatrix} + \vec{n}$$

consider $Q^1 = (H^1)^\dagger$
Now repeat the process by decoding x2 and so on
Successively cancelling . . .
The advantage of this process or system is diversity order progressively increases as the process proceeds through the scheme.

$$y_t = h_t x_t + n_t$$

Streams that are decoded later experience progressively higher accuracy(higher diversity) of detection and lower BER. A non-linear receiver.
MIMO Beamforming
Beamforming in the context of MIMO, implies transmission in one spatial dimension.

$$y = Hx + \bar{n} \quad r \geq t$$

$$= U\Sigma V^H x + \bar{n}$$

$$= [u_1 \quad u_2 \quad \ldots \quad u_t] \begin{bmatrix} \sigma_1 & 0 & 0 \\ 0 & \ddots & 0 \\ 0 & 0 & \sigma_t \end{bmatrix} \begin{bmatrix} v_1^H \\ \vdots \\ v_t^H \end{bmatrix} x + \bar{n}$$

transmit vector $\bar{x} = v_1 \tilde{x}_1$ transmitting one symbol $\tilde{x}_1$
dominant transmission mode of MIMO in an abstract space in an abstract direction.

$$\bar{y} = [\bar{u}_1 \quad \bar{u}_2 \quad \ldots \quad \bar{u}_t] \begin{bmatrix} \sigma_1 & 0 & 0 \\ 0 & \ddots & 0 \\ 0 & 0 & \sigma_t \end{bmatrix} \begin{bmatrix} v_1^H \\ \vdots \\ v_t^H \end{bmatrix} v_1 \tilde{x}_1 + \bar{n}$$

$$\bar{y} = [\bar{u}_1 \quad \bar{u}_2 \quad \ldots \quad \bar{u}_t] \begin{bmatrix} \sigma_1 & & \\ & \ddots & \\ & & \sigma_t \end{bmatrix} \begin{bmatrix} 1 \\ 0 \\ \vdots \\ 0 \end{bmatrix} \tilde{x}_1 + \tilde{n}$$

orthonormal columns $$\bar{y} = [\bar{u}_1 \quad \bar{u}_2 \quad \ldots \quad \bar{u}_t] \begin{bmatrix} \sigma_1 \\ \vdots \\ 0 \end{bmatrix} \tilde{x}_1 + \tilde{n}$$

-continued $$\bar{y} = \sigma_1 \bar{u}_1 \tilde{x}_1 + \tilde{n}$$

$$= \sigma_1 \tilde{x}_1 \bar{u}_1 + \bar{n}$$

at receiver, MRC can be determined
$u_1$ can be employed for MRC $$u_1^H \bar{y} = u_1^H (\sigma_1 \bar{u}_1 \tilde{x}_1 + \vec{n}) = \sigma_1 \tilde{x}_1 + u_1^H \vec{n} = \sigma_1 \tilde{x}_1 + \tilde{n}$$

$$SNR = \frac{\sigma_1^2 P}{\sigma_n^2}$$

$\sigma_1$=largest singular value=gain associated with dominant mode
Maximal Ratio Transmission(MRT) results in a simplistic transmission and reception scheme for MIMO compared to MIMO-ZF, MIMO-MMSE, MIMO-VBLAST.
MRT does beam forming but no higher throughput and no parallel channels.
MRT
1. MRT is capacity optimal for low SNR
MRT achieves diversity order of rxt=high diversity

What is claimed is:
1. A communications system, comprising:
mode division multiplexing circuitry for receiving a plurality of input data streams and mode division multiplexing the plurality of input data streams onto a carrier signal, the mode division multiplexing circuitry comprising:
first signal processing circuitry for receiving the plurality of input data streams and applying a different orthogonal function to each of the plurality of input data streams;
second signal processing circuitry for processing each of the plurality of input data streams having the different orthogonal function applied thereto to multiplex a first group of the plurality of input data streams having a first group of orthogonal functions applied thereto onto the carrier signal and to multiplex a second group of the plurality of input data streams having a second group of orthogonal functions applied thereto onto the carrier signal to provide a mode division multiplexed carrier signal;
a MIMO transmitter for transmitting the mode division multiplexed carrier signal including the first group of the plurality of input data streams having the first group of orthogonal functions applied thereto and the second group of the plurality of input data streams having the second group of orthogonal functions applied thereto over a plurality of separate communications links from the MIMO transmitter, each of the plurality of separate communications links from one transmitting antenna of a plurality of transmitting antennas to each of a plurality of receiving antennas at a MIMO receiver; and
wherein a combination of mode division multiplexing and MIMO transmission minimize interchannel crosstalk effects between the plurality of input data streams.
2. The communications system of claim 1, wherein the first signal processing circuitry further comprises:
a carrier signal generator for generating a carrier signal for each of the plurality of input data streams;
a modulator for modulating each of the plurality of input data streams onto a separate carrier signal;

orthogonal processing circuitry for applying the different orthogonal function to each of the separate carrier signal to provide the plurality of input data streams having the different orthogonal function applied thereto.

3. The communications system of claim 1, further including:
a receiver for receiving the carrier signal over the plurality of separate communications links through a plurality of receiving antennas;
third signal processing circuitry for separating the first group of the plurality of input data streams having the first group of orthogonal functions applied thereto from the second group of the plurality of input data streams having the second group of orthogonal functions applied thereto; and
fourth signal processing circuitry for removing the first and the second groups of orthogonal functions from the first and the second groups of the plurality of input data streams respectively.

4. The communications system of claim 1, wherein the orthogonal functions comprise at least one of orbital angular momentum function, Hermite-Gaussian function, Laguerre-Gaussian function, spatial Bessel function, Prolate Spheroidal function.

5. The communications system of claim 1, wherein the MIMO transmitter transmits the carrier signal over at least one of an optical link or a radio frequency (RF) link.

6. The communications system of claim 1 further comprising third signal processing circuitry for applying maximum ratio combining to the first group and the second group of the plurality of input data streams to improve a signal to noise ratio of the transmitted mode division multiplexed carrier signal.

7. The communications system of claim 1, wherein transmitter transmits the carrier signal including the first and the second groups of the plurality of input data streams using a channel matrix of an impulse response of a channel, the channel matrix is created using a pilot signal transmitted on a pilot channel.

8. The communications system of claim 7, wherein the channel matrix comprises a set of simultaneous equations, each equation representing a received signal which is a composite of a unique set of channel coefficients applied to the transmitted carrier signal.

9. The communications system of claim 7, wherein the channel matrix can be decomposed using singular value decomposition.

10. A method for transmitting data over a communications link, comprising
mode division multiplexing a plurality of input data streams onto a carrier signal using mode division processing circuitry, the mode division multiplexing further comprising the steps of:
receiving a plurality of input data streams;
applying a different orthogonal function to each of the plurality of input data streams;
multiplexing a first group of the plurality of input data streams having a first group of orthogonal functions applied thereto onto a first carrier signal;
multiplexing a second group of the plurality of input data streams having a second group of orthogonal functions applied thereto onto a second carrier signal;
temporally multiplexing the first carrier signal and the second carrier signal onto a third carrier signal to provide a mode division multiplexed carrier signal;
transmitting, using a MIMO transmitter, the mode division multiplexed carrier signal including the first and the second groups of the plurality of input data streams over a plurality of communications links from the MIMO transmitter, each of the plurality of communications links transmitted from a separate transmitting antenna to a separate receiving antenna of a MIMO receiver; and
wherein a combination of mode division multiplexing and MIMO transmission minimize interchannel crosstalk effects between the plurality of input data streams.

11. The method of claim 10, wherein the step of applying further comprises:
generating a carrier signal for each of the plurality of input data streams;
modulating each of the plurality of input data streams onto a separate carrier signal; and
applying the different orthogonal function to each of the separate carrier signal to provide the plurality of input data streams having the different orthogonal function applied thereto.

12. The method of claim 11, further including:
receiving the carrier signal over the plurality of communications links through a plurality of receiving antennas;
separating the first group of the plurality of input data streams having the first orthogonal functions applied thereto from the second group of the plurality of input data streams having the second orthogonal functions applied thereto; and
removing the first and the second orthogonal functions from the first and the second groups of the plurality of input data streams respectively.

13. The method of claim 10, wherein the orthogonal functions comprise at least one of orbital angular momentum function, Hermite-Gaussian function, Laguerre-Gaussian function, spatial Bessel function, Prolate Spheroidal function.

14. The method of claim 10, wherein the step of transmitting further comprises transmitting the carrier signal over at least one of an optical link or a radio frequency (RF) link.

15. The method of claim 10 further comprising applying maximum ratio combining to the first group and the second group of the plurality of input data streams to improve a signal to noise ratio of the transmitted mode division multiplexed carrier signal.

16. The method of claim 10, wherein the step of transmitting further comprises:
creating a channel matrix using a pilot signal transmitted on a pilot channel; and
transmitting the carrier signal including the first and the second groups of the plurality of input data streams using the channel matrix of an impulse response of a channel.

17. The method of claim 16, wherein the channel matrix comprises a set of simultaneous equations, each equation representing a received signal which is a composite of a unique set of channel coefficients applied to the transmitted carrier signal.

18. The method of claim 16 further comprising the step of decomposing the channel matrix using singular value decomposition.

19. A communications system, comprising:
mode division multiplexing circuitry for receiving a plurality of input data streams and mode division multiplexing the plurality of input data streams onto a carrier signal, the mode division multiplexing circuitry comprising:
  a carrier signal generator for generating a carrier signal for each of the plurality of input data streams;
  a modulator for modulating each of the plurality of input data streams onto a separate carrier signal;
  orthogonal function processing circuitry for applying a different orthogonal function to each of the plurality of input data streams to provide a plurality of data streams having the different orthogonal function applied thereto;
  first signal processing circuitry for processing each of the plurality of input data streams having the different orthogonal function applied thereto to multiplex a first group of the plurality of input data streams having a first group of orthogonal functions applied thereto onto the carrier signal and to multiplex a second group of the plurality of input data streams having a second group of orthogonal functions applied thereto onto the carrier signal to provide a mode division multiplexed carrier signal;
  a MIMO transmitter for transmitting the mode division multiplexed carrier signal including the first group of the plurality of input data streams having the first group of orthogonal functions applied thereto and the second group of the plurality of input data streams having the second group of orthogonal functions applied thereto over a plurality of communications links from the MIMO transmitter, each of the plurality of communications links from one transmitting antenna of a plurality of transmitting antennas to each of a plurality of receiving antennas;
  a MIMO receiver including the plurality of receiving antennas for receiving the mode division multiplexed carrier signal over each of the plurality of communications links through the plurality of receiving antennas;
  wherein a combination of mode division multiplexing and MIMO transmission minimize interchannel crosstalk effects between the plurality of input data streams;
  second mode division processing circuitry for receiving the mode division multiplexed carrier signal and mode division demultiplexing mode division multiplexed carrier signal into the plurality of input data streams, the second mode division processing circuitry comprising:
    second signal processing circuitry for demultiplexing the mode division multiplexed carrier signal into the first group of the plurality of input data streams having the first group of orthogonal functions applied thereto and the second group of the plurality of input data streams having the second group of orthogonal functions applied thereto; and
    third signal processing circuitry for removing the first and the second group of orthogonal functions from the first and the second groups of the plurality of input data streams respectively.

20. The communications system of claim 19, wherein the orthogonal functions comprise at least one of orbital angular momentum function, Hermite-Gaussian function, Laguerre-Gaussian function, spatial Bessel function, Prolate Spheroidal function.

21. The communications system of claim 19, wherein the MIMO transmitter transmits the carrier signal over at least one of an optical link or a radio frequency (RF) link.

22. The communications system of claim 19 further comprising fourth signal processing circuitry for applying maximum ratio combining to the first group and the second group of the plurality of input data streams to improve a signal to noise ratio of the transmitted mode division multiplexed carrier signal.

23. The communications system of claim 19, wherein the MIMO transmitter transmits the carrier signal including the first and the second groups of the plurality of input data streams using a channel matrix of an impulse response of a channel, the channel matrix is created using a pilot signal transmitted on a pilot channel.

24. The communications system of claim 23, wherein the channel matrix comprises a set of simultaneous equations, each equation representing a received signal which is a composite of a unique set of channel coefficients applied to the transmitted carrier signal.

25. The communications system of claim 23, wherein the channel matrix can be decomposed using singular value decomposition.

26. A communications system, comprising:
  first signal processing circuitry for receiving a plurality of input data streams and applying a different orthogonal function to each of the plurality of input data streams;
  second signal processing circuitry for processing each of the plurality of input data streams having the different orthogonal function applied thereto to multiplex a first group of the plurality of input data streams having a first group of orthogonal functions applied thereto onto a carrier signal and to multiplex a second group of the plurality of input data streams having a second group of orthogonal functions applied thereto onto the carrier signal;
  third signal processing circuitry for applying maximum ratio combining to the carrier signal to improve a signal to noise ratio of a transmitted carrier signal; and
  a MIMO transmitter for transmitting the carrier signal including the plurality of input data streams having the maximum ration combining applied thereto over a plurality of communications links, each of the plurality of communications links from one transmitting antenna a plurality of transmitting antennas to each of a plurality of receiving antennas at a MIMO receiver.

27. The communications system of claim 26, further including:
  a receiver for receiving the carrier signal over the plurality of communications links through the plurality of receiving antennas; and
  second signal processing circuitry for processing the received carrier signal using maximum ratio combining and outputting the plurality of input data streams.

28. The communications system of claim 26, wherein transmitter transmits the carrier signal over at least one of an optical link or a radio frequency link.

29. The communications system of claim 26, wherein transmitter transmits the carrier signal including the first and second groups of the plurality of input data streams using a channel matrix of an impulse response of a channel, the channel matrix is created using a pilot signal transmitted on a pilot channel.

30. The communications system of claim 29, wherein the channel matrix comprises a set of simultaneous equations, each equation representing a received signal which is a composite of a unique set of channel coefficients applied to the transmitted carrier signal.

* * * * *